US011966031B2

(12) United States Patent
Yeh et al.

(10) Patent No.: US 11,966,031 B2
(45) Date of Patent: Apr. 23, 2024

(54) IMAGE LENS ASSEMBLY, ZOOM IMAGING APPARATUS AND ELECTRONIC DEVICE

(71) Applicant: LARGAN PRECISION CO., LTD., Taichung (TW)

(72) Inventors: Kuan-Ting Yeh, Taichung (TW); Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 143 days.

(21) Appl. No.: 17/516,771

(22) Filed: Nov. 2, 2021

(65) Prior Publication Data

US 2022/0171171 A1 Jun. 2, 2022

(30) Foreign Application Priority Data

Dec. 2, 2020 (TW) ................................ 109142477

(51) Int. Cl.

*G02B 15/14* (2006.01)
*G02B 9/34* (2006.01)
*G02B 13/00* (2006.01)

(52) U.S. Cl.

CPC ............. *G02B 15/144* (2019.08); *G02B 9/34* (2013.01); *G02B 13/004* (2013.01)

(58) Field of Classification Search

CPC ...... G02B 15/144; G02B 9/34; G02B 13/004; G02B 15/144111; G02B 15/20

See application file for complete search history.

(56) References Cited

U.S. PATENT DOCUMENTS

| | | | | |
|---|---|---|---|---|
| 6,349,002 | B1 | 2/2002 | Shibayama et al. | |
| 7,436,600 | B1 | 10/2008 | Noda | |
| 2020/0073085 | A1 | 3/2020 | Huang | |
| 2021/0063704 | A1 | 3/2021 | Son et al. | |
| 2021/0286151 | A1* | 9/2021 | Zhang ................ | G02B 27/0012 |
| 2021/0325644 | A1* | 10/2021 | Zhang ................ | G02B 15/1445 |

FOREIGN PATENT DOCUMENTS

| | | | |
|---|---|---|---|
| CN | 111338065 | A | 6/2020 |
| CN | 111338066 | A | 6/2020 |
| WO | 2021169557 | A1 | 9/2021 |

* cited by examiner

*Primary Examiner* — Joseph P Martinez

(74) *Attorney, Agent, or Firm* — McClure, Qualey & Rodack, LLP

(57) ABSTRACT

An image lens assembly includes, in order from an object side to an image side along an optical path, a first lens group, a second lens group, a third lens group and a fourth lens group. A total number of lens elements in the image lens assembly is seven. The first lens group includes a first lens element with positive refractive power and a second lens element with negative refractive power. Each of the second lens group and the third lens group includes at least one lens element. The fourth lens group includes a seventh lens element. When the image lens assembly is focusing or zooming, a relative position between the first lens group and an image surface is fixed, a relative position between the fourth lens group and the image surface is fixed, and the second lens group and the third lens group move along the optical axis.

36 Claims, 82 Drawing Sheets

20

IMAGE LENS ASSEMBLY, ZOOM IMAGING APPARATUS AND ELECTRONIC DEVICE

RELATED APPLICATIONS

This application claims priority to Taiwan Application Serial Number 109142477, filed Dec. 2, 2020, which is herein incorporated by reference.

BACKGROUND

Technical Field

The present disclosure relates to an image lens assembly and a zoom imaging apparatus. More particularly, the present disclosure relates to an image lens assembly and a zoom imaging apparatus with focusing and zooming functions applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, an image lens assembly includes, in order from an object side to an image side along an optical path, a first lens group, a second lens group, a third lens group and a fourth lens group. The first lens group includes a first lens element and a second lens element, wherein the first lens element with positive refractive power has an object-side surface being convex in a paraxial region thereof, and the second lens element has negative refractive power. The second lens group includes a third lens element and a fourth lens element. The third lens group includes a fifth lens element and a sixth lens element. The fourth lens group includes a seventh lens element. A total number of lens elements in the image lens assembly is seven. At least one lens element of the image lens assembly includes at least one inflection point in an off-axis region thereof. When the image lens assembly is focusing or zooming, a relative position between the first lens group and an image surface is fixed, a relative position between the fourth lens group and the image surface is fixed, and the second lens group and the third lens group move along an optical axis. At least four lens elements of the image lens assembly are made of plastic material. When a maximum field of view in a zoom range of the image lens assembly is FOVmax, and a minimum field of view in the zoom range of the image lens assembly is FOVmin, the following conditions are satisfied: FOVmax<50 degrees; and 1.25<FOVmax/FOVmin<6.0.

According to one aspect of the present disclosure, a zoom imaging apparatus includes the image lens assembly of the aforementioned aspect and an image sensor, wherein the image sensor is disposed on the image surface of the image lens assembly.

According to one aspect of the present disclosure, an electronic device includes the zoom imaging apparatus of the aforementioned aspect and at least one prime imaging apparatus. The zoom imaging apparatus and the said prime imaging apparatus face towards the same side, and the optical axis of the zoom imaging apparatus is perpendicular to an optical axis of the prime imaging apparatus. When a maximum field of view of the prime imaging apparatus of the electronic device is DFOV, and the maximum field of view in the zoom range of the image lens assembly is FOVmax, the following condition is satisfied: 40 degrees<DFOV−FOVmax.

According to one aspect of the present disclosure, an electronic device includes a zoom imaging apparatus and at least one prime imaging apparatus, wherein the zoom imaging apparatus and the said prime imaging apparatus face towards the same side. The zoom imaging apparatus includes an image lens assembly, an optical axis of the prime imaging apparatus is perpendicular to an optical axis of the image lens assembly, and the image lens assembly includes, in order from an object side to an image side along an optical path, a first lens group, a second lens group, a third lens group and a fourth lens group. The first lens group includes a first lens element and a second lens element, wherein the first lens element has positive refractive power, and the second lens element has negative refractive power. The second lens group includes at least one lens element. The third lens group includes at least one lens element. The fourth lens group includes a seventh lens element. A total number of lens elements in the image lens assembly is seven. At least one lens element of the image lens assembly includes at least one inflection point in an off-axis region thereof. When the image lens assembly is focusing or zooming, a relative position between the first lens group and an image surface is fixed, a relative position between the fourth lens group and the image surface is fixed, and the second lens group and the third lens group move along the optical axis. At least four lens elements of the image lens assembly are made of plastic material. When a maximum field of view in a zoom range of the image lens assembly is FOVmax, a minimum field of view in the zoom range of the image lens assembly is FOVmin, and a maximum field of view of the prime imaging apparatus of the electronic device is DFOV, the following conditions are satisfied: 1.25<FOVmax/FOVmin<5.0; and 40 degrees<DFOV−FOVmax.

BRIEF DESCRIPTION OF THE DRAWINGS

FIG. 213 shows spherical aberration curves, astigmatic field curves and a distortion curve of the zoom imaging apparatus on the zoom position according to the 1st embodiment of FIG. 1B.

Figure 1A:
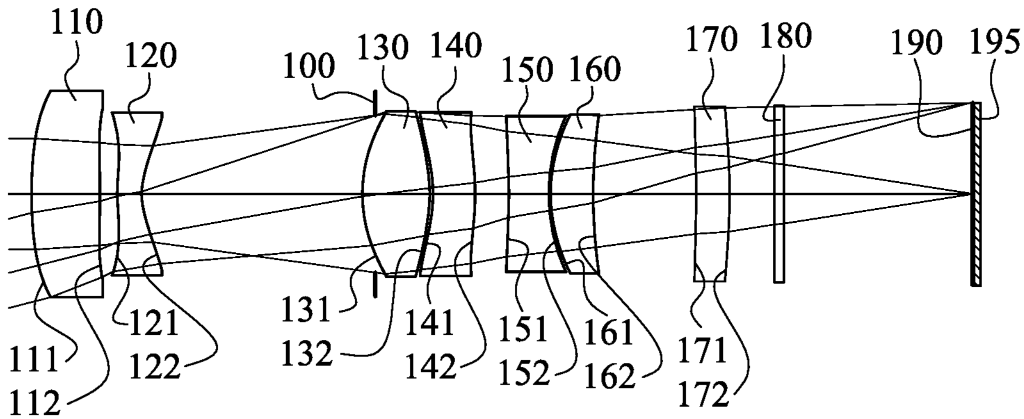
FIG. 1A is a schematic view of a zoom imaging apparatus on one zoom position according to the 1st embodiment of the present disclosure.
Figure 1B:
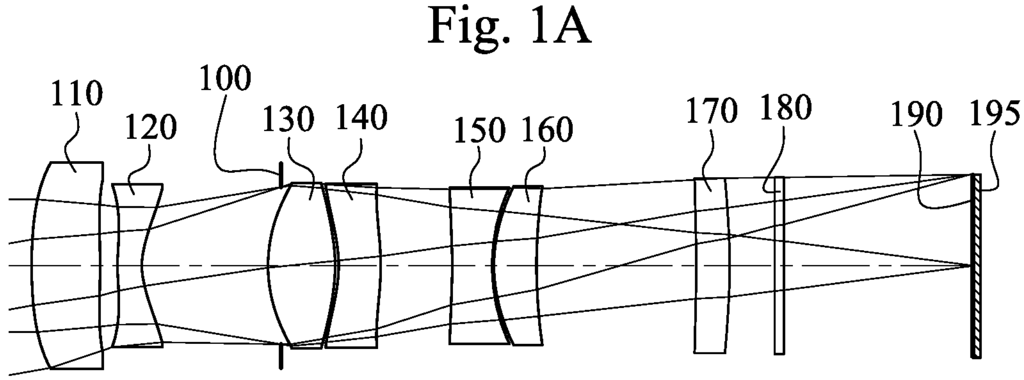
FIG. 1B is a schematic view of the zoom imaging apparatus on another zoom position according to the 1st embodiment of the present disclosure.
Figure 1C:
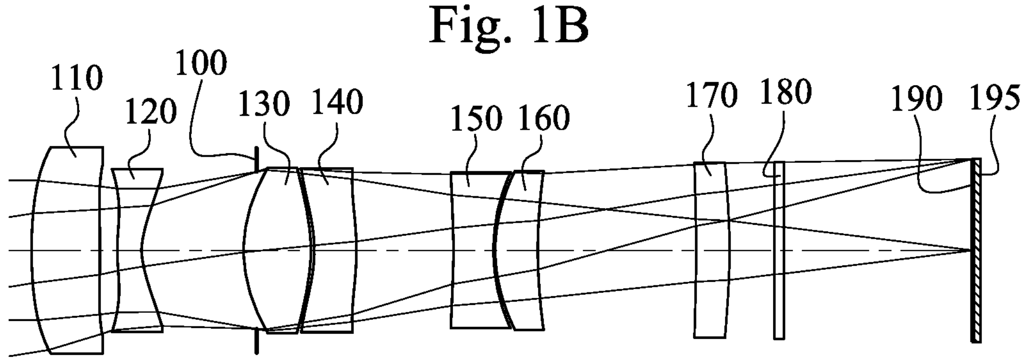
FIG. 1C is a schematic view of the zoom imaging apparatus on another zoom position according to the 1st embodiment of the present disclosure.
Figure 1D:
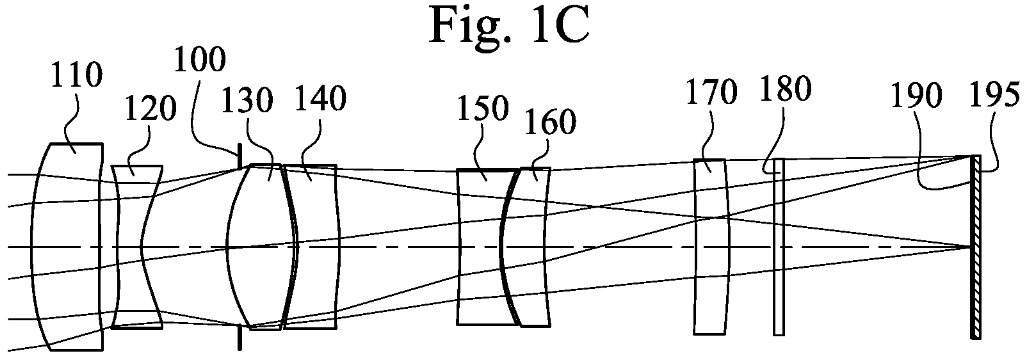
FIG. 1D is a schematic view of the zoom imaging apparatus on another zoom position according to the 1st embodiment of the present disclosure.
Figure 1E:
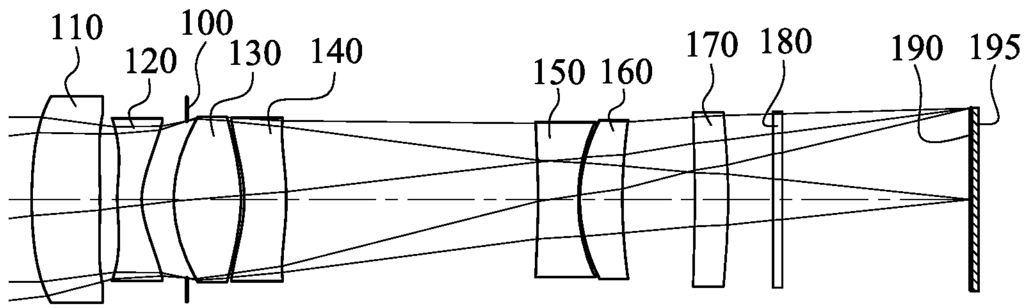
FIG. 1E is a schematic view of the zoom imaging apparatus on another zoom position according to the 1st embodiment of the present disclosure.
Figure 1F:
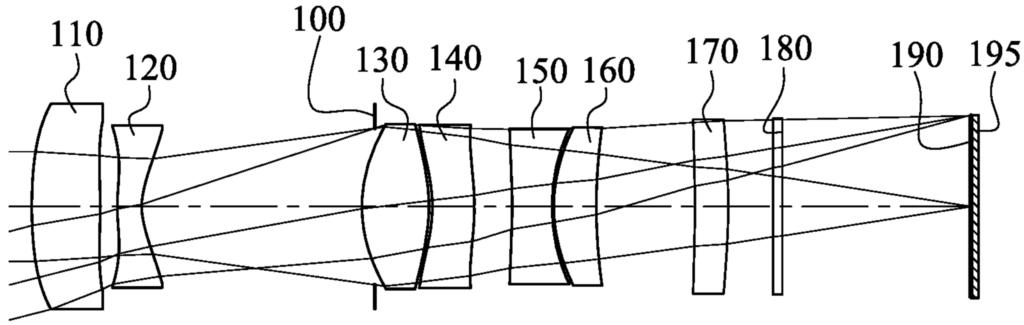
FIG. 1F is a schematic view of the zoom imaging apparatus on another zoom position according to the 1st embodiment of the present disclosure.
Figure 1G:
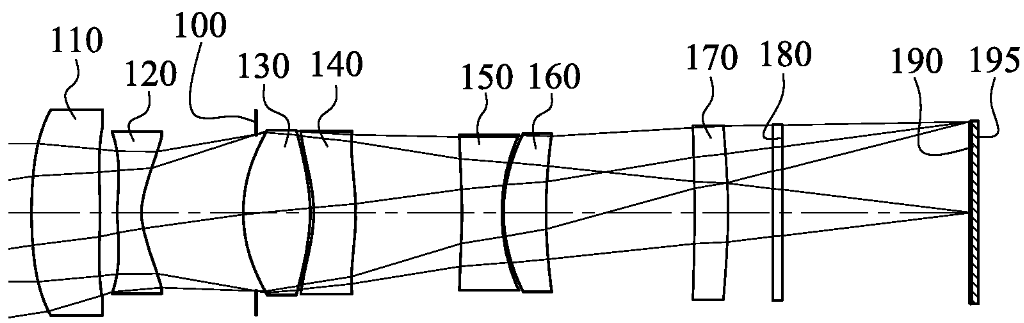
FIG. 1G is a schematic view of the zoom imaging apparatus on another zoom position according to the 1st embodiment of the present disclosure.
Figure 1H:
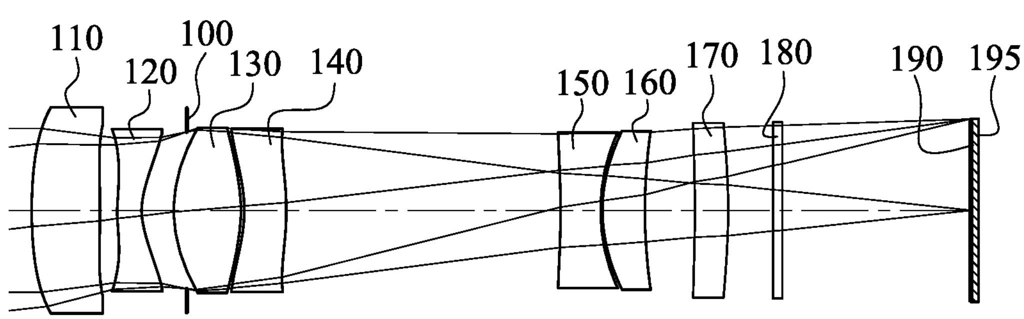
FIG. 1H is a schematic view of the zoom imaging apparatus on another zoom position according to the 1st embodiment of the present disclosure.
Figure 2A:
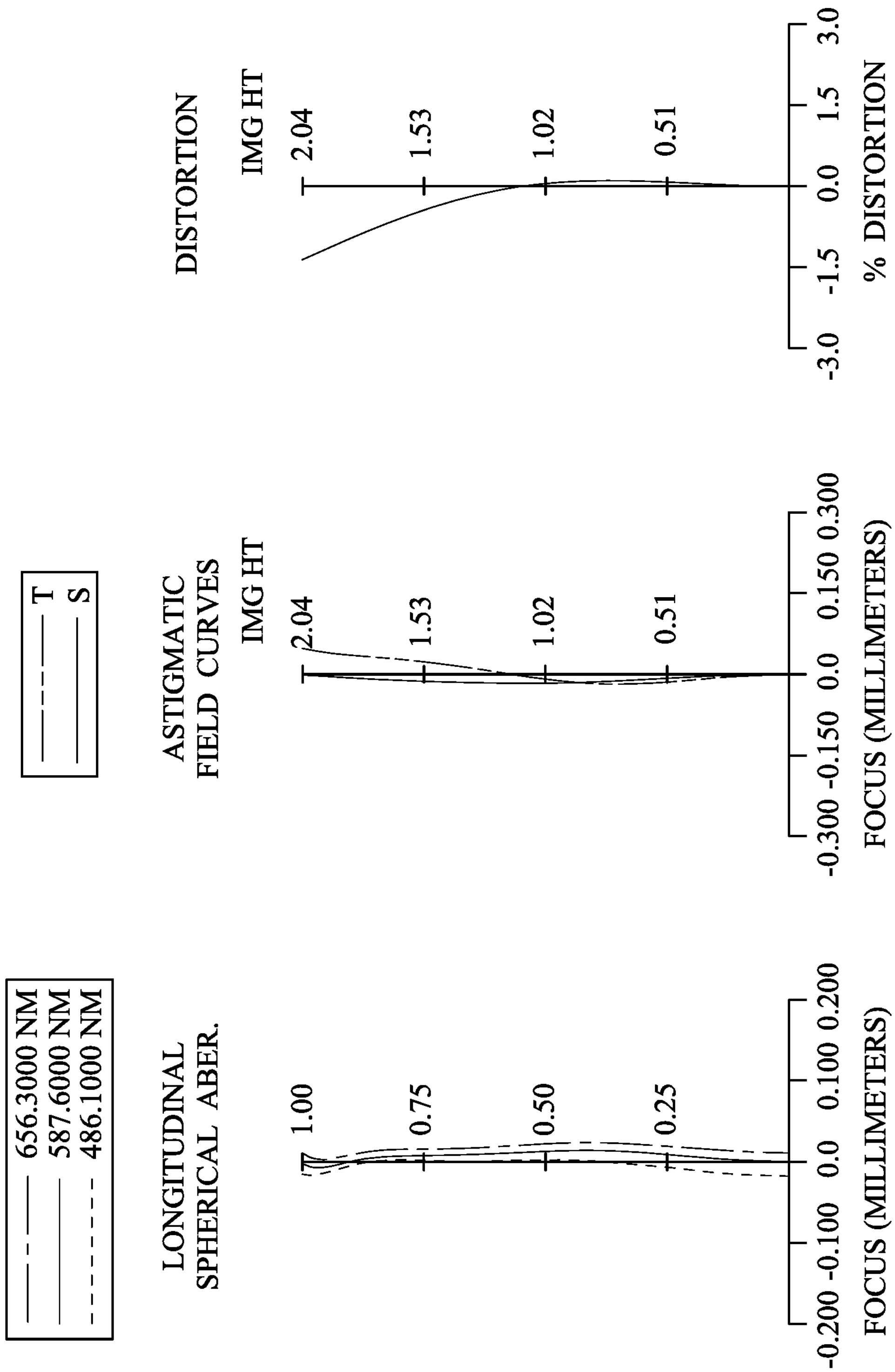
FIG. 2A shows spherical aberration curves, astigmatic field curves and a distortion curve of the zoom imaging apparatus on the zoom position according to the 1st embodiment of FIG. 1A.
Figure 2B:
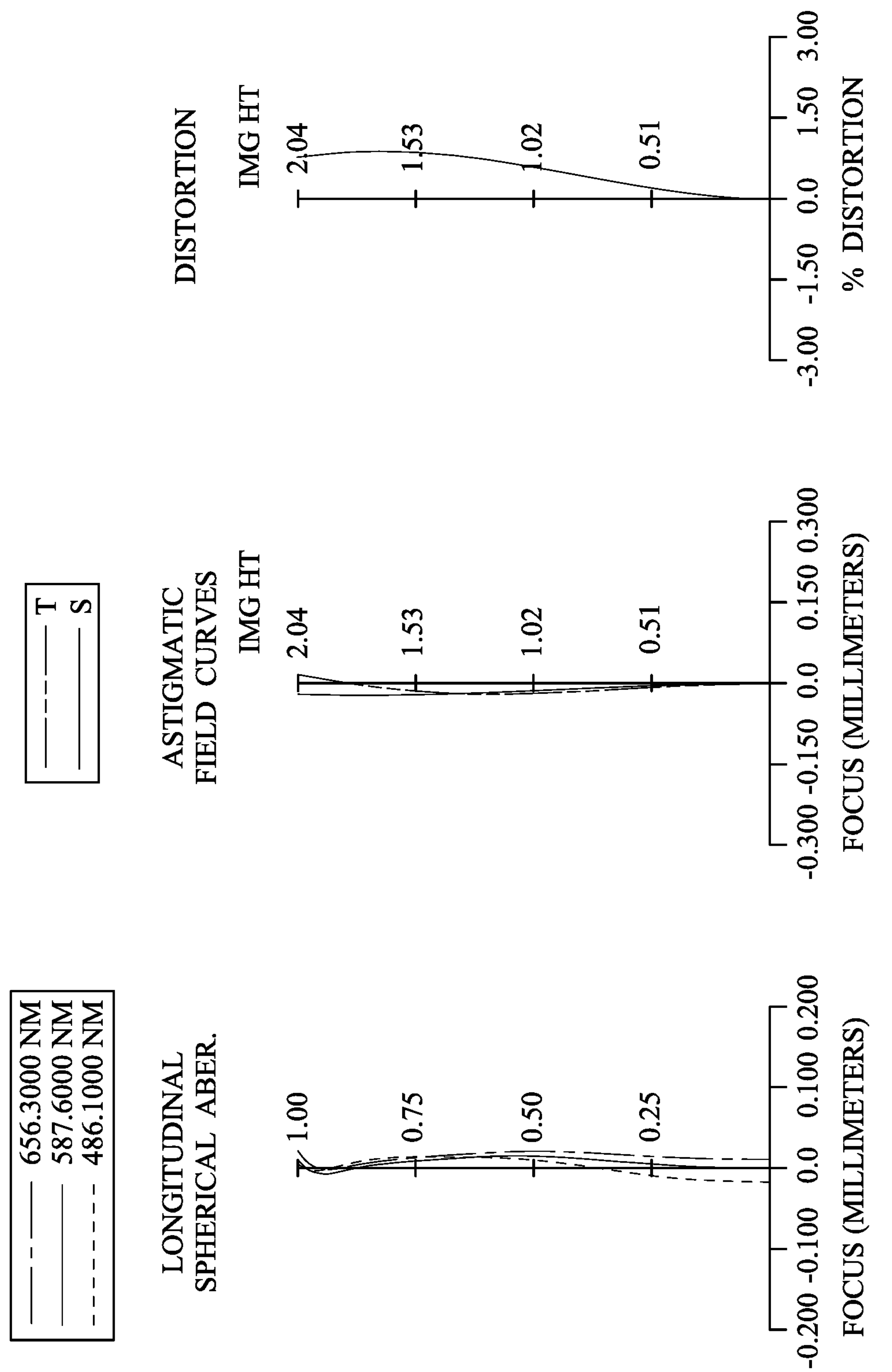
FIG. 2C shows spherical aberration curves, astigmatic field curves and a distortion curve of the zoom imaging apparatus on the zoom position according to the 1st embodiment of FIG. 1C.
FIG. 2D shows spherical aberration curves, astigmatic field curves and a distortion curve of the zoom imaging apparatus on the zoom position according to the 1st embodiment of FIG. 1D.
FIG. 2E shows spherical aberration curves, astigmatic field curves and a distortion curve of the zoom imaging apparatus on the zoom position according to the 1st embodiment of FIG. 1E.
FIG. 2F shows spherical aberration curves, astigmatic field curves and a distortion curve of the zoom imaging apparatus on the zoom position according to the 1st embodiment of FIG. 1F.
FIG. 2G shows spherical aberration curves, astigmatic field curves and a distortion curve of the zoom imaging apparatus on the zoom position according to the 1st embodiment of FIG. 1G.
FIG. 2H shows spherical aberration curves, astigmatic field curves and a distortion curve of the zoom imaging apparatus on the zoom position according to the 1st embodiment of FIG. 1H.
Figure 2C:
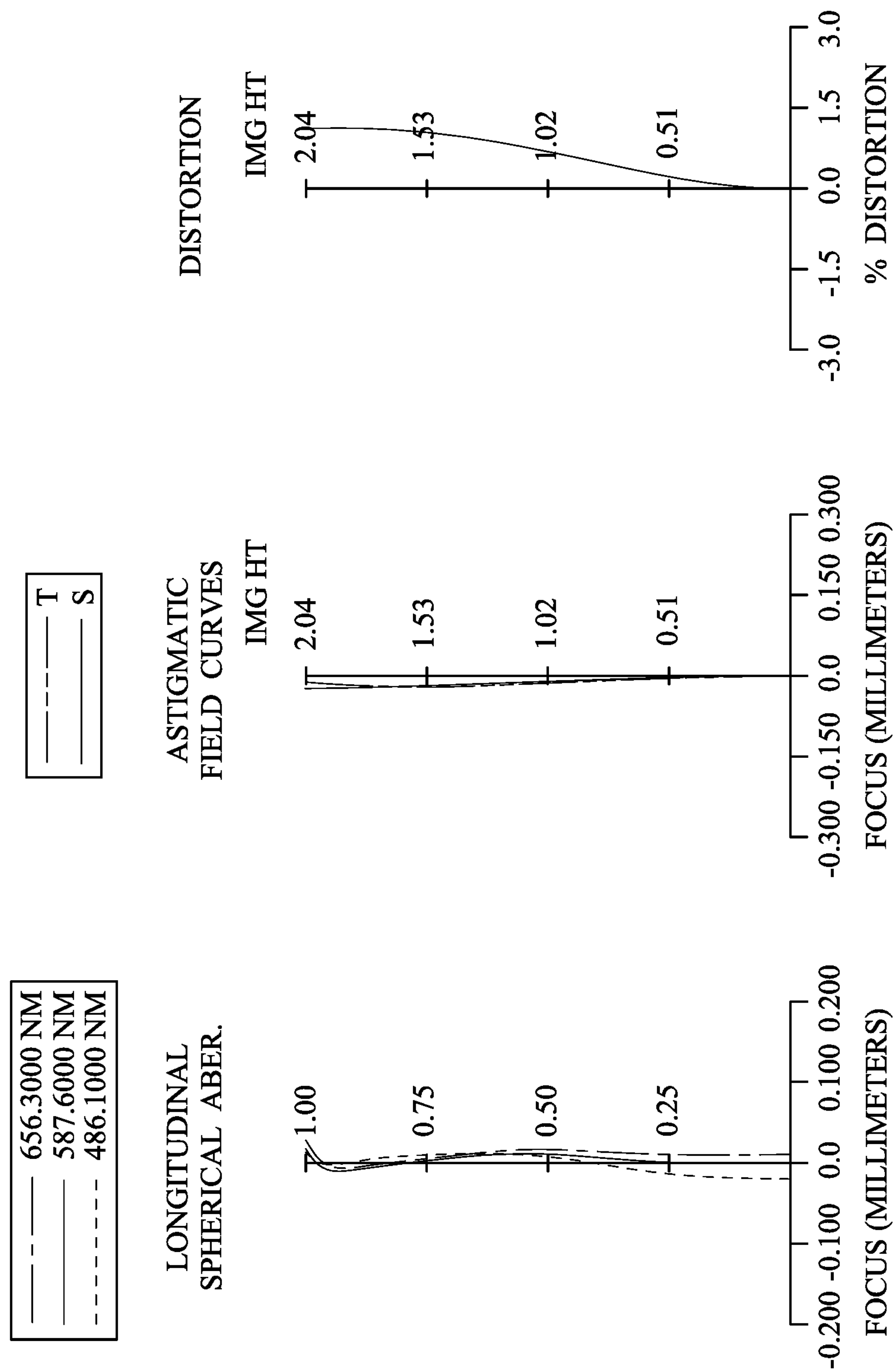
Figure 2D:
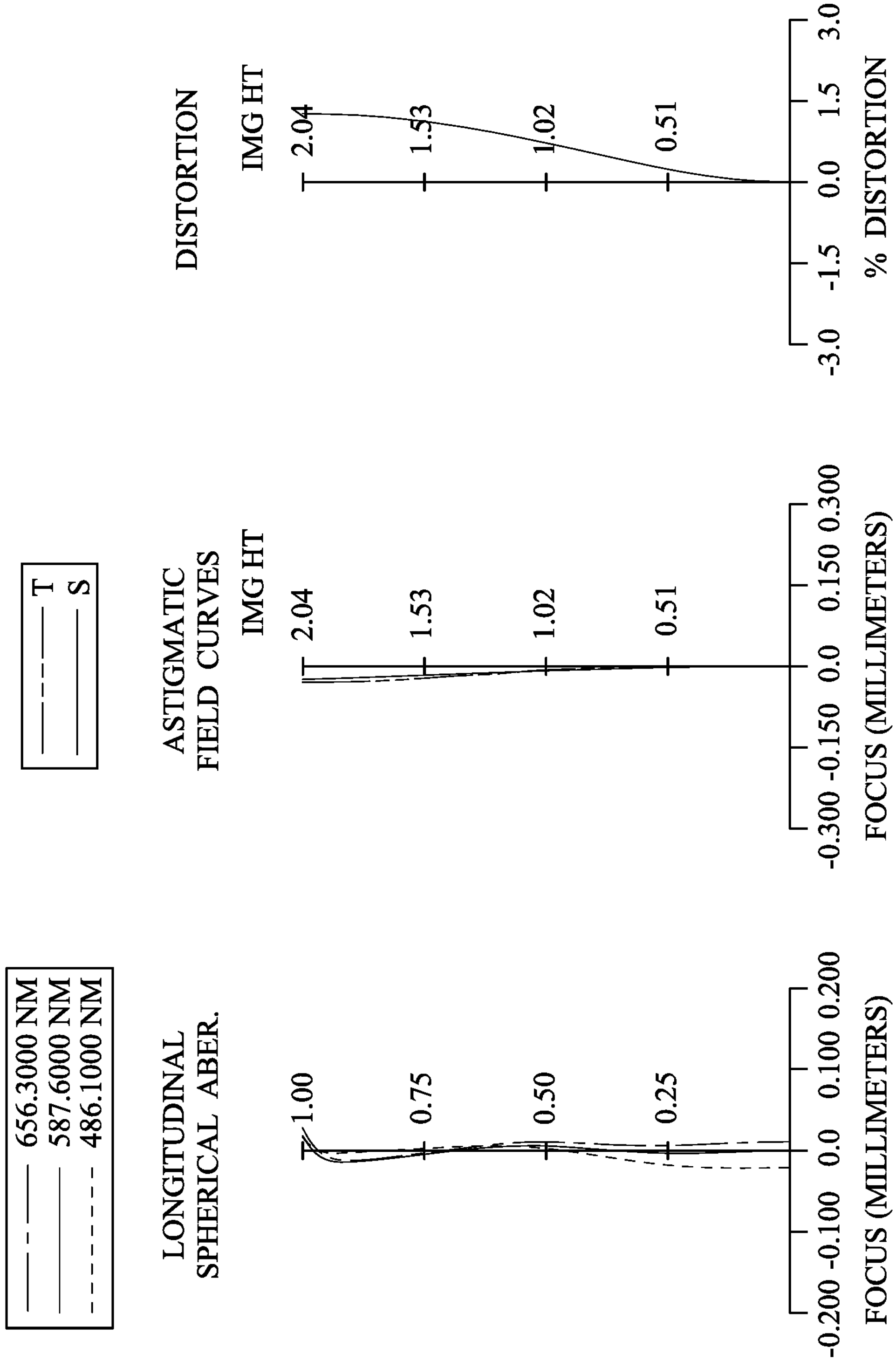
Figure 2E:
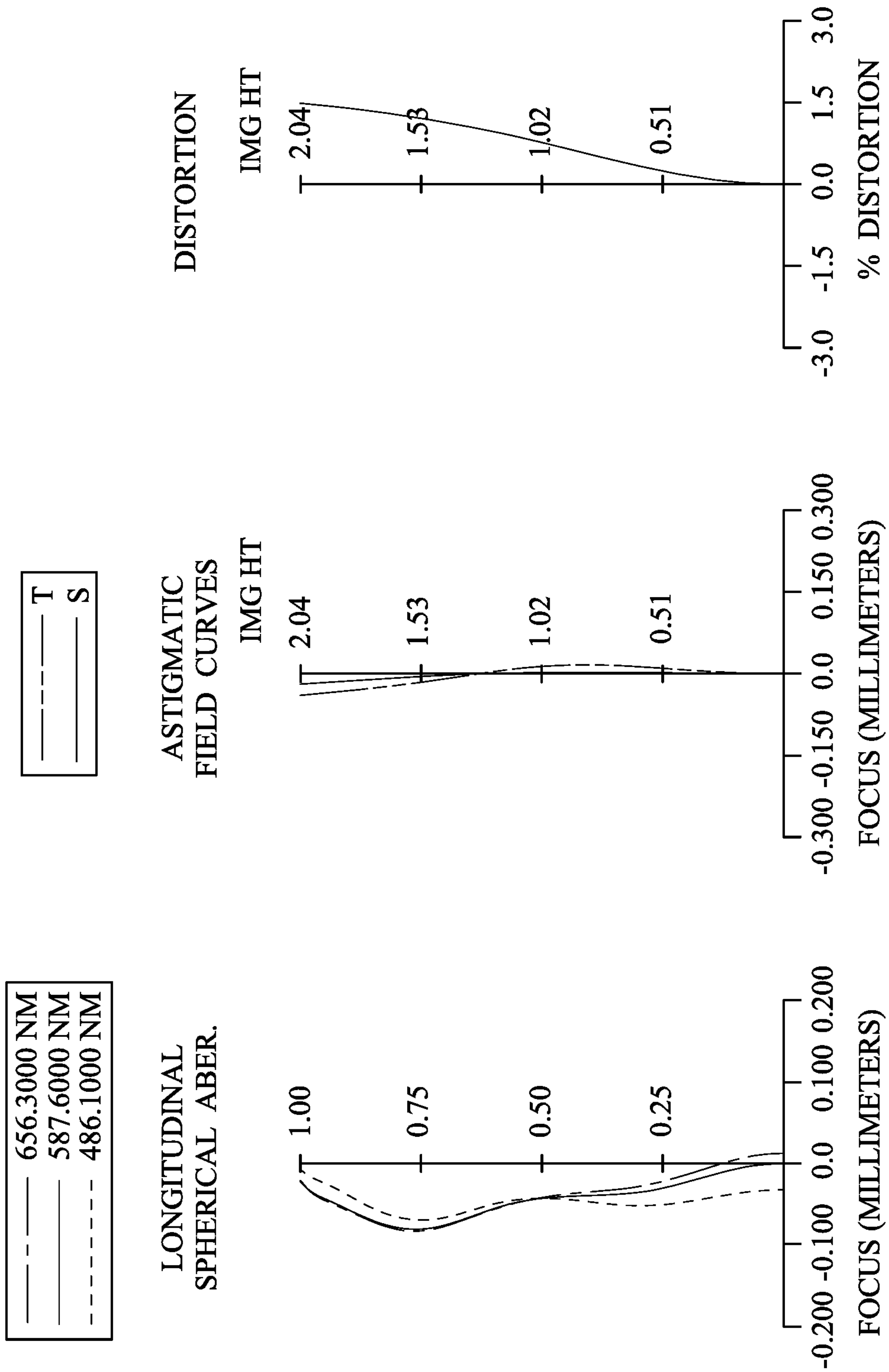
Figure 2F:
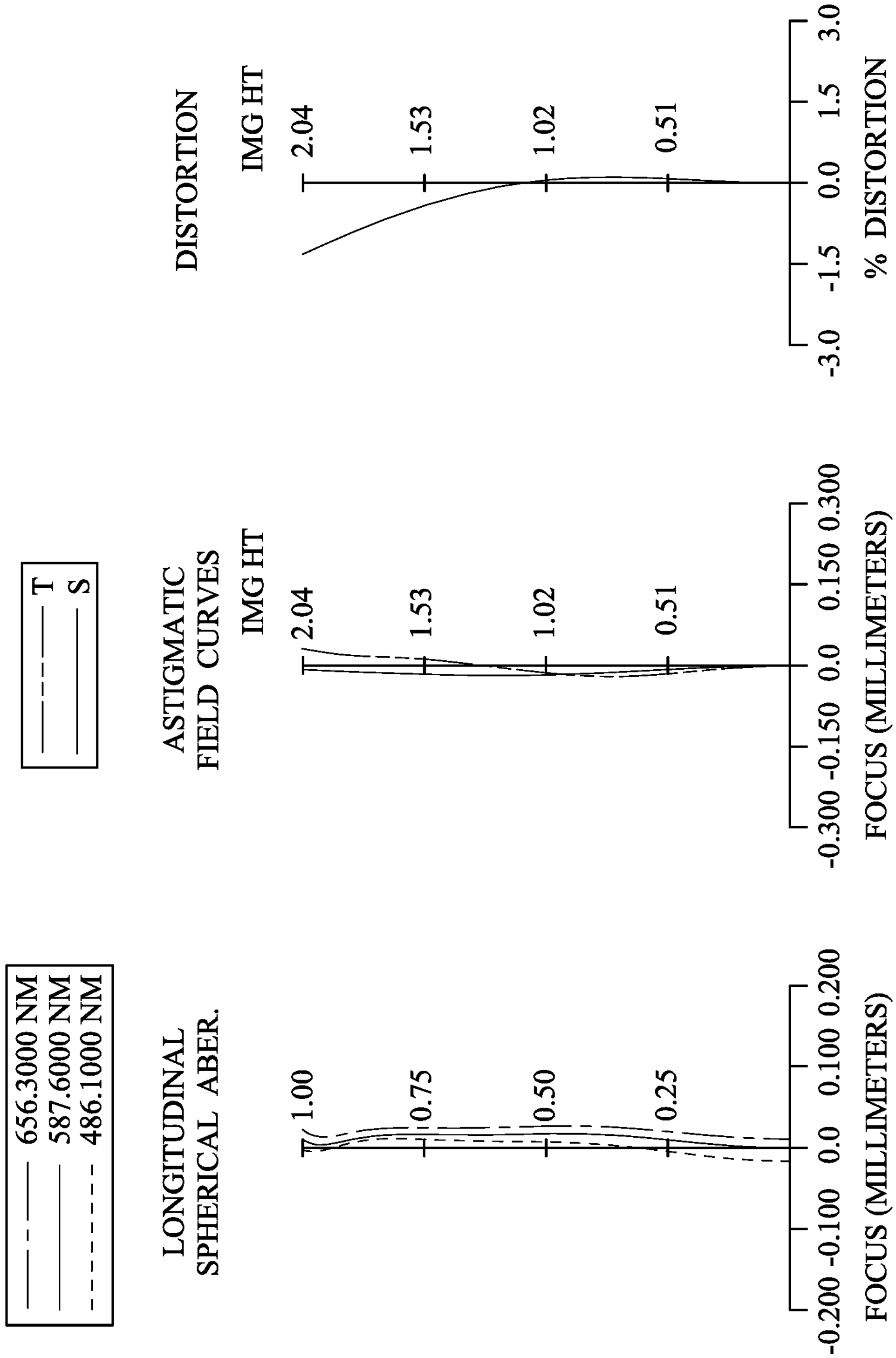
Figure 2G:
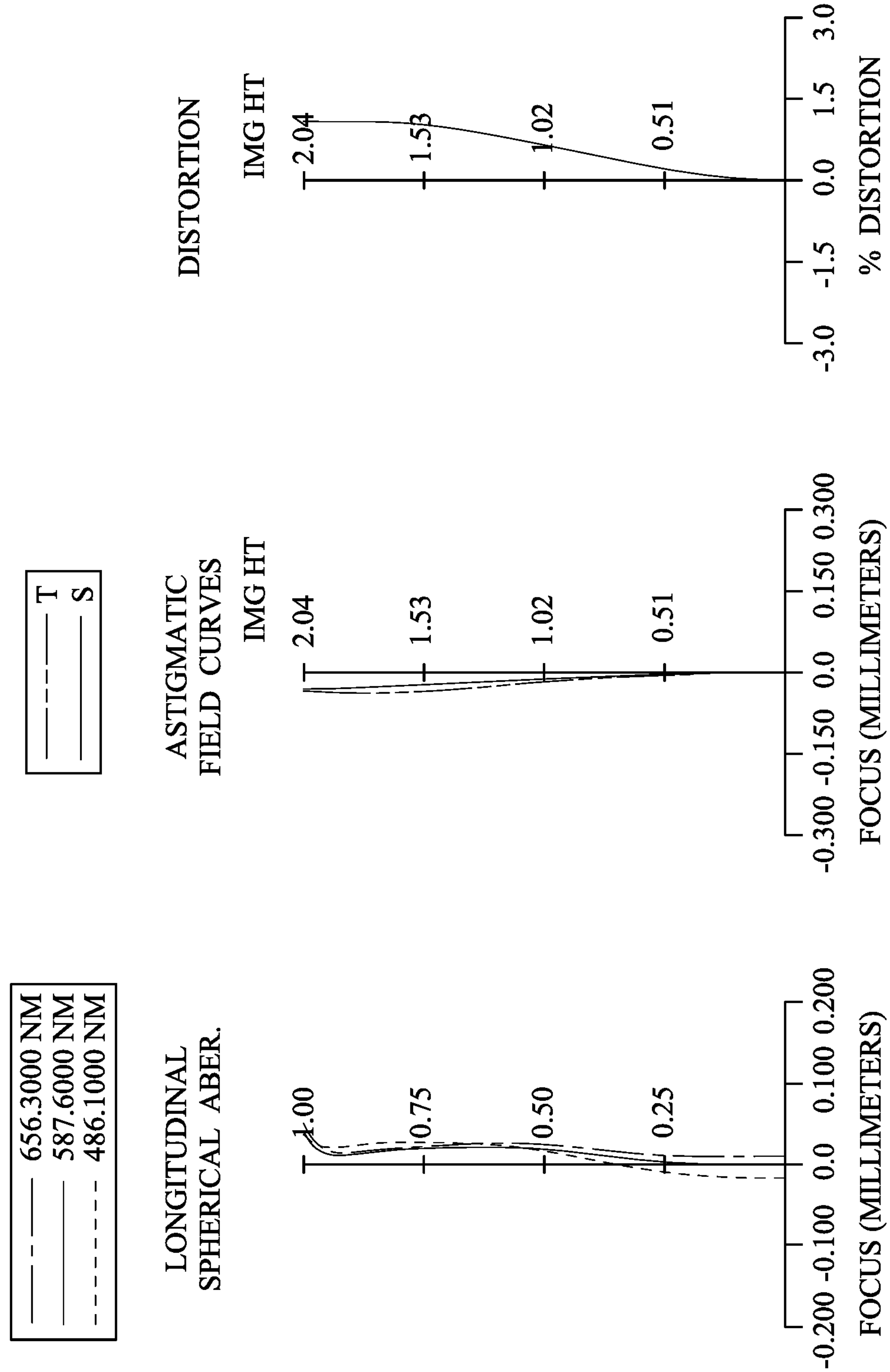
Figure 2H:
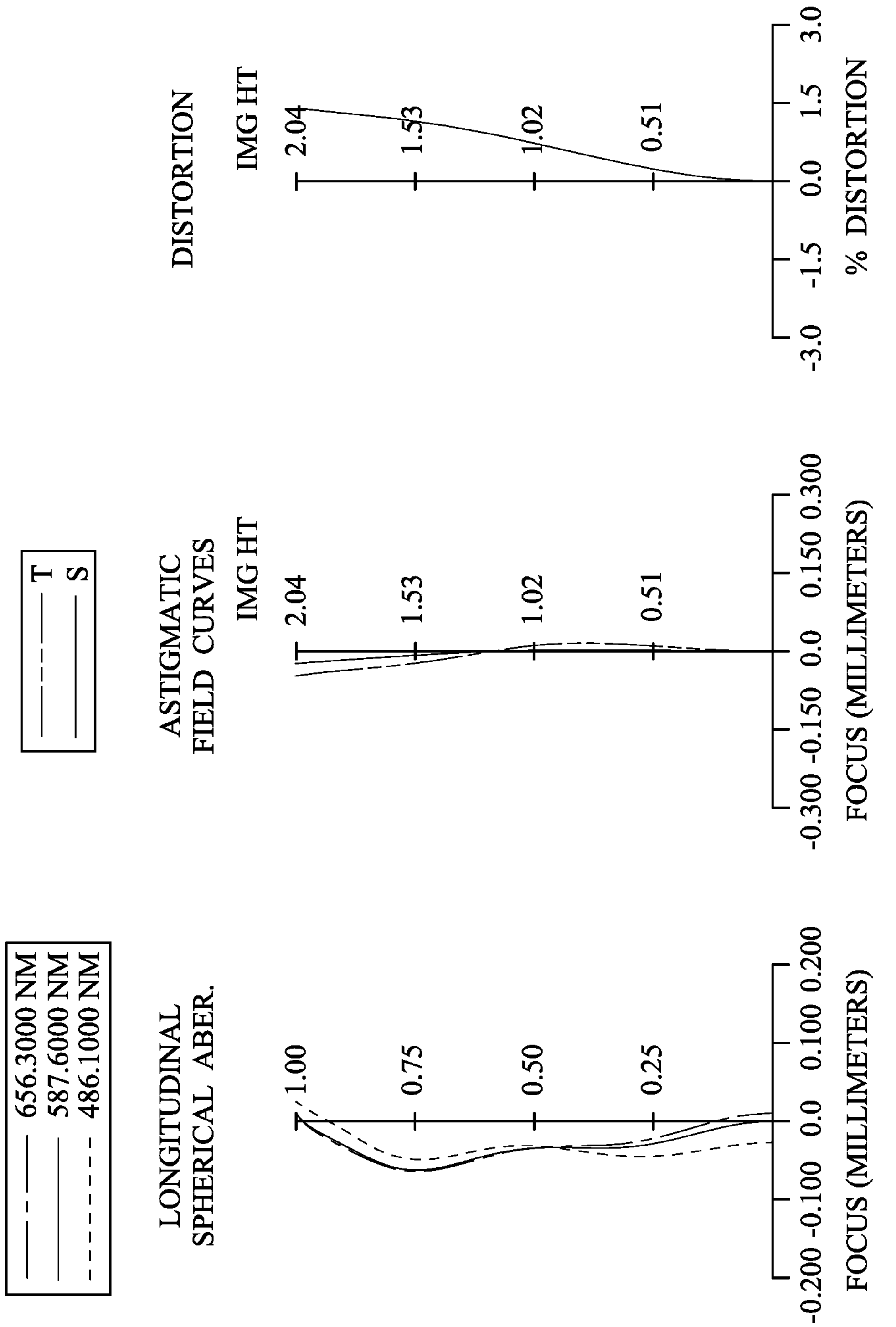
Figure 3A:
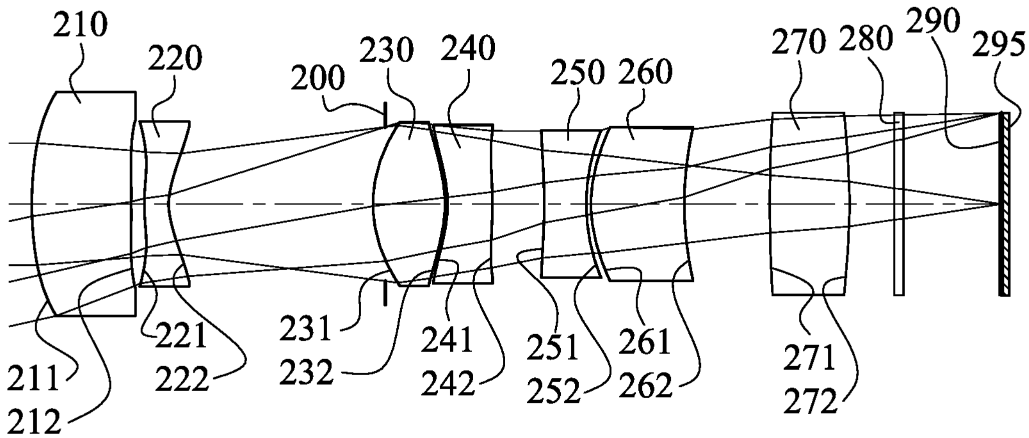
FIG. 3A is a schematic view of a zoom imaging apparatus on one zoom position according to the 2nd embodiment of the present disclosure.
Figure 3B:
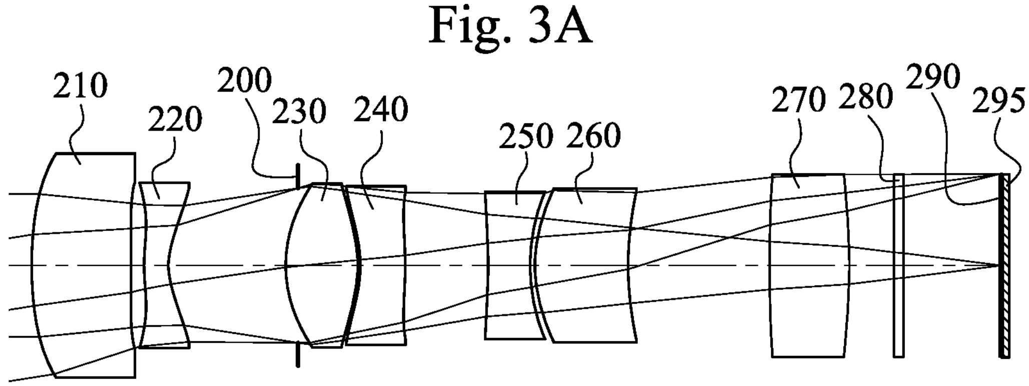
FIG. 3B is a schematic view of the zoom imaging apparatus on another zoom position according to the 2nd embodiment of the present disclosure.
Figure 3C:
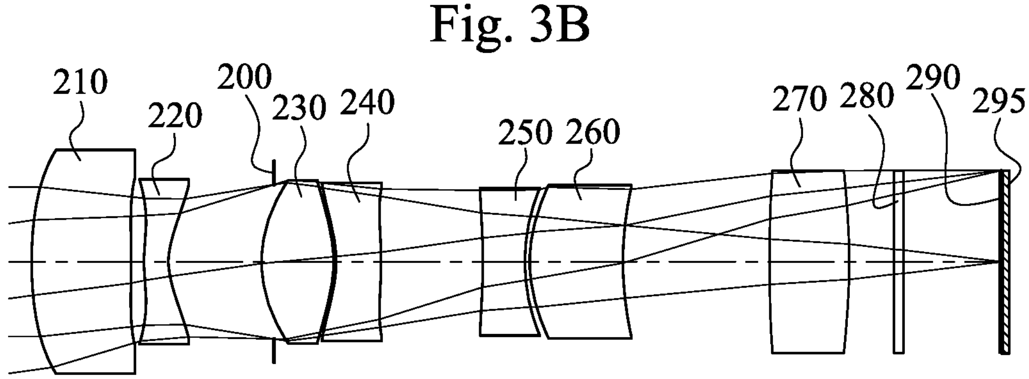
FIG. 3C is a schematic view of the zoom imaging apparatus on another zoom position according to the 2nd embodiment of the present disclosure.
Figure 3D:
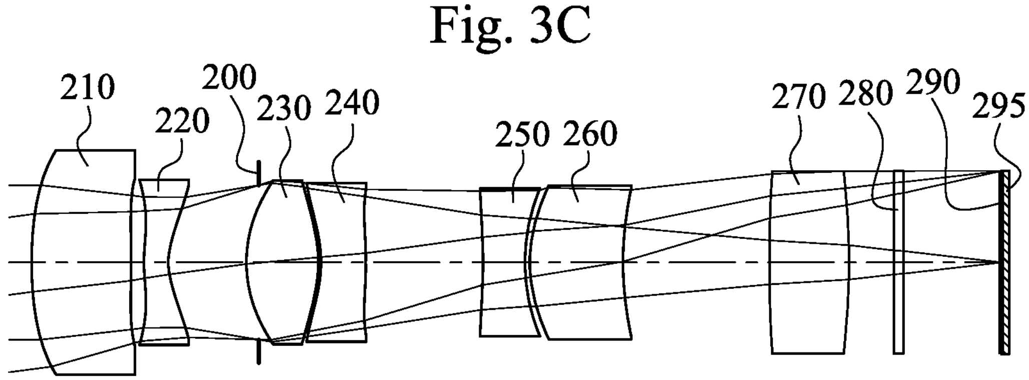
FIG. 3D is a schematic view of the zoom imaging apparatus on another zoom position according to the 2nd embodiment of the present disclosure.
Figure 3E:
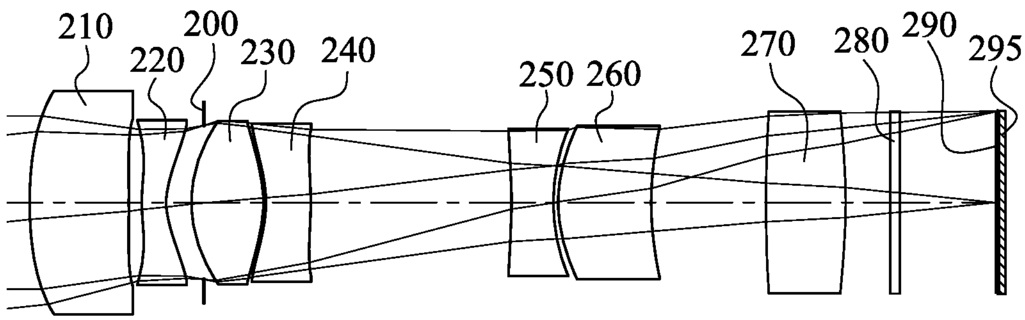
FIG. 3E is a schematic view of the zoom imaging apparatus on another zoom position according to the 2nd embodiment of the present disclosure.
Figure 3F:
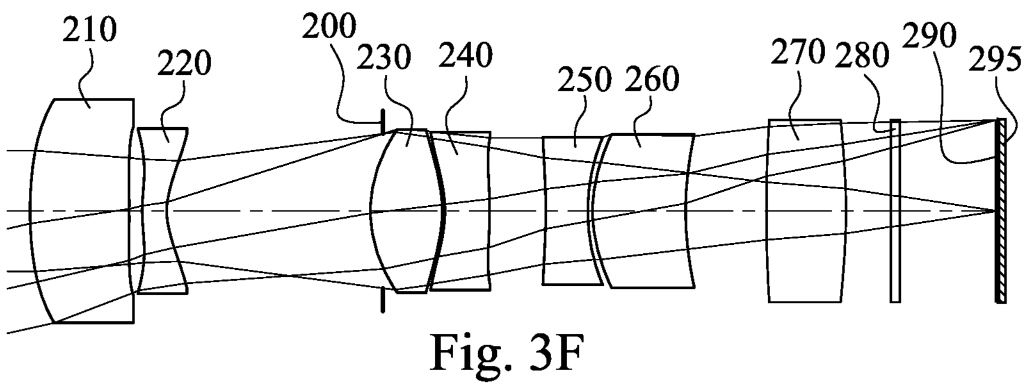
FIG. 3F is a schematic view of the zoom imaging apparatus on another zoom position according to the 2nd embodiment of the present disclosure.
Figure 3G:
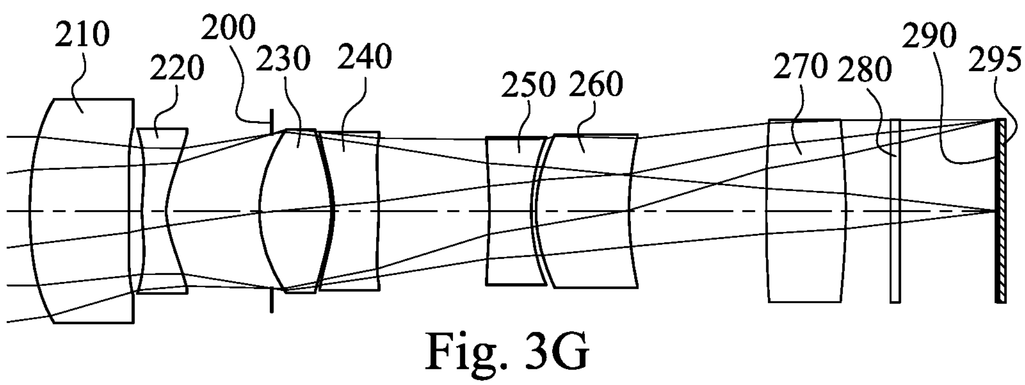
FIG. 3G is a schematic view of the zoom imaging apparatus on another zoom position according to the 2nd embodiment of the present disclosure.
Figure 3H:
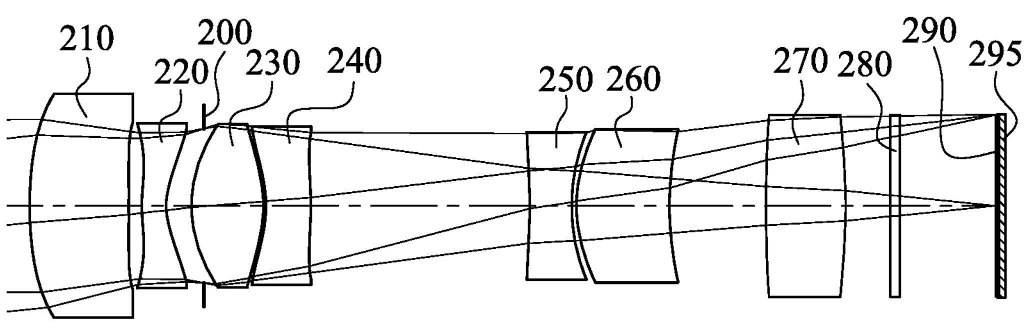
FIG. 3H is a schematic view of the zoom imaging apparatus on another zoom position according to the 2nd embodiment of the present disclosure.
Figure 4A:
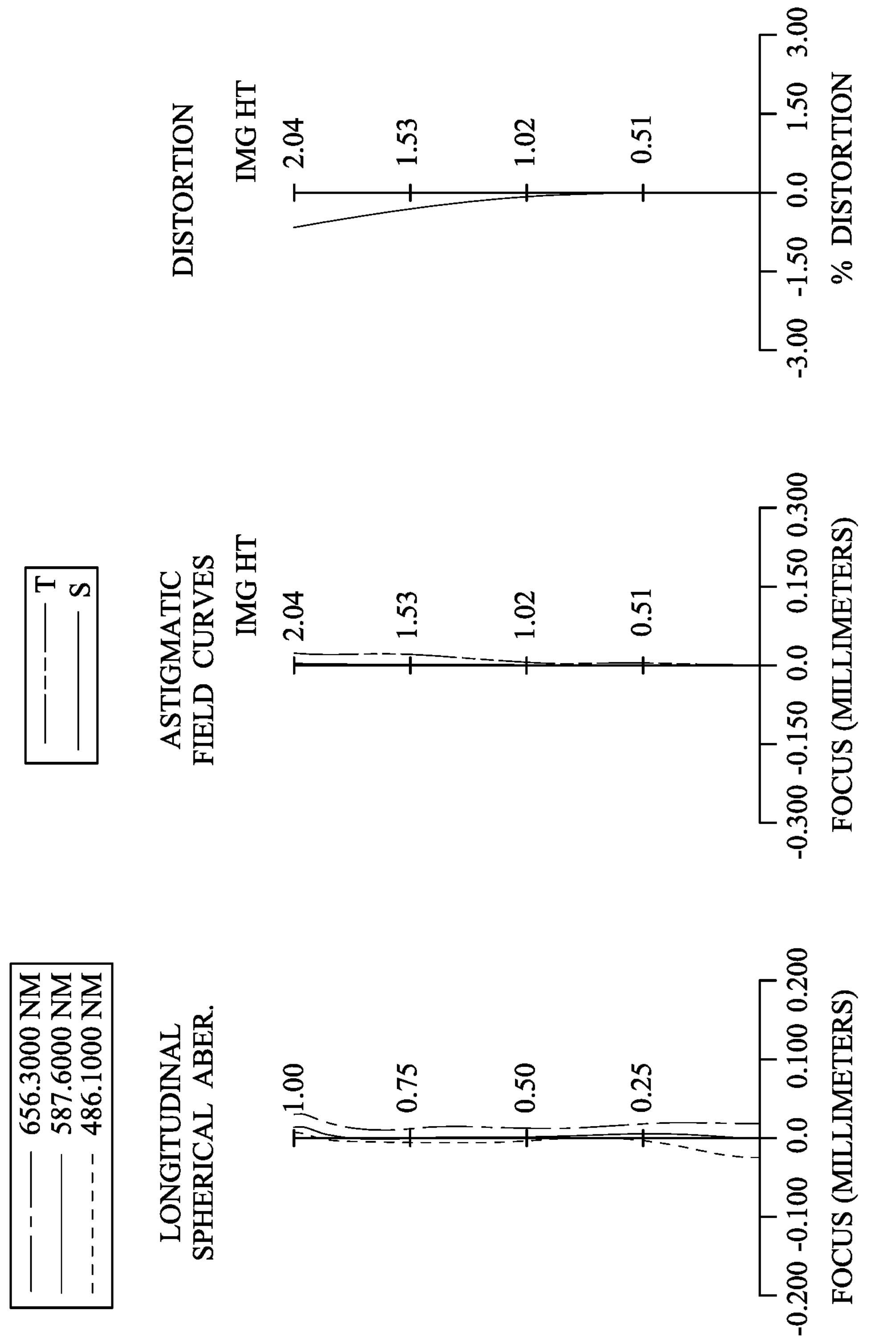
FIG. 4A shows spherical aberration curves, astigmatic field curves and a distortion curve of the zoom imaging apparatus on the zoom position according to the 2nd embodiment of FIG. 3A.
Figure 4B:
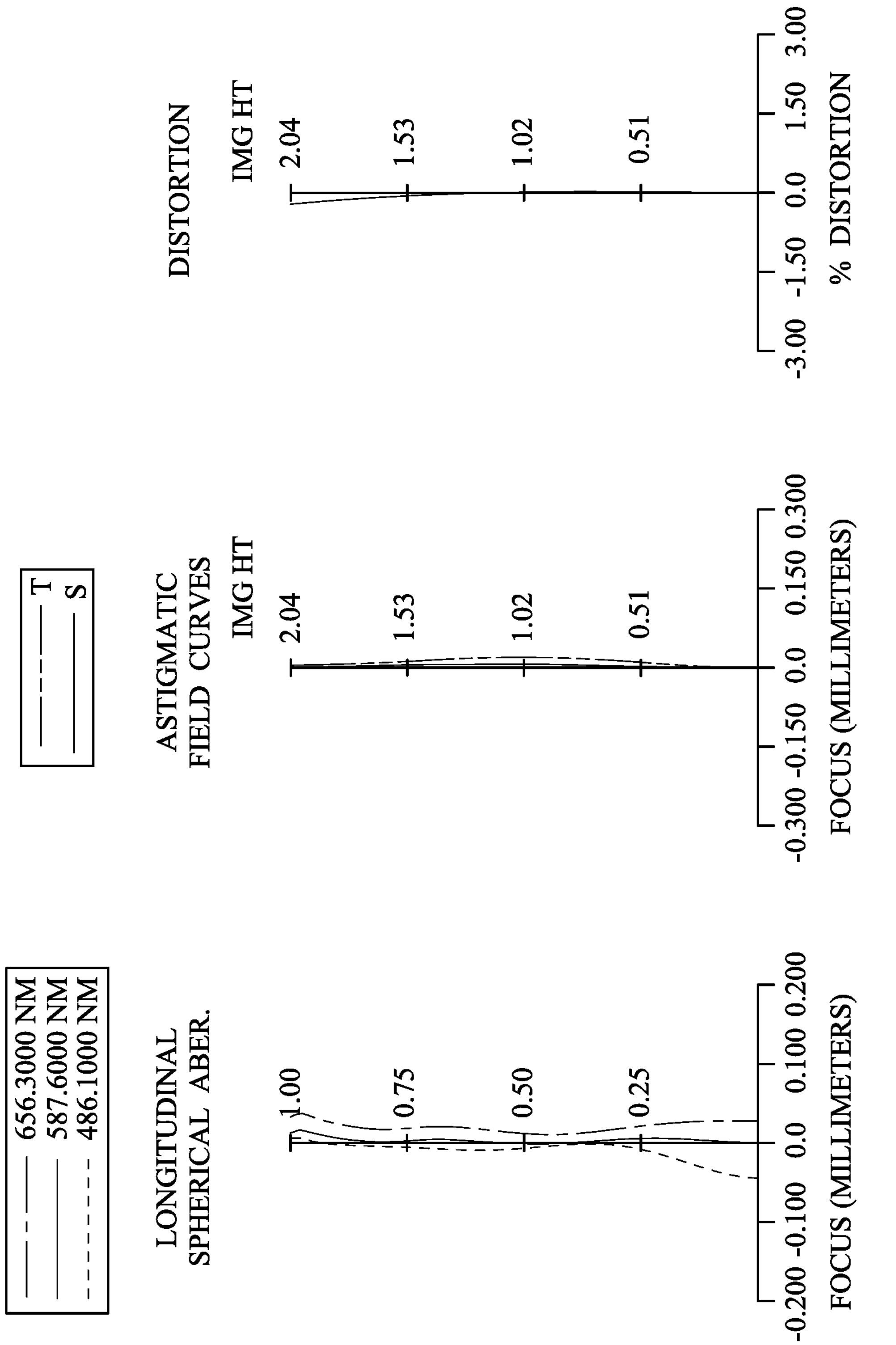
FIG. 4B shows spherical aberration curves, astigmatic field curves and a distortion curve of the zoom imaging apparatus on the zoom position according to the 2nd embodiment of FIG. 3B.
Figure 4C:
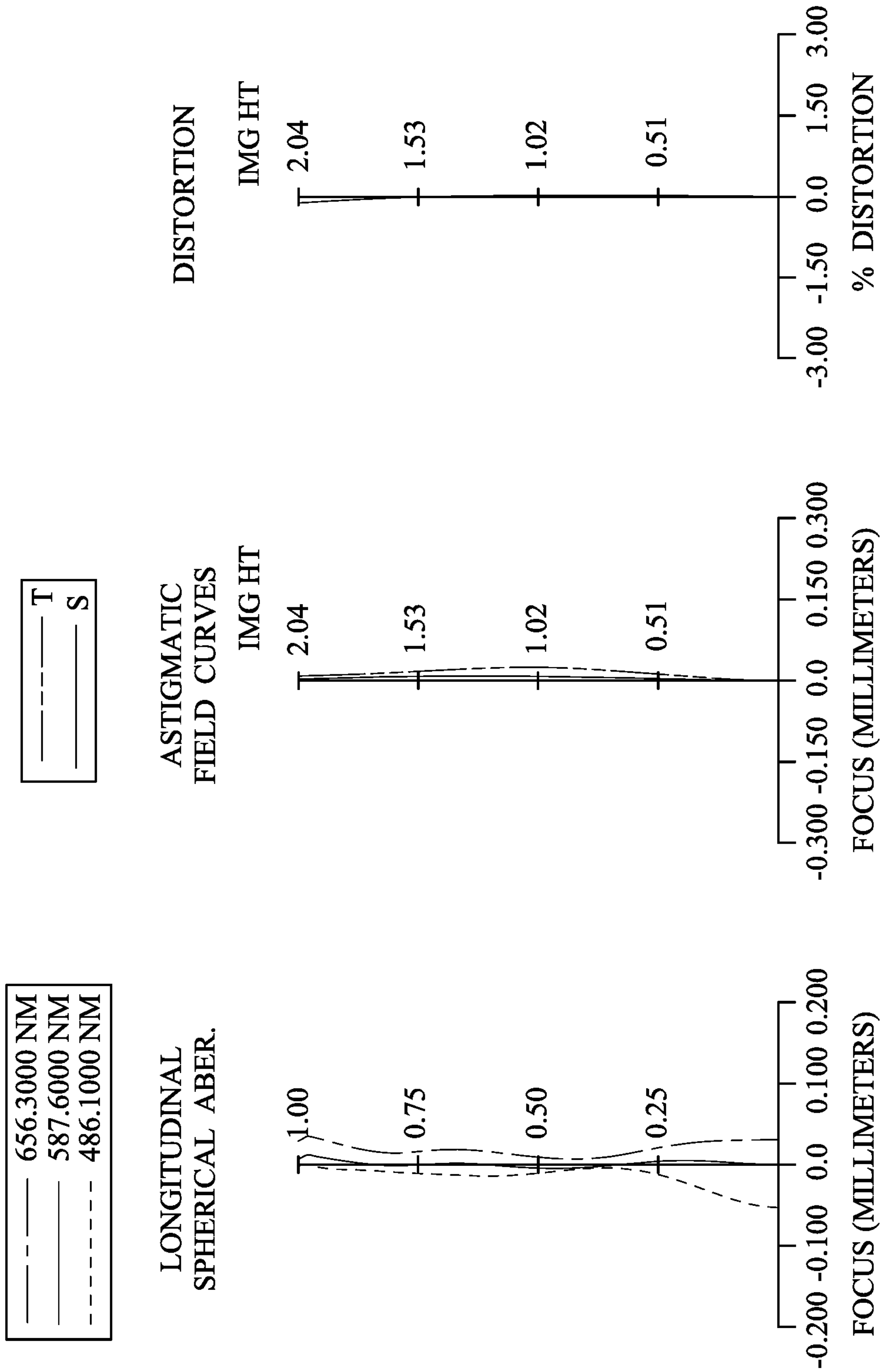
FIG. 4C shows spherical aberration curves, astigmatic field curves and a distortion curve of the zoom imaging apparatus on the zoom position according to the 2nd embodiment of FIG. 3C.
Figure 4D:
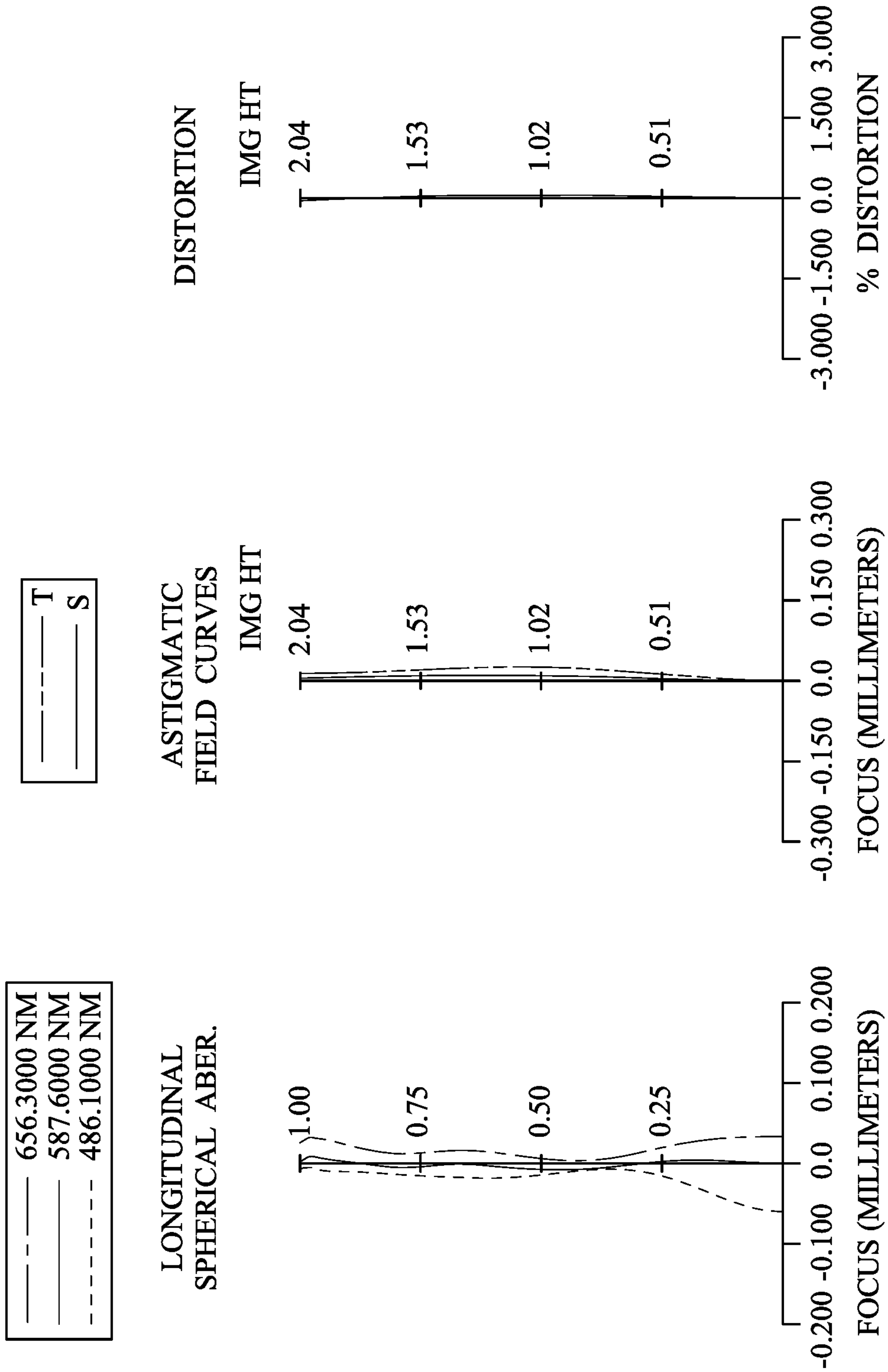
FIG. 4D shows spherical aberration curves, astigmatic field curves and a distortion curve of the zoom imaging apparatus on the zoom position according to the 2nd embodiment of FIG. 3D.
Figure 4E:
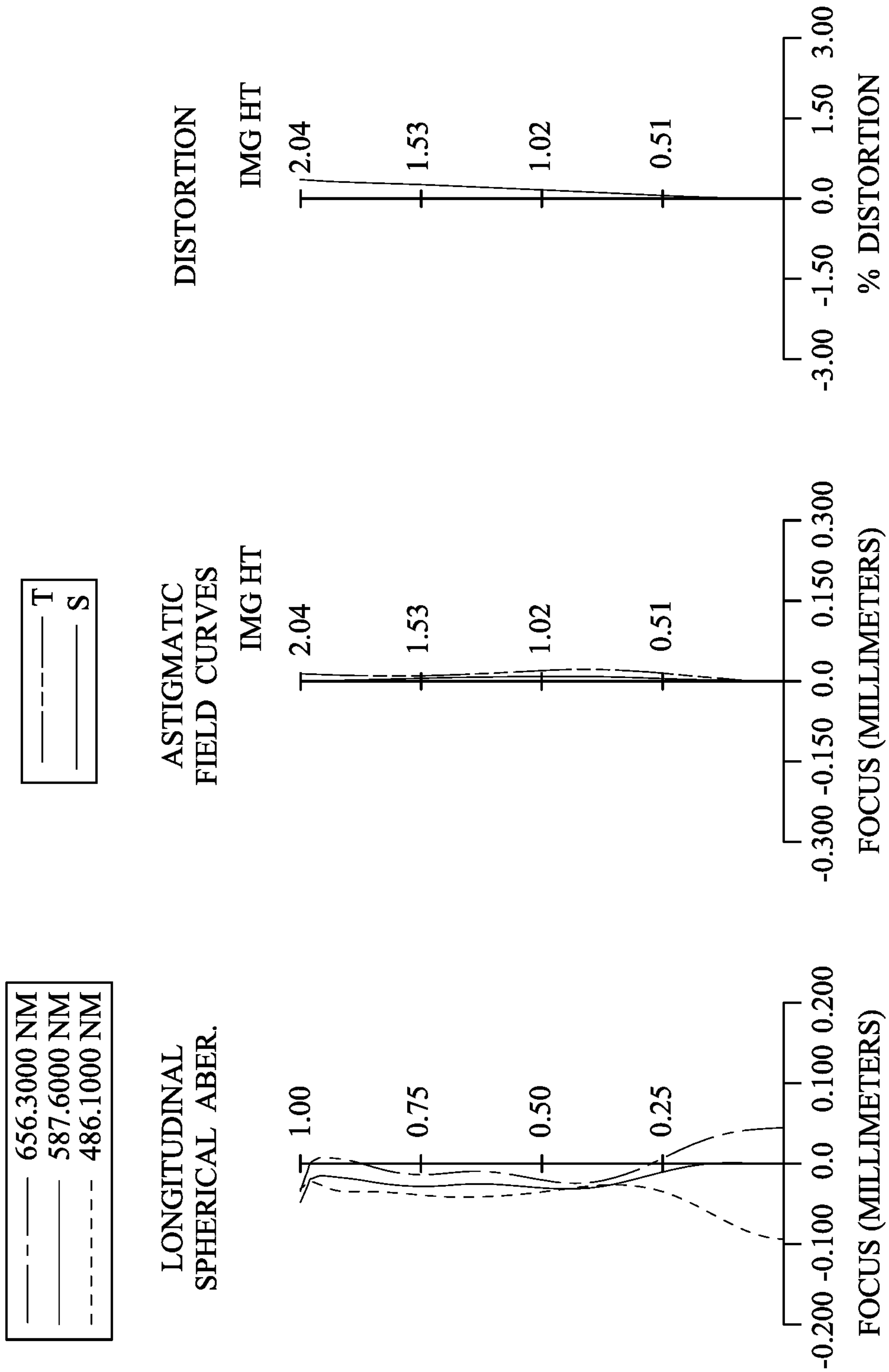
FIG. 4E shows spherical aberration curves, astigmatic field curves and a distortion curve of the zoom imaging apparatus on the zoom position according to the 2nd embodiment of FIG. 3E.
Figure 4F:
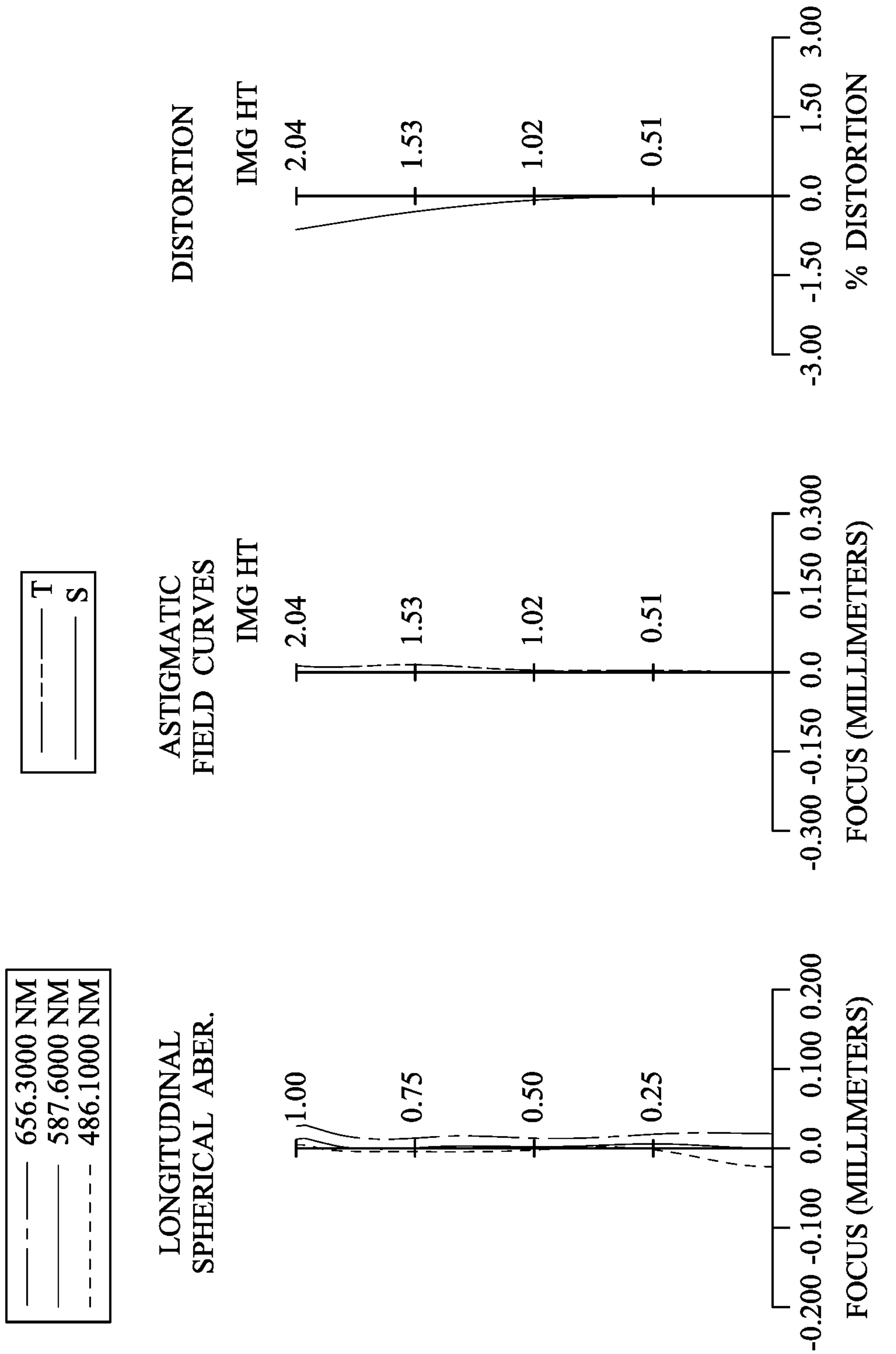
FIG. 4F shows spherical aberration curves, astigmatic field curves and a distortion curve of the zoom imaging apparatus on the zoom position according to the 2nd embodiment of FIG. 3F.
Figure 4G:
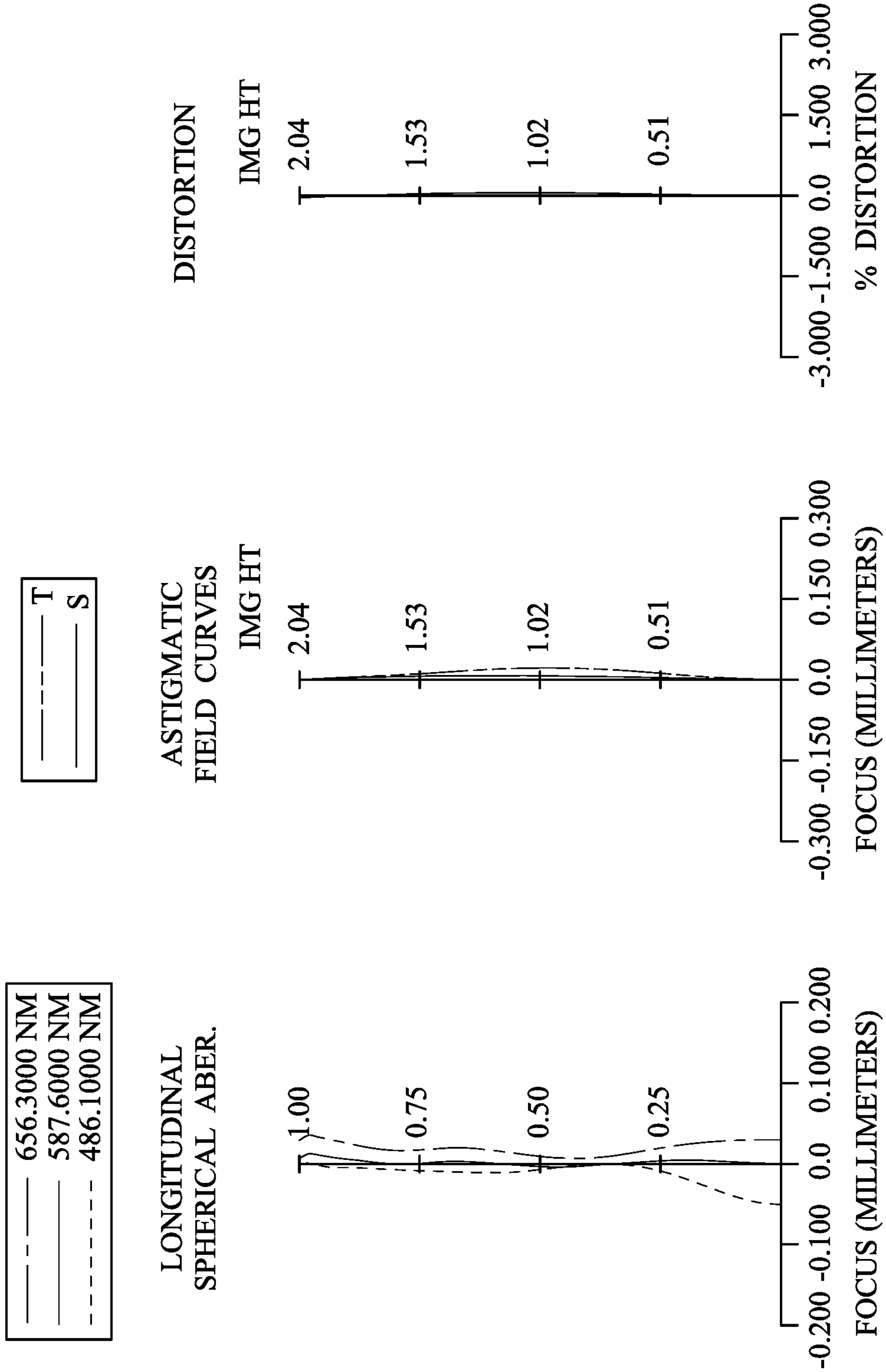
FIG. 4G shows spherical aberration curves, astigmatic field curves and a distortion curve of the zoom imaging apparatus on the zoom position according to the 2nd embodiment of FIG. 3G.
Figure 4H:
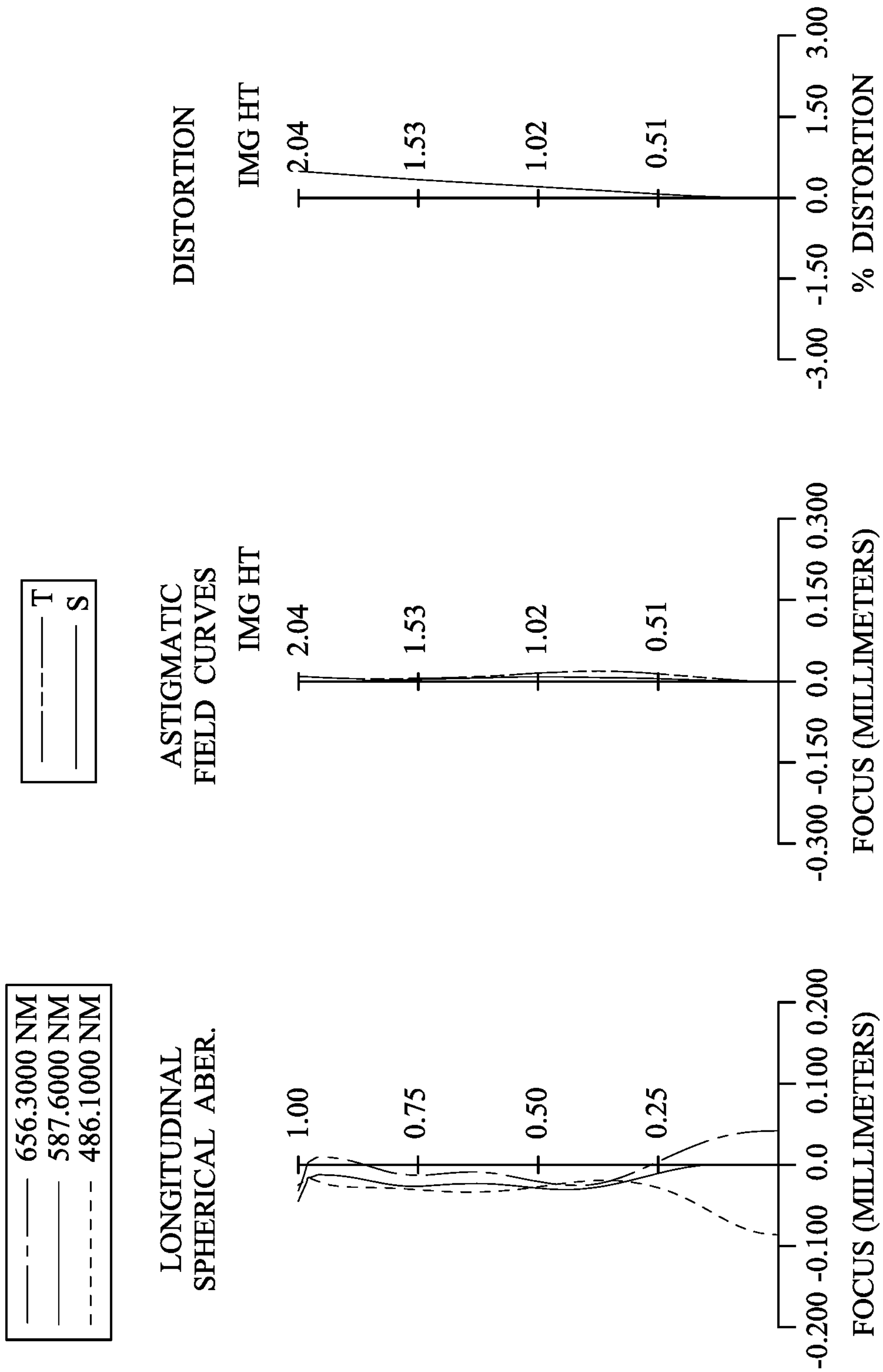
FIG. 4H shows spherical aberration curves, astigmatic field curves and a distortion curve of the zoom imaging apparatus on the zoom position according to the 2nd embodiment of FIG. 3H.
Figure 5A:
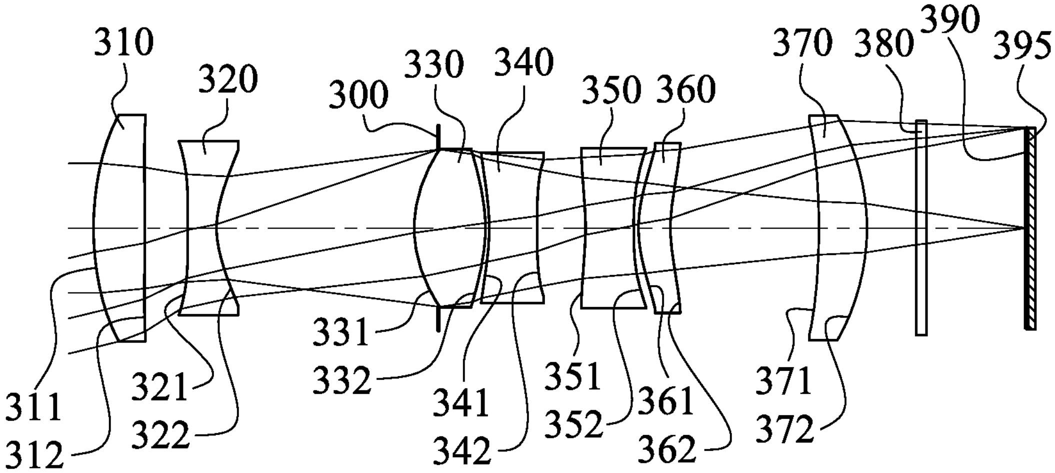
FIG. 5A is a schematic view of a zoom imaging apparatus on one zoom position according to the 3rd embodiment of the present disclosure.
Figure 5B:
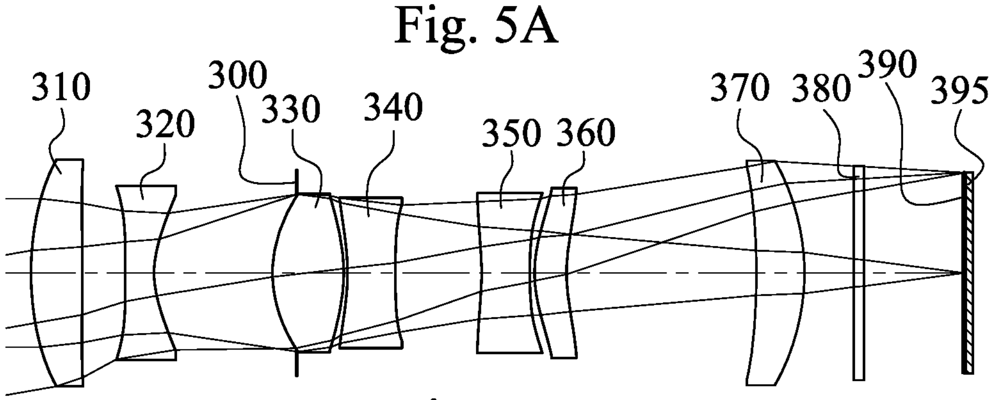
FIG. 5B is a schematic view of the zoom imaging apparatus on another zoom position according to the 3rd embodiment of the present disclosure.
Figure 5C:
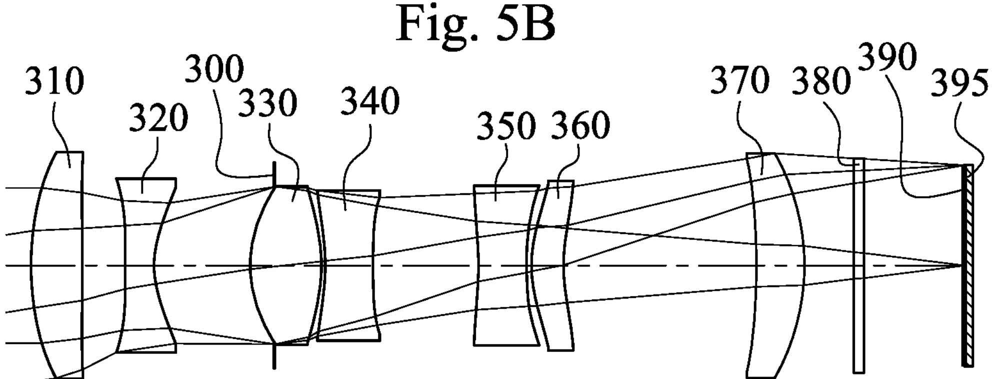
FIG. 5C is a schematic view of the zoom imaging apparatus on another zoom position according to the 3rd embodiment of the present disclosure.
Figure 5D:
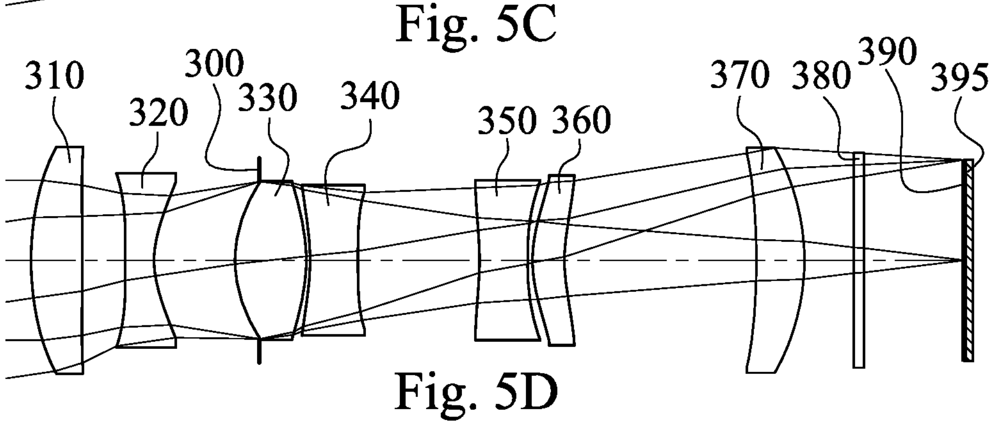
FIG. 5D is a schematic view of the zoom imaging apparatus on another zoom position according to the 3rd embodiment of the present disclosure.
Figure 5E:
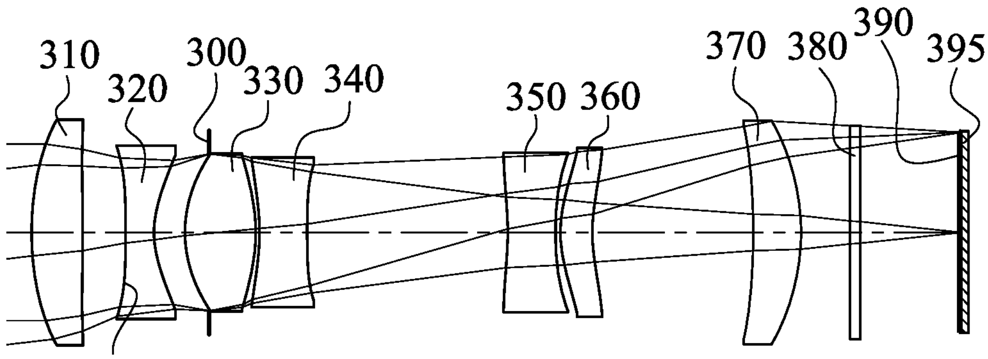
FIG. 5E is a schematic view of the zoom imaging apparatus on another zoom position according to the 3rd embodiment of the present disclosure.
Figure 5F:
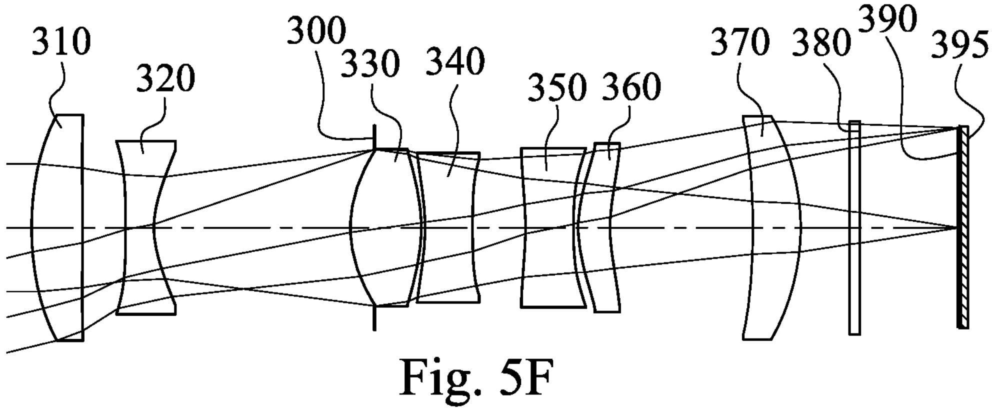
FIG. 5F is a schematic view of the zoom imaging apparatus on another zoom position according to the 3rd embodiment of the present disclosure.
Figure 5G:
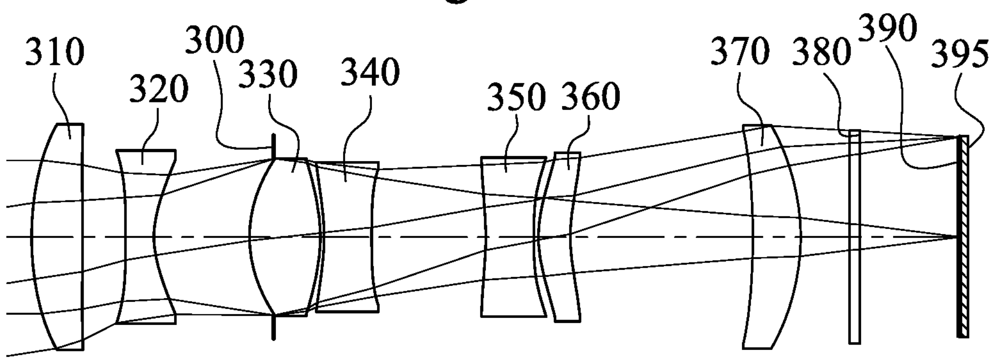
FIG. 5G is a schematic view of the zoom imaging apparatus on another zoom position according to the 3rd embodiment of the present disclosure.
Figure 5H:
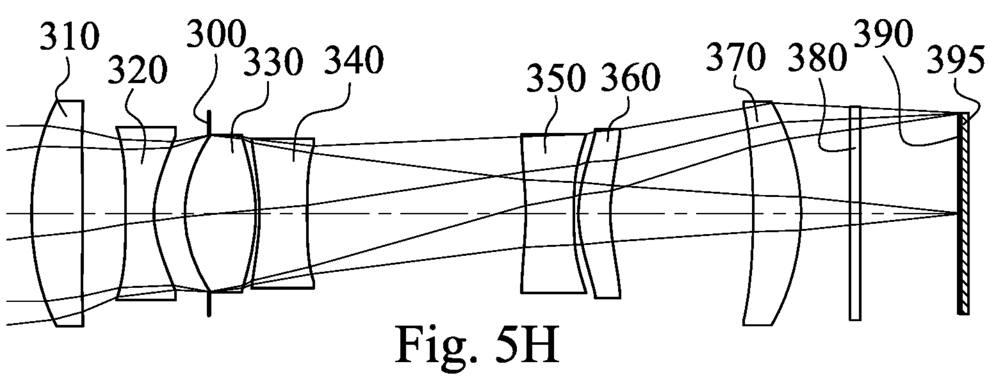
FIG. 5H is a schematic view of the zoom imaging apparatus on another zoom position according to the 3rd embodiment of the present disclosure.
Figure 6A:
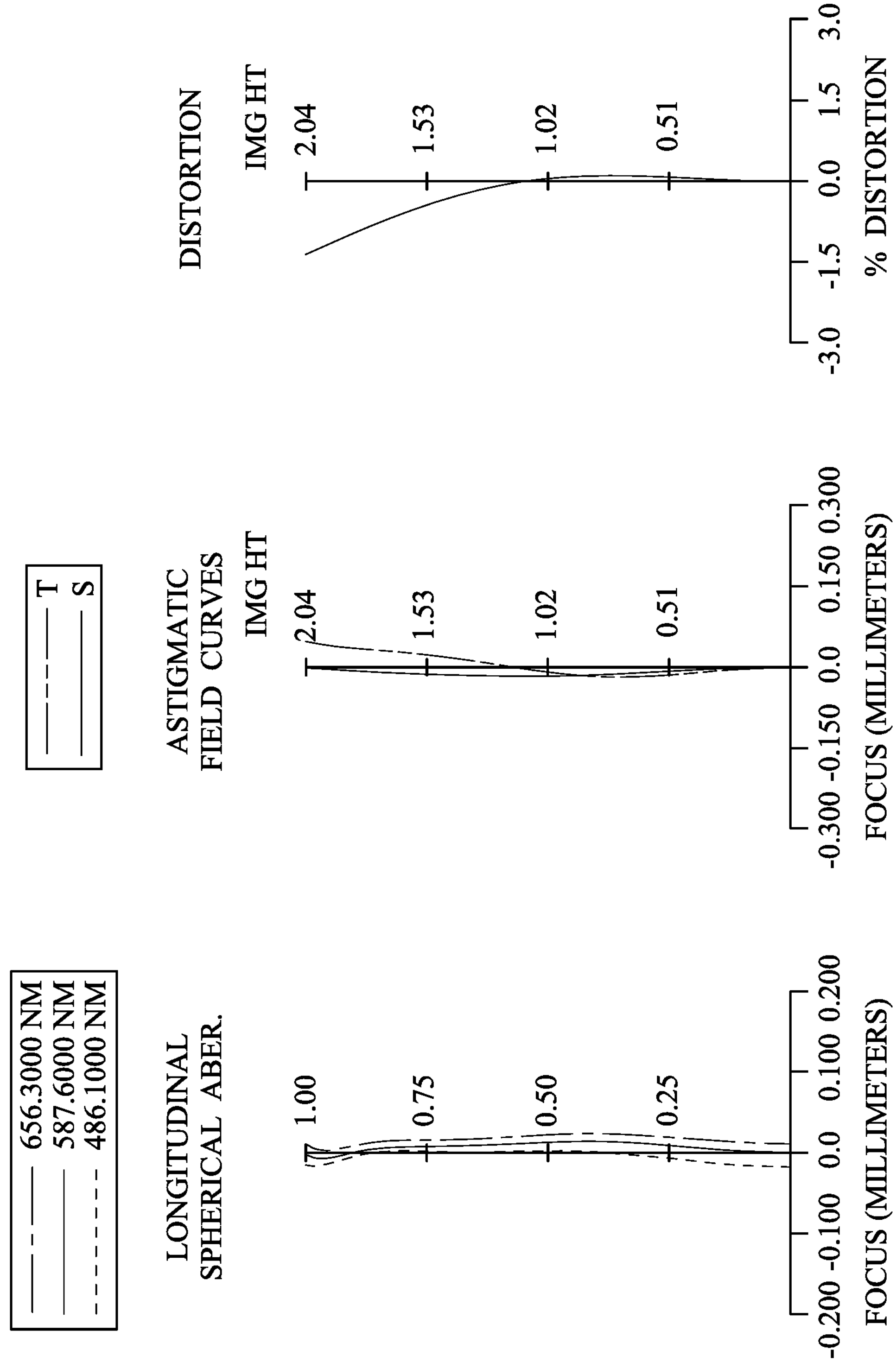
FIG. 6A shows spherical aberration curves, astigmatic field curves and a distortion curve of the zoom imaging apparatus on the zoom position according to the 3rd embodiment of FIG. 5A.
Figure 6B:
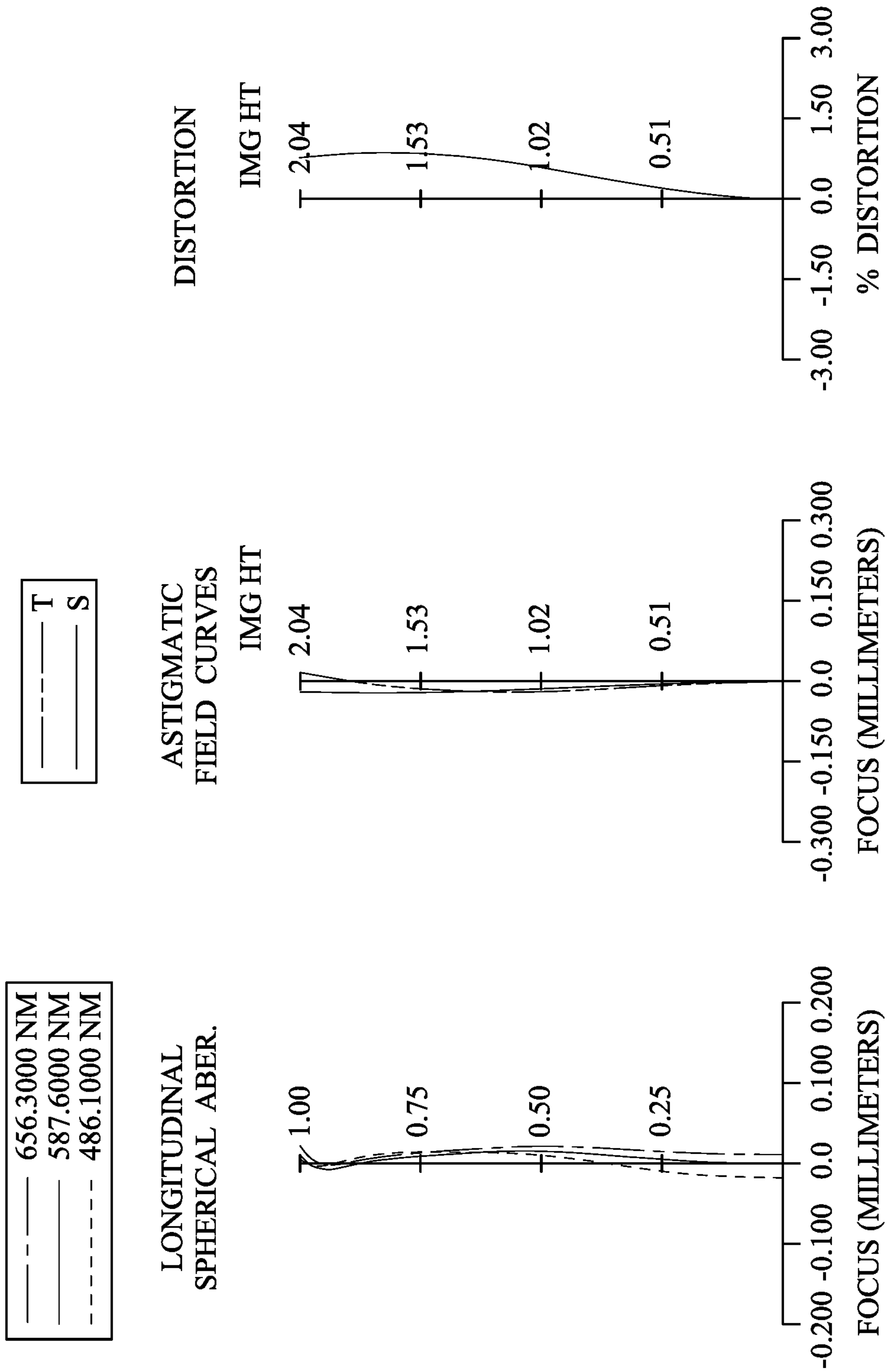
FIG. 6B shows spherical aberration curves, astigmatic field curves and a distortion curve of the zoom imaging apparatus on the zoom position according to the 3rd embodiment of FIG. 5B.
Figure 6C:
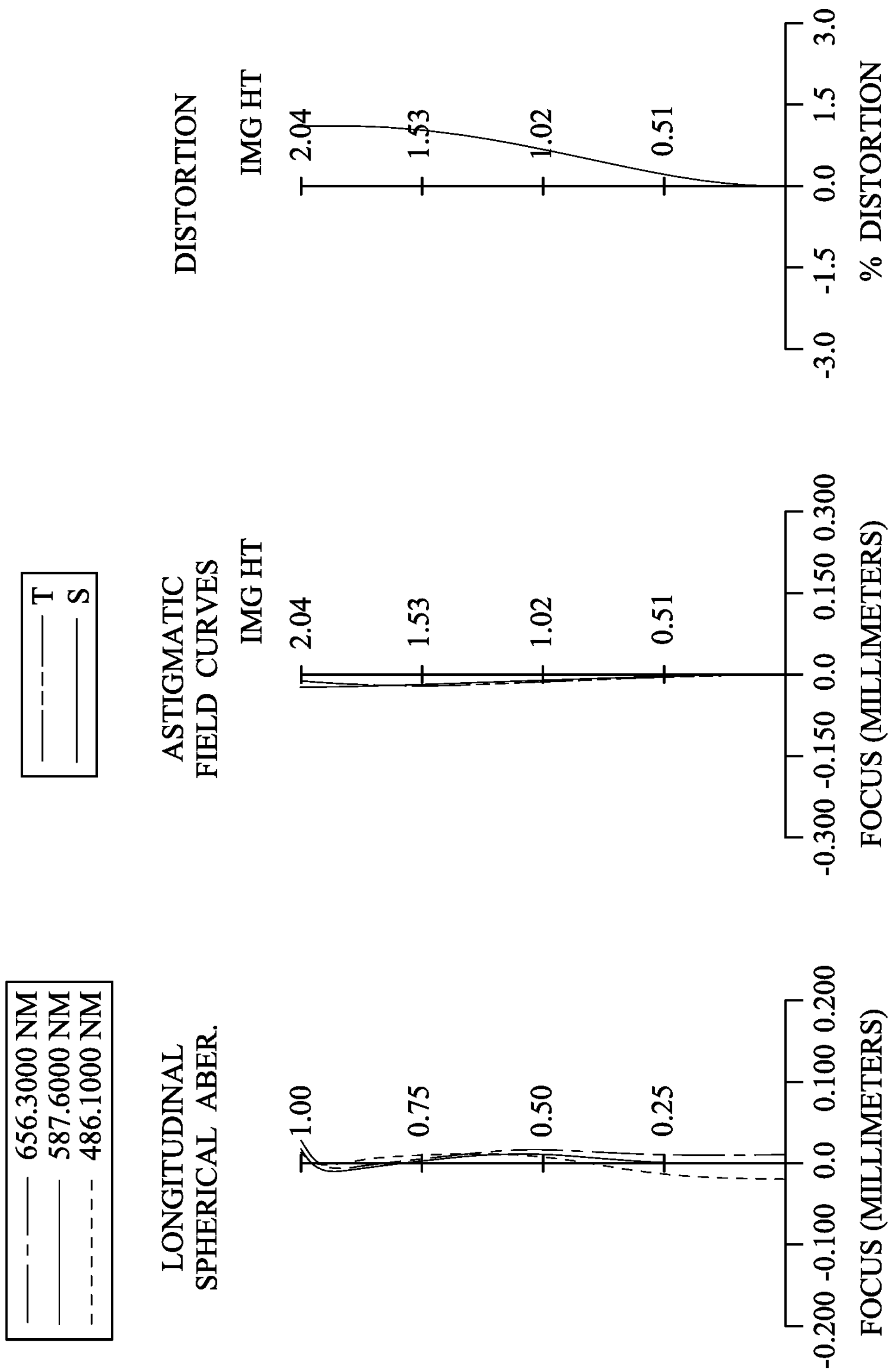
FIG. 6C shows spherical aberration curves, astigmatic field curves and a distortion curve of the zoom imaging apparatus on the zoom position according to the 3rd embodiment of FIG. 5C.
Figure 6D:
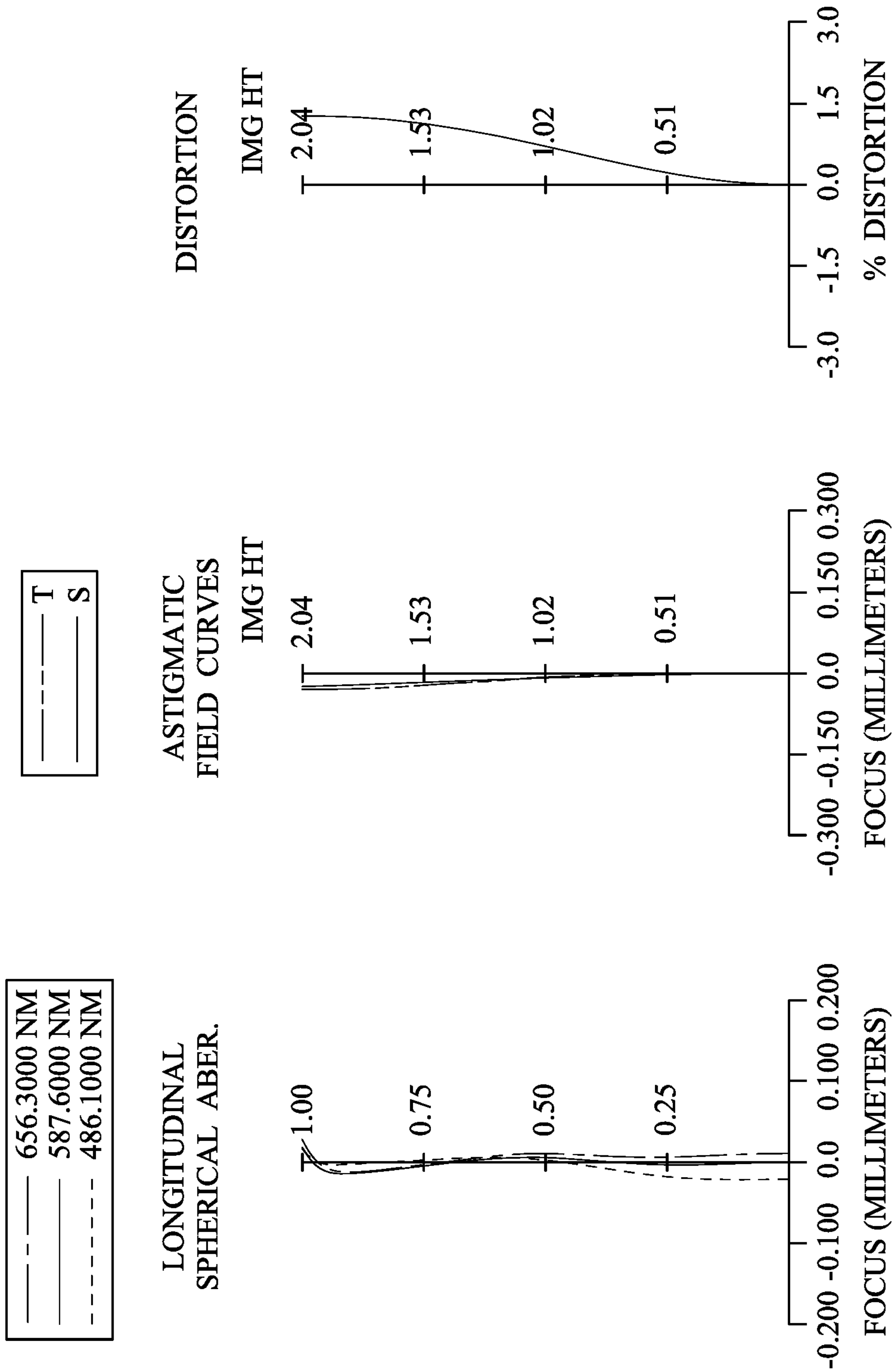
FIG. 6D shows spherical aberration curves, astigmatic field curves and a distortion curve of the zoom imaging apparatus on the zoom position according to the 3rd embodiment of FIG. 5D.
Figure 6E:
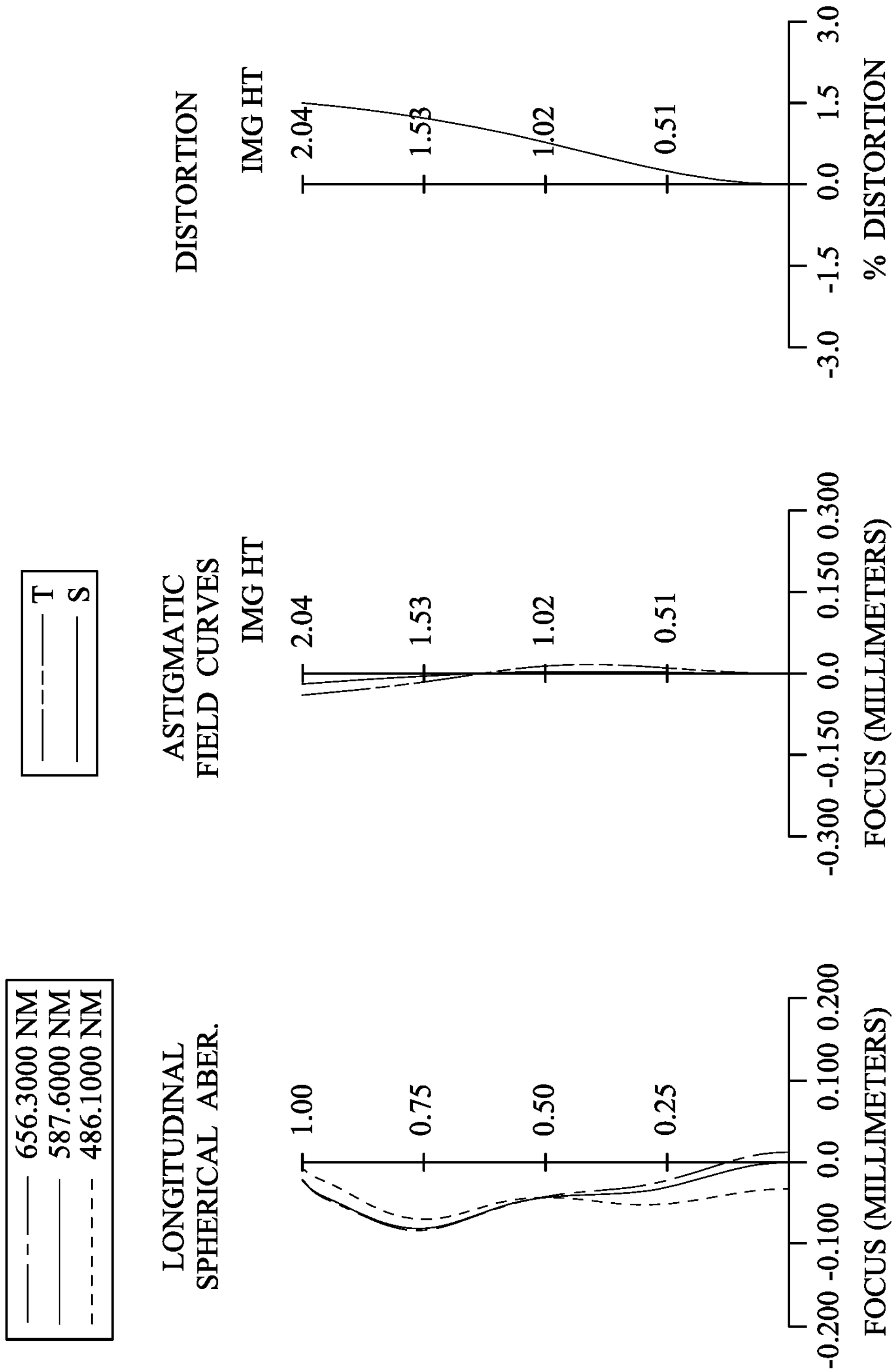
FIG. 6E shows spherical aberration curves, astigmatic field curves and a distortion curve of the zoom imaging apparatus on the zoom position according to the 3rd embodiment of FIG. 5E.
Figure 6F:
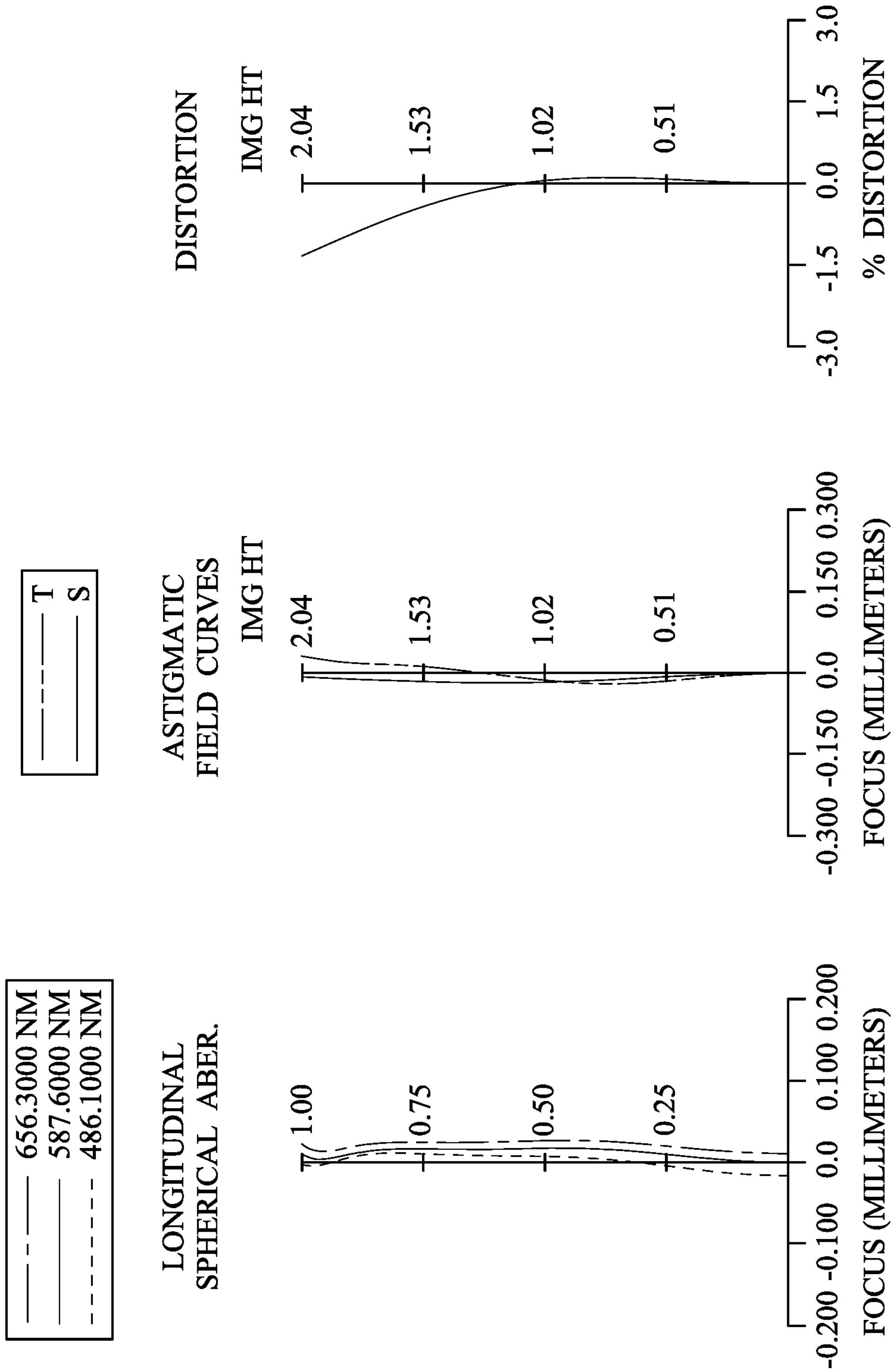
FIG. 6F shows spherical aberration curves, astigmatic field curves and a distortion curve of the zoom imaging apparatus on the zoom position according to the 3rd embodiment of FIG. 5F.
Figure 6G:
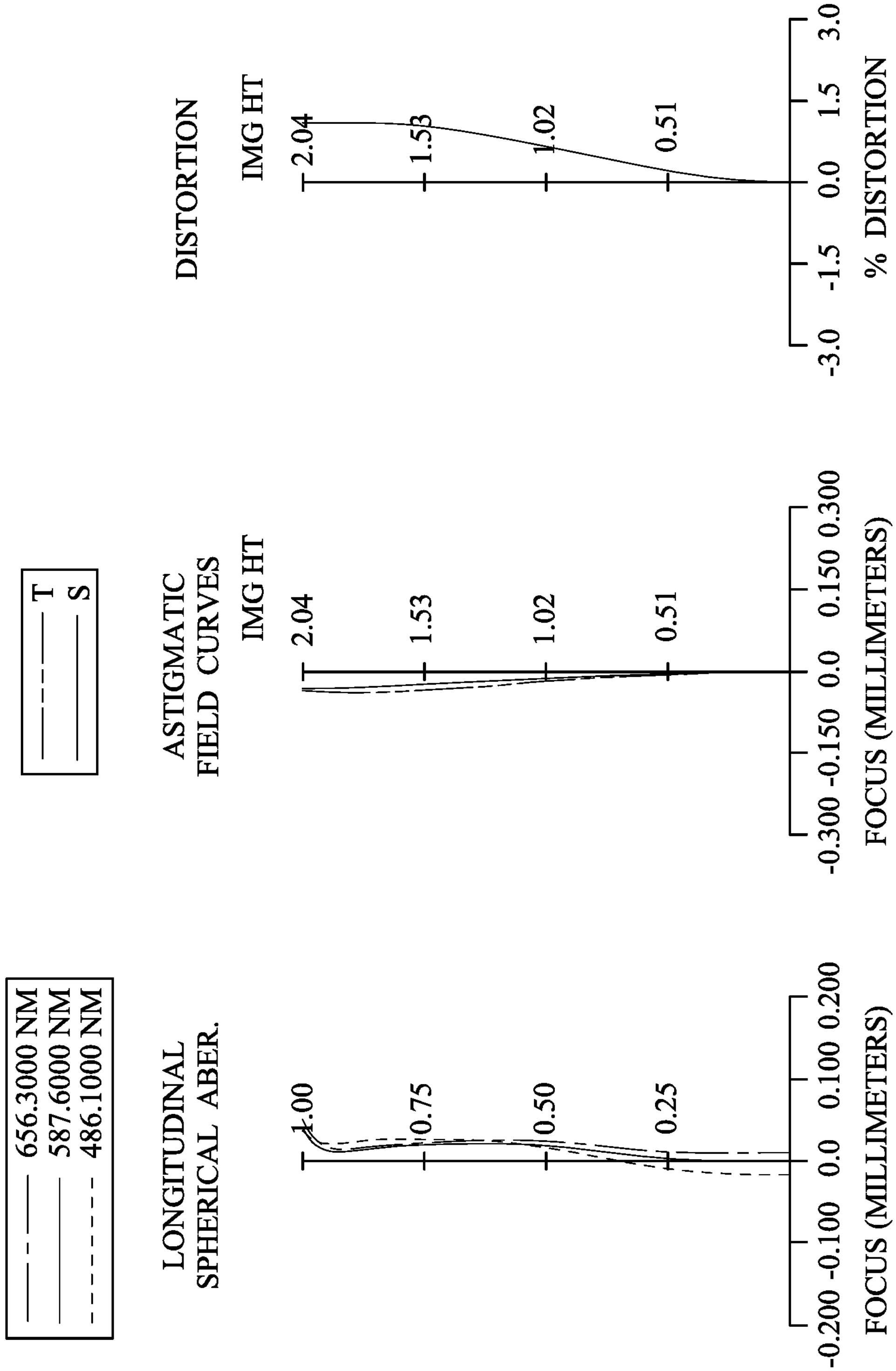
FIG. 6G shows spherical aberration curves, astigmatic field curves and a distortion curve of the zoom imaging apparatus on the zoom position according to the 3rd embodiment of FIG. 5G.
Figure 6H:
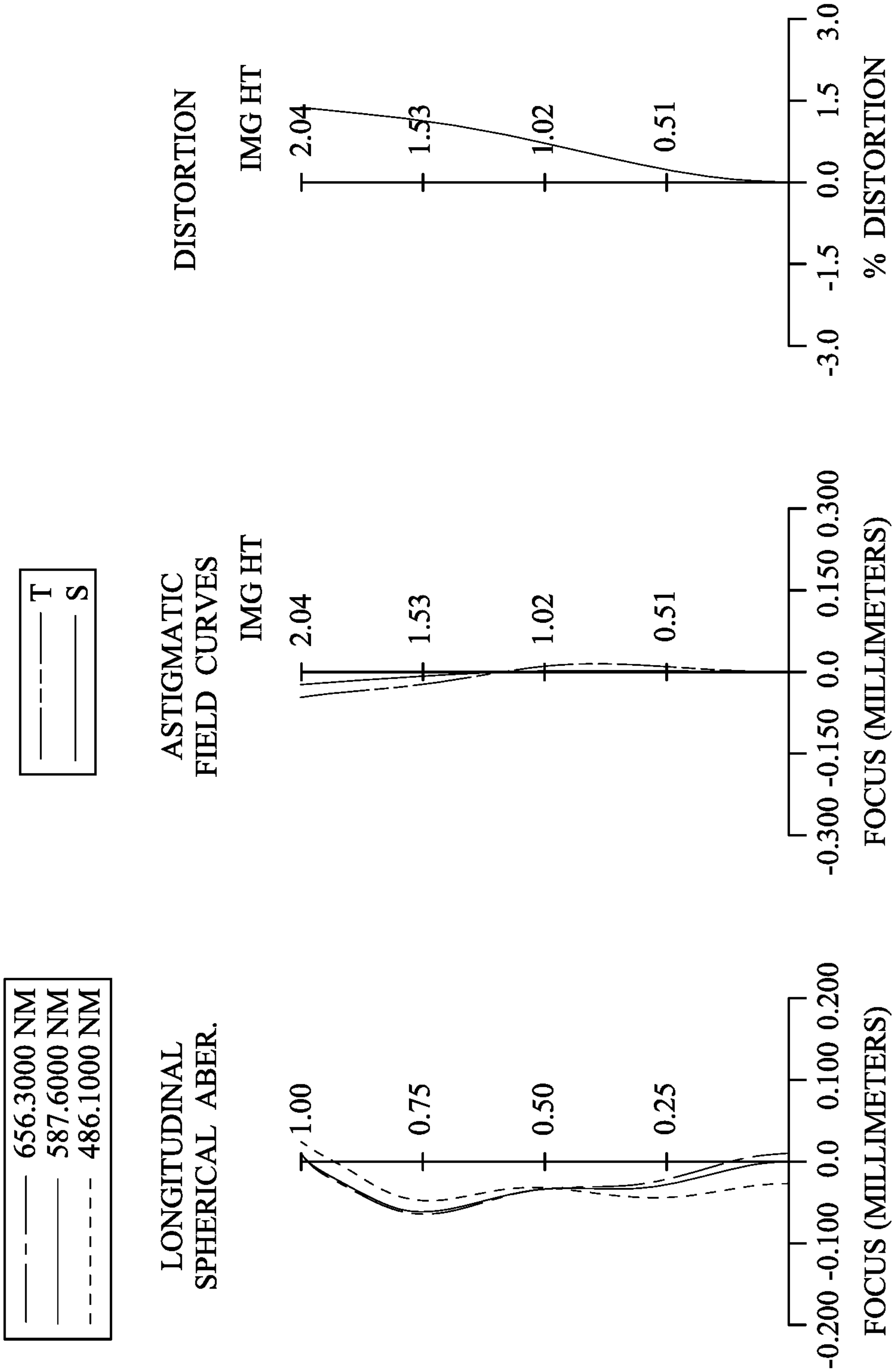
FIG. 6H shows, spherical aberration curves, astigmatic field curves and a distortion curve of the zoom imaging apparatus on the zoom position according to the 3rd embodiment of FIG. 5H.
Figure 7A:
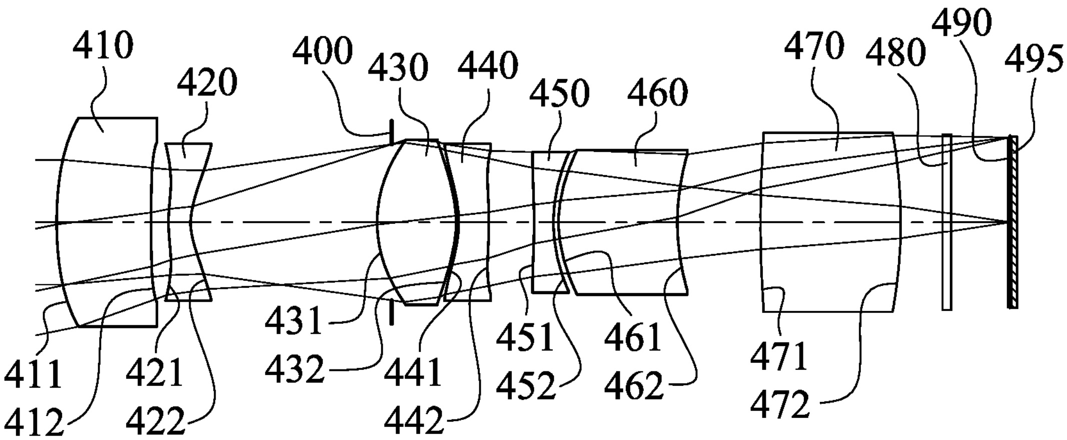
FIG. 7A is a schematic view of a zoom imaging apparatus on one zoom position according to the 4th embodiment of the present disclosure.
Figure 7B:
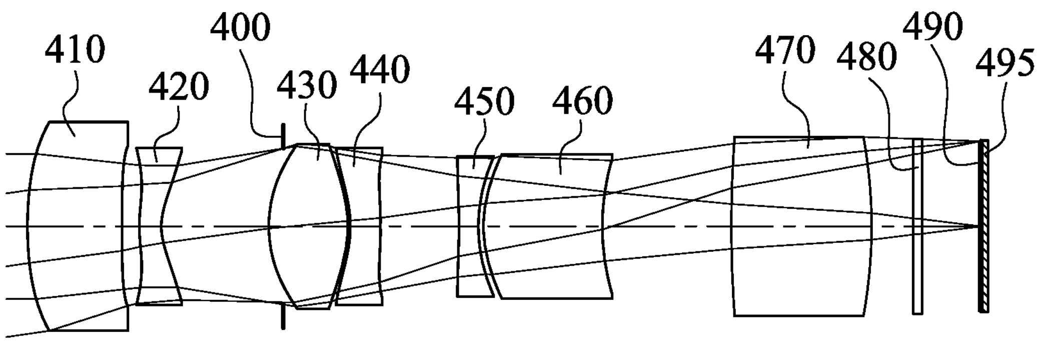
FIG. 7B is a schematic view of the zoom imaging apparatus on another zoom position according to the 4th embodiment of the present disclosure.
Figure 7C:
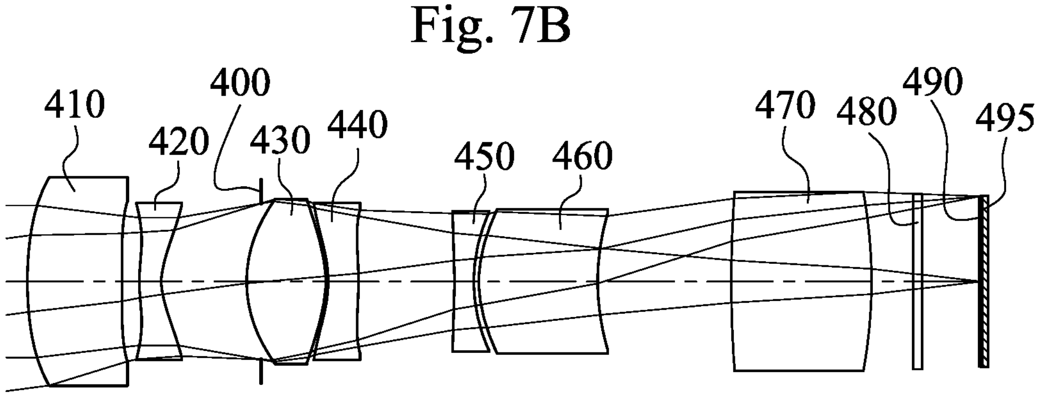
FIG. 7C is a schematic view of the zoom imaging apparatus on another zoom position according to the 4th embodiment of the present disclosure.
Figure 7D:
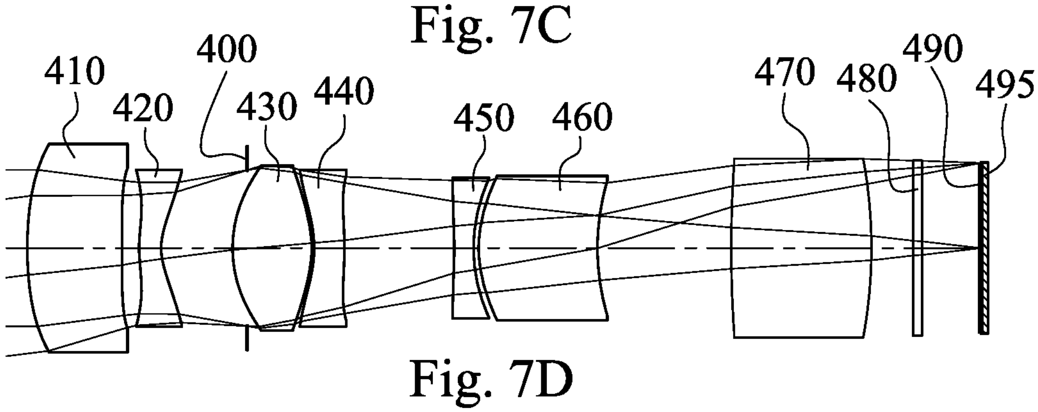
FIG. 7D is a schematic view of the zoom imaging apparatus on another zoom position according to the 4th embodiment of the present disclosure.
Figure 7E:
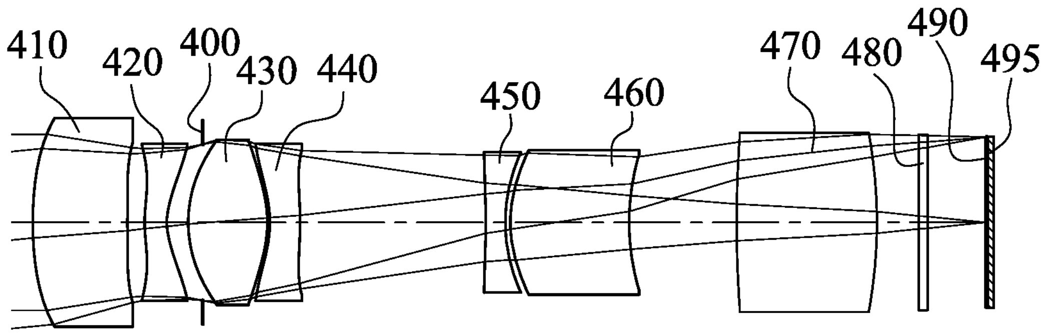
FIG. 7E is a schematic view of the zoom imaging apparatus on another zoom position according to the 4th embodiment of the present disclosure.
Figure 7F:
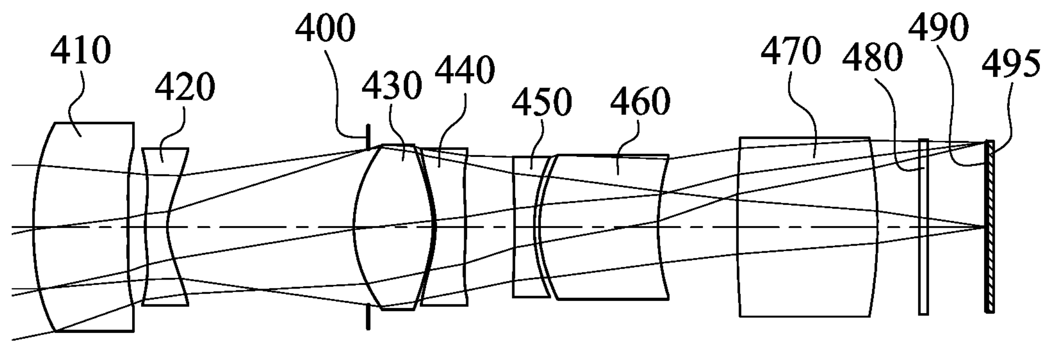
FIG. 7F is a schematic view of the zoom imaging apparatus on another zoom position according to the 4th embodiment of the present disclosure.
Figure 7G:
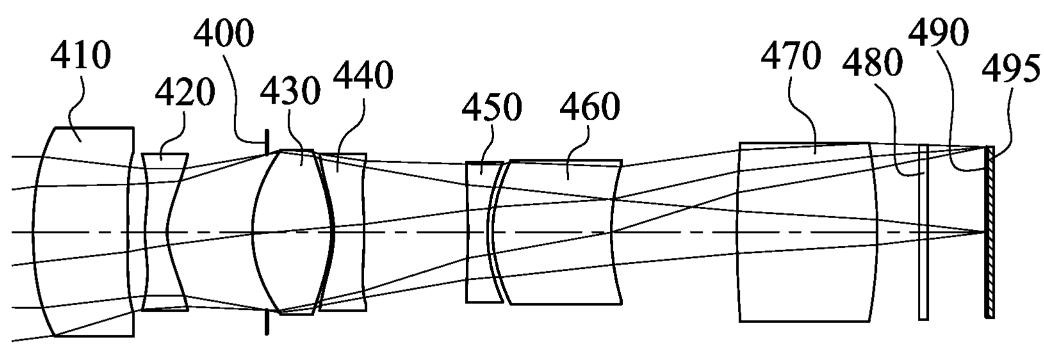
FIG. 7G is a schematic view of the zoom imaging apparatus on another zoom position according to the 4th embodiment of the present disclosure.
Figure 7H:
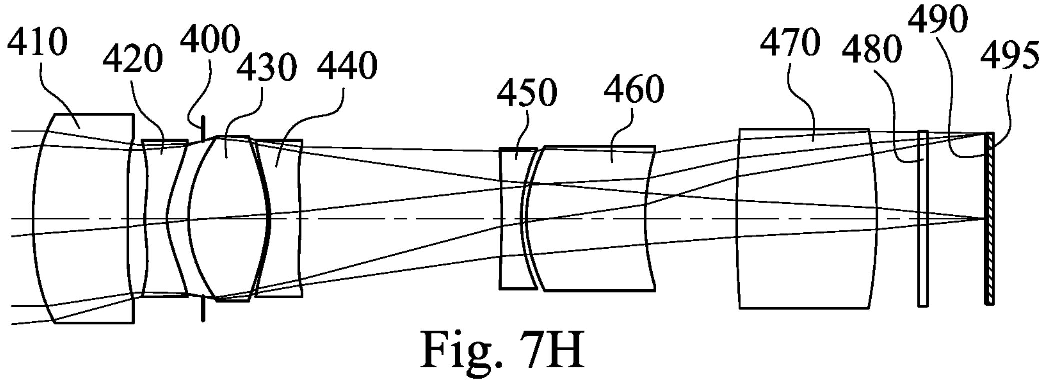
FIG. 7H is a schematic view of the zoom imaging apparatus on another zoom position according to the 4th embodiment of the present disclosure.
Figure 8A:
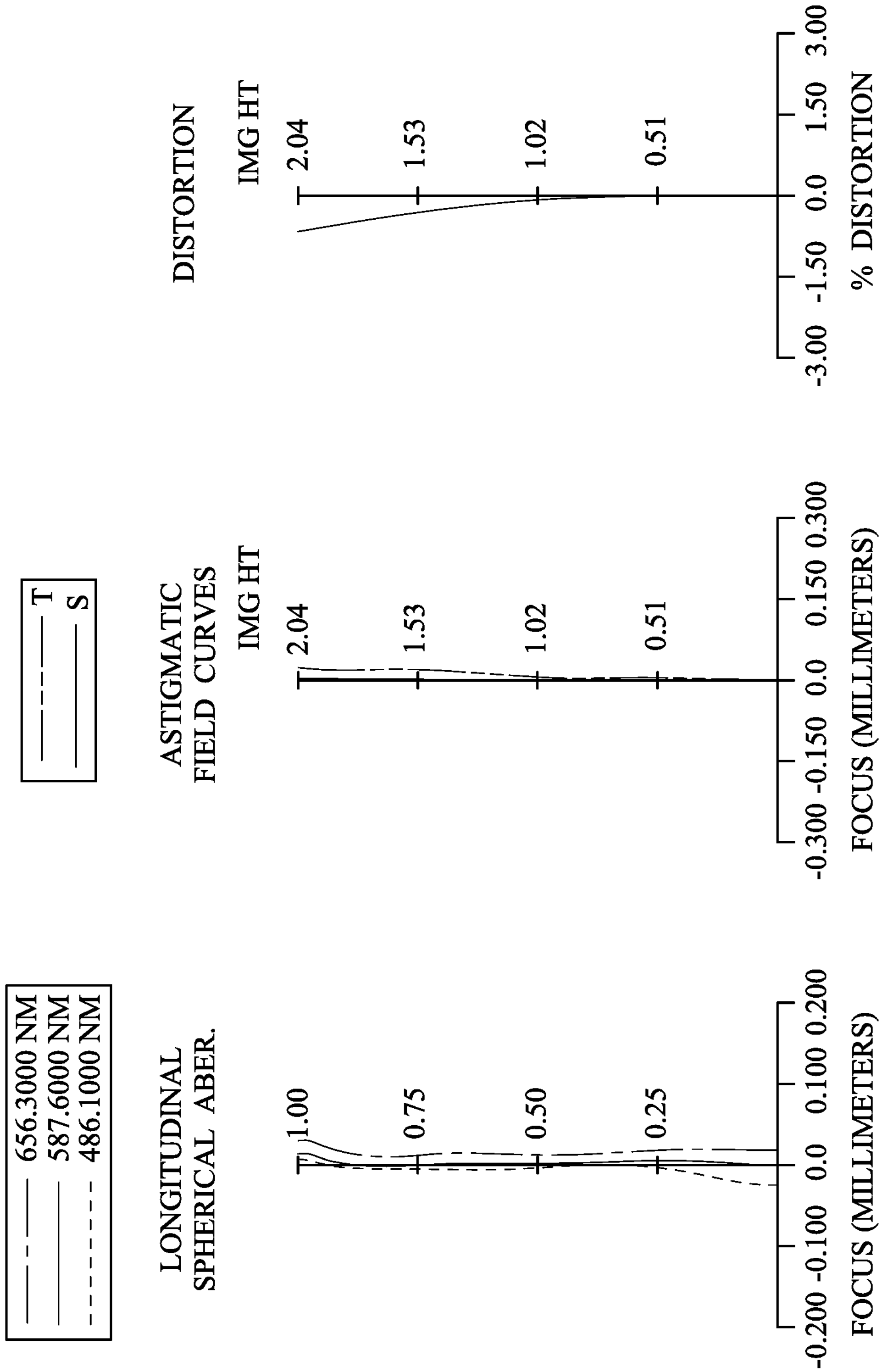
FIG. 8A shows spherical aberration curves, astigmatic field curves and a distortion curve of the zoom imaging apparatus on the zoom position according to the 4th embodiment of FIG. 7A.
Figure 8B:
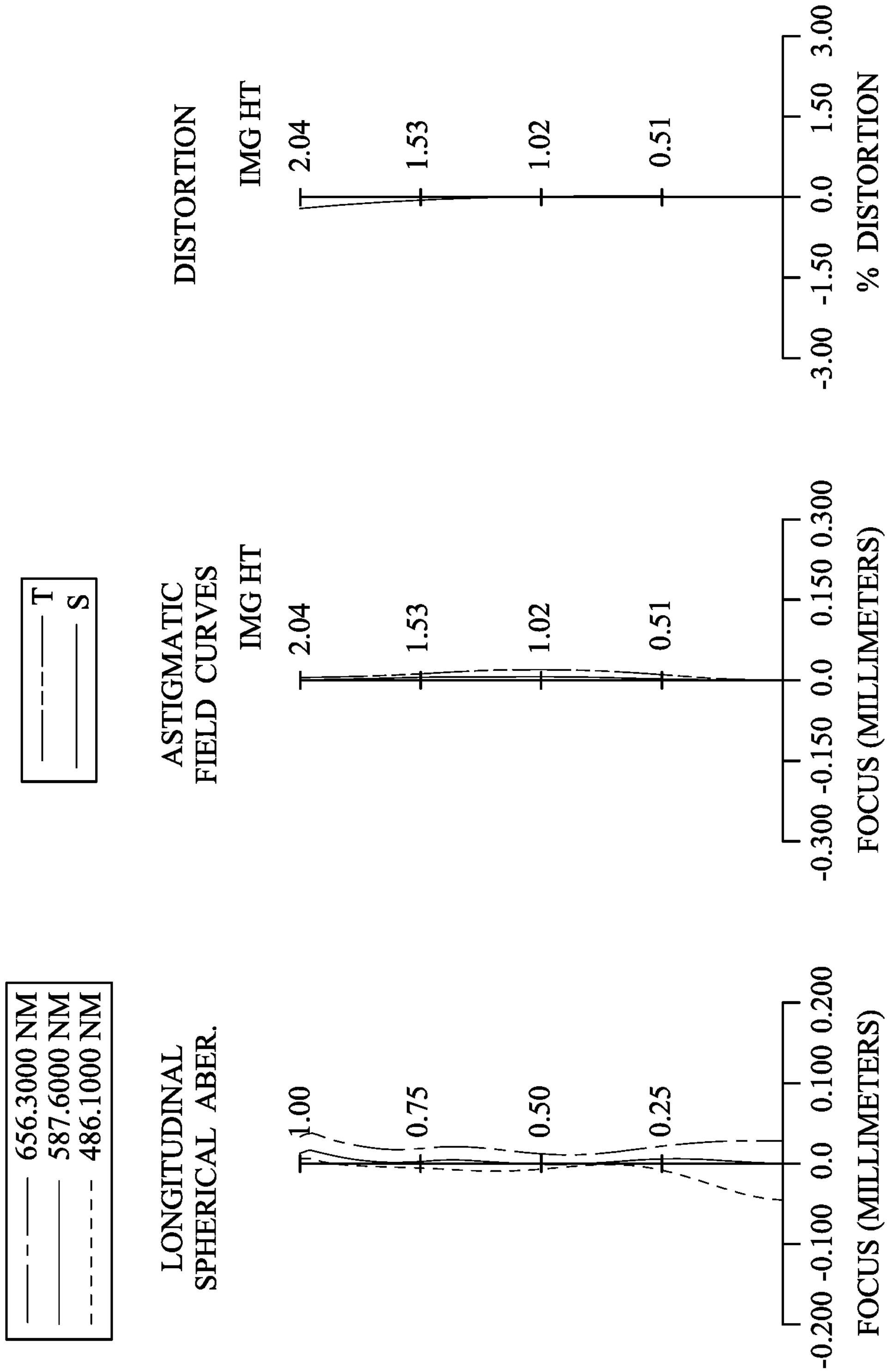
FIG. 8B shows spherical aberration curves, astigmatic field curves and a distortion curve of the zoom imaging apparatus on the zoom position according to the 4th embodiment of FIG. 7B.
Figure 8C:
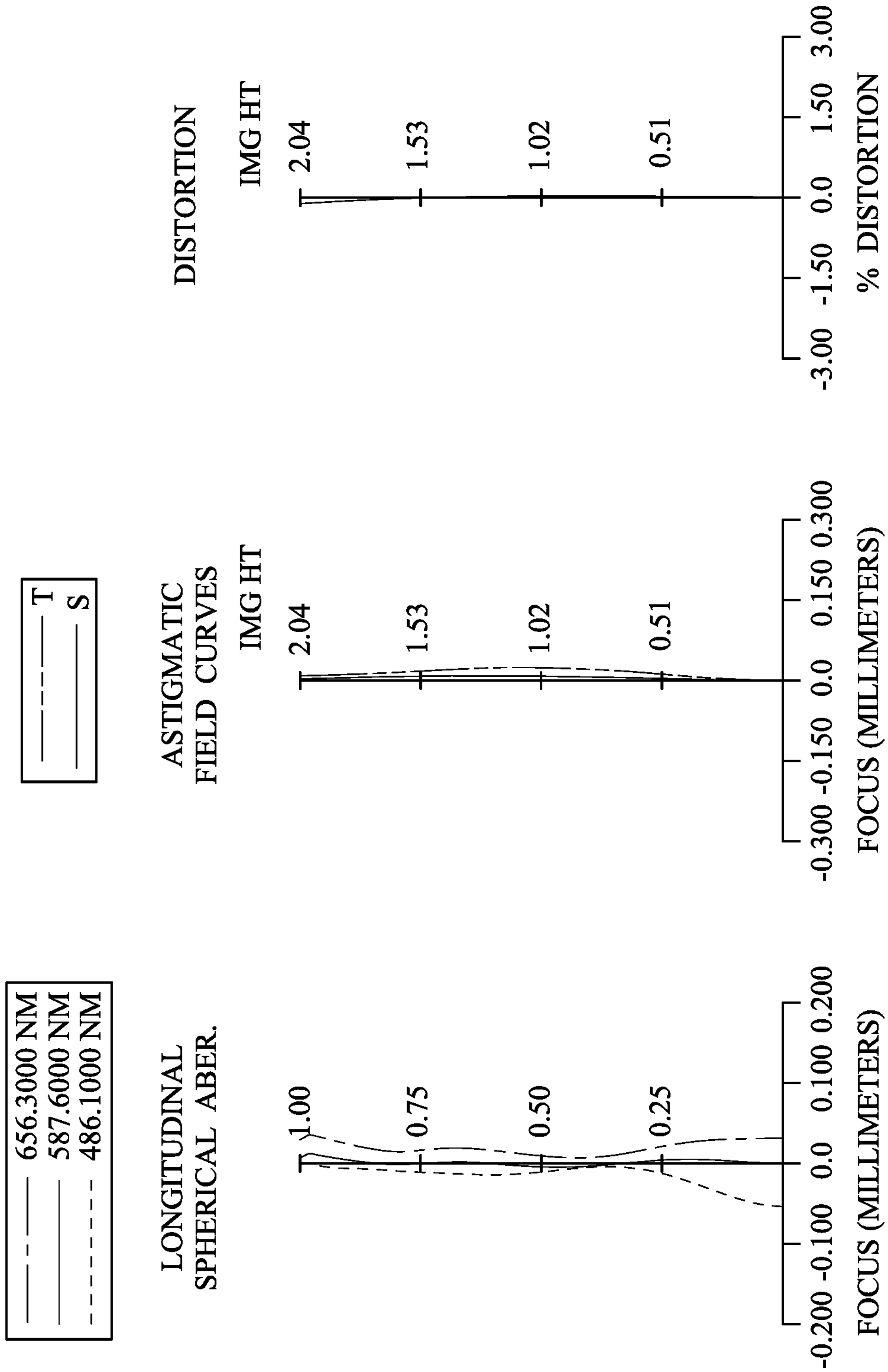
FIG. 8C shows spherical aberration curves, astigmatic field curves and a distortion curve of the zoom imaging apparatus on the zoom position according to the 4th embodiment of FIG. 7C.
Figure 8D:
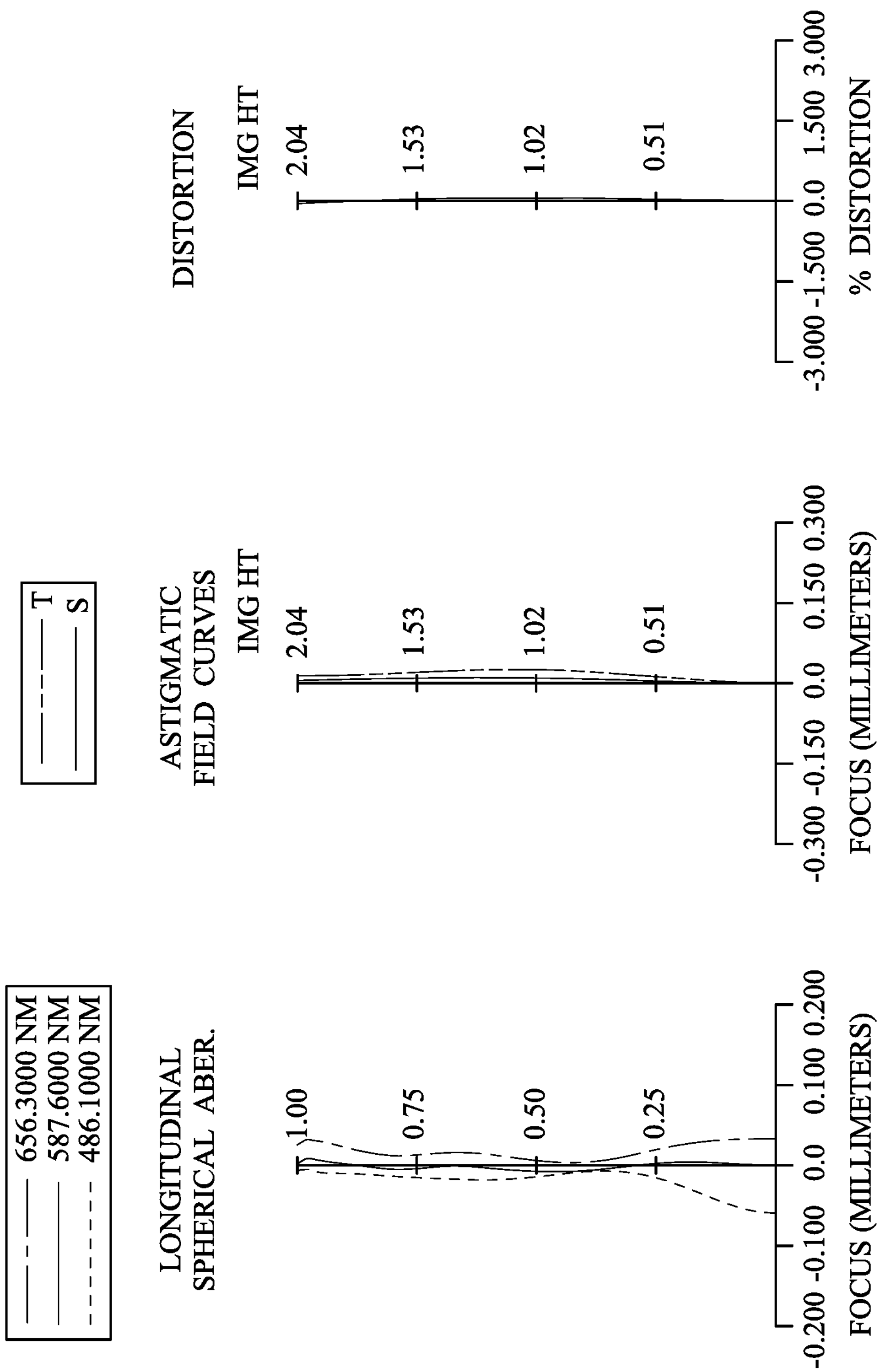
FIG. 8D shows spherical aberration curves, astigmatic field curves and a distortion curve of the zoom imaging apparatus on the zoom position according to the 4th embodiment of FIG. 7D.
Figure 8E:
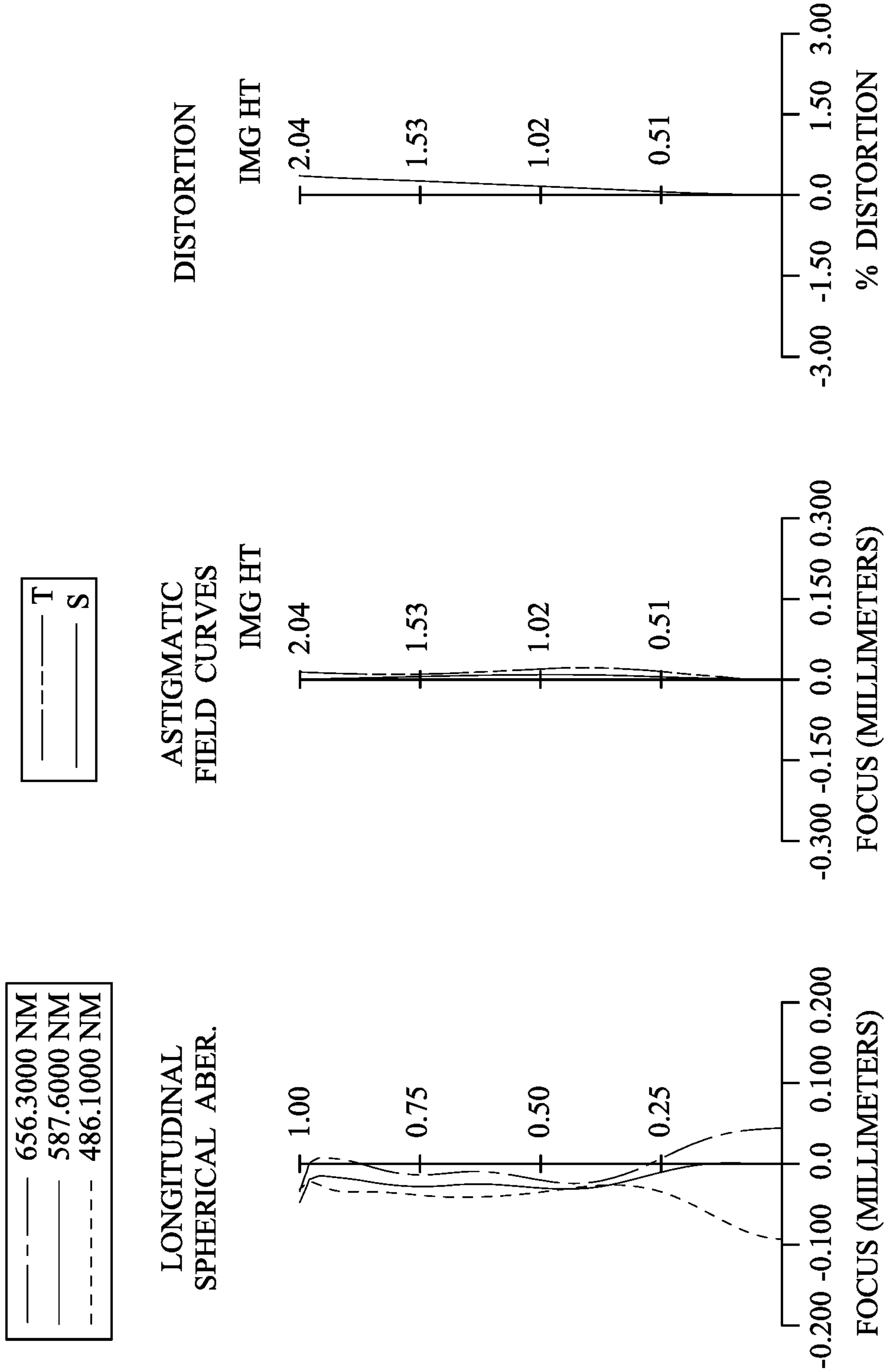
FIG. 8E shows spherical aberration curves, astigmatic field curves and a distortion curve of the zoom imaging apparatus on the zoom position according to the 4th embodiment of FIG. 7E.
Figure 8F:
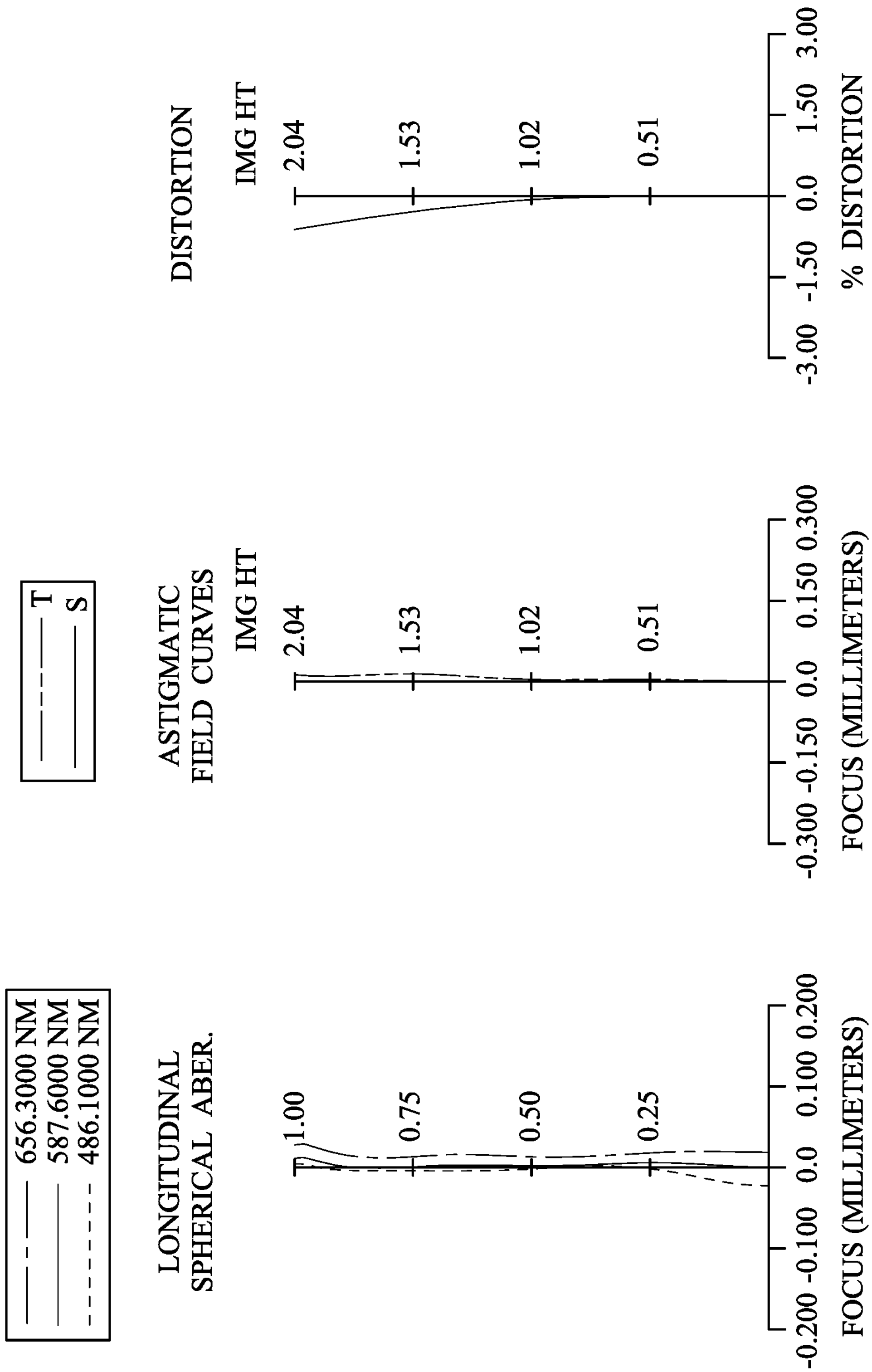
FIG. 8F shows spherical aberration curves, astigmatic field curves and a distortion curve of the zoom imaging apparatus on the zoom position according to the 4th embodiment of FIG. 7F.
Figure 8G:
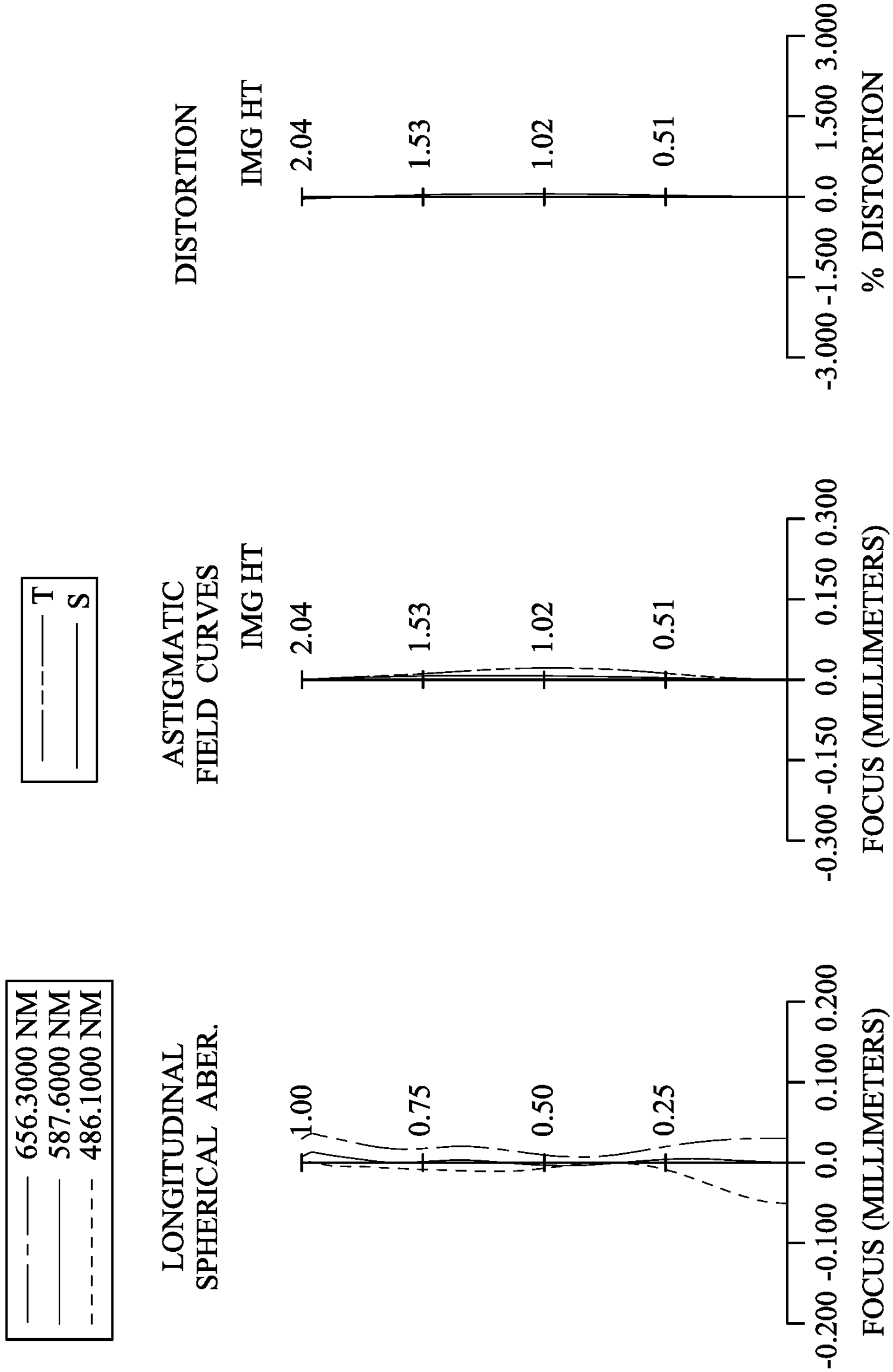
FIG. 8G shows spherical aberration curves, astigmatic field curves and a distortion curve of the zoom imaging apparatus on the zoom position according to the 4th embodiment of FIG. 7G.
Figure 8H:
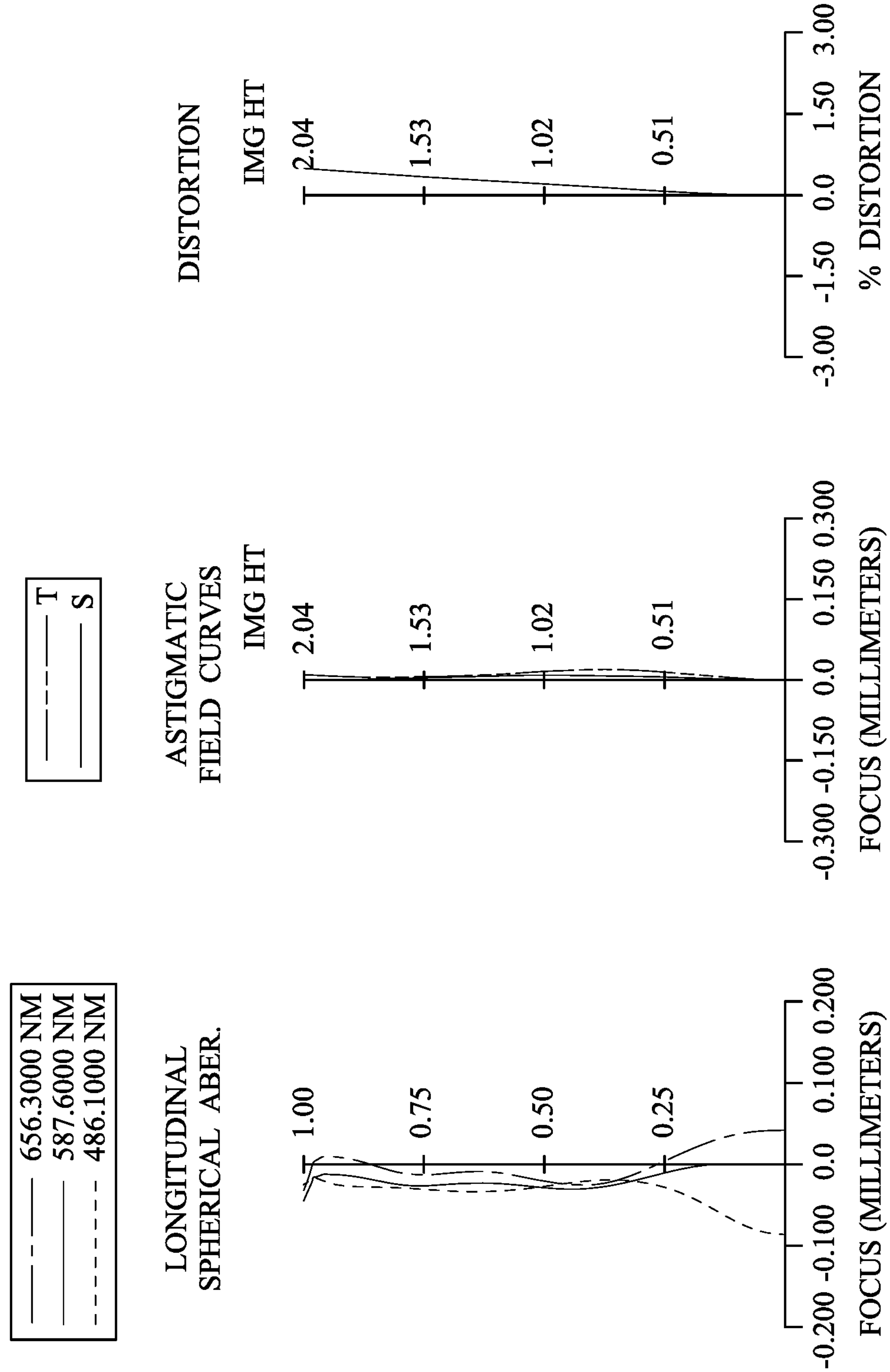
FIG. 8H shows spherical aberration curves, astigmatic field curves and a distortion curve of the zoom imaging apparatus on the zoom position according to the 4th embodiment of FIG. 7H.
Figure 9A:
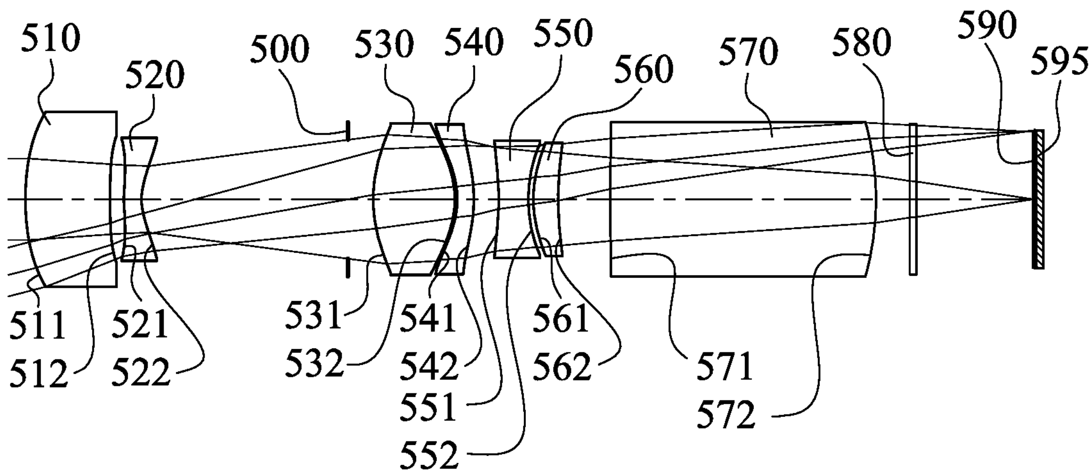
FIG. 9A is a schematic view of a zoom imaging apparatus on one zoom position according to the 5th embodiment of the present disclosure.
Figure 9B:
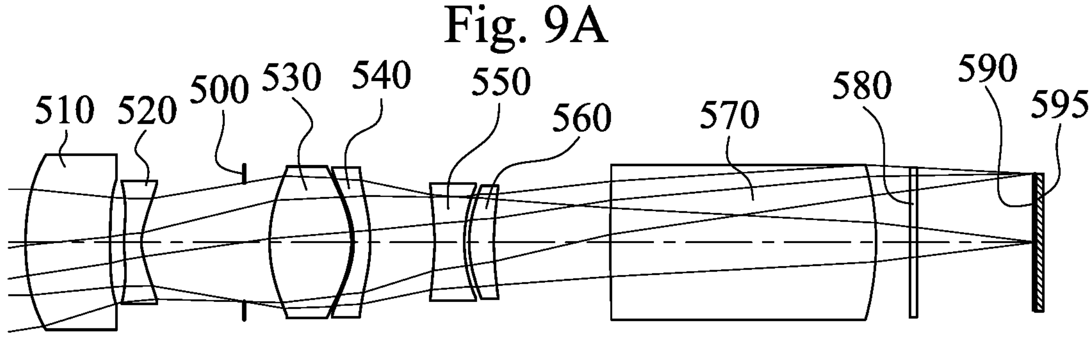
FIG. 9B is a schematic view of the zoom imaging apparatus on another zoom position according to the 5th embodiment of the present disclosure.
Figure 9C:
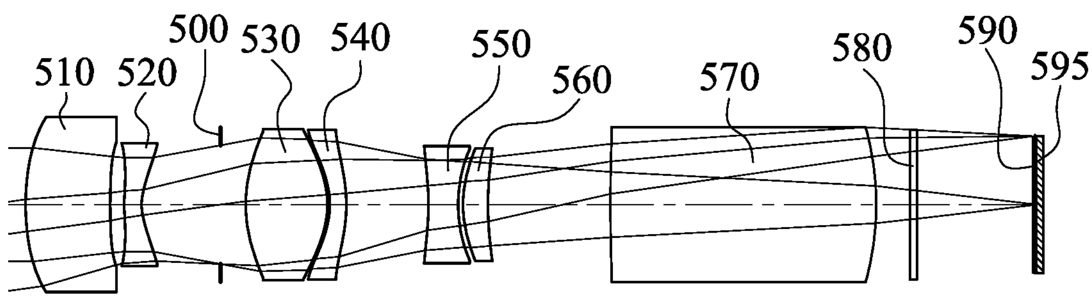
FIG. 9C is a schematic view of the zoom imaging apparatus on another zoom position according to the 5th embodiment of the present disclosure.
Figure 9D:
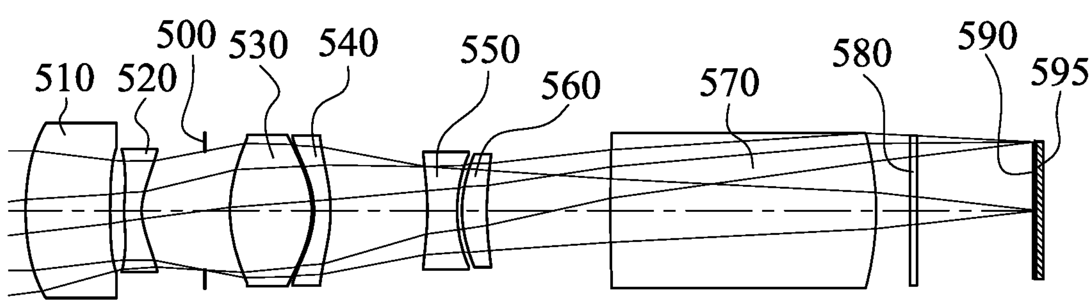
FIG. 9D is a schematic view of the zoom imaging apparatus on another zoom position according to the 5th embodiment of the present disclosure.
Figure 9E:
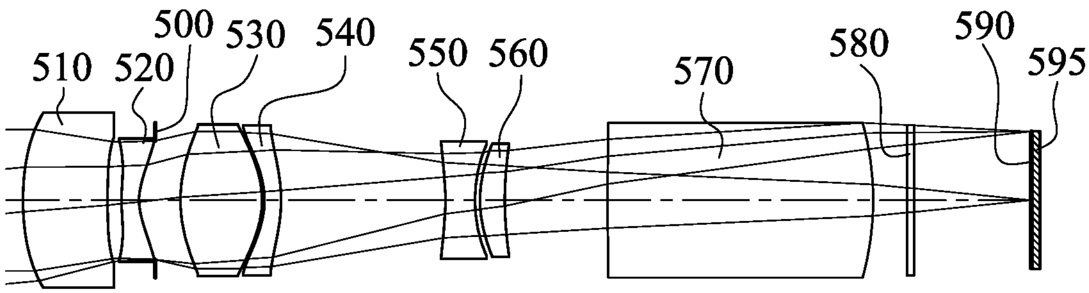
FIG. 9E is a schematic view of the zoom imaging apparatus on another zoom position according to the 5th embodiment of the present disclosure.
Figure 9F:
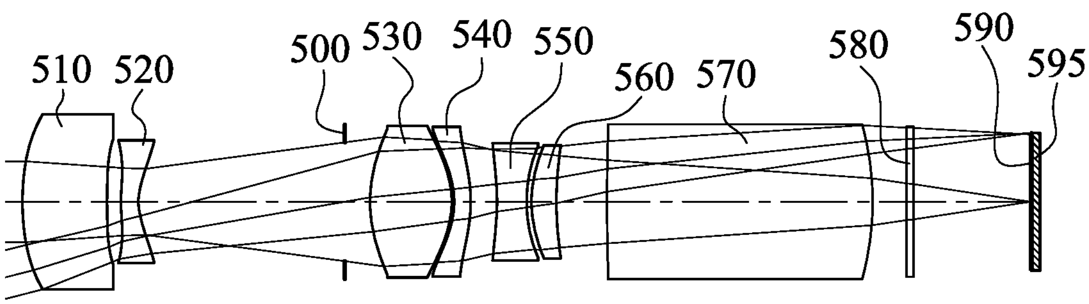
FIG. 9F is a schematic view of the zoom imaging apparatus on another zoom position according to the 5th embodiment of the present disclosure.

FIG. IOF shows spherical aberration curves, astigmatic field curves and a distortion curve of the zoom imaging apparatus on the zoom position according to the 5th embodiment of FIG. 9F.

Figure 9G:
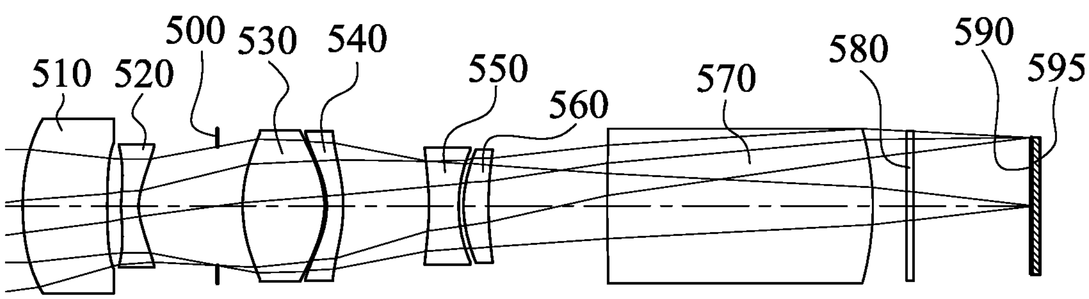
FIG. 9G is a schematic view of the zoom imaging apparatus on another zoom position according to the 5th embodiment of the present disclosure.
Figure 10A:
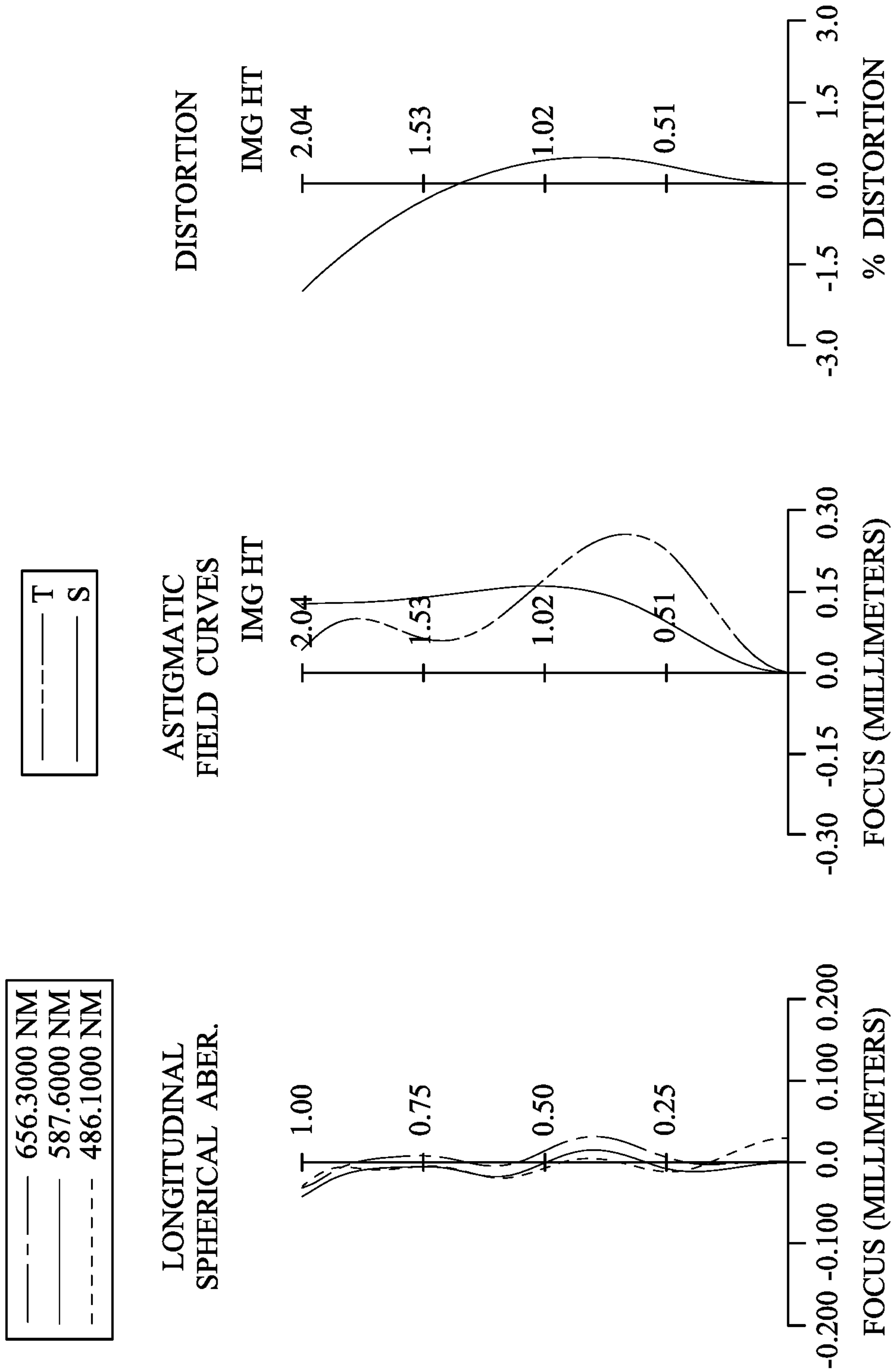
FIG. 10A shows spherical aberration curves, astigmatic field curves and a distortion curve of the zoom imaging apparatus on the zoom position according to the 5th embodiment of FIG. 9A.
Figure 10B:
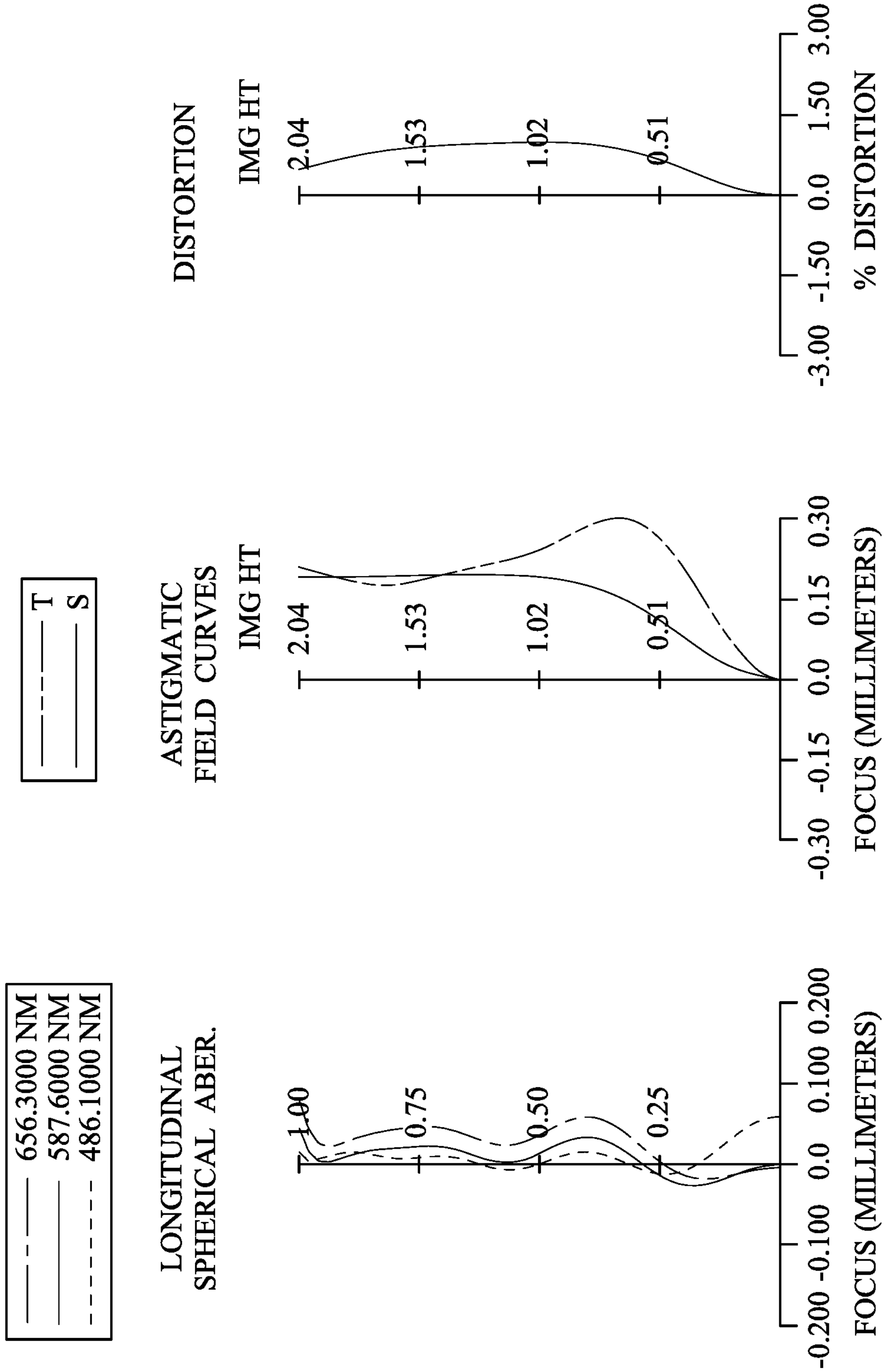
FIG. 10B shows spherical aberration curves, astigmatic field curves and a distortion curve of the zoom imaging apparatus on the zoom position according to the 5th embodiment of FIG. 9B.
Figure 10C:
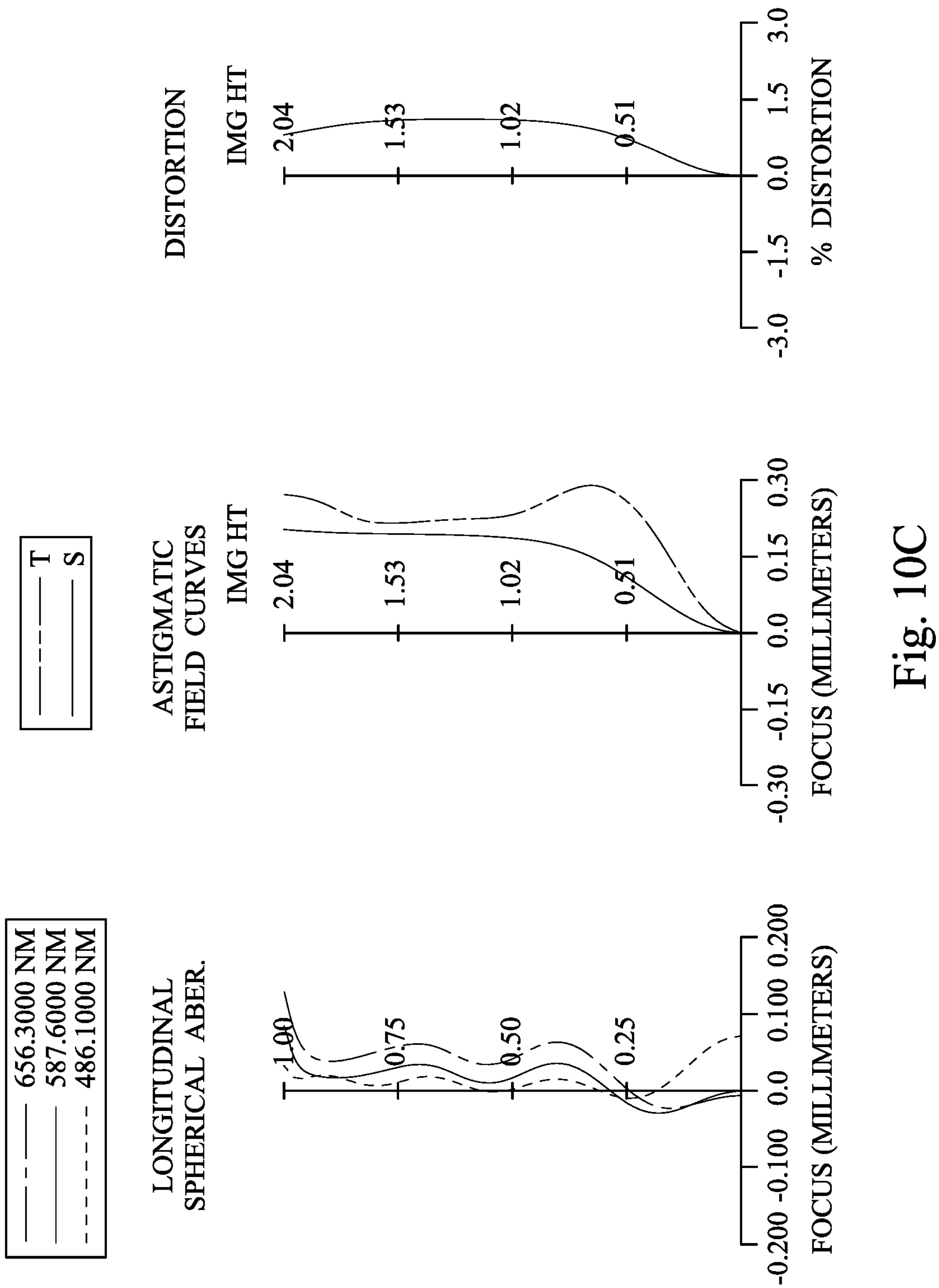
FIG. 10C shows spherical aberration curves, astigmatic field curves and a distortion curve of the zoom imaging apparatus on the zoom position according to the 5th embodiment of FIG. 9C.
Figure 10D:
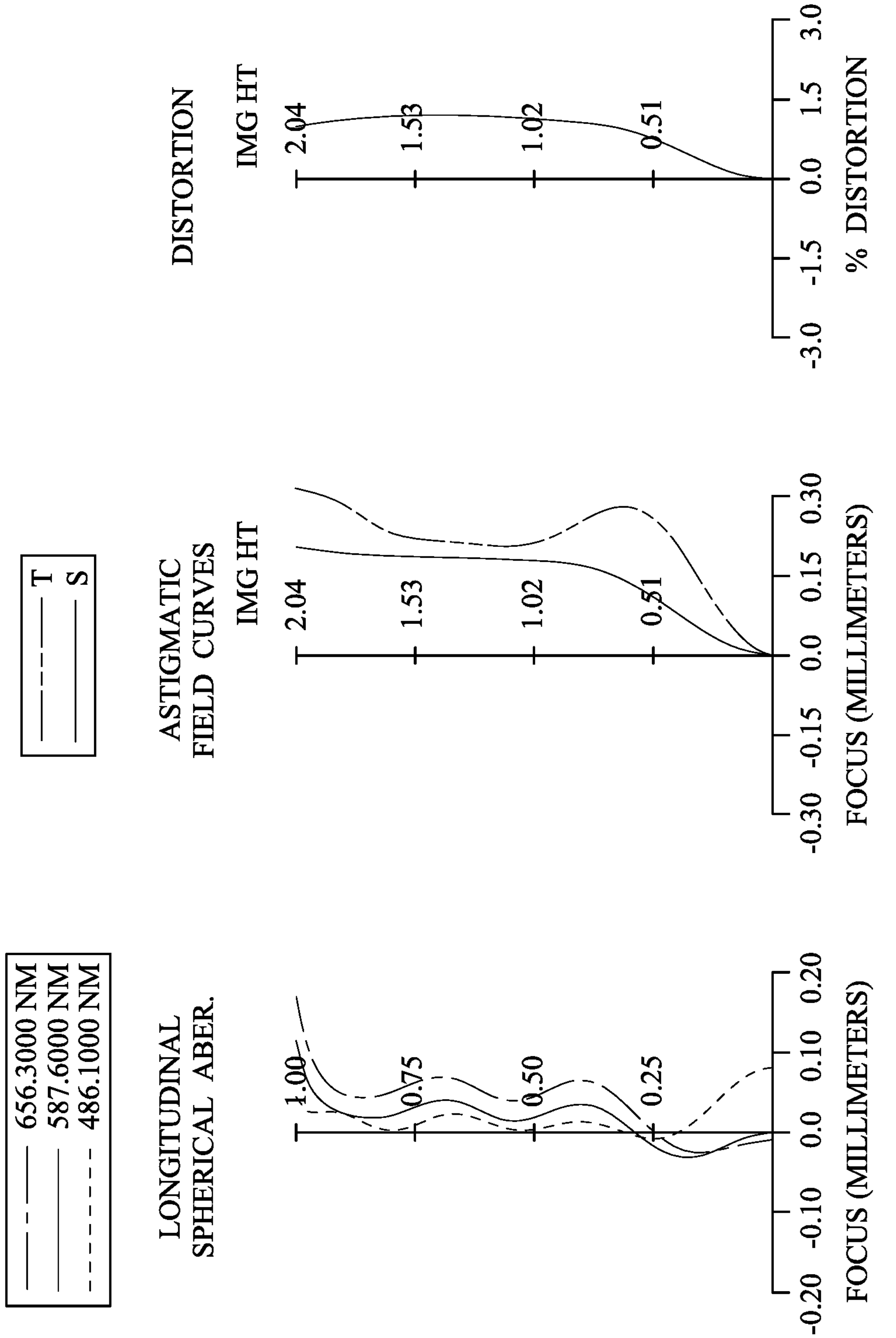
FIG. 10D shows spherical aberration curves, astigmatic field curves and a distortion curve of the zoom imaging apparatus on the zoom position according to the 5th embodiment of FIG. 9D.
Figure 10E:
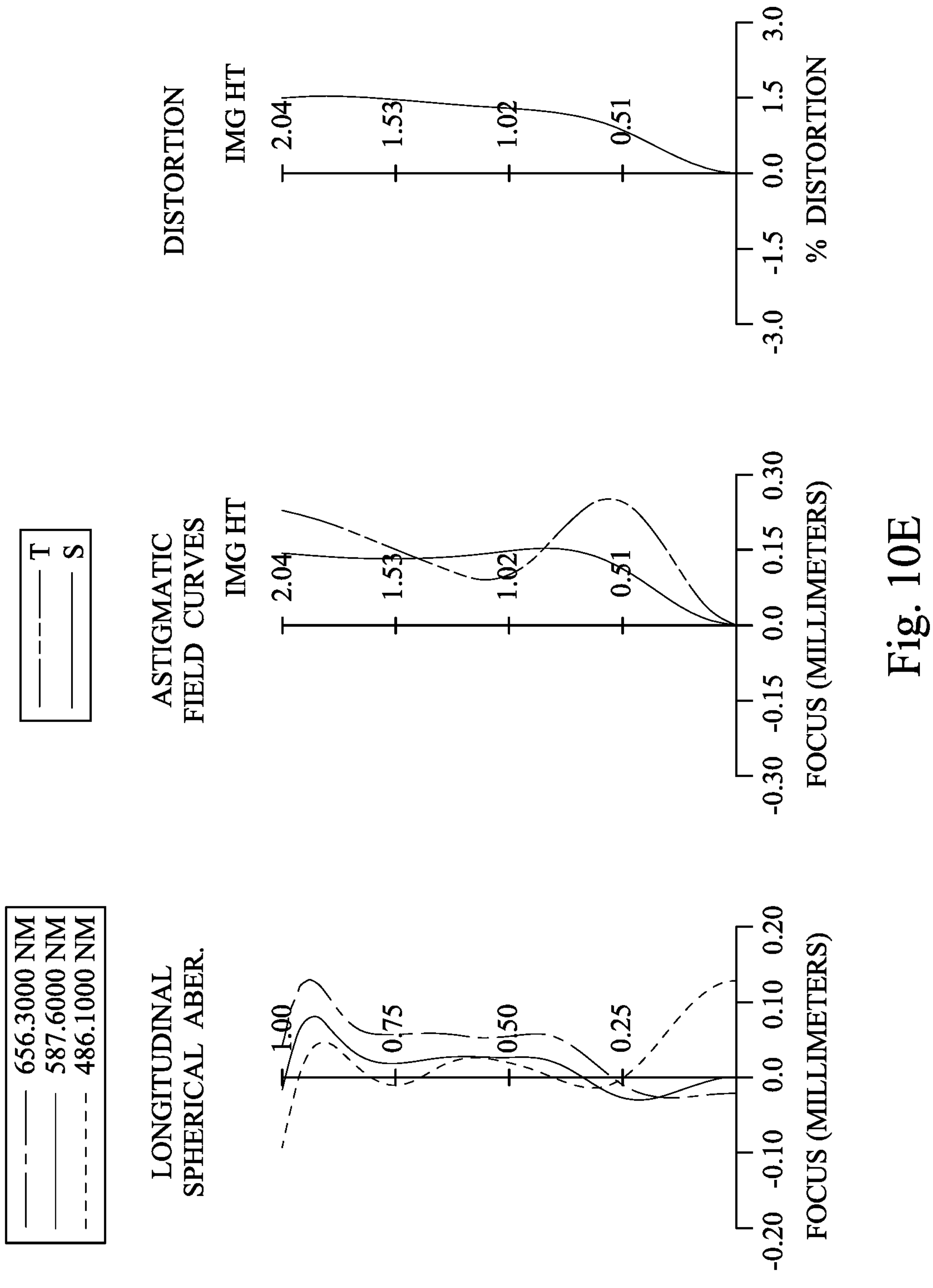
FIG. 10E shows spherical aberration curves, astigmatic field curves and a distortion curve of the zoom imaging, apparatus on the zoom position according to the 5th embodiment of FIG. 9E.
Figure 10F:
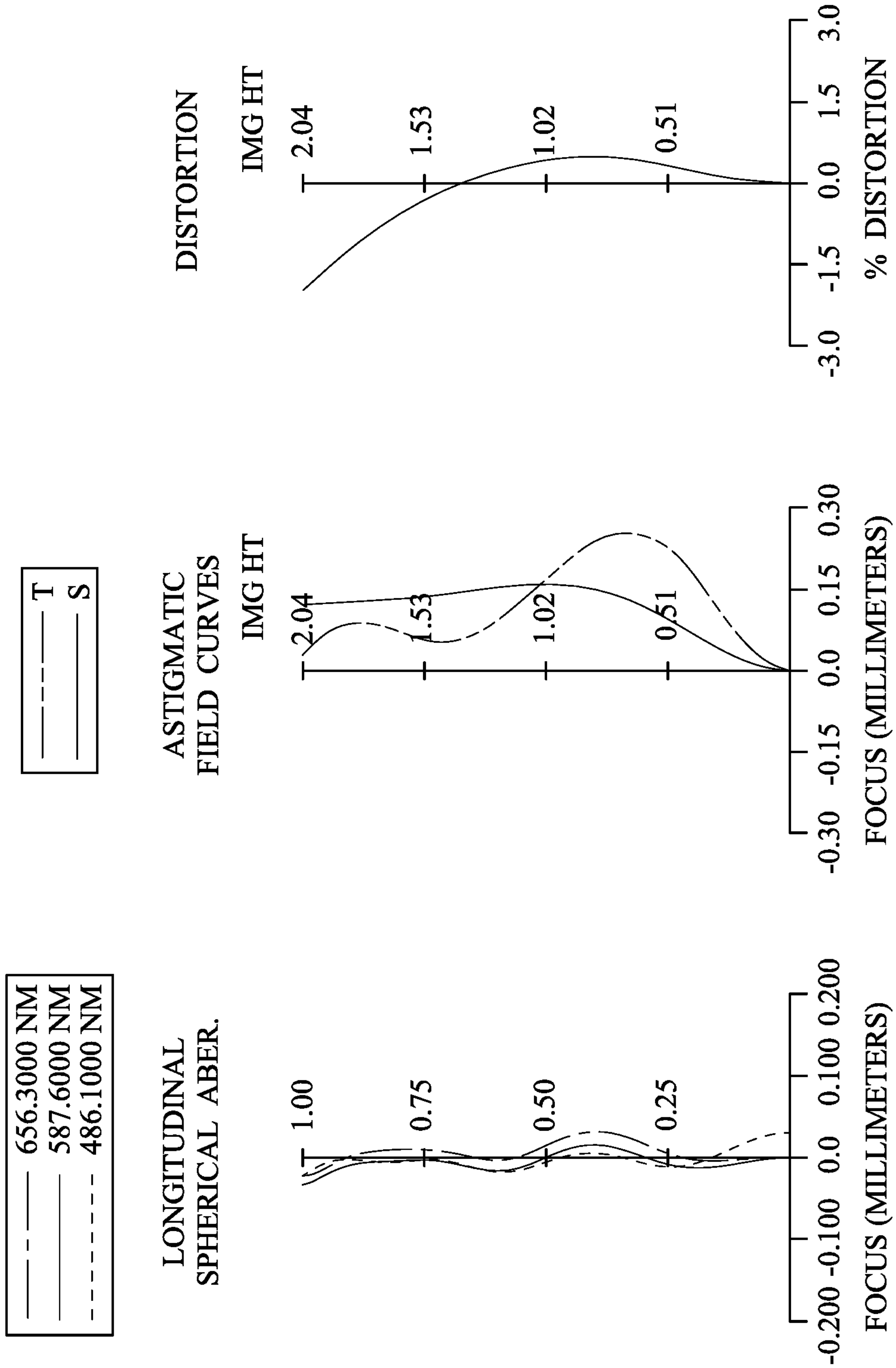
Figure 10G:
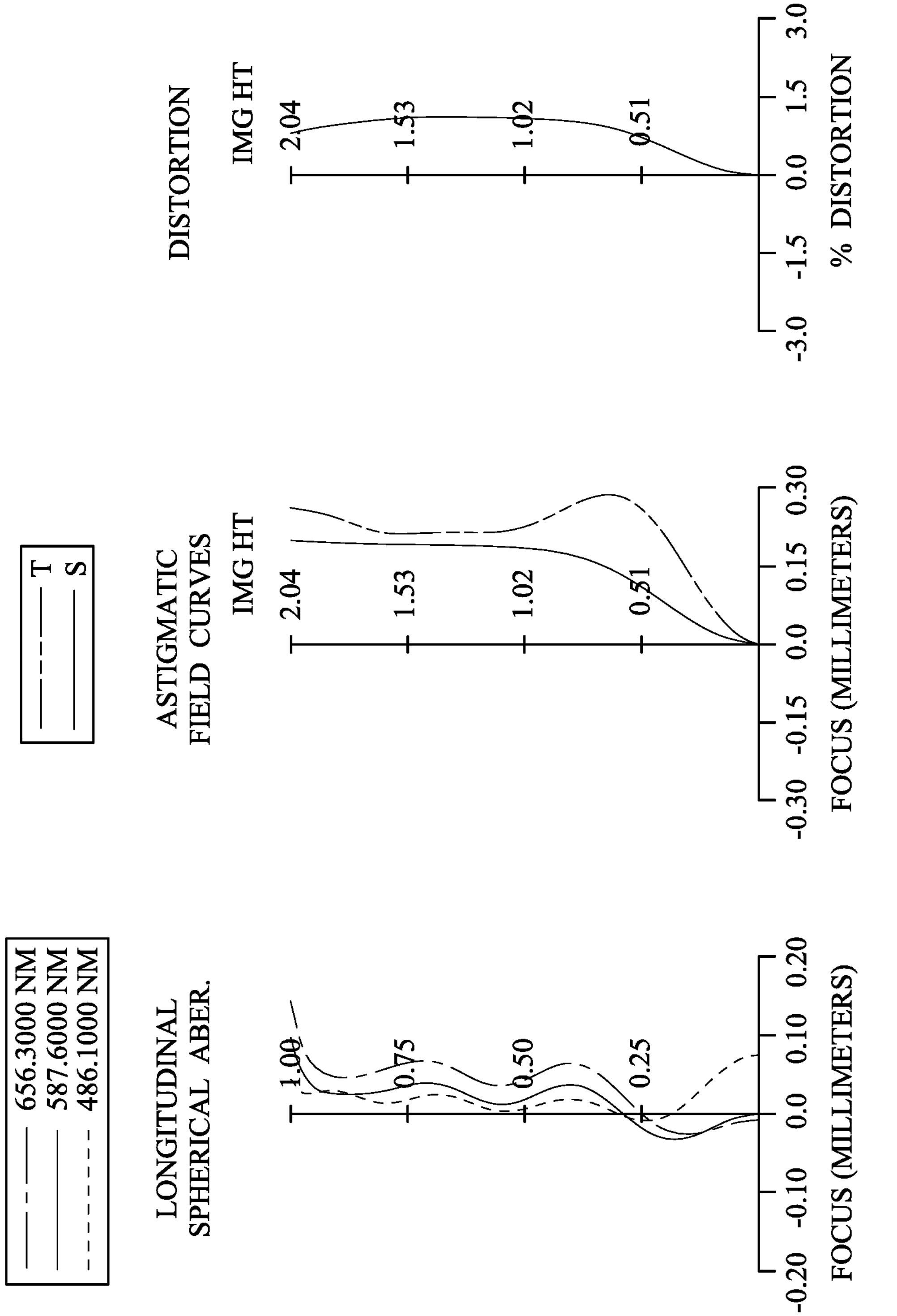

FIG. 10G shows spherical aberration curves, astigmatic field curves and a distortion curve of the zoom imaging apparatus on the zoom position according to the 5th embodiment of FIG. 9G.

Figure 9H:
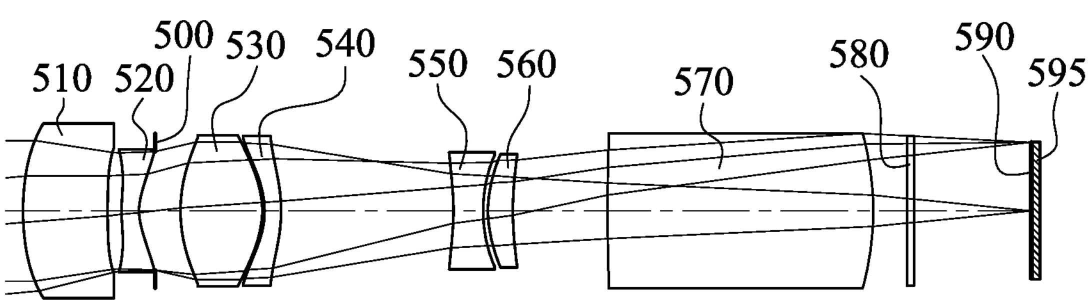
FIG. 9H is a schematic view of the zoom imaging apparatus on another zoom position according to the 5th embodiment of the present disclosure.
Figure 10H:
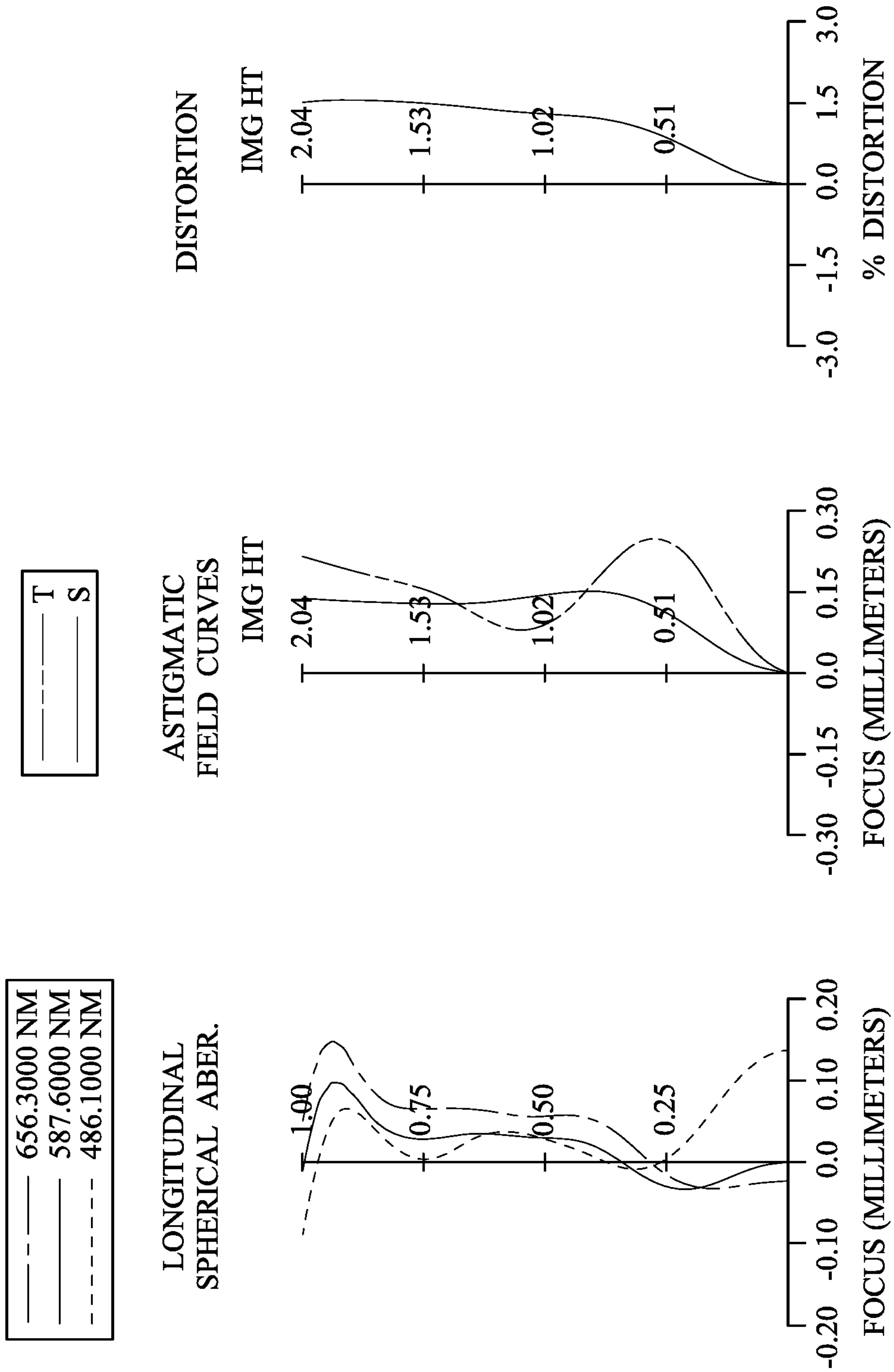

FIG. 10H shows spherical aberration curves, astigmatic field curves and a distortion curve of the zoom imaging apparatus on the zoom position according to the 5th embodiment of FIG. 9H.

Figure 11A:
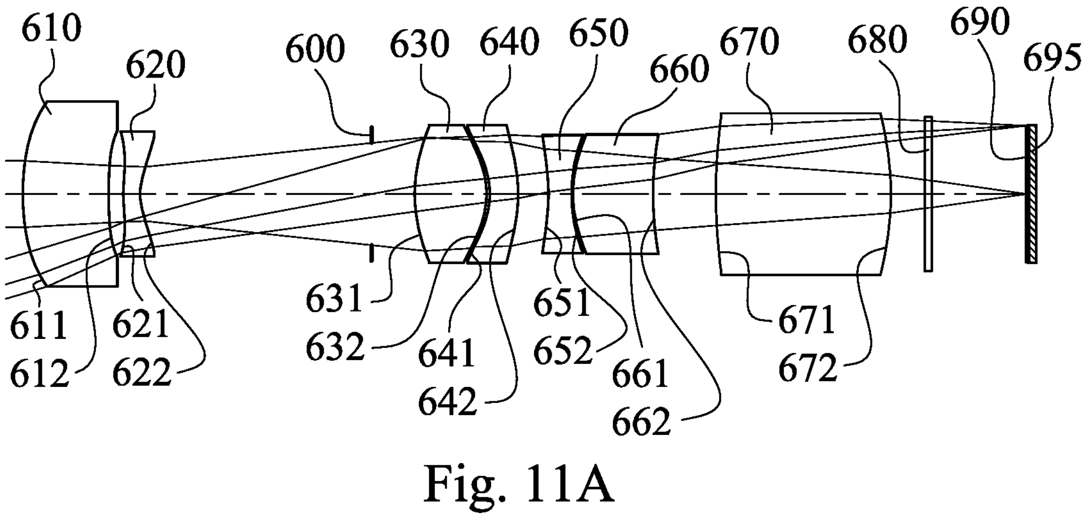

FIG. 11A is a schematic view of a zoom imaging apparatus on one zoom position according to the 6th embodiment of the present disclosure.

Figure 11B:
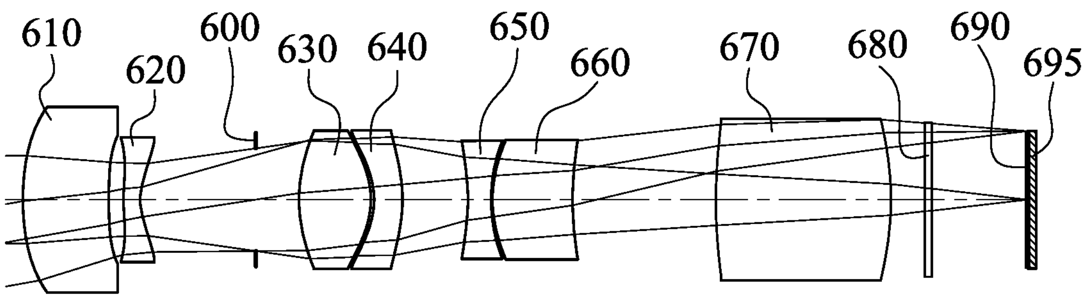

FIG. 11B is a schematic view of the zoom imaging apparatus on another zoom position according to the 6th embodiment of the present disclosure.

Figure 11C:
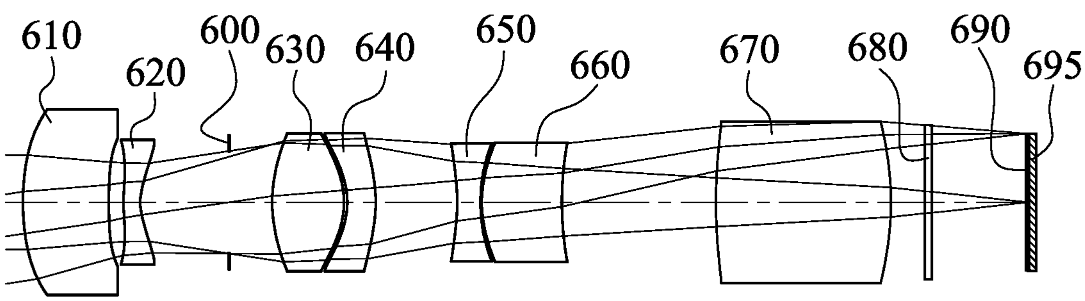

FIG. 11C is a schematic view of the zoom imaging apparatus on another zoom position according to the 6th embodiment of the present disclosure.

Figure 11D:
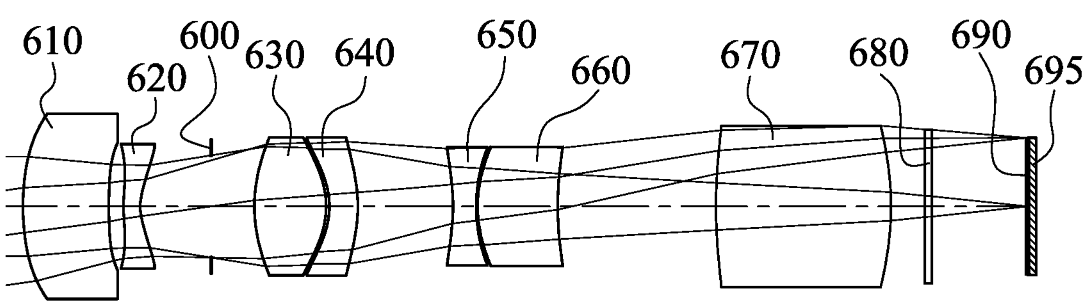

FIG. 11D is a schematic view of the zoom imaging apparatus on another zoom position according to the 6th embodiment of the present disclosure.

Figure 11E:
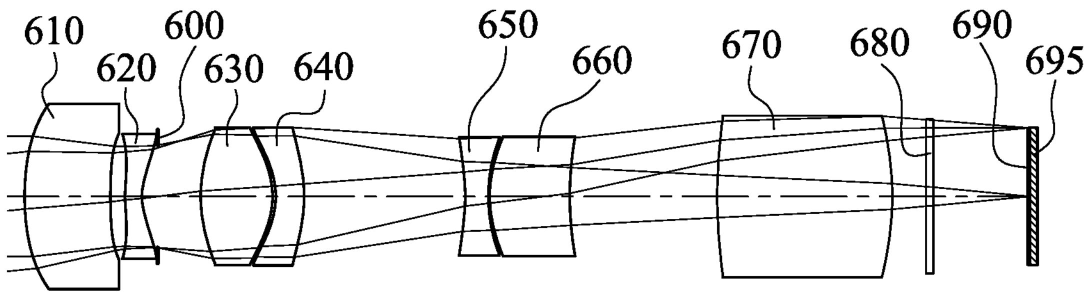

FIG. 11E is a schematic view of the zoom imaging apparatus on another zoom position according to the 6th embodiment of the present disclosure.

Figure 11F:
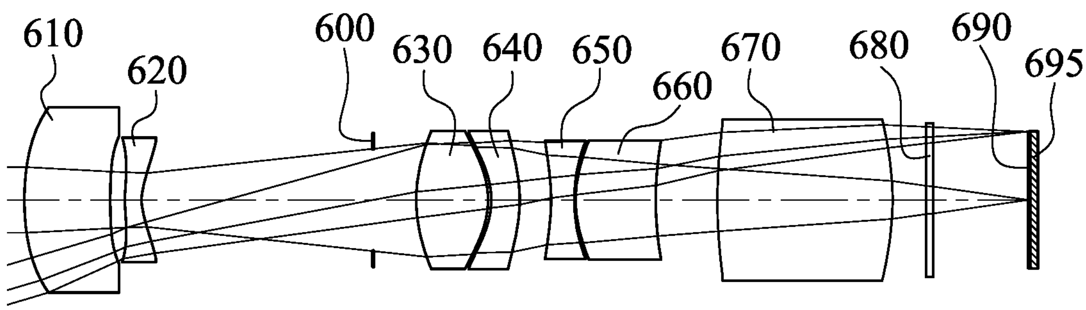

FIG. 11F is a schematic view of the zoom imaging apparatus on another zoom position according to the 6th embodiment of the present disclosure.

Figure 11G:
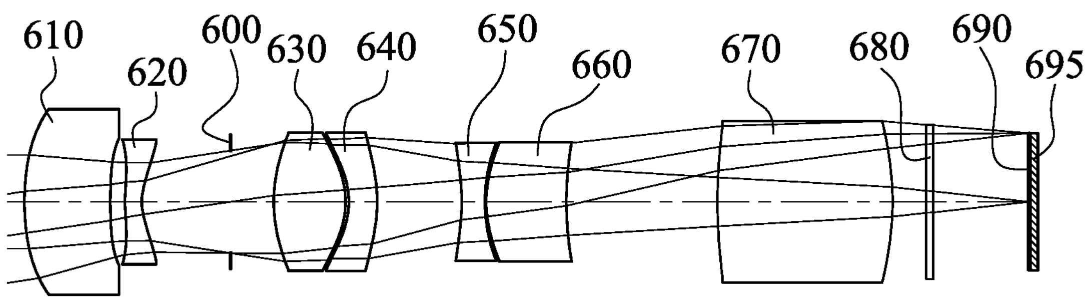

FIG. 11G is a schematic view of the zoom imaging apparatus on another zoom position according to the 6th embodiment of the present disclosure.

Figure 11H:
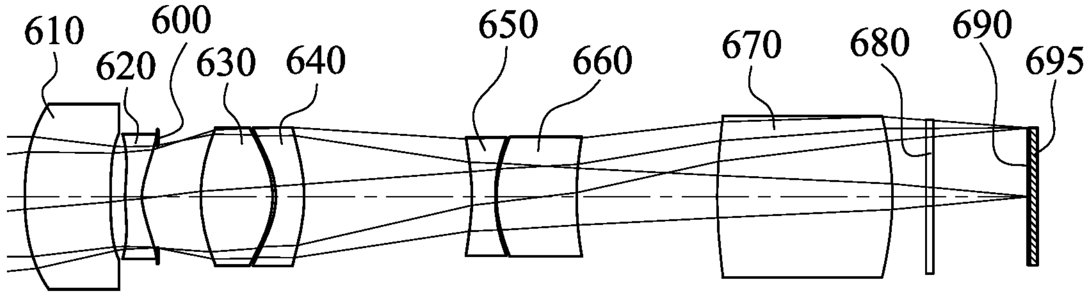

FIG. 11H is a schematic view of the zoom imaging apparatus on another zoom position according to the 6th embodiment of the present disclosure.

Figure 12A:
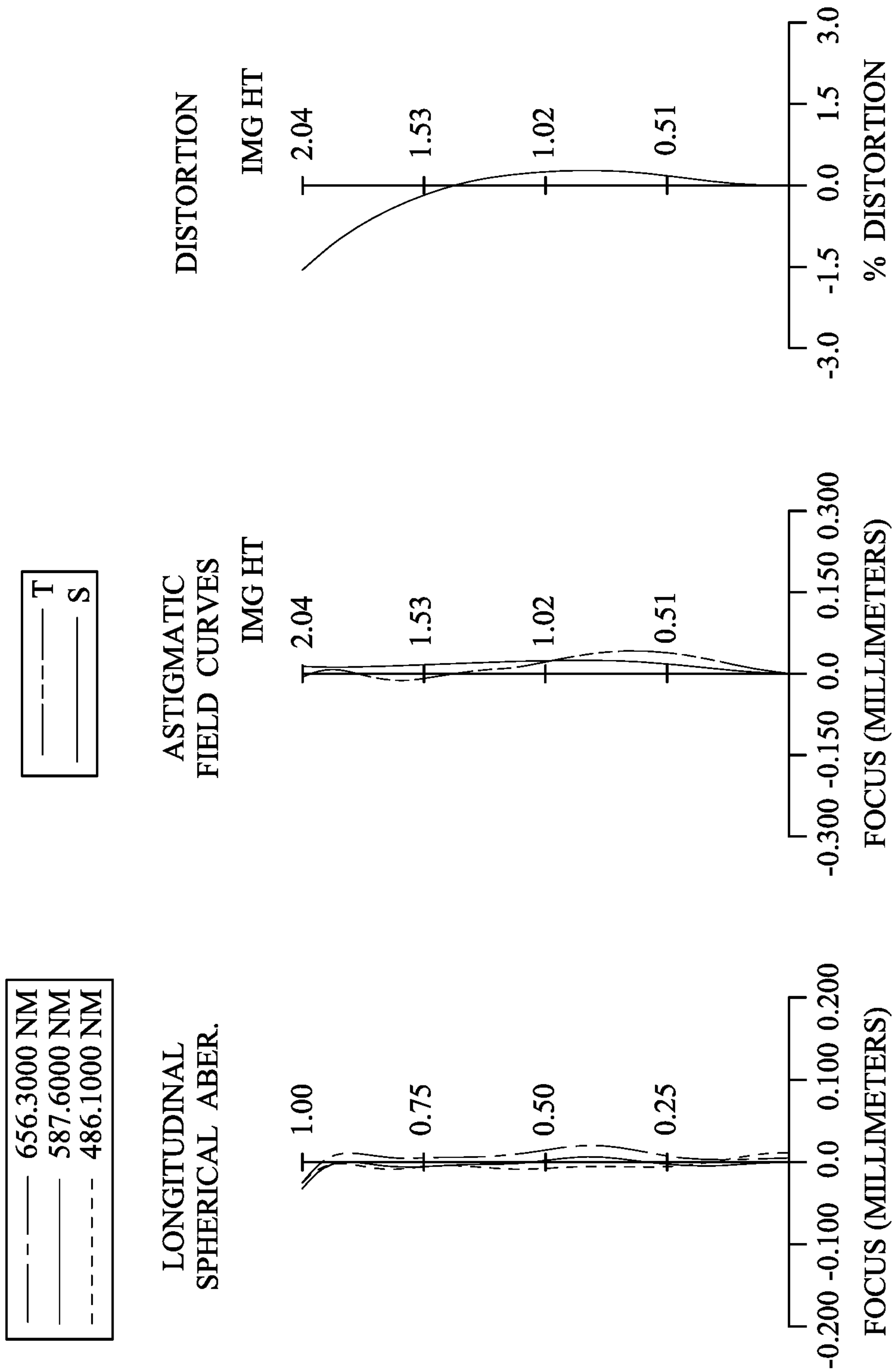

FIG. 12A shows spherical aberration curves, astigmatic field curves and a distortion curve of the zoom imaging apparatus on the zoom position according to the 6th embodiment of FIG. 11A.

Figure 12B:
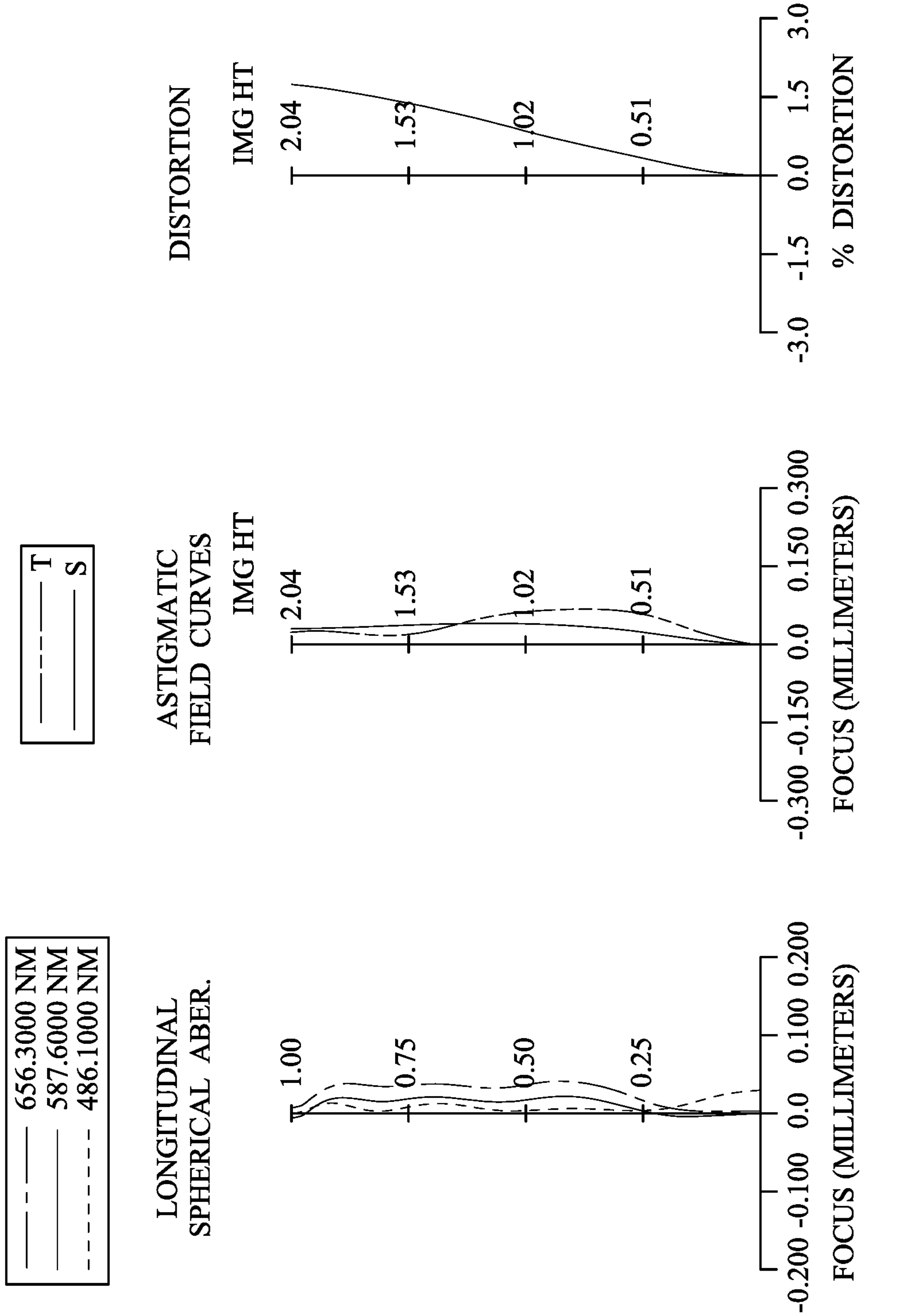

FIG. 12B shows spherical aberration curves, astigmatic field curves and a distortion curve of the zoom imaging apparatus on the zoom position according to the 6th embodiment of FIG. 11B.

Figure 12C:
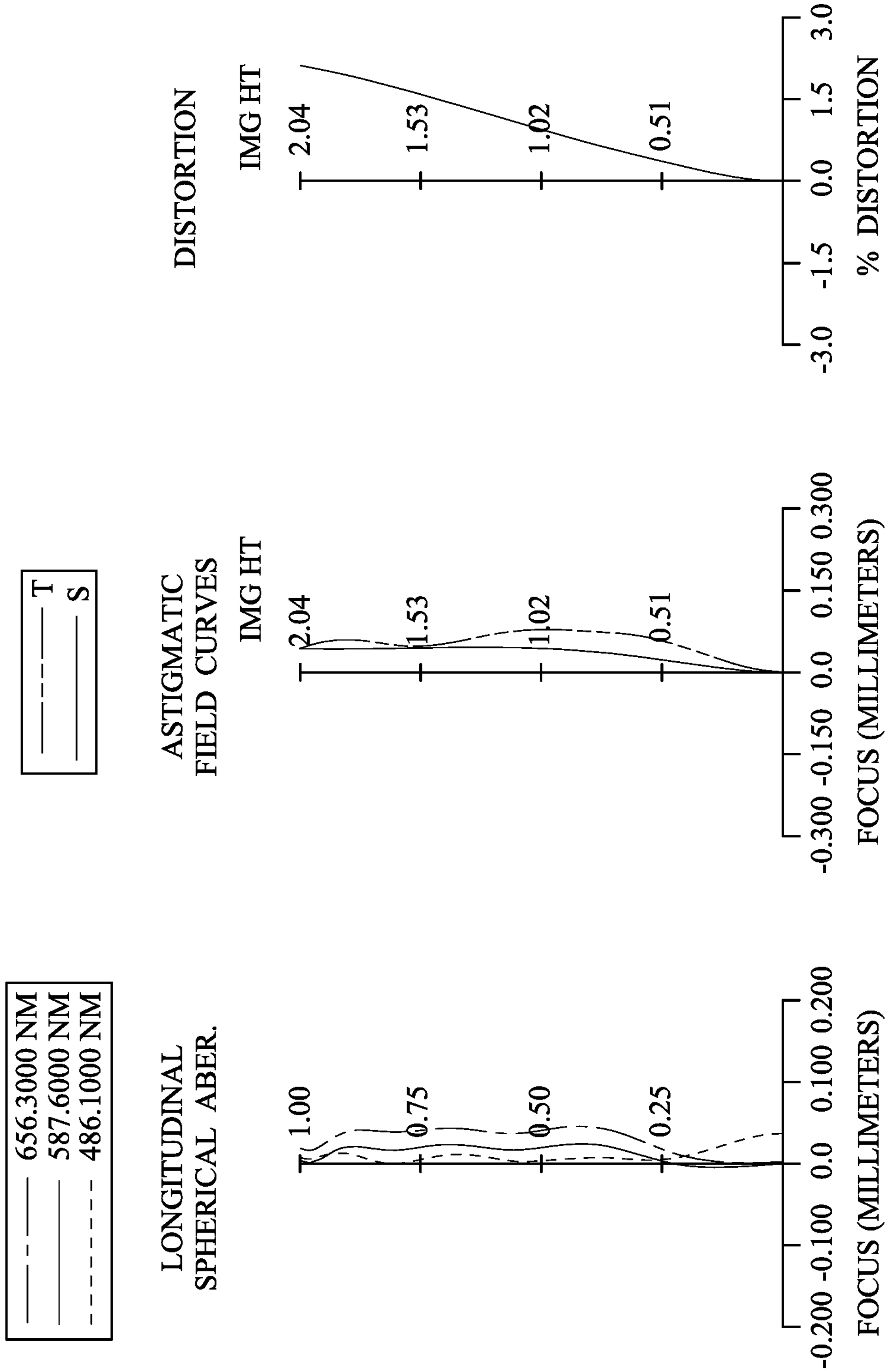

FIG. 12C shows spherical aberration curves, astigmatic field curves and a distortion curve of the zoom imaging apparatus on the zoom position according to the 6th embodiment of FIG. 11C.

Figure 12D:
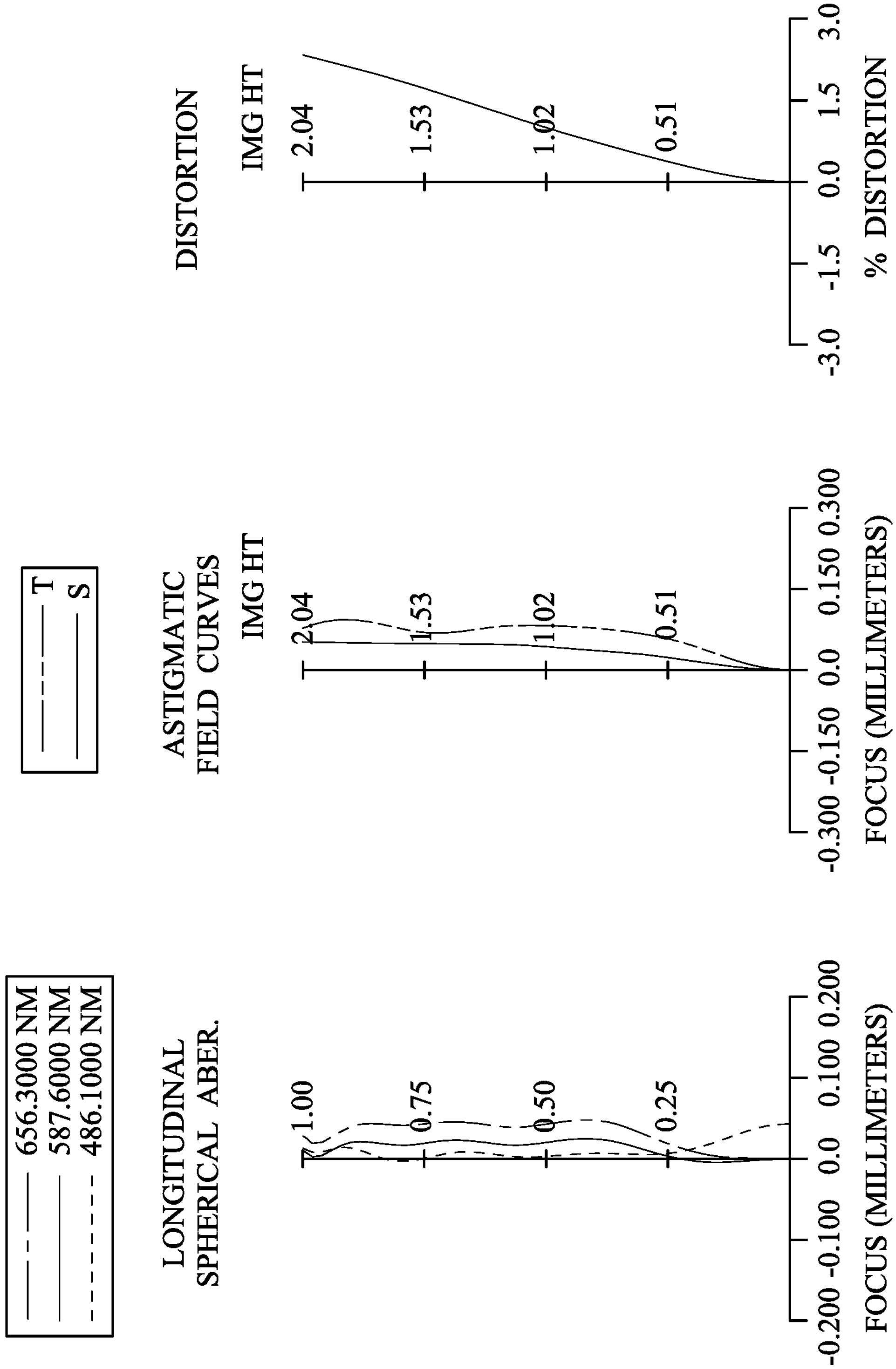

FIG. 12D shows spherical aberration curves, astigmatic field curves and a distortion curve of the zoom imaging apparatus on the zoom position according to the 6th embodiment of FIG. 11D.

Figure 12E:
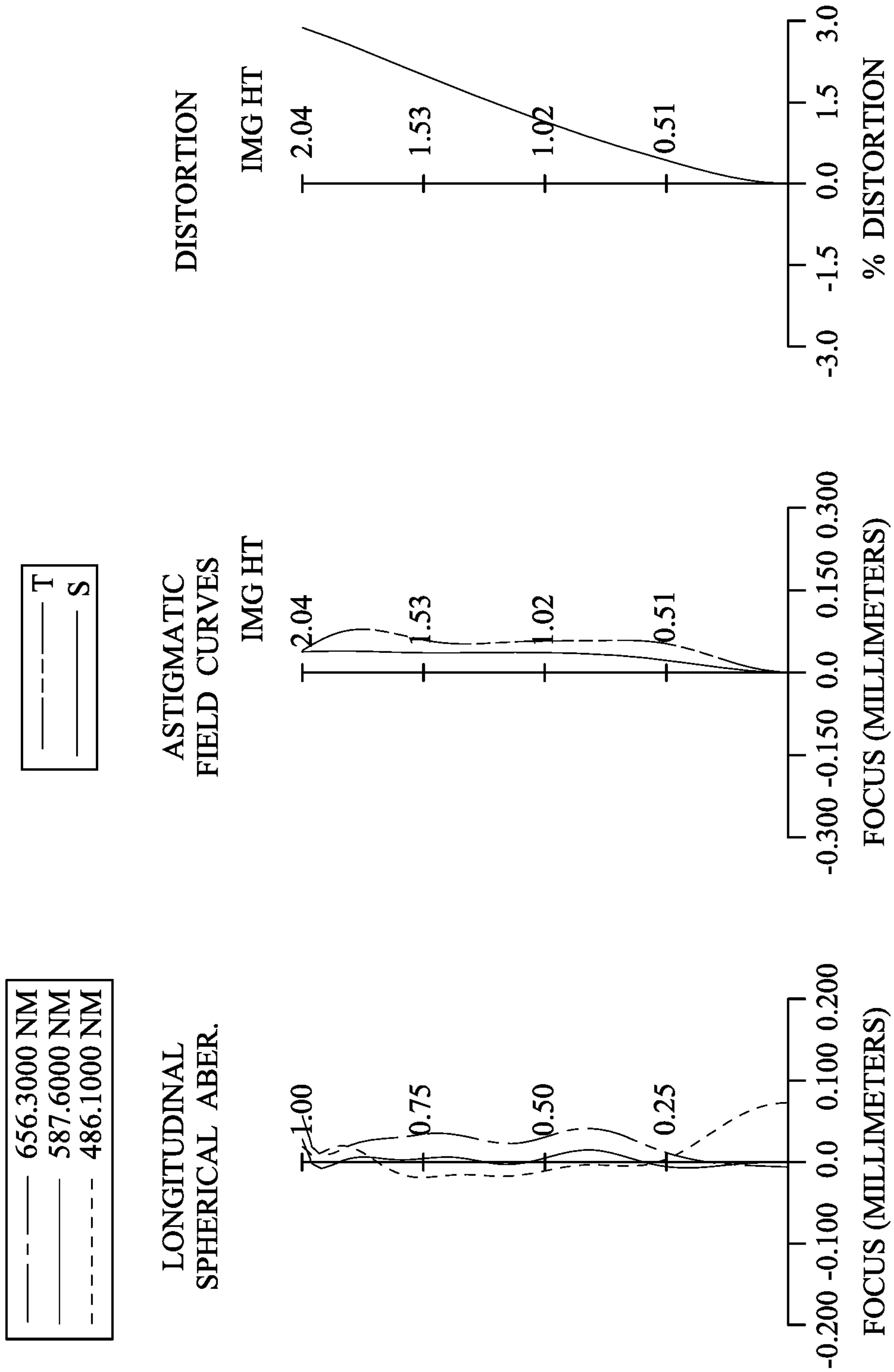

FIG. 12E shows spherical aberration curves, astigmatic field curves and a distortion curve of the zoom imaging apparatus on the zoom position according to the 6th embodiment of FIG. 11E.

Figure 12F:
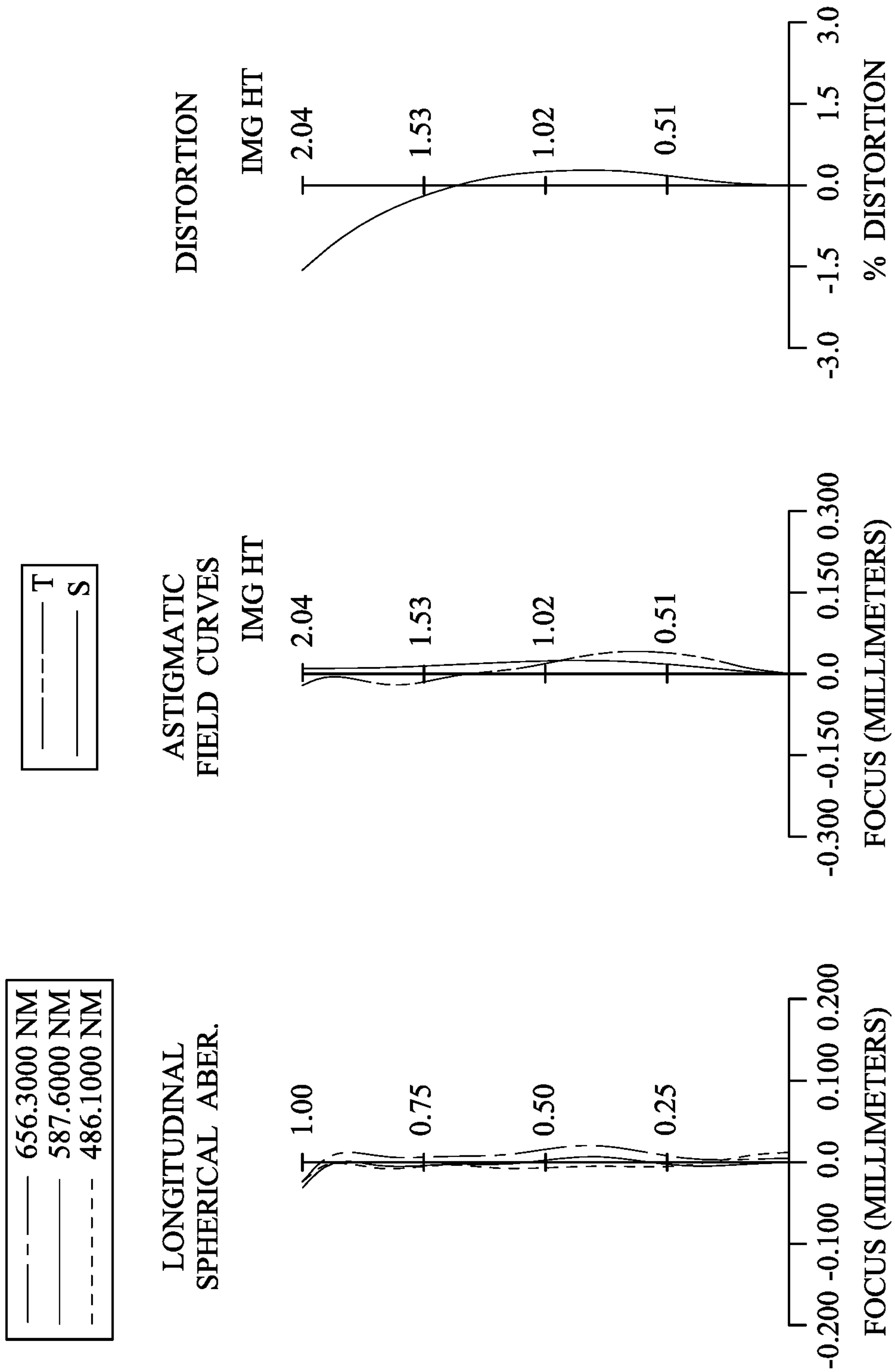

FIG. 12F shows spherical aberration curves, astigmatic field curves and a distortion curve of the zoom imaging apparatus on the zoom position according to the 6th embodiment of FIG. 11F.

Figure 12G:
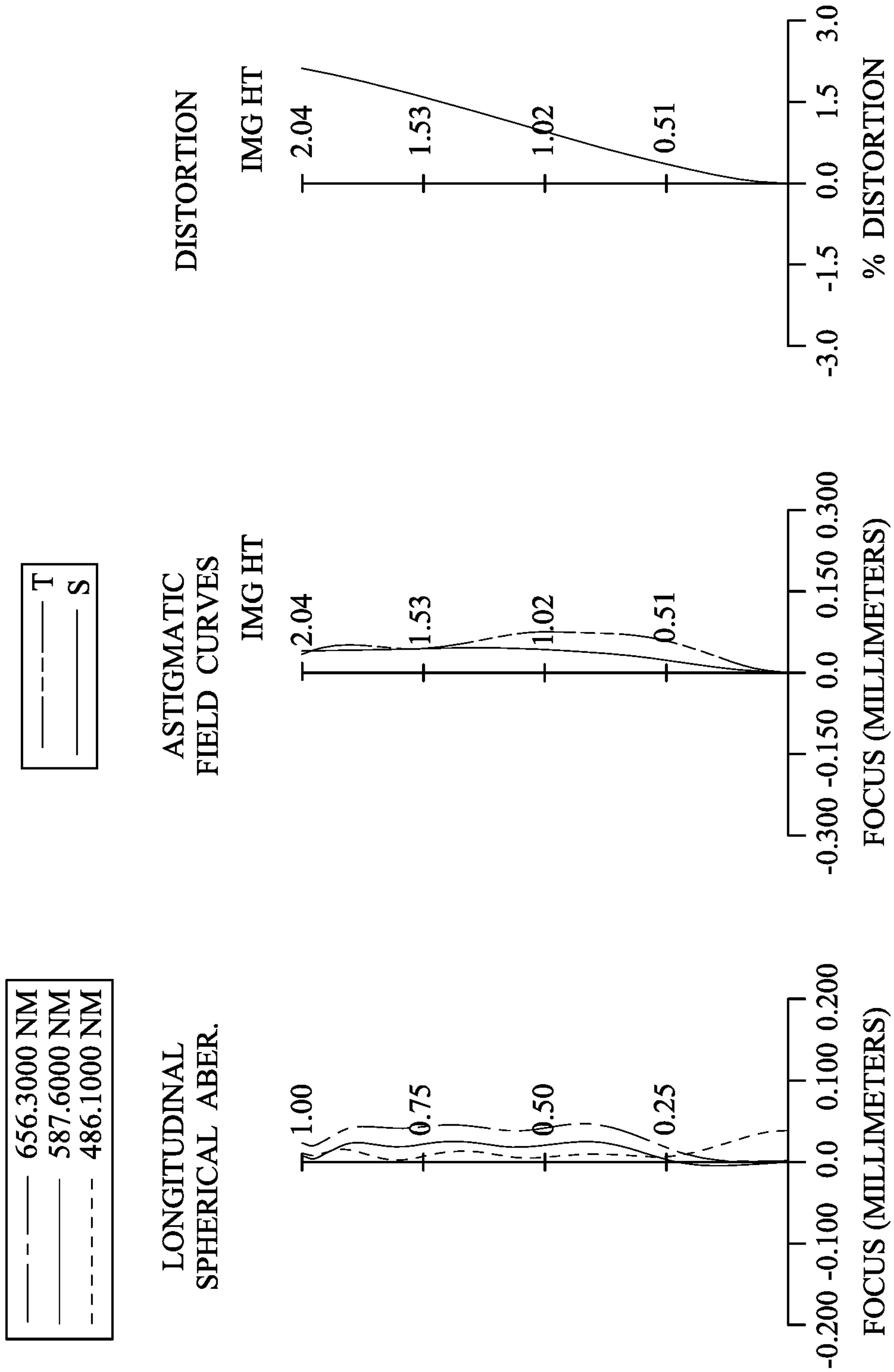

FIG. 12G shows spherical aberration curves, astigmatic field curves and a distortion curve of the zoom imaging apparatus on the zoom position according to the 6th embodiment of FIG. 11G.

Figure 12H:
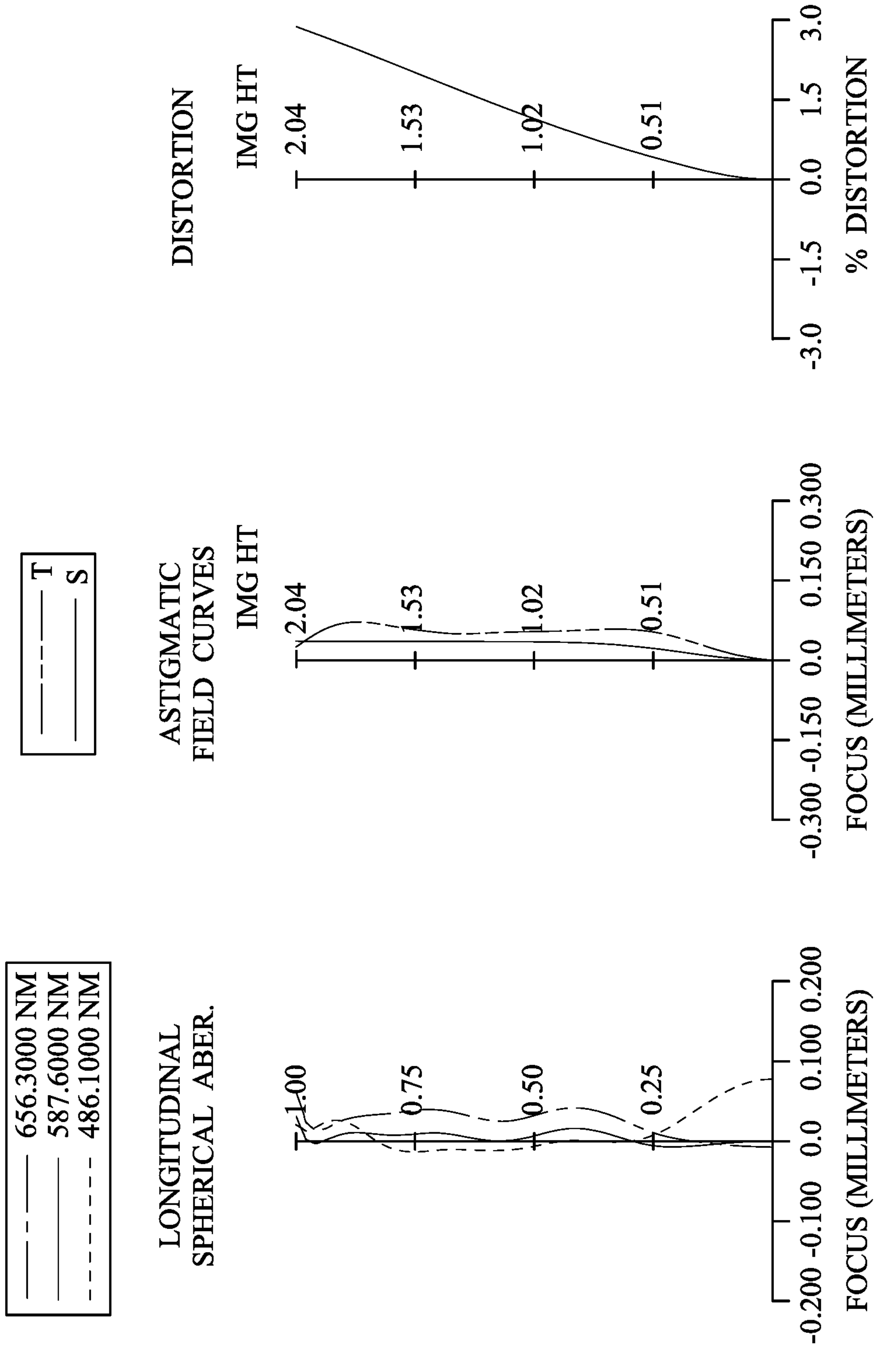

FIG. 12H shows spherical aberration curves, astigmatic field curves and a distortion curve of the zoom imaging apparatus on the zoom position according to the 6th embodiment of FIG. 11H.

Figure 13A:
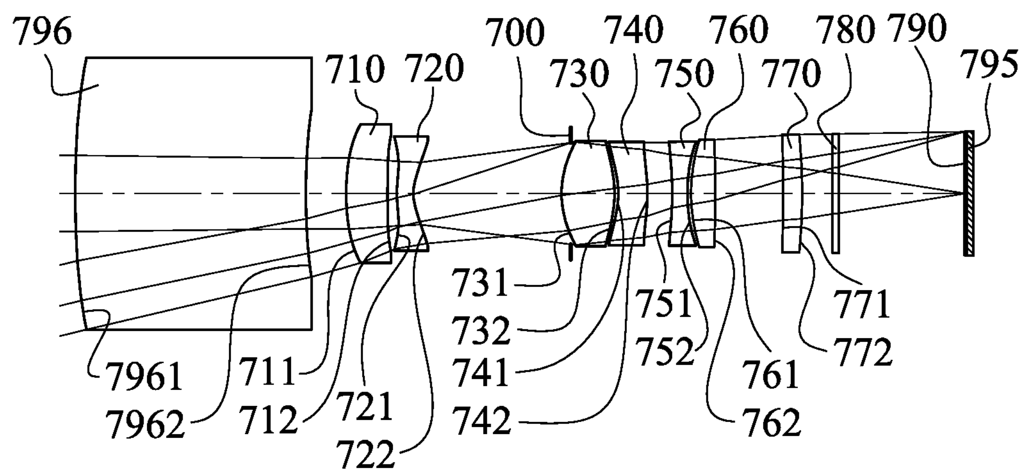

FIG. 13A is a schematic view of a zoom imaging apparatus on one zoom position according to the 7th embodiment of the present disclosure.

Figure 13B:
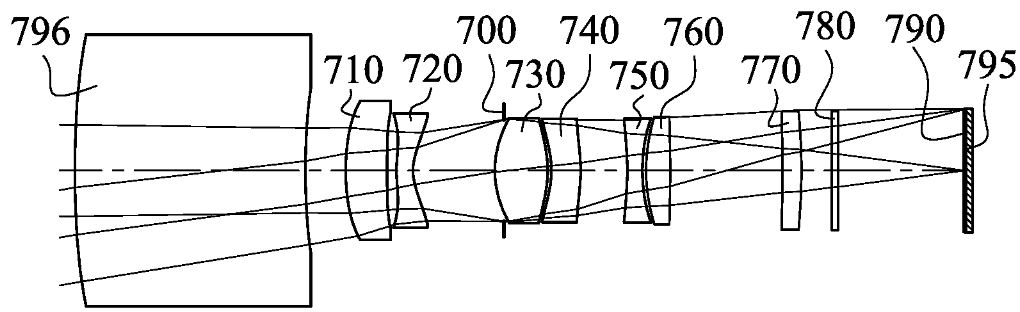

FIG. 13B is a schematic view of the zoom imaging apparatus on another zoom position according to the 7th embodiment of the present disclosure.

Figure 13C:
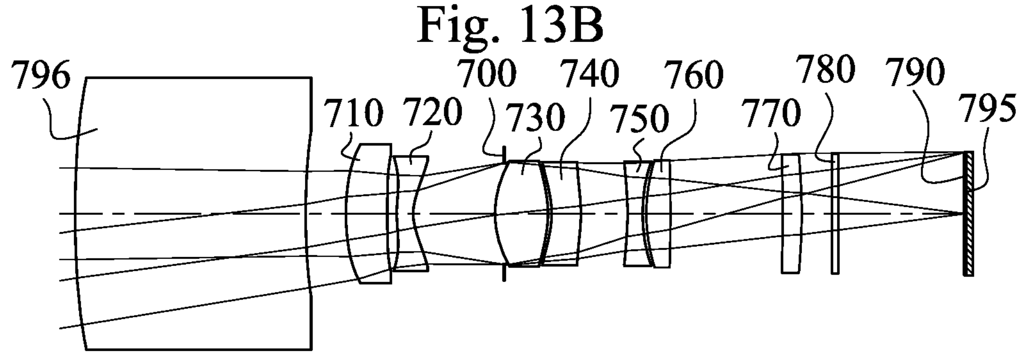

FIG. 13C is a schematic view of the zoom imaging apparatus on another zoom position according to the 7th embodiment of the present disclosure.

Figure 13D:
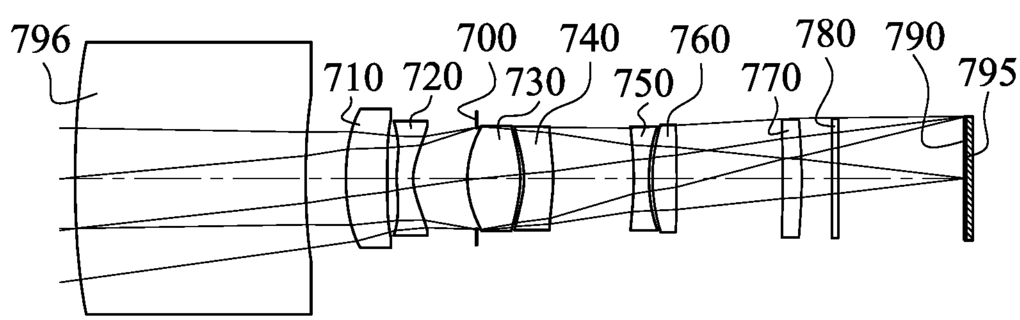

FIG. 13D is a schematic view of the zoom imaging apparatus on another zoom position according to the 7th embodiment of the present disclosure.

Figure 13E:
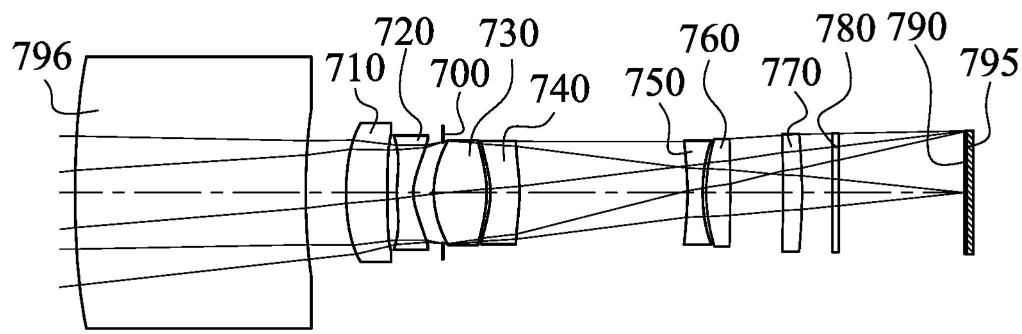

FIG. 13E is a schematic view of the zoom imaging apparatus on another zoom position according to the 7th embodiment of the present disclosure.

Figure 13F:
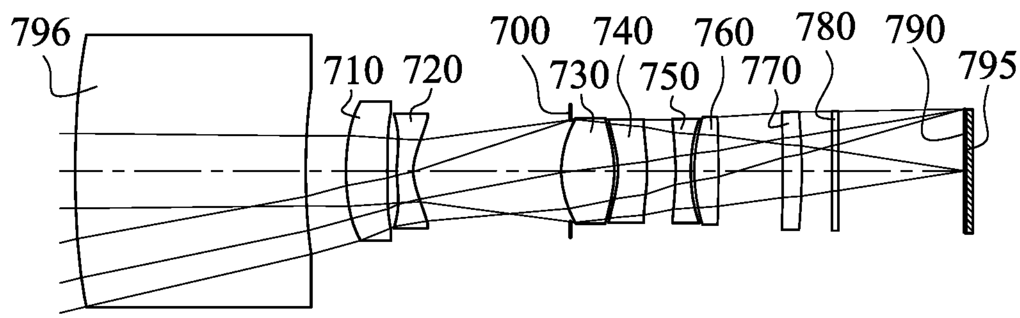

FIG. 13F is a schematic view of the zoom imaging apparatus on another zoom position according to the 7th embodiment of the present disclosure.

Figure 13G:
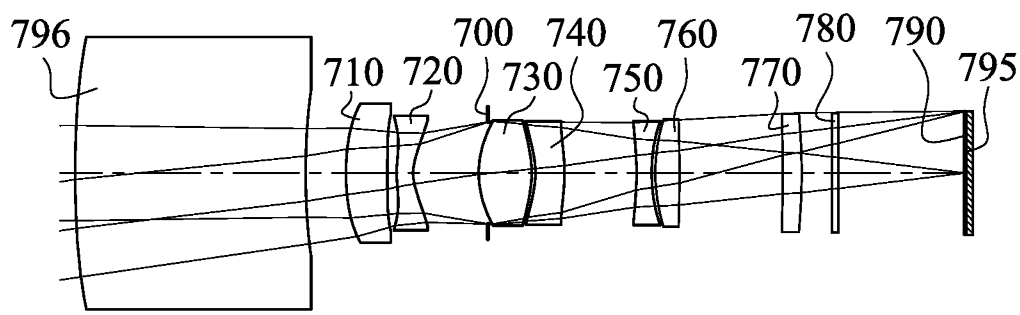

FIG. 13G is a schematic view of the zoom imaging apparatus on another zoom position according to the 7th embodiment of the present disclosure.

Figure 13H:
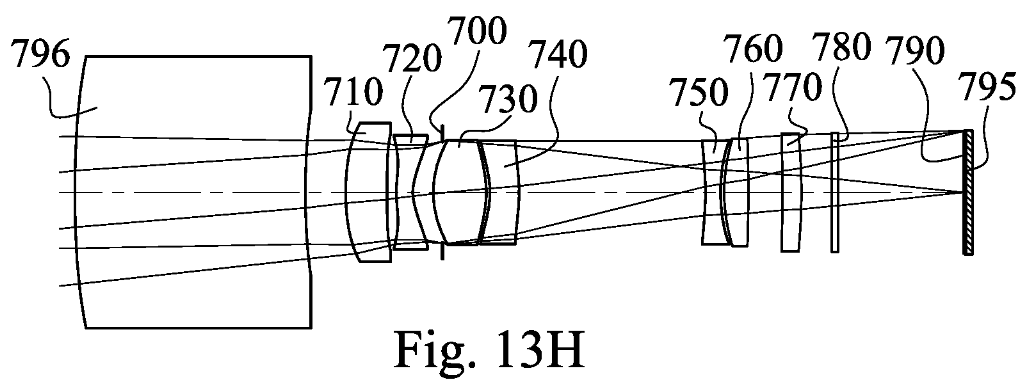

FIG. 13H is a schematic view of the zoom imaging apparatus on another zoom position according to the 7th embodiment of the present disclosure.

Figure 14A:
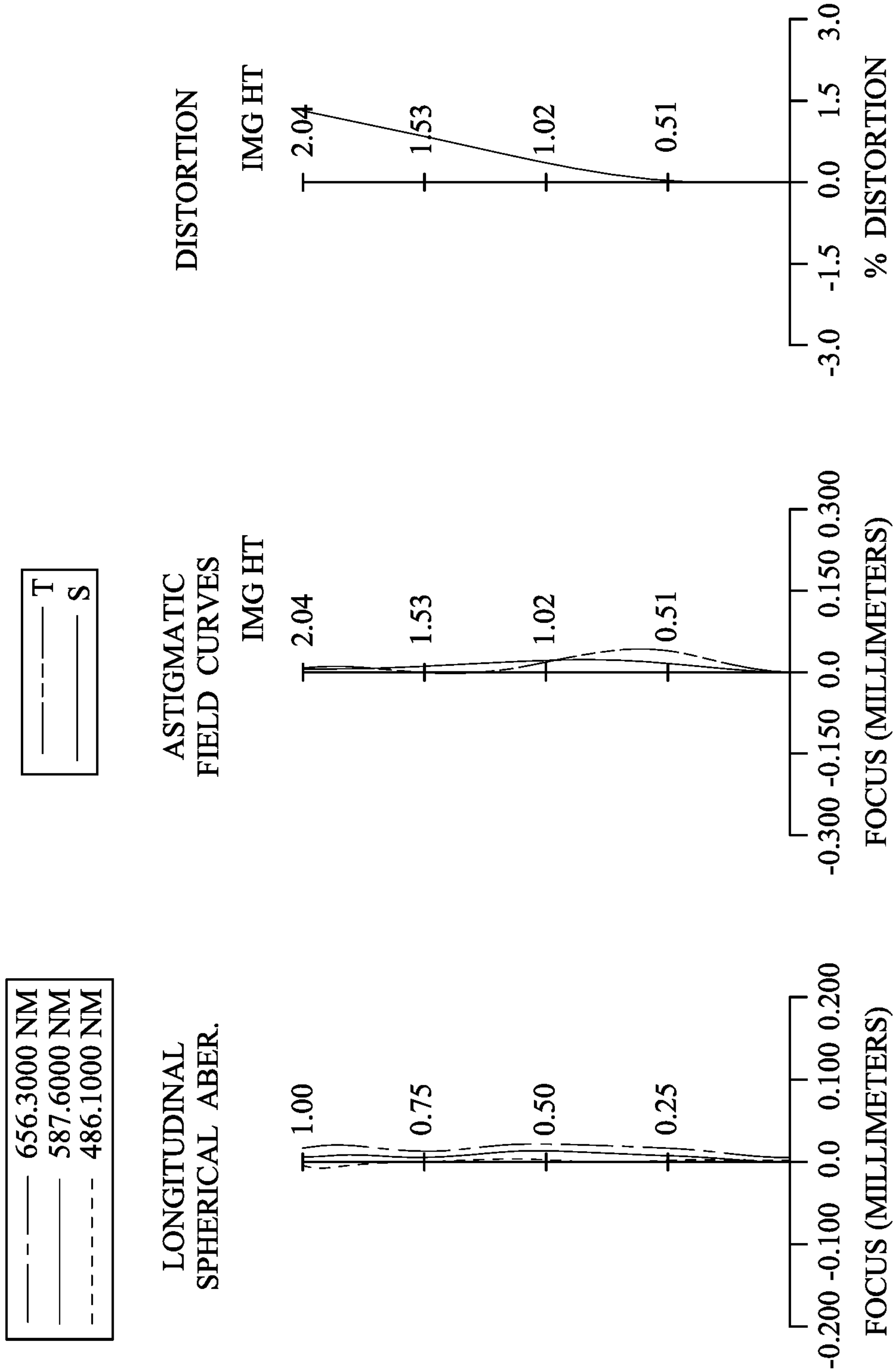

FIG. 14A shows spherical aberration curves, astigmatic field curves and a distortion curve of the zoom imaging apparatus on the zoom position according to the 7th embodiment of FIG. 13A.

Figure 14B:
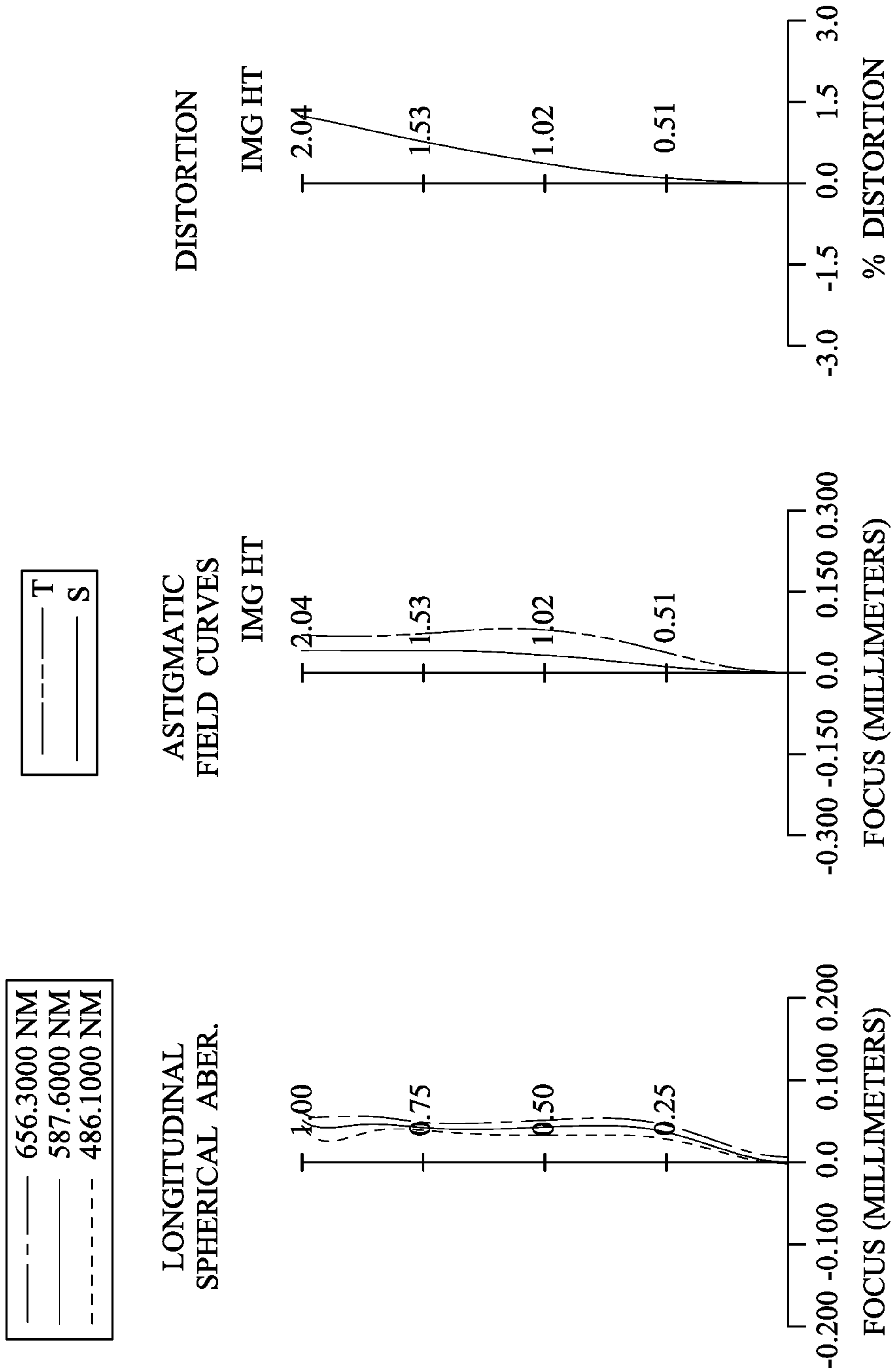

FIG. 14B shows spherical aberration curves, astigmatic field curves and a distortion curve of the zoom imaging apparatus on the zoom position according to the 7th embodiment of FIG. 13B.

Figure 14C:
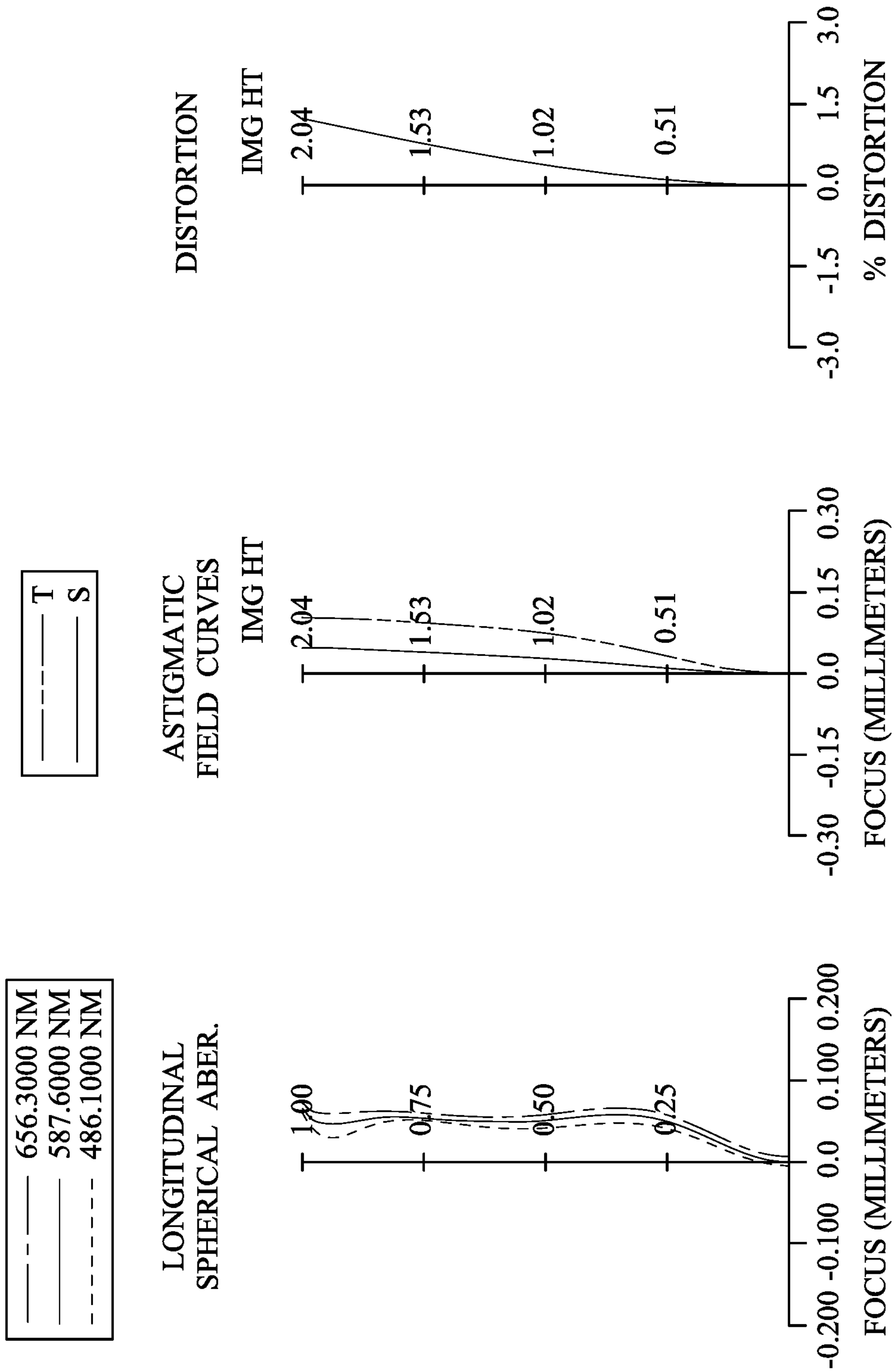

FIG. 14C shows spherical aberration curves, astigmatic field curves and a distortion curve of the zoom imaging apparatus on the zoom position according to the 7th embodiment of FIG. 13C.

Figure 14D:
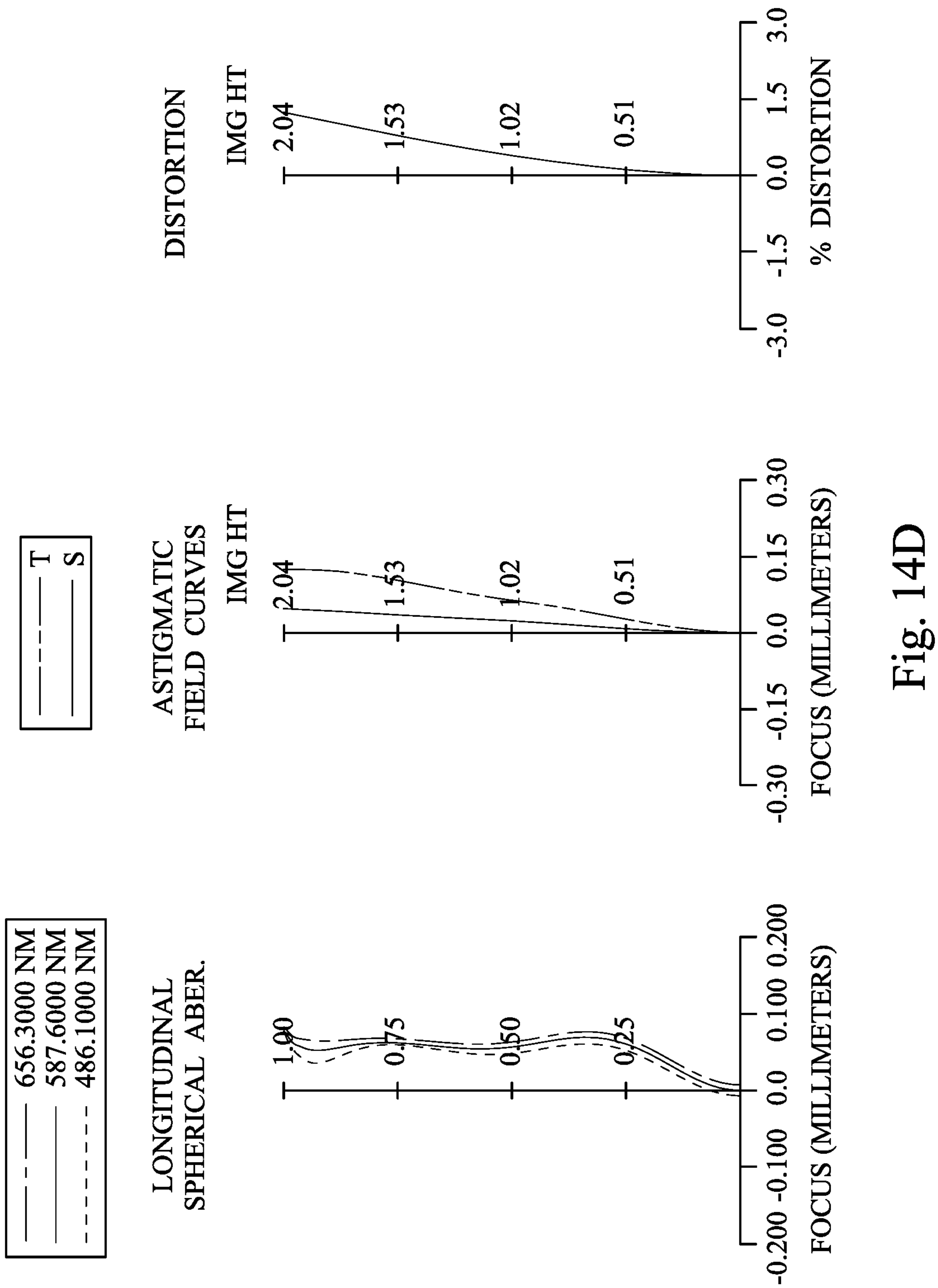

FIG. 14D shows spherical aberration curves, astigmatic field curves and a distortion curve of the zoom imaging apparatus on the zoom position according to the 7th embodiment of FIG. 13D.

Figure 14E:
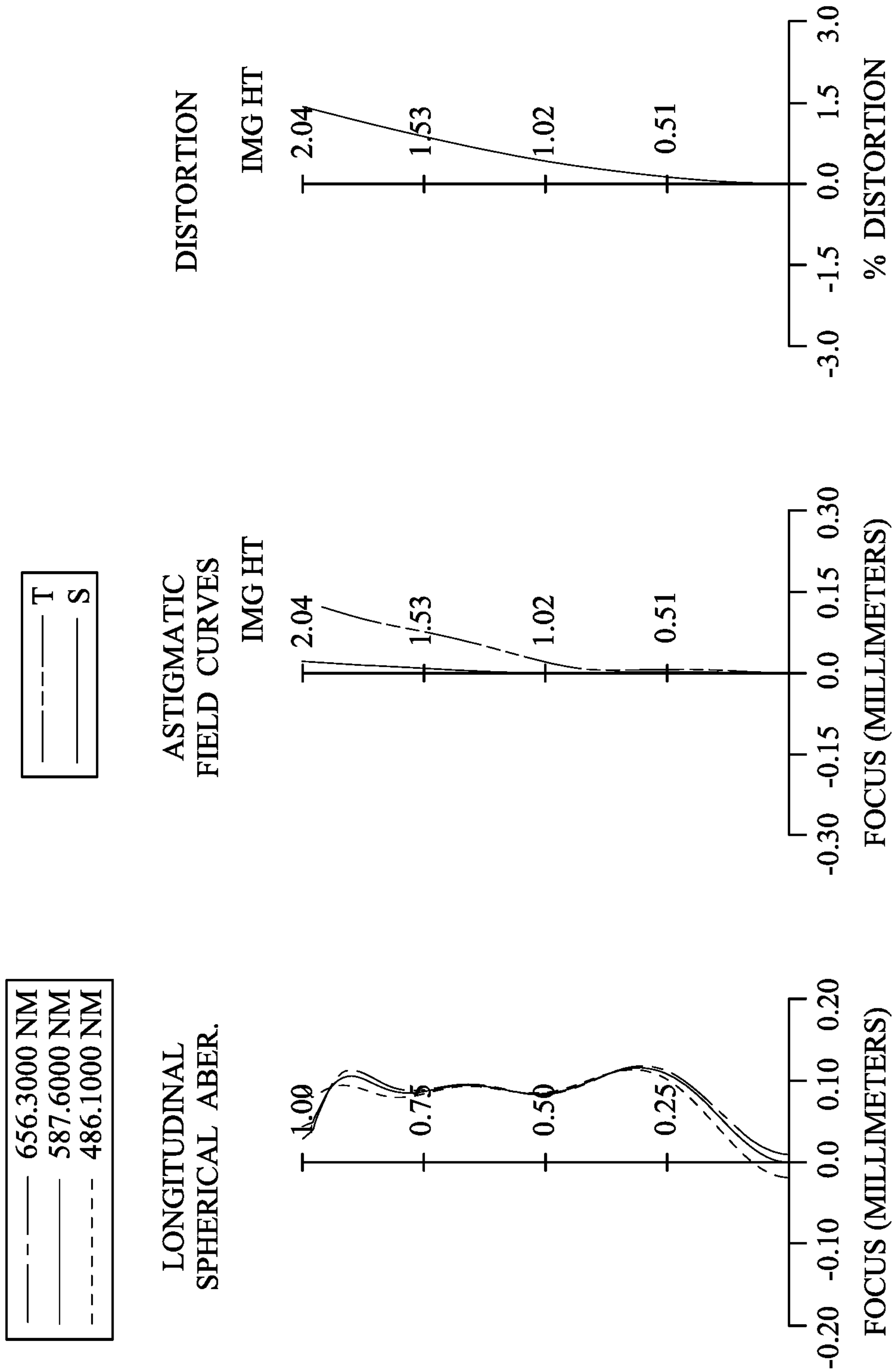

FIG. 14E shows spherical aberration curves, astigmatic field curves and a distortion curve of the zoom imaging apparatus on the zoom position according to the 7th embodiment of FIG. 13E.

Figure 14F:
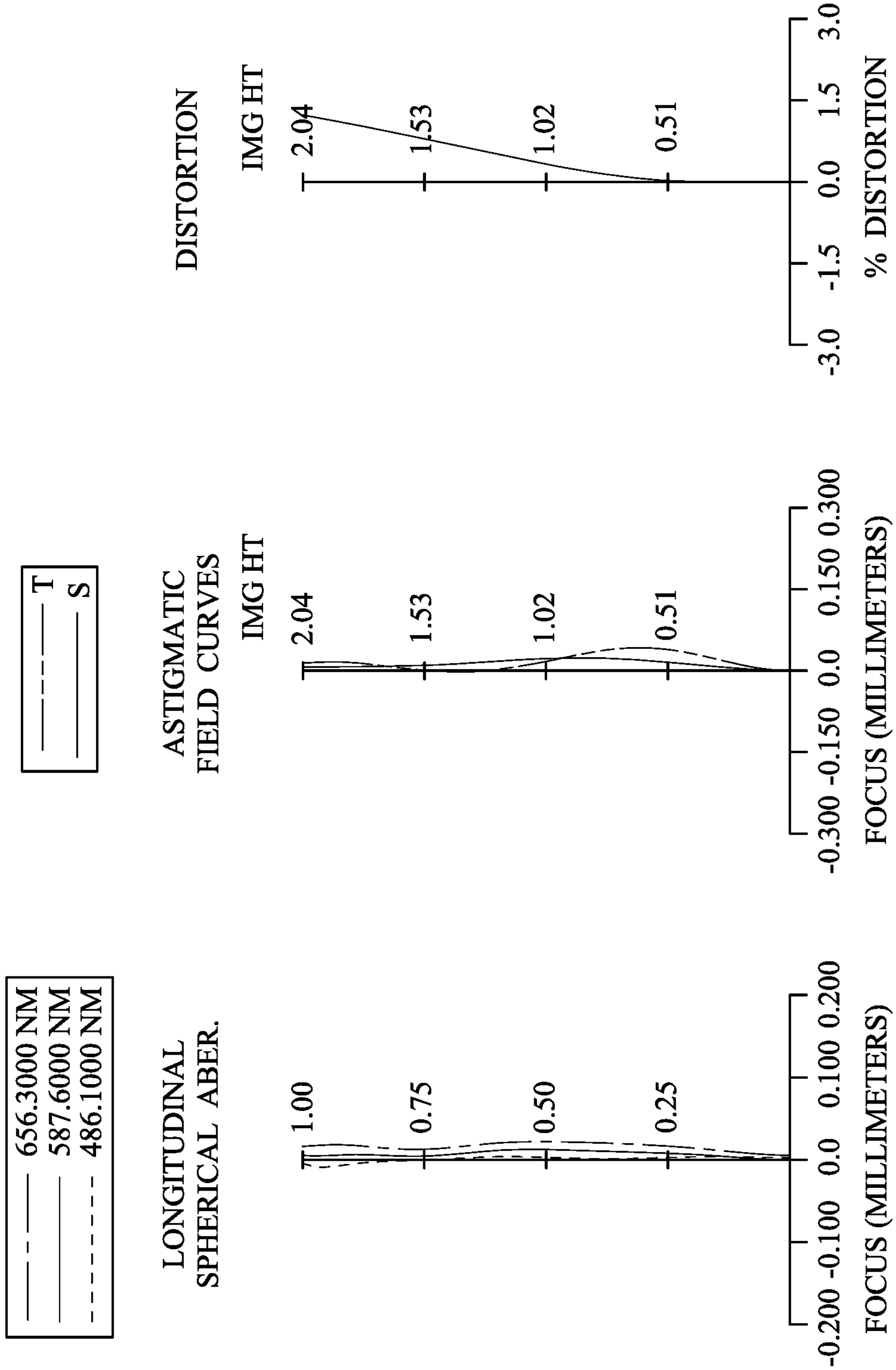

FIG. 14F shows spherical aberration curves, astigmatic field curves and a distortion curve of the zoom imaging apparatus on the zoom position according to the 7th embodiment of FIG. 13F.

Figure 14G:
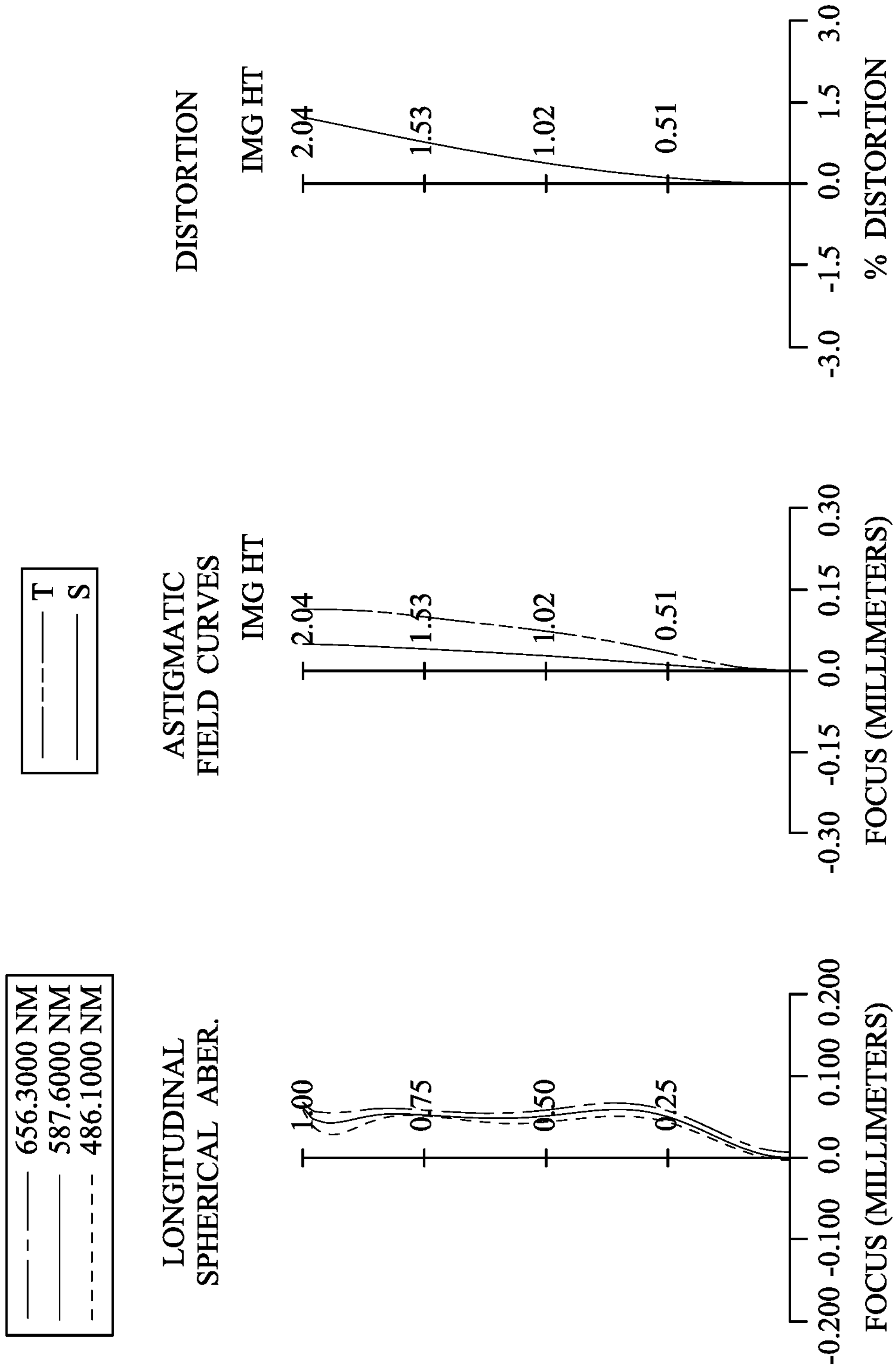

FIG. 14G shows spherical aberration curves, astigmatic field curves and a distortion curve of the zoom imaging apparatus on the zoom position according to the 7th embodiment of FIG. 13G.

Figure 14H:
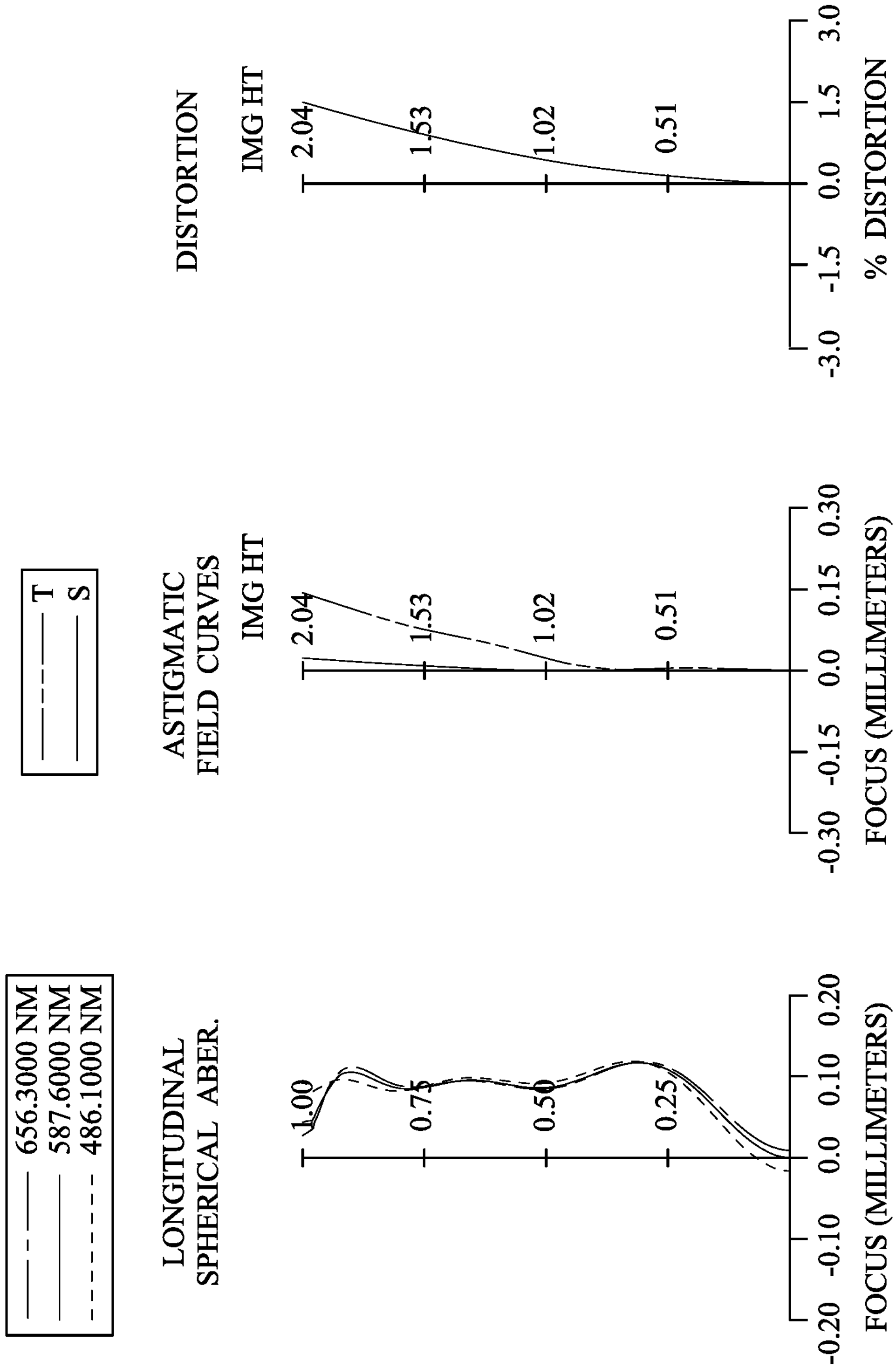

FIG. 14H shows spherical aberration curves, astigmatic field curves and a distortion curve of the zoom imaging apparatus on the zoom position according to the 7th embodiment of FIG. 13H.

Figure 15:
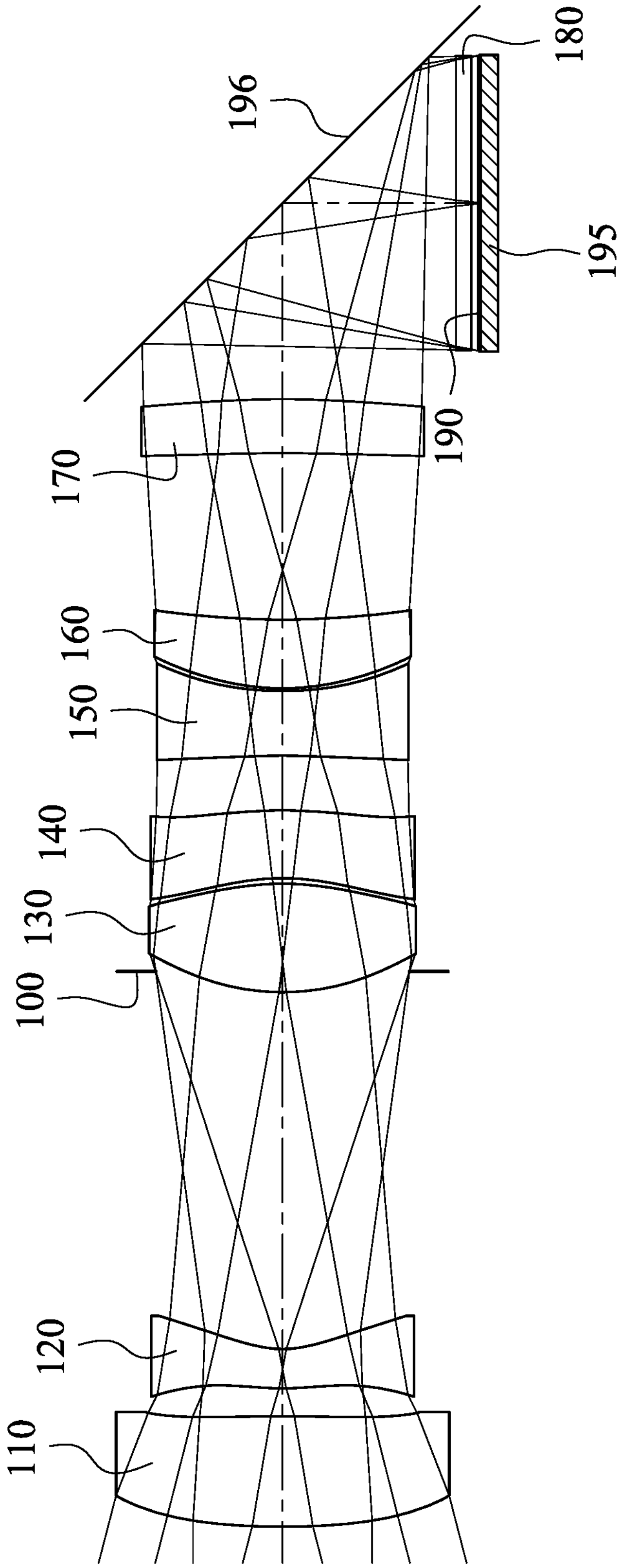

FIG. 15 shows a schematic view of the zoom imaging apparatus including a reflective element according to the 1st embodiment of the present disclosure.

Figure 16:
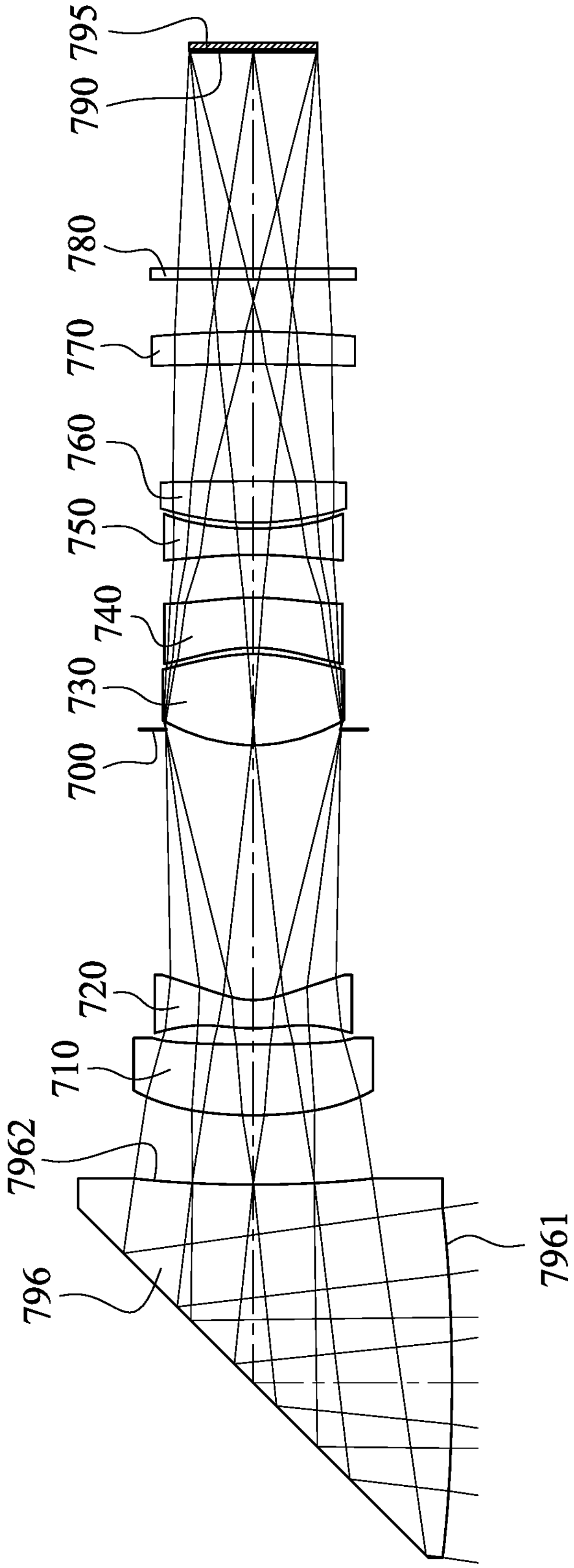

FIG. 16 shows a schematic view of the zoom imaging apparatus with another reflective element according to the 7th embodiment of the present disclosure.

Figure 17:
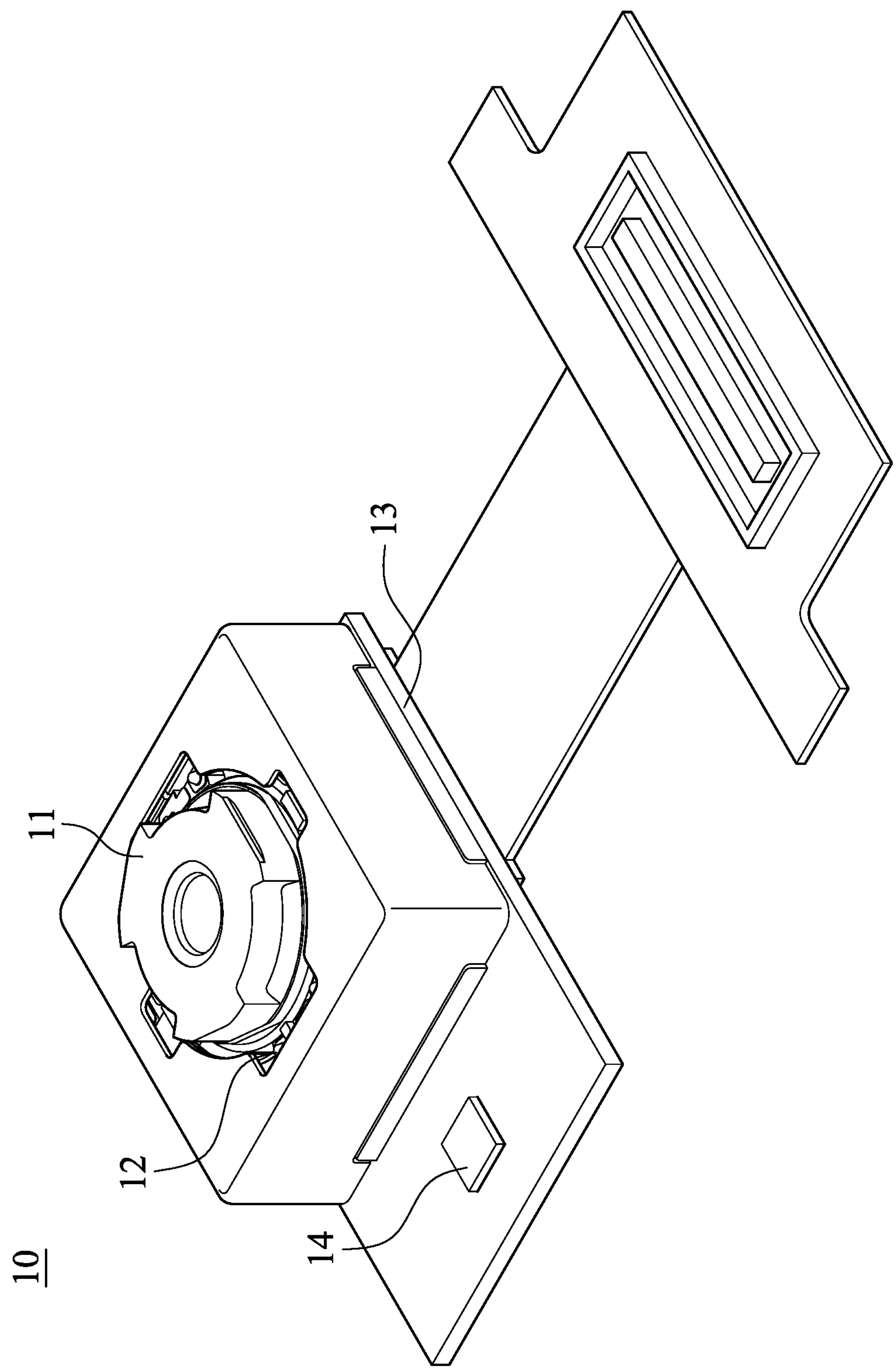

FIG. 17 is a three-dimensional schematic view of a zoom imaging apparatus according to the 8th embodiment of the present disclosure.

Figure 18A:
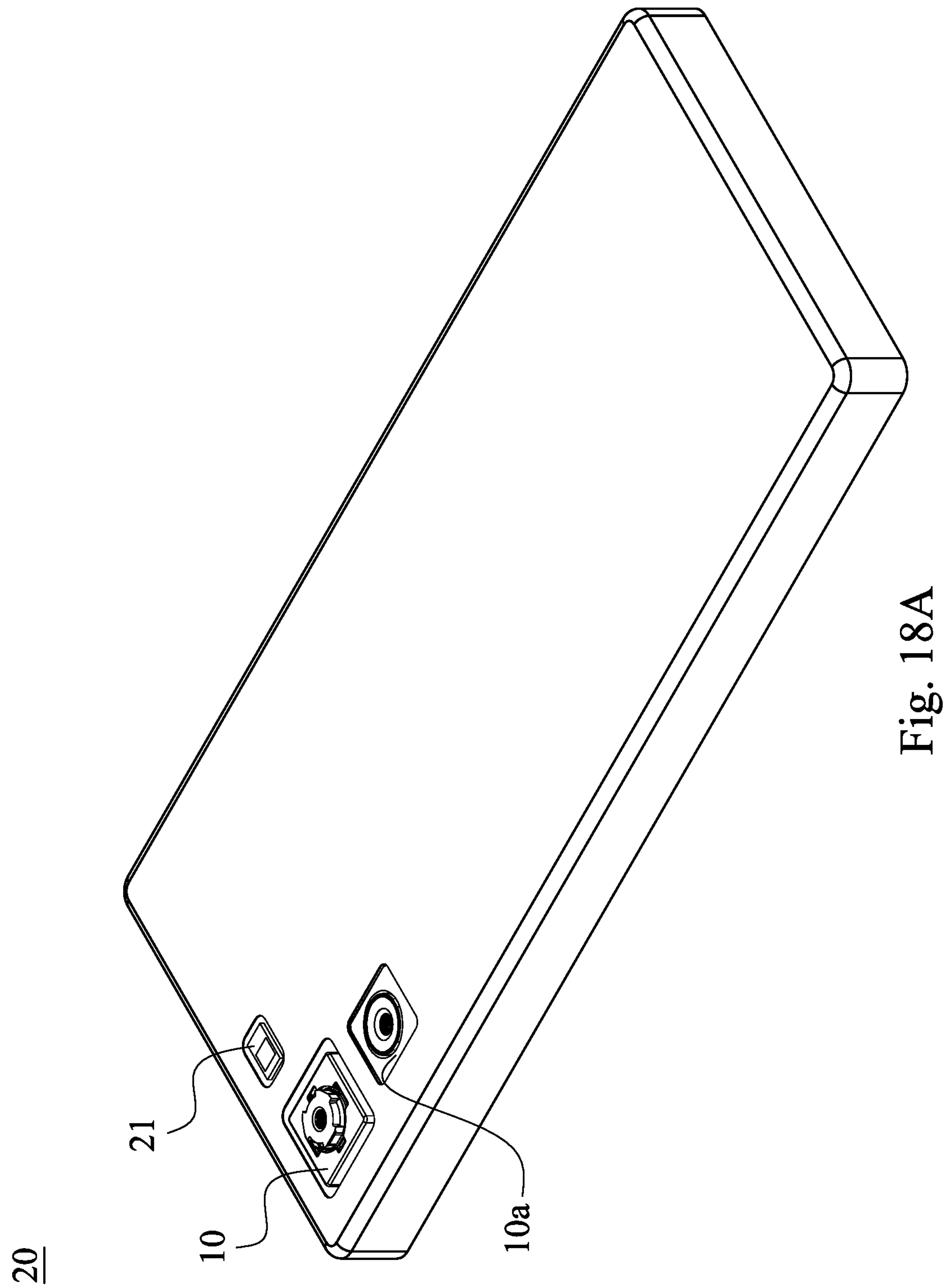

FIG. 18A is a schematic view of one side of an electronic device according to the 9th embodiment of the present disclosure.

Figure 18B:
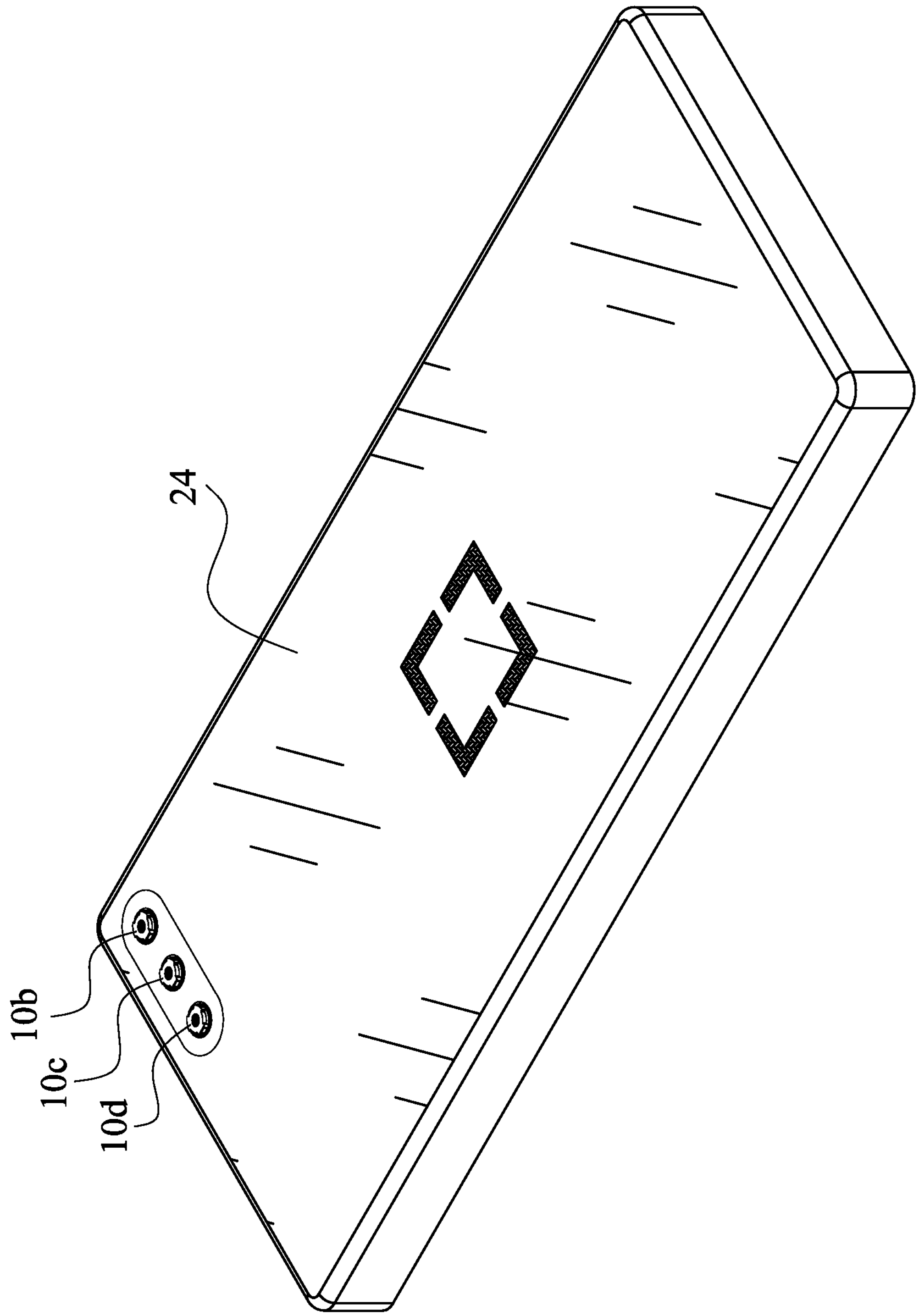

FIG. 18B is a schematic view of another side of the electronic device of FIG. 18A.

Figure 18C:
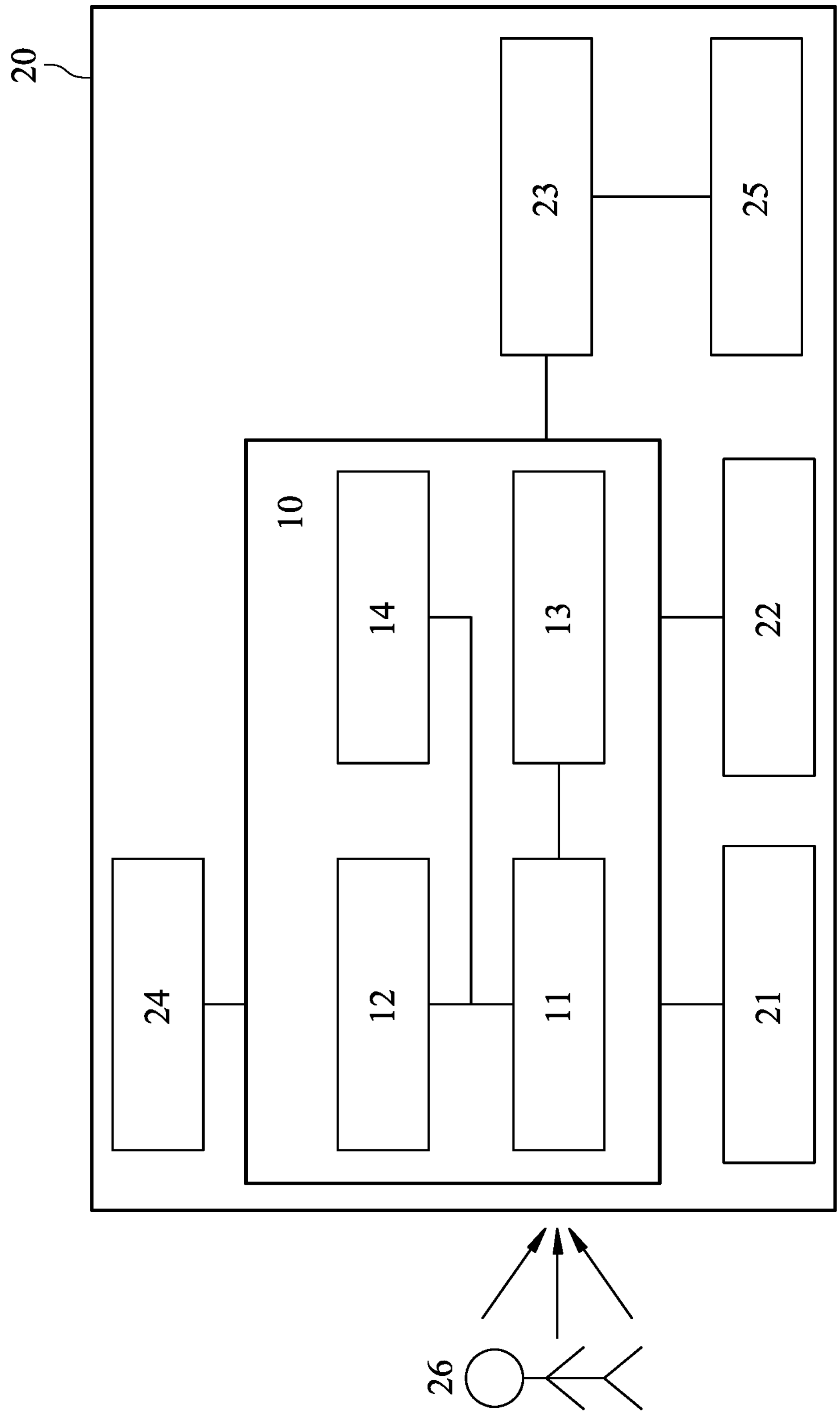

FIG. 18C is a system schematic view of the electronic device of FIG. 18A.

Figure 19:
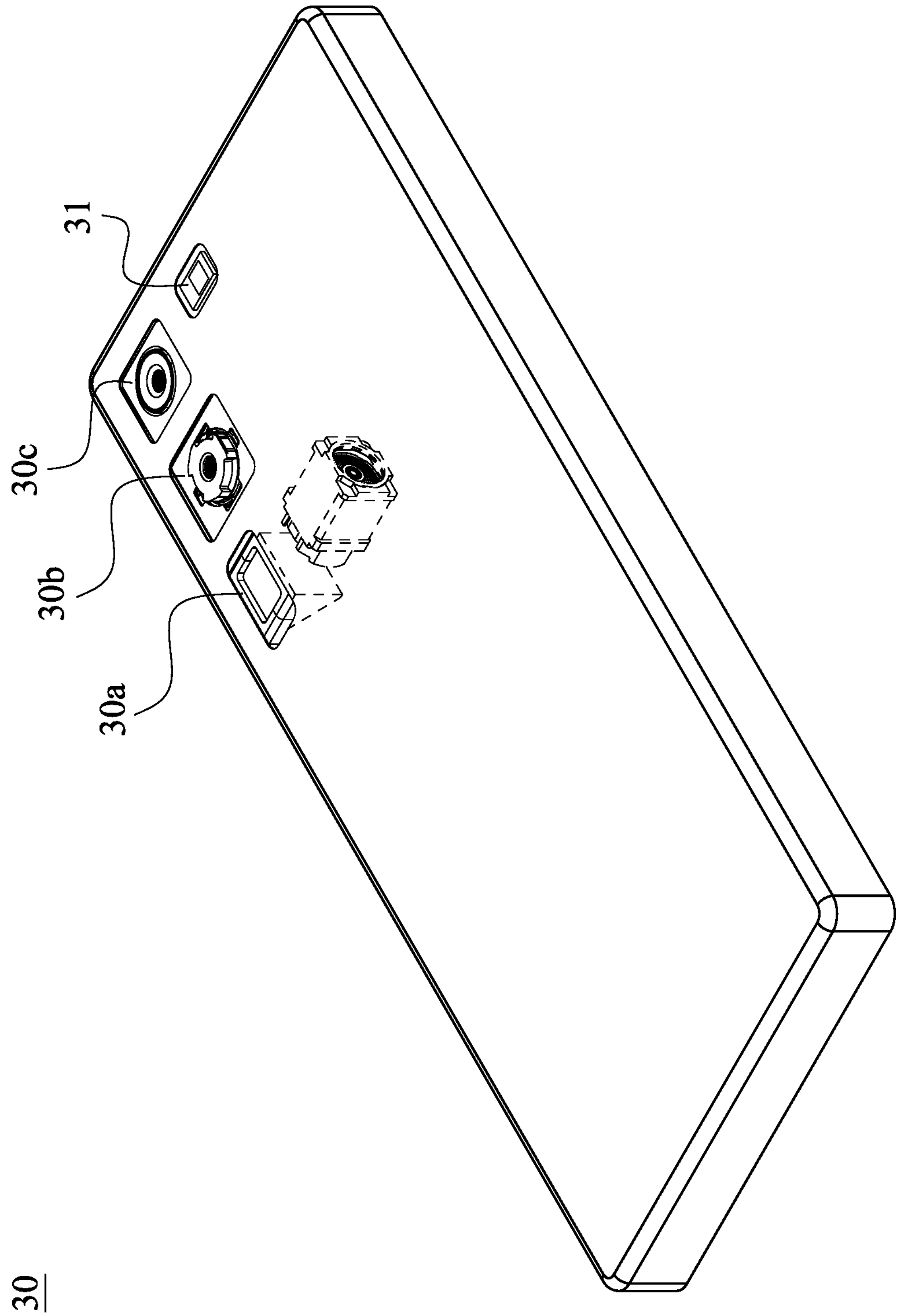

FIG. 19 is a schematic view of one side of an electronic device according to the 10th embodiment of the present disclosure.

Figure 20:
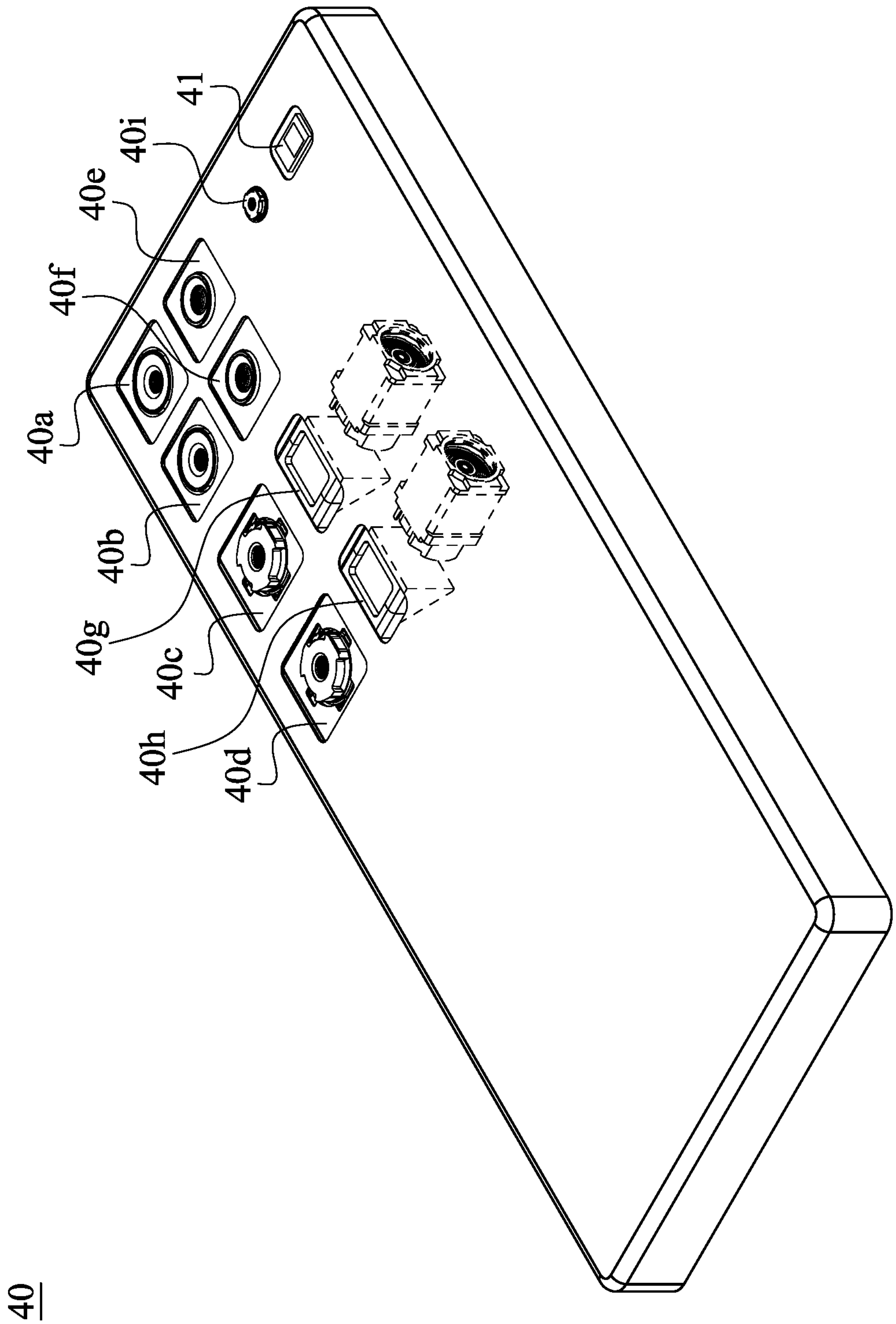

FIG. 20 is a schematic view of one side of an electronic device according to the 11th embodiment of the present disclosure.

Figure 21A:
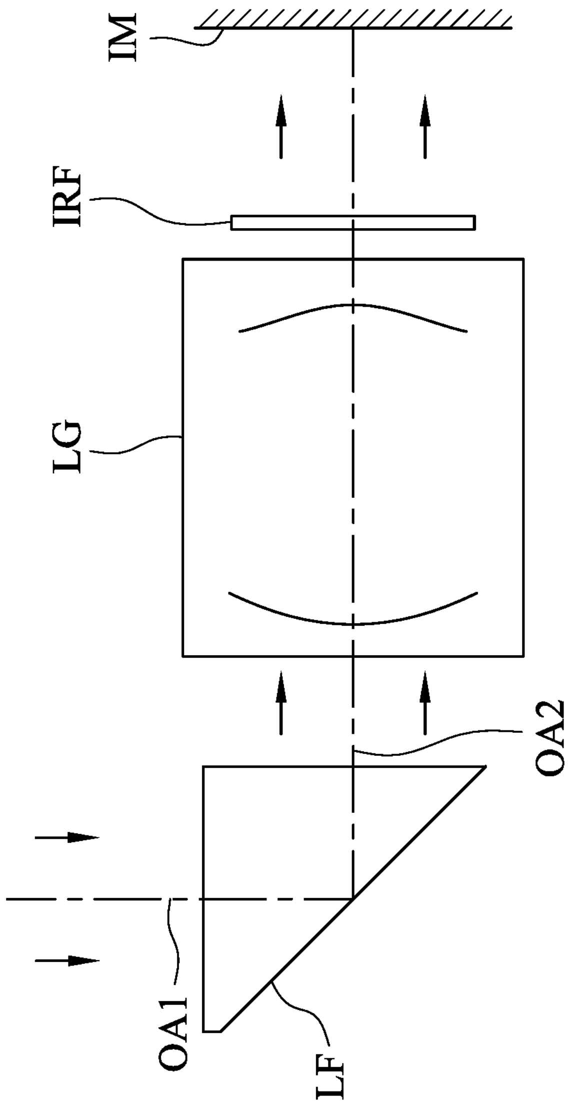

FIG. 21A is a schematic view of an arrangement of a light path folding element in the image lens assembly of the present disclosure.

Figure 21B:
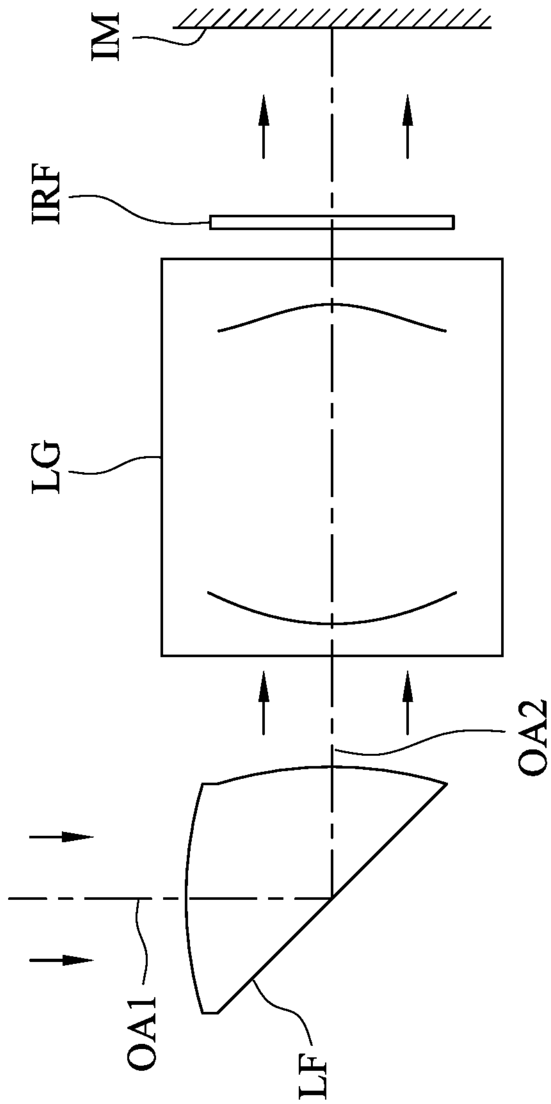

FIG. 21B is a schematic view of another arrangement of the light path folding element in the image lens assembly of the present disclosure.

Figure 21C:
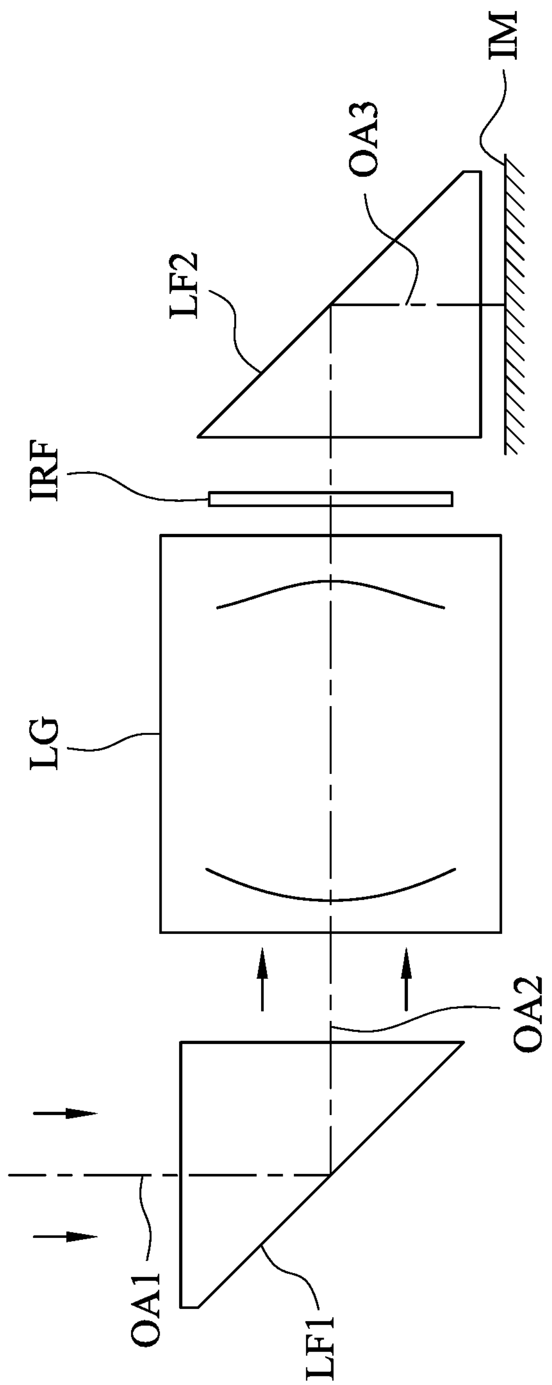

FIG. 21C is a schematic view of an arrangement of two light path folding elements in the image lens assembly of the present disclosure.

Figure 21D:
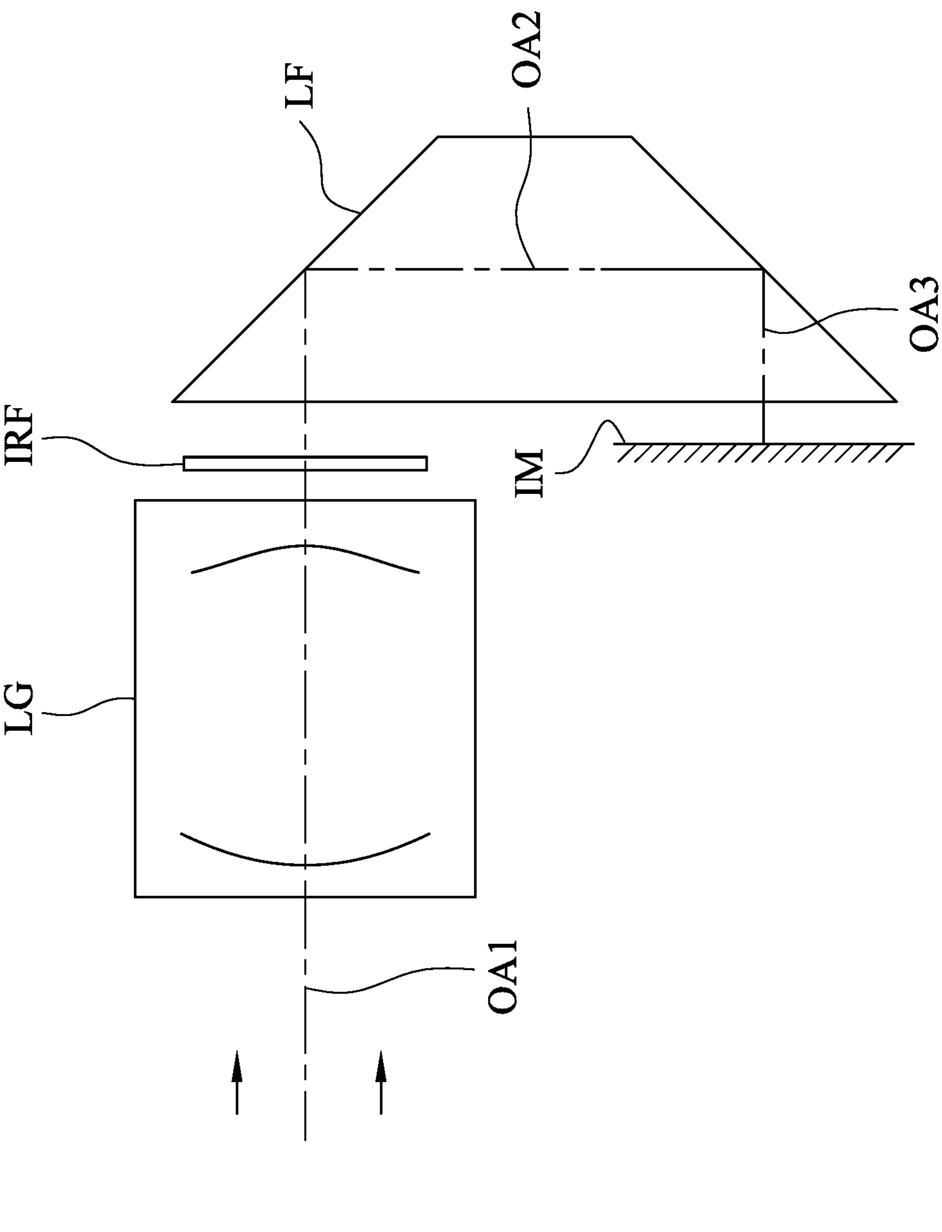

FIG. 21D is a schematic view of another arrangement of a light path folding element in the image lens assembly of the present disclosure.

DETAILED DESCRIPTION

The present disclosure provides an image lens assembly including, in order from an object side to an image side along an optical path, a first lens group, a second lens group, a third lens group and a fourth lens group. When the image lens assembly is focusing or zooming, a relative position between the first lens group and an image surface is fixed, a relative position between the fourth lens group and the image surface is fixed, and the second lens group and the third lens group move along an optical axis. Therefore, the movable image lens assembly can achieve optical zoom in a smaller field of view, and also provides a larger zoom range for electronic devices.

The first lens group includes a first lens element and a second lens element. The second lens group includes at least one lens element, which can include a third lens element and a fourth lens element. The third lens group includes at least one lens element, which can include a fifth lens element and a sixth lens element. The fourth lens group includes a seventh lens element. A total number of lens elements in the image lens assembly is seven, and there is an air gap between each of adjacent lens elements of the seven lens elements. Therefore, it is favorable for increasing the assembling yield rate of the image lens assembly by avoiding the assembling interference among the lens elements.

The first lens element has positive refractive power, so that it is favorable for reducing the total track length of the image lens assembly so as to achieve compactness. The first lens element can have an object-side surface being convex in a paraxial region thereof, so as to enhance the refractive power of the first lens element.

The second lens element has negative refractive power, so as to balance aberrations generated from the first lens element. The second lens element has an object-side surface being convex in a paraxial region thereof, so as to avoid excessive aberration corrections by adjusting the direction of optical path.

The seventh lens element can have positive refractive power, so that it is favorable for adjusting the direction of light path and decreasing the incident angle on the image surface so as to enhance the response efficiency of the image sensor. The seventh lens element can have an image-side surface being convex in a paraxial region thereof, so that it is favorable for reducing the total track length by adjusting the back focal length of the image lens assembly.

In the movable lens groups, each of the second lens group and the third lens group can include two lens elements, which can provide sufficient zoom, and also limit the required amount of movable lens elements, so as to reduce the load of its driving device. Moreover, the two lens elements of the second lens group can include a lens element with positive refractive power and a lens element with negative refractive power. The two lens elements of the third lens group can include a lens element with positive refractive power and a lens element with negative refractive power. Therefore, it is favorable for controlling aberrations in the middle section of the image lens assembly.

At least one lens element of the image lens assembly includes at least one inflection point in an off-axis region thereof. Therefore, it is favorable for controlling the variation of lens surface, reducing the aberration generation and decreasing the size thereof.

At least four lens elements of the image lens assembly are made of plastic material. Therefore, it is favorable for decreasing the manufacturing cost.

At least one of the lens elements of the image lens assembly can include at least one critical point in an off-axis region thereof. Therefore, it is favorable for improving the image quality in the peripheral region of the image. Further, the object-side surface of the second lens element can include at least one concave critical point in an off-axis region thereof.

At least one of the lens elements of the image lens assembly can be made of glass material. Therefore, it is favorable for ensuring consistent image quality by decreasing temperature effects in various environments.

When a maximum field of view in a zoom range of the image lens assembly is FOVmax, and a minimum field of view in the zoom range of the image lens assembly is FOVmin, the following condition is satisfied: $1.25<FOVmax/FOVmin<6.0$. Therefore, it is favorable for providing a wider zoom range. Further, the following condition can be satisfied: $1.25<FOVmax/FOVmin<5.0$. Moreover, the following condition can be satisfied: $1.5<FOVmax/FOVmin<5.0$. Furthermore, the following condition can be satisfied: $1.5<FOVmax/FOVmin<4.0$.

When the maximum field of view in a zoom range of the image lens assembly is FOVmax, the following condition is satisfied: FOVmax<50 degrees. Therefore, it is favorable for balancing the zoom efficiency and the image quality.

When a focal length of the first lens element is f1, and a focal length of the second lens element is f2, the following condition is satisfied: $1.5<f1/|f2|$. Therefore, it is favorable for avoiding overly large refractive power of the first lens element, which would restrict the angle of the incident light of the image lens assembly and unable to provide a wide zoom with a small field of view. Further, the following condition can be satisfied: $2.0<f1/|f2|$. Moreover, the following condition can be satisfied: $2.5<f1/|f2|$.

In the image lens assembly, when an Abbe number of one of the lens elements is Vi, and a refractive index of the lens element is Ni, at least two of the lens elements of the image lens assembly satisfy the following condition: $6.0<Vi/Ni<12.5$, wherein i=1, 2, 3, 4, 5, 6, 7. Therefore, it is favorable for correcting chromatic and other types of aberrations of the image lens assembly. Further, the image lens assembly can arrange at least three or four lens elements so as to further adjust aberrations of the image lens assembly.

When a total number of the lens elements having Abbe numbers less than 40 is V40, the following condition is satisfied: 4 V40. Therefore, it is favorable for enhancing the correction of chromatic aberration of the image lens assembly.

When a sum of central thicknesses of all lens elements of the image lens assembly is ΣCT, and a sum of all axial distances between adjacent lens elements of the image lens assembly is EAT, the following condition is satisfied: $0.65<\Sigma CT/\Sigma AT<2.0$. Therefore, sufficient space for functions, such as zooming and focusing for the movable lens group can be provided.

When an axial distance from the object-side surface of the first lens element to an image-side surface of the second lens element is Dr1r4, and a difference value of an axial distance between the second lens element and the third lens element in long shot mode with maximum field of view to an axial distance between the second lens element and the third lens element in long shot mode with minimum field of view is ΔT23, the following condition is satisfied: $Dr1r4/\Delta T23<1.5$. Therefore, it is favorable for enlarging magnification by ensuring sufficient moving space for third lens element. Further, the following condition can be satisfied: $0.25<Dr1r4/\Delta T23<1.0$.

When a maximum effective diameter of the object-side surface of the first lens element in the zoom range is Y1R1, and a maximum image height of the image lens assembly is ImgH, the following condition is satisfied: $Y1R1/ImgH<1.5$. Therefore, it is favorable for avoiding overly large size of the first lens element so as to utilize the image lens assembly in compact electronic device.

When an Abbe number of the first lens element is V1, and an Abbe number of the second lens element is V2, the following condition is satisfied: $V1+V2<60$. Therefore, it is favorable for correcting chromatic aberration on the object side of the image lens assembly.

When a total number of the lens elements with positive refractive power having Abbe numbers less than 30 is Vp30, the following condition is satisfied: $2\leq Vp30$. Therefore, it is favorable for further correcting chromatic aberration of the image lens assembly.

When a difference value of an axial distance between the image-side surface of the seventh lens element and the image surface in long shot mode with a maximum field of view to an axial distance between the image-side surface of the seventh lens element and the image surface in long shot mode with a minimum field of view is ΔBL, and the sum of central thicknesses of all lens elements of the image lens assembly is ΣCT, the following condition is satisfied: $|\Delta BL|/\Sigma CT<0.01$. Therefore, it is favorable for avoid additional driving mechanisms for movable lens elements by fixing the position of the seventh lens element so as to reduce manufacturing complexity.

When a difference value of an axial distance between the object-side surface of the first lens element and the image-side surface of the seventh lens element in long shot mode with the maximum field of view to an axial distance between the object-side surface of the first lens element and the image-side surface of the seventh lens element in long shot mode with the minimum field of view is ΔTd, and a sum of central thicknesses of all lens elements of the image lens assembly is ΣCT, the following condition is satisfied: $|\Delta Td|/\Sigma CT<0.01$. Therefore, the required amount of driving mechanisms for the movable lens elements can be reduced by fixing the positions of the first lens element and the seventh lens element, so that the manufacturing difficulty of the image lens assembly can be reduced.

When a curvature radius of the image-side surface of the third lens element is R6, and a curvature radius of the object-side surface of the fourth lens element is R7, the following condition is satisfied: $-0.75<(R6-R7)/(R6+R7)<0.75$. Therefore, the surface shapes of two adjacent lens elements of the second lens group are more similar for allowing a simpler structural combination, so that the stability of the second lens group in motion can be enhanced.

When an axial distance between the image-side surface of the seventh lens element and the image surface is BL, and a maximum image height of the image lens assembly is ImgH, the following condition is satisfied: $BL/ImgH<3.0$. Therefore, excessive assembling sensitivity or waste of space caused by overly long back focal length can be avoided. Further, the following condition can be satisfied: $BL/ImgH<2.50$. Moreover, the following condition can be satisfied: $BL/ImgH<2.0$.

The image lens assembly can further include at least one reflective element. In detail, the reflective element can be disposed on an object-side of the first lens element along the optical path, which can have refractive power, and the surface facing towards the imaged object can be convex in a paraxial region thereof. Therefore, the total track length of the image lens assembly can be arranged with higher flexibility, and the refractive power on the object side can be strengthened, so as to lower the need for additional lens elements. Further, the reflective element can be made of plastic material.

When a glass transition temperature of a material of the reflective element is Tgp, and a refractive index of the reflective element is Np, the following condition is satisfied: $92.5<Tgp/Np<100$. Therefore, it is favorable for reducing the manufacturing difficulty of the reflective element so as to increase the yield rate.

Each of the aforementioned features of the image lens assembly can be utilized in various combinations for achieving the corresponding effects.

According to the image lens assembly of the present disclosure, the lens elements thereof can be made of glass or plastic materials. When the lens elements are made of glass materials, the distribution of the refractive power of the image lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the image lens assembly. Therefore, the total track length of the image lens assembly can also be reduced. The aspheric surfaces may be formed by a plastic injection molding method, a glass molding method or other manufacturing methods.

According to the image lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for lights in a wavelength range of 600 nm-800 nm in the image lens assembly so as to reduce extra red light or infrared lights, or the additives can have the absorption ability for lights in a wavelength range of 350 nm-450 nm in the image lens assembly so as to reduce blue light or ultraviolet lights. Therefore, additives can prevent the image from interfering by lights in a particular wavelength range. Furthermore, the additives can be homogeneously mixed with the plastic material, and the lens elements can be made by the injection molding method.

According to the image lens assembly of the present disclosure, when a surface of the lens element is aspheric, it indicates that entire optical effective region of the surface of the lens element or a part thereof is aspheric.

According to the image lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the image lens assembly of the present disclosure, if the lens element has positive refractive power or negative refractive power, or the focal length of the lens element, all can be referred to the refractive power, or the focal length, in the paraxial region of the lens element.

According to the image lens assembly of the present disclosure, a critical point is a non-axial point of the lens surface where its tangent is perpendicular to the optical axis; an inflection point is a point on a lens surface with a curvature changing from positive to negative or from negative to positive.

According to the image lens assembly of the present disclosure, the image surface thereof, based on the corresponding image sensor, can be flat or curved. In particular, the image surface can be a concave curved surface facing towards the object side. Furthermore, the image lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

According to the image lens assembly of the present disclosure, at least one element with light path folding function can be selectively disposed between the imaged object and the image surface, such as a prism or a mirror, etc. Therefore, it is favorable for providing high flexible space arrangement of the image lens assembly, so that the compactness of the electronic device would not be restricted by the optical total track length of the image lens assembly. FIG. 21A is a schematic view of an arrangement of a light path folding element LF in the image lens assembly of the present disclosure. FIG. 21B is a schematic view of another arrangement of the light path folding element LF in the image lens assembly of the present disclosure. As shown in FIGS. 21A and 21B, the image lens assembly includes, in order from an imaged object (not shown in drawings) to an image surface IM, a first optical axis OA1, the light path folding element LF, a second optical axis OA2, a lens group LG of the image lens assembly and an IR-cut filter IRF, wherein the light path folding element LF can be disposed between the imaged object and the lens group LG of the image lens assembly, wherein the difference between FIG. 21A and FIG. 21B is that in FIG. 21A, the object-side surface and the image-side surface of the light path folding element LF are both planar, in FIG. 21B, the object-side surface and the image-side surface of the light path folding element LF are both convex. Moreover, FIG. 21C is a schematic view of an arrangement of two light path folding elements LF1, LF2 in the image lens assembly of the present disclosure. As shown in FIG. 21C, the image lens assembly includes, in order from an imaged object (not shown in drawings) to an image surface IM, a first optical axis OM, the light path folding element LF1, a second optical axis OA2, a lens group LG of the image lens assembly, an IR-cut filter IRF, the light path folding element LF2 and a third optical axis OA3, wherein the light path folding element LF1 is disposed between the imaged object and a lens group LG of the image lens assembly, and the light path folding element LF2 is disposed between the IR-cut filter IRF and the image surface IM. The image lens assembly can also be selectively disposed with three or more light path folding element, the type, amount and location of the light path folding element will not be limited to the present disclosure. Moreover, FIG. 21D is a schematic view of another arrangement of a light path folding element LF in the image lens assembly of the present disclosure. In FIG. 21D, the image lens assembly includes, in order from an imaged object (not shown in drawings) to an image surface IM, a first optical axis OA1, a lens group LG of the image lens assembly, an IR-cut filter IRF, the light path folding element LF, a second optical axis OA2 and a third optical axis, wherein the light path folding element LF can be disposed between the IR-cut filter IRF and the image surface IM, the light path folding element LF can fold the incident light from a direction of the first optical axis OA1 into a direction of the second optical axis OA2, then fold into a direction of the third optical axis OA3 to the image surface IM.

Furthermore, according to the image lens assembly of the present disclosure, the image lens assembly can include at least one stop, such as an aperture stop, a glare stop or a field stop, for eliminating stray light and thereby improving image resolution thereof.

According to the image lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the image lens assembly and the image surface can be obtained, and thereby obtains a telecentric effect and improves the image-sensing efficiency of the image sensor, such as CCD or CMOS. The middle stop is favorable for enlarging the field of view of the image lens assembly and thereby provides a wider field of view for the same.

According to the image lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the image lens assembly according to the present disclosure, so as to moderate the image quality by changing f-number such as changing the depth of field or the exposure speed.

According to the image lens assembly of the present disclosure, the image lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, a zoom imaging apparatus including the aforementioned image lens assembly and an image sensor is provided, wherein the image sensor is disposed on the image surface of the image lens assembly. By arranging the image lens assembly with a small field of view and movable lens groups for achieving optical zooming with a small field of view, the zooming range of the zoom imaging apparatus can be expanded so as to further enhance the accuracy of focusing and also compensate the variations, such as near side focusing, temperature effects, etc. Moreover, the zoom imaging apparatus can further include a barrel member, a holder member or a combination thereof. Further, the driving method for moving lens groups can use screw, Voice Coil Motor (VCM) which can be spring type or ball type, etc., but the present disclosure will not be limited thereto.

According to the present disclosure, an electronic device including the aforementioned zoom imaging apparatus and at least one prime imaging apparatus is provided. The zoom imaging apparatus and one of the prime imaging apparatus face towards the same side, and the optical axis of the zoom imaging apparatus is perpendicular to an optical axis of the prime imaging apparatus. By arranging the image lens assembly with a small field of view and movable lens groups for achieving optical zooming with a small field of view, the zooming range of the zoom imaging apparatus can be expanded so as to further enhance the accuracy of focusing and also compensate the variations, such as near side focusing, temperature effects, etc.

When a maximum field of view of the prime imaging apparatus of the electronic device is DFOV, and the maximum field of view in the zoom range of the image lens assembly is FOVmax, the following condition is satisfied: 40 degrees<DFOV−FOVmax. Therefore, it is favorable for providing a wider zoom function. Further, the following condition can be satisfied: 60 degrees<DFOV−FOVmax.

When an average of lens refractive indices of the image lens assembly is Navg, the following condition is satisfied: Navg<1.70. Therefore, the refractive power of the lens elements can be well distributed so as to avoid overcorrecting aberrations by a single lens group or single lens element with overly large refractive power. Further, the following condition can be satisfied: Navg<1.65.

Moreover, the electronic device can further include a control unit, a display, a storage unit, a random-access memory unit (RAM) or a combination thereof.

Each of the aforementioned zoom imaging apparatus and electronic device can be combined and arranged with each feature of the aforementioned image lens assembly for achieving the corresponding effects.

1st Embodiment

FIG. 1A to FIG. 1H are schematic views of a zoom imaging apparatus on different zoom positions according to the 1st embodiment of the present disclosure. FIG. 2A to FIG. 2H show spherical aberration curves, astigmatic field curves and a distortion curve of the zoom imaging apparatus on different zoom positions according to the 1st embodiment of FIG. 1A to FIG. 1H, respectively. In FIG. 1A to FIG. 1H, the zoom imaging apparatus includes an image lens assembly (its reference numeral is omitted) and an image sensor 195. The image lens assembly includes, in order from an object side to an image side along an optical path, a first lens element 110, a second lens element 120, an aperture stop 100, a third lens element 130, a fourth lens element 140, a fifth lens element 150, a sixth lens element 160, a seventh lens element 170, an IR-cut filter 180 and an image surface 190, wherein the image sensor 195 is disposed on the image surface 190 of the image lens assembly. The image lens assembly includes seventh lens elements (110, 120, 130, 140, 150, 160, 170) without additional one or more lens elements inserted between the first lens element 110 and the seventh lens element 170, and there is an air gap between each of adjacent lens elements of the seven lens elements.

The first lens element 110 with positive refractive power has an object-side surface 111 being convex in a paraxial region thereof and an image-side surface 112 being convex in a paraxial region thereof. The first lens element 110 is made of a plastic material, and has the object-side surface 111 and the image-side surface 112 being both aspheric. Furthermore, the image side surface 112 of the first lens element 110 includes at least one inflection point in an off-axis region thereof.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric. Furthermore, the object-side surface 121 of the second lens element 120 includes at least one inflection point and at least one concave critical point in an off-axis region thereof.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of a plastic material, and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric.

The seventh lens element 170 with negative refractive power has an object-side surface 171 being concave in a paraxial region thereof and an image-side surface 172 being convex in a paraxial region thereof. The seventh lens element 170 is made of a plastic material, and has the object-side surface 171 and the image-side surface 172 being both aspheric. Furthermore, the object-side surface 171 of the seventh lens element 170 includes at least one inflection point in an off-axis region thereof.

The IR-cut filter 180 is made of a glass material, which is located between the seventh lens element 170 and the image surface 190 in order, and will not affect the focal length of the image lens assembly.

The equation of the aspheric surface profiles of the aforementioned lens elements of the 1st embodiment is expressed as follows:

$$X(Y) = (Y^2/R)/(1+\text{sqrt}(1-(1+k)\times(Y/R)^2)) + \sum_i (Ai)\times(Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient.

In the image lens assembly according to the 1st embodiment, when a focal length of the image lens assembly is f, an f-number of the image lens assembly is Fno, and a half of a maximum field of view of the image lens assembly is HFOV, these parameters have the following values: f=7.98 mm~17.40 mm; Fno=3.24~4.75; and HFOV=6.6 degrees~14.5 degrees.

In the image lens assembly according to the 1st embodiment, when a maximum field of view in a zoom range of the image lens assembly is FOVmax, and a minimum field of view in the zoom range of the image lens assembly is FOVmin, the following conditions are satisfied: FOVmax=29.0 degrees; FOVmin=13.2 degrees; and FOVmax/FOVmin=2.20.

In the image lens assembly according to the 1st embodiment, when a focal length of the first lens element 110 is f1, and a focal length of the second lens element 120 is f2, the following condition is satisfied: f1/|f2|=2.74.

In the image lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, a total number of the lens elements with positive refractive power having Abbe numbers less than 30 is Vp30, a total number of the lens elements having Abbe numbers less than 40 is V40, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, the following conditions are satisfied: V1/N1=11.7; V2/N2=24.6; V3/N3=36.5; V4/N4=10.9; V5/N5=14.3; V6/N6=10.9; V7/N7=10.9; V1+V2=58.15; Vp30=3; and V40=6.

In the image lens assembly according to the 1st embodiment, when a difference value of an axial distance between the second lens element 120 and the third lens element 130 in long shot mode with a maximum field of view to an axial distance between the second lens element 120 and the third lens element 130 in long shot mode with a minimum field of view is ΔT23, and an axial distance from the object-side surface 111 of the first lens element 110 to the image-side surface 122 of the second lens element 120 is Dr1r4, the following conditions are satisfied: ΔT23=4.20; and Dr1r4/ΔT23=0.58.

In the image lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a central thickness of the seventh lens element 170 is CT7, a sum of central thicknesses of all lens elements of the image lens assembly is ΣCT, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, a sum of all axial distances between adjacent lens elements of the image lens assembly is ΣAT, a difference value of an axial distance between the object-side surface 111 of the first lens element 110 and the image-side surface 172 of the seventh lens element 170 in long shot mode with the maximum field of view to an axial distance between the object-side surface 111 of the first lens element 110 and the image-side surface 172 of the seventh lens element 170 in long shot mode with the minimum field of view is ΔTd, a difference value of an axial distance between the image-side surface 172 of the seventh lens element 170 and the image surface 190 in long shot mode with the maximum field of view to an axial distance between the image-side surface 172 of the seventh lens element 170 and the image surface 190 in long shot mode with a minimum field of view is ΔBL, the following conditions are satisfied: |ΔTd|=0.00; |ΔTd|/ΣCT=0.00; |ΔBL|=0.00; |ΔBL|/ΣCT=0.00; ΣCT/ΣAT=0.84; wherein, according to the 1st embodiment, ΣCT=CT1+CT2+CT3+CT4+CT5+CT6+CT7; and ΣAT=T12+T23+T34+T45+T56+T67.

In the image lens assembly according to the 1st embodiment, when a maximum effective diameter of the object-side surface 111 of the first lens element 110 in the zoom range is Y1R1, a maximum image height of the image lens assembly is ImgH, an axial distance between the image-side surface 172 of the seventh lens element 170 and the image surface 190 is BL, and the following conditions are satisfied: Y1R1/ImgH=1.13; and BL/ImgH=2.66.

In the image lens assembly according to the 1st embodiment, when a curvature radius of the image-side surface 132 of the third lens element 130 is R6, and a curvature radius of the object-side surface 141 of the fourth lens element 140 is R7, the following condition is satisfied: (R6-R7)/(R6+R7) =0.07.

The detailed optical data of the 1st embodiment are shown in Table 1.1, Table 1.2 and Table 1.3 below.

TABLE 1.1

| 1st Embodiment | | | | | | | | | |
|---|---|---|---|---|---|---|---|---|---|
| Surface # | | Curvature Radius | | Thickness | Material | Index | Abbe # | Focal Length |
| 0 | Object | Plano | | D1 | | | | |
| 1 | Lens 1 | 10.900 | ASP | 1.525 | Plastic | 1.669 | 19.5 | 12.34 |
| 2 | | −32.134 | ASP | 0.387 | | | | |
| 3 | Lens 2 | 3.834 | ASP | 0.543 | Plastic | 1.570 | 38.7 | −4.51 |
| 4 | | 1.459 | ASP | D2 | | | | |
| 5 | Ape. Stop | Plano | | −0.287 | | | | |
| 6 | Lens 3 | 3.271 | ASP | 1.499 | Plastic | 1.534 | 55.9 | 3.53 |
| 7 | | −3.726 | ASP | 0.075 | | | | |
| 8 | Lens 4 | −3.253 | ASP | 0.937 | Plastic | 1.686 | 18.4 | −10.25 |
| 9 | | −6.764 | ASP | D3 | | | | |
| 10 | Lens 5 | −11.354 | ASP | 0.895 | Plastic | 1.639 | 23.5 | −6.01 |
| 11 | | 5.982 | ASP | 0.035 | | | | |
| 12 | Lens 6 | 3.835 | ASP | 0.949 | Plastic | 1.686 | 18.4 | 8.33 |
| 13 | | 10.489 | ASP | D4 | | | | |
| 14 | Lens 7 | −20.965 | ASP | 0.745 | Plastic | 1.686 | 18.4 | 39.40 |
| 15 | | −11.979 | ASP | 1.000 | | | | |
| 16 | IR-cut filter | Plano | | 0.210 | Glass | 1.517 | 64.2 | — |
| 17 | | Plano | | 4.213 | | | | |
| 18 | Image | Plano | | — | | | | |

Reference wavelength is 587.6 nm (d-line).

Effective radius of Surface 1 is 2.300 mm.

TABLE 1.2

| Aspheric Coefficients | | | | | |
|---|---|---|---|---|---|
| Surface # | 1 | 2 | 3 | 4 | 6 |
| k = | 0.0000E+00 | 0.0000E+00 | −4.6668E−02 | −2.4495E+00 | −3.8198E−02 |
| A4 = | 6.9483E−03 | 1.7953E−03 | −1.3602E−01 | −1.1434E−01 | −3.7158E−04 |
| A6 = | −9.4555E−04 | 5.8296E−03 | 4.9459E−02 | 7.0699E−02 | −2.9900E−04 |
| A8 = | 3.7054E−04 | −3.6874E−03 | −5.9319E−03 | −2.7040E−02 | 1.8867E−04 |
| A10 = | −7.1785E−05 | 2.0222E−03 | −3.7202E−03 | 5.6055E−03 | −1.4603E−04 |
| A12 = | 7.1680E−06 | −7.2440E−04 | 1.8177E−03 | −3.3298E−04 | 3.2116E−05 |
| A14 = | −1.2294E−07 | 1.3611E−04 | −3.0993E−04 | −6.8465E−05 | −3.0296E−06 |
| A16 = | −7.6234E−09 | −9.6556E−06 | 1.8823E−05 | 8.6553E−06 | −4.1621E−07 |
| Surface # | 7 | 8 | 9 | 10 | 11 |
| k = | 4.2190E−02 | −4.0376E−02 | 1.6959E+00 | −1.4509E+00 | −6.8884E−01 |
| A4 = | 2.8665E−02 | 3.3217E−02 | 1.4047E−02 | 2.1733E−02 | 9.3014E−02 |
| A6 = | −1.0481E−02 | −1.1393E−02 | −1.5531E−03 | −1.4535E−02 | −1.2757E−01 |
| A8 = | 3.7914E−03 | 6.1341E−03 | 1.8586E−03 | 1.1330E−02 | 1.0406E−01 |
| A10 = | −1.6302E−04 | −1.6078E−03 | −7.7938E−04 | −6.8359E−03 | −5.0105E−02 |
| A12 = | −2.7884E−04 | 2.1273E−04 | 2.1338E−04 | 2.5539E−03 | 1.3996E−02 |
| A14 = | 5.9908E−05 | −2.0221E−05 | −2.7371E−05 | −5.1877E−04 | −2.0805E−03 |
| A16 = | −3.4649E−06 | 1.7770E−06 | 8.6966E−07 | 4.3569E−05 | 1.2604E−04 |
| Surface # | 12 | 13 | 14 | 15 | |
| k = | 8.5451E−02 | 7.7944E+00 | 2.8375E+01 | 3.6179E+00 | |
| A4 = | 5.8099E−02 | −6.1146E−03 | 7.5021E−03 | 8.0667E−03 | |
| A6 = | −9.8391E−02 | 5.5215E−03 | −6.8261E−04 | −2.4163E−03 | |
| A8 = | 7.6846E−02 | −9.5232E−03 | −4.9636E−04 | 1.4824E−03 | |
| A10 = | −3.3557E−02 | 8.0821E−03 | 2.2693E−04 | −8.7766E−04 | |
| A12 = | 8.1904E−03 | −3.4883E−03 | −2.5907E−05 | 3.0322E−04 | |
| A14 = | −1.0032E−03 | 7.5802E−04 | −4.1564E−06 | −5.4214E−05 | |
| A16 = | 4.4617E−05 | −6.5416E−05 | 7.6968E−07 | 3.8366E−06 | |

TABLE 1.3

| Zoom Position Data | | | | | | | |
|---|---|---|---|---|---|---|---|
| Zoom # | f | Fno | HFOV | D1 | D2 | D3 | D4 |
| 1 | 8.01 | 3.24 | 14.5 | Infinity | 5.215 | 0.756 | 2.301 |
| 2 | 11.52 | 3.90 | 10.0 | Infinity | 3.107 | 1.599 | 3.567 |
| 3 | 12.76 | 4.10 | 9.0 | Infinity | 2.566 | 2.169 | 3.537 |
| 4 | 13.71 | 4.25 | 8.4 | Infinity | 2.197 | 2.690 | 3.385 |
| 5 | 17.40 | 4.74 | 6.6 | Infinity | 1.011 | 5.637 | 1.625 |
| 6 | 7.98 | 3.25 | 14.5 | 800.000 | 5.215 | 0.849 | 2.208 |
| 7 | 12.64 | 4.12 | 9.0 | 800.000 | 2.566 | 2.379 | 3.327 |
| 8 | 17.00 | 4.75 | 6.6 | 800.000 | 1.011 | 6.141 | 1.121 |

Table 1.1 shows the detailed data according to the 1st embodiment of FIG. 1A to FIG. 1H, wherein the curvature radius, the thickness and the focal length are shown in millimeters (mm). Surface numbers 0-18 represent the surfaces sequentially arranged from the object side to the image side along the optical axis, each refractive index is the refractive index measured with the reference wavelength. In Table 1.2, k represents the conic coefficient of the equation of the aspheric surface profiles. A4-A16 represent the aspheric coefficients ranging from the 4th order to the 16th order. In Table 1.3, the zoom #1 to 8 correspond to the parameter data in FIG. 1A to FIG. 1H, respectively, wherein D1, D2, D3 and D4 refer to the thicknesses in Table 1.1. The tables presented below for each embodiment correspond to schematic parameter and aberration curves of each embodiment, and term definitions of the tables are the same as those in Table 1.1, Table 1.2 and Table 1.3 of the 1st embodiment. Therefore, an explanation in this regard will not be provided again.

Furthermore, according to the 1st embodiment in FIG. 1A to FIG. 1H, the first lens element 110 and the second lens element 120 belong to a first lens group, the third lens element 130 and the fourth lens element 140 belong to a second lens group, the fifth lens element 150 and the sixth lens element 160 belong to a third lens group, and the seventh lens element 170 belongs to a fourth lens group. When the image lens assembly is focusing or zooming, a relative position between the first lens group and the image surface 190 is fixed, a relative position between the fourth lens group and the image surface 190 is fixed, and the second lens group and the third lens group move along the optical axis.

FIG. 15 shows a schematic view of the zoom imaging apparatus including a reflective element 196 according to the 1st embodiment of the present disclosure. In FIG. 15, the zoom imaging apparatus includes the reflective element 196 disposed between the seventh lens element 170 and the IR-cut filter 180, which can be a prism for folding the incident light.

2nd Embodiment

FIG. 3A to FIG. 3H are schematic views of a zoom imaging apparatus on different zoom positions according to the 2nd embodiment of the present disclosure. FIG. 4A to FIG. 4H show spherical aberration curves, astigmatic field curves and a distortion curve of the zoom imaging apparatus on different zoom positions according to the 2nd embodiment of FIG. 3A to FIG. 3H, respectively. In FIG. 3A to FIG. 3H, the zoom imaging apparatus includes an image lens assembly (its reference numeral is omitted) and an image sensor 295. The image lens assembly includes, in order from an object side to an image side along an optical path, a first lens element 210, a second lens element 220, an aperture stop 200, a third lens element 230, a fourth lens element 240, a fifth lens element 250, a sixth lens element 260, a seventh lens element 270, an IR-cut filter 280 and an image surface 290, wherein the image sensor 295 is disposed on the image surface 290 of the image lens assembly. The image lens assembly includes seventh lens elements (210, 220, 230, 240, 250, 260, 270) without additional one or more lens elements inserted between the first lens element 210 and the seventh lens element 270, and there is an air gap between each of adjacent lens elements of the seven lens elements.

The first lens element 210 with positive refractive power has an object-side surface 211 being convex in a paraxial region thereof and an image-side surface 212 being convex in a paraxial region thereof. The first lens element 210 is made of a plastic material, and has the object-side surface 211 and the image-side surface 212 being both aspheric. Furthermore, the image side surface 212 of the first lens element 210 includes at least one inflection point in an off-axis region thereof.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric. Furthermore, the object-side surface 221 of the second lens element 220 includes at least one inflection point and at least one concave critical point in an off-axis region thereof.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of a plastic material, and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric.

The seventh lens element 270 with positive refractive power has an object-side surface 271 being convex in a paraxial region thereof and an image-side surface 272 being convex in a paraxial region thereof. The seventh lens element 270 is made of a plastic material, and has the object-side surface 271 and the image-side surface 272 being both aspheric.

The IR-cut filter 280 is made of a glass material, which is located between the seventh lens element 270 and the image surface 290 in order, and will not affect the focal length of the image lens assembly.

The detailed optical data of the 2nd embodiment are shown in Table 2.1, Table 2.2 and Table 2.3 below.

TABLE 2.1

2nd Embodiment

| Surface # | | Curvature Radius | | Thickness | Material | Index | Abbe # | Focal Length |
|---|---|---|---|---|---|---|---|---|
| 0 | Object | Plano | | D1 | | | | |
| 1 | Lens 1 | 8.815 | ASP | 2.219 | Plastic | 1.660 | 20.4 | 12.20 |
| 2 | | −83.754 | ASP | 0.291 | | | | |
| 3 | Lens 2 | 3.662 | ASP | 0.543 | Plastic | 1.566 | 37.4 | −4.65 |
| 4 | | 1.449 | ASP | D2 | | | | |
| 5 | Ape. Stop | Plano | | −0.276 | | | | |
| 6 | Lens 3 | 2.976 | ASP | 1.607 | Plastic | 1.534 | 55.9 | 3.16 |
| 7 | | −3.170 | ASP | 0.057 | | | | |
| 8 | Lens 4 | −3.016 | ASP | 1.000 | Plastic | 1.639 | 23.5 | −6.86 |
| 9 | | −10.924 | ASP | D3 | | | | |
| 10 | Lens 5 | −10.053 | ASP | 0.940 | Plastic | 1.660 | 20.4 | −5.06 |
| 11 | | 5.187 | ASP | 0.104 | | | | |
| 12 | Lens 6 | 3.404 | ASP | 2.081 | Plastic | 1.705 | 14.0 | 7.50 |
| 13 | | 7.142 | ASP | D4 | | | | |
| 14 | Lens 7 | 59.681 | ASP | 1.779 | Plastic | 1.607 | 26.6 | 18.42 |
| 15 | | −13.616 | ASP | 1.000 | | | | |
| 16 | IR-cut filter | Plano | | 0.210 | Glass | 1.517 | 64.2 | — |
| 17 | | Plano | | 2.180 | | | | |
| 18 | Image | Plano | | — | | | | |

Reference wavelength is 587.6 nm (d-line).
Effective radius of Surface 1 is 2.500 mm.

TABLE 2.2

Aspheric Coefficients

| Surface # | 1 | 2 | 3 | 4 | 6 |
|---|---|---|---|---|---|
| k = | 0.0000E+00 | 0.0000E+00 | −1.0038E−01 | −2.4788E+00 | −4.7274E−02 |
| A4 = | 4.7263E−03 | −1.3888E−03 | −1.3672E−01 | −1.1136E−01 | −1.5142E−03 |
| A6 = | −6.0541E−04 | 7.6824E−03 | 5.0636E−02 | 6.8988E−02 | 8.2314E−04 |
| A8 = | 2.2687E−04 | −4.7480E−03 | −7.9552E−03 | −2.8262E−02 | −4.1274E−04 |
| A10 = | −3.6953E−05 | 2.7250E−03 | −2.2241E−03 | 7.1935E−03 | 4.4239E−05 |
| A12 = | 2.3785E−06 | −1.0244E−03 | 1.2870E−03 | −1.0107E−03 | −3.6188E−06 |
| A14 = | 1.4803E−07 | 2.0344E−04 | −2.1772E−04 | 6.0969E−05 | 3.2596E−06 |
| A16 = | −1.8144E−08 | −1.5345E−05 | 1.2570E−05 | −6.6661E−07 | −1.0775E−06 |

| Surface # | 7 | 8 | 9 | 10 | 11 |
|---|---|---|---|---|---|
| k = | −2.6204E−01 | −1.6191E−01 | −4.5671E+00 | −1.0420E+01 | −4.6698E+00 |
| A4 = | −1.4967E−02 | −6.5223E−03 | 1.1906E−02 | 1.9998E−02 | 4.9868E−02 |
| A6 = | 6.8646E−02 | 6.3900E−02 | 3.7729E−03 | −1.2575E−02 | −6.0096E−02 |
| A8 = | −5.9598E−02 | −5.7005E−02 | −1.5032E−03 | 8.1526E−03 | 4.9776E−02 |
| A10 = | 2.7716E−02 | 2.7439E−02 | −6.3714E−05 | −3.7328E−03 | −2.3936E−02 |
| A12 = | −7.0771E−03 | −7.2173E−03 | 5.5379E−04 | 1.0444E−03 | 6.2081E−03 |
| A14 = | 9.0266E−04 | 9.4506E−04 | −2.2742E−04 | −1.7068E−04 | −7.3059E−04 |
| A16 = | −4.2744E−05 | −4.5173E−05 | 2.9947E−05 | 1.3688E−05 | 2.0169E−05 |

| Surface # | 12 | 13 | 14 | 15 |
|---|---|---|---|---|
| k = | −5.4137E−01 | 6.0580E+00 | 9.9000E+01 | 4.8995E−01 |
| A4 = | 1.9974E−02 | −3.2449E−03 | 2.7196E−03 | 3.0275E−03 |
| A6 = | −4.1041E−02 | −1.1085E−03 | −5.7753E−04 | −7.2961E−04 |
| A8 = | 3.5232E−02 | 4.8707E−04 | 2.0808E−04 | 3.4272E−04 |
| A10 = | −1.6997E−02 | 1.3547E−04 | −5.0401E−05 | −1.2302E−04 |
| A12 = | 4.5431E−03 | −2.1312E−04 | 3.4217E−06 | 2.5833E−05 |
| A14 = | −5.9853E−04 | 7.6227E−05 | 9.7236E−07 | −2.8349E−06 |
| A16 = | 2.7299E−05 | −9.1790E−06 | −1.5099E−07 | 1.2290E−07 |

TABLE 2.3

Zoom Position Data

| Zoom # | f | Fno | HFOV | D1 | D2 | D3 | D4 |
|---|---|---|---|---|---|---|---|
| 1 | 9.10 | 3.35 | 12.6 | Infinity | 4.841 | 1.161 | 1.912 |
| 2 | 12.82 | 4.03 | 9.0 | Infinity | 2.897 | 1.856 | 3.161 |
| 3 | 14.16 | 4.24 | 8.1 | Infinity | 2.360 | 2.278 | 3.276 |

TABLE 2.3-continued

Zoom Position Data

| Zoom # | f | Fno | HFOV | D1 | D2 | D3 | D4 |
|---|---|---|---|---|---|---|---|
| 4 | 15.10 | 4.38 | 7.6 | Infinity | 2.021 | 2.620 | 3.272 |
| 5 | 18.98 | 4.90 | 6.1 | Infinity | 0.846 | 4.497 | 2.571 |
| 6 | 9.05 | 3.35 | 12.6 | 800.000 | 4.841 | 1.261 | 1.811 |

TABLE 2.3-continued

| Zoom Position Data | | | | | | | |
|---|---|---|---|---|---|---|---|
| Zoom # | f | Fno | HFOV | D1 | D2 | D3 | D4 |
| 7 | 14.01 | 4.25 | 8.1 | 800.000 | 2.360 | 2.481 | 3.073 |
| 8 | 18.54 | 4.90 | 6.1 | 800.000 | 0.846 | 4.904 | 2.164 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 2.1, Table 2.2 and Table 2.3 as the following values and satisfy the following conditions:

| 2nd Embodiment | | | |
|---|---|---|---|
| f [mm] | 9.05~18.98 | V1 + V2 | 57.84 |
| Fno | 3.35~4.90 | Vp30 | 3 |
| HFOV [degrees] | 6.1~12.6 | V40 | 6 |
| FOVmax [degrees] | 25.3 | ΔT23 | 4.00 |
| FOVmin [degrees] | 12.1 | Dr1r4/ΔT23 | 0.76 |
| FOVmax/FOVmin | 2.09 | \|ΔTd\| | 0.00 |
| f1/\|f2\| | 2.62 | \|ΔTd\|/ΣCT | 0.00 |
| V1/N1 | 12.3 | \|ΔBL\| | 0.00 |
| V2/N2 | 23.9 | \|ΣBL\|/ΣCT | 0.00 |
| V3/N3 | 36.5 | ΣCT/ΣAT | 1.26 |
| V4/N4 | 14.3 | Y1R1/ImgH | 1.23 |
| V5/N5 | 12.3 | BL/ImgH | 1.66 |
| V6/N6 | 8.2 | (R6 − R7)/(R6 + R7) | 0.02 |
| V7/N7 | 16.6 | | |

Furthermore, according to the 2nd embodiment in FIG. 3A to FIG. 3H, the first lens element 210 and the second lens element 220 belong to a first lens group, the third lens element 230 and the fourth lens element 240 belong to a second lens group, the fifth lens element 250 and the sixth lens element 260 belong to a third lens group, and the seventh lens element 270 belongs to a fourth lens group. When the image lens assembly is focusing or zooming, a relative position between the first lens group and the image surface 290 is fixed, a relative position between the fourth lens group and the image surface 290 is fixed, and the second lens group and the third lens group move along the optical axis.

3rd Embodiment

FIG. 5A to FIG. 5H are schematic views of a zoom imaging apparatus on different zoom positions according to the 3rd embodiment of the present disclosure. FIG. 6A to FIG. 6H show spherical aberration curves, astigmatic field curves and a distortion curve of the zoom imaging apparatus on different zoom positions according to the 3rd embodiment of FIG. 5A to FIG. 5H, respectively. In FIG. 5A to FIG. 5H, the zoom imaging apparatus includes an image lens assembly (its reference numeral is omitted) and an image sensor 395. The image lens assembly includes, in order from an object side to an image side along an optical path, a first lens element 310, a second lens element 320, an aperture stop 300, a third lens element 330, a fourth lens element 340, a fifth lens element 350, a sixth lens element 360, a seventh lens element 370, an IR-cut filter 380 and an image surface 390, wherein the image sensor 395 is disposed on the image surface 390 of the image lens assembly. The image lens assembly includes seventh lens elements (310, 320, 330, 340, 350, 360, 370) without additional one or more lens elements inserted between the first lens element 310 and the seventh lens element 370, and there is an air gap between each of adjacent lens elements of the seven lens elements.

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric. Furthermore, the object-side surface 321 of the second lens element 320 includes at least one inflection point and at least one concave critical point in an off-axis region thereof.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with negative refractive power has an object-side surface 351 being concave in a paraxial region thereof and an image-side surface 352 being concave in a paraxial region thereof. The fifth lens element 350 is made of a plastic material, and has the object-side surface 351 and the image-side surface 352 being both aspheric. Furthermore, the object-side surface 351 of the fifth lens element 350 includes at least one inflection point in an off-axis region thereof, and the image-side surface 352 of the fifth lens element 350 includes at least one inflection point in an off-axis region thereof.

The sixth lens element 360 with positive refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the object-side surface 361 of the sixth lens element 360 includes at least one inflection point in an off-axis region thereof, and the image-side surface 362 of the sixth lens element 360 includes at least one inflection point in an off-axis region thereof.

The seventh lens element 370 with positive refractive power has an object-side surface 371 being concave in a paraxial region thereof and an image-side surface 372 being convex in a paraxial region thereof. The seventh lens element 370 is made of a plastic material, and has the object-side surface 371 and the image-side surface 372 being both aspheric.

The IR-cut filter 380 is made of a glass material, which is located between the seventh lens element 370 and the image surface 390 in order, and will not affect the focal length of the image lens assembly.

The detailed optical data of the 3rd embodiment are shown in Table 3.1, Table 3.2 and Table 3.3 below.

TABLE 3.1

| 3rd Embodiment | | | | | | | | | |
|---|---|---|---|---|---|---|---|---|---|
| Surface # | | Curvature Radius | | Thickness | Material | Index | Abbe # | Focal Length |
| 0 | Object | Plano | | D1 | | | | |
| 1 | Lens 1 | 6.224 | ASP | 1.042 | Plastic | 1.669 | 19.5 | 7.97 |
| 2 | | −34.781 | ASP | 0.869 | | | | |
| 3 | Lens 2 | 33.268 | ASP | 0.584 | Plastic | 1.587 | 28.3 | −3.44 |
| 4 | | 1.894 | ASP | D2 | | | | |
| 5 | Ape. Stop | Plano | | −0.490 | | | | |
| 6 | Lens 3 | 2.582 | ASP | 1.445 | Plastic | 1.544 | 56.0 | 2.93 |
| 7 | | −3.330 | ASP | 0.077 | | | | |
| 8 | Lens 4 | −4.431 | ASP | 0.969 | Plastic | 1.639 | 23.5 | −5.65 |
| 9 | | 21.021 | ASP | D3 | | | | |
| 10 | Lens 5 | −5.287 | ASP | 0.976 | Plastic | 1.587 | 28.3 | −5.97 |
| 11 | | 11.140 | ASP | 0.098 | | | | |
| 12 | Lens 6 | 2.537 | ASP | 0.649 | Plastic | 1.669 | 19.5 | 12.31 |
| 13 | | 3.292 | ASP | D4 | | | | |
| 14 | Lens 7 | −13.831 | ASP | 0.975 | Plastic | 1.669 | 19.5 | 9.09 |
| 15 | | −4.344 | ASP | 1.000 | | | | |
| 16 | IR-cut filter | Plano | | 0.210 | Glass | 1.517 | 64.2 | — |
| 17 | | Plano | | 2.029 | | | | |
| 18 | Image | Plano | | — | | | | |

Reference wavelength is 587.6 nm (d-line).
Effective radius of Surface 1 is 2.300 mm.

TABLE 3.2

| Aspheric Coefficients | | | | | |
|---|---|---|---|---|---|
| Surface # | 1 | 2 | 3 | 4 | 6 |
| k = | 0.0000E+00 | 0.0000E+00 | 0.0000E+00 | −3.6493E+00 | 0.0000E+00 |
| A4 = | 3.0260E−03 | 8.3885E−03 | −4.4260E−02 | −2.0328E−02 | −4.2233E−03 |
| A6 = | −4.2914E−04 | −2.9074E−03 | 9.4228E−03 | 6.5180E−03 | 3.5051E−04 |
| A8 = | 2.8607E−05 | 5.4208E−04 | −8.2742E−04 | −5.0458E−04 | −4.2061E−04 |
| A10 = | 8.1314E−06 | −3.0578E−05 | −1.6975E−05 | −7.2753E−05 | |
| Surface # | 7 | 8 | 9 | 10 | 11 |
| k = | 0.0000E+00 | 0.0000E+00 | 0.0000E+00 | 0.0000E+00 | 0.0000E+00 |
| A4 = | 3.0826E−02 | 2.8909E−02 | 1.7769E−02 | 5.3817E−02 | 3.5491E−02 |
| A6 = | −7.6119E−03 | −6.6971E−03 | 1.8311E−03 | −1.9693E−02 | 5.2045E−04 |
| A8 = | 9.9917E−04 | 1.2258E−03 | 8.2067E−04 | 4.0387E−03 | −4.3814E−03 |
| A10 = | | | | −3.2313E−04 | 7.1407E−04 |
| Surface # | 12 | 13 | 14 | 15 | |
| k = | 0.0000E+00 | 0.0000E+00 | 0.0000E+00 | 0.0000E+00 | |
| A4 = | −5.7239E−02 | −5.6947E−02 | 1.6326E−03 | 4.4498E−03 | |
| A6 = | 1.7218E−02 | 1.4844E−02 | −7.6792E−04 | −6.9297E−04 | |
| A8 = | −3.5578E−03 | −2.2652E−03 | 3.7987E−05 | 2.5689E−06 | |

TABLE 3.3

| Zoom Position Data | | | | | | | |
|---|---|---|---|---|---|---|---|
| Zoom # | f | Fno | HFOV | D1 | D2 | D3 | D4 |
| 1 | 8.50 | 3.24 | 13.7 | Infinity | 4.500 | 0.985 | 3.012 |
| 2 | 11.60 | 3.85 | 9.9 | Infinity | 2.895 | 1.750 | 3.853 |
| 3 | 12.74 | 4.05 | 9.0 | Infinity | 2.441 | 2.141 | 3.915 |
| 4 | 13.60 | 4.20 | 8.4 | Infinity | 2.133 | 2.469 | 3.894 |
| 5 | 17.00 | 4.73 | 6.8 | Infinity | 1.123 | 4.092 | 3.283 |
| 6 | 8.50 | 3.25 | 13.6 | 800.000 | 4.500 | 1.082 | 2.915 |
| 7 | 12.77 | 4.07 | 8.9 | 800.000 | 2.441 | 2.330 | 3.725 |
| 8 | 17.00 | 4.75 | 6.7 | 800.000 | 1.123 | 4.460 | 2.915 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 3.1, Table 3.2 and Table 3.3 as the following values and satisfy the following conditions:

| 3rd Embodiment | | | |
|---|---|---|---|
| f [mm] | 8.50~17.00 | V1 + V2 | 47.75 |
| Fno | 3.24~4.75 | Vp30 | 3 |
| HFOV [degrees] | 6.7~13.7 | V40 | 6 |
| FOVmax [degrees] | 27.3 | ΔT23 | 3.38 |
| FOVmin [degrees] | 13.4 | Dr1r4/ΔT23 | 0.74 |
| FOVmax/FOVmin | 2.03 | \|ΔTd\| | 0.00 |
| f1/\|f2\| | 2.32 | \|ΔTd\|/ΣCT | 0.00 |
| V1/N1 | 11.7 | \|ΔBL\| | 0.00 |

-continued

| 3rd Embodiment | | | |
|---|---|---|---|
| V2/N2 | 17.8 | \|ΔBL\|/ΣCT | 0.00 |
| V3/N3 | 36.3 | ΣCT/ΣAT | 0.73 |
| V4/N4 | 14.3 | Y1R1/ImgH | 1.13 |
| V5/N5 | 17.8 | BL/ImgH | 1.59 |
| V6/N6 | 11.7 | (R6 − R7)/(R6 + R7) | −0.14 |
| V7/N7 | 11.7 | | |

Furthermore, according to the 3rd embodiment in FIG. 5A to FIG. 5H, the first lens element 310 and the second lens element 320 belong to a first lens group, the third lens element 330 and the fourth lens element 340 belong to a second lens group, the fifth lens element 350 and the sixth lens element 360 belong to a third lens group, and the seventh lens element 370 belongs to a fourth lens group. When the image lens assembly is focusing or zooming, a relative position between the first lens group and the image surface 390 is fixed, a relative position between the fourth lens group and the image surface 390 is fixed, and the second lens group and the third lens group move along the optical axis.

4th Embodiment

FIG. 7A to FIG. 7H are schematic views of a zoom imaging apparatus on different zoom positions according to the 4th embodiment of the present disclosure. FIG. 8A to FIG. 8H show spherical aberration curves, astigmatic field curves and a distortion curve of the zoom imaging apparatus on different zoom positions according to the 4th embodiment of FIG. 7A to FIG. 7H, respectively. In FIG. 7A to FIG. 7H, the zoom imaging apparatus includes an image lens assembly (its reference numeral is omitted) and an image sensor 495. The image lens assembly includes, in order from an object side to an image side along an optical path, a first lens element 410, a second lens element 420, an aperture stop 400, a third lens element 430, a fourth lens element 440, a fifth lens element 450, a sixth lens element 460, a seventh lens element 470, an IR-cut filter 480 and an image surface 490, wherein the image sensor 495 is disposed on the image surface 490 of the image lens assembly. The image lens assembly includes seventh lens elements (410, 420, 430, 440, 450, 460, 470) without additional one or more lens elements inserted between the first lens element 410 and the seventh lens element 470, and there is an air gap between each of adjacent lens elements of the seven lens elements.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric. Furthermore, the object-side surface 421 of the second lens element 420 includes at least one inflection point and at least one concave critical point in an off-axis region thereof.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric. Furthermore, the object-side surface 441 of the fourth lens element 440 includes at least one inflection point in an off-axis region thereof, and the image-side surface 442 of the fourth lens element 440 includes at least one inflection point in an off-axis region thereof.

The fifth lens element 450 with negative refractive power has an object-side surface 451 being concave in a paraxial region thereof and an image-side surface 452 being concave in a paraxial region thereof. The fifth lens element 450 is made of a plastic material, and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric.

The seventh lens element 470 with positive refractive power has an object-side surface 471 being convex in a paraxial region thereof and an image-side surface 472 being convex in a paraxial region thereof. The seventh lens element 470 is made of a plastic material, and has the object-side surface 471 and the image-side surface 472 being both aspheric.

The IR-cut filter 480 is made of a glass material, which is located between the seventh lens element 470 and the image surface 490 in order, and will not affect the focal length of the image lens assembly.

The detailed optical data of the 4th embodiment are shown in Table 4.1, Table 4.2 and Table 4.3 below.

TABLE 4.1

| 4th Embodiment | | | | | | | | |
|---|---|---|---|---|---|---|---|---|
| Surface # | | Curvature Radius | | Thickness | Material | Index | Abbe # | Focal Length |
| 0 | Object | Plano | | D1 | | | | |
| 1 | Lens 1 | 8.800 | ASP | 2.270 | Plastic | 1.660 | 20.4 | 13.71 |
| 2 | | 290.989 | ASP | 0.413 | | | | |
| 3 | Lens 2 | 3.442 | ASP | 0.528 | Plastic | 1.559 | 40.4 | −4.94 |
| 4 | | 1.448 | ASP | D2 | | | | |
| 5 | Ape. Stop | Plano | | −0.347 | | | | |
| 6 | Lens 3 | 3.043 | ASP | 1.897 | Plastic | 1.534 | 55.9 | 3.19 |

TABLE 4.1-continued

| 4th Embodiment | | | | | | | | |
|---|---|---|---|---|---|---|---|---|
| Surface # | | Curvature Radius | | Thickness | Material | Index | Abbe # | Focal Length |
| 7 | | −3.029 | ASP | 0.059 | | | | |
| 8 | Lens 4 | −2.964 | ASP | 0.722 | Plastic | 1.639 | 23.5 | −6.51 |
| 9 | | −11.325 | ASP | D3 | | | | |
| 10 | Lens 5 | −11.070 | ASP | 0.467 | Plastic | 1.660 | 20.4 | −4.95 |
| 11 | | 4.706 | ASP | 0.120 | | | | |
| 12 | Lens 6 | 3.270 | ASP | 2.848 | Plastic | 1.705 | 14.0 | 7.36 |
| 13 | | 5.651 | ASP | D4 | | | | |
| 14 | Lens 7 | 33.909 | ASP | 3.364 | Plastic | 1.642 | 22.5 | 14.05 |
| 15 | | −11.800 | ASP | 1.000 | | | | |
| 16 | IR-filter | Plano | | 0.210 | Glass | 1.517 | 64.2 | — |
| 17 | | Plano | | 1.403 | | | | |
| 18 | image | Plano | | — | | | | |

Reference wavelength is 587.6 nm (d-line).
Effective radius of Surface 1 is 2.500 mm

TABLE 4.2

| Aspheric Coefficients | | | | | |
|---|---|---|---|---|---|
| Surface # | 1 | 2 | 3 | 4 | 6 |
| k = | 0.0000E+00 | 0.0000E+00 | 1.2197E−02 | −2.4516E−00 | −1.3833E−02 |
| A4 = | 4.4870E−03 | 5.9339E−03 | −1.2153E−01 | −1.0200E−01 | −1.6260E−03 |
| A6 = | −7.2061E−04 | −1.0807E−03 | 3.4065E−02 | 5.5471E−02 | 6.9991E−04 |
| A8 = | 2.6938E−04 | 1.3330E−03 | −1.0275E−03 | −1.9797E−02 | −5.0042E−04 |
| A10 = | −5.0083E−05 | −4.1161E−04 | −3.1995E−03 | 4.5181E−03 | 2.0693E−04 |
| A12 = | 5.1977E−06 | 7.4685E−05 | 1.1471E−03 | −6.2679E−04 | −8.2180E−05 |
| A14 = | −2.1789E−07 | −1.2808E−05 | −1.6851E−04 | 4.9753E−05 | 1.9557E−05 |
| A16 = | 8.1432E−10 | 1.9227E−06 | 9.6866E−06 | −1.9956E−06 | −2.0634E−06 |
| Surface* | 7 | 8 | 9 | 10 | 11 |
| k = | −2.7256E−01 | −2.0901E−01 | −9.2075E+00 | −3.2460E+01 | −4.3354E+00 |
| A4 = | −1.6197E−02 | −8.4215E−03 | 1.0902E−02 | 3.1392E−02 | 5.8915E−02 |
| A6 = | 6.5920E−02 | 6.5200E−02 | 7.3915E−03 | −2.7802E−02 | −6.8303E−02 |
| A8 = | −5.4560E−02 | −5.5978E−02 | −5.5754E−03 | 1.9787E−02 | 5.4091E−02 |
| A10 = | 2.4462E−02 | 2.6212E−02 | 2.6856E−03 | −9.6817E−03 | −2.7292E−02 |
| A12 = | −6.1542E−03 | −6.8635E−03 | −6.2782E−04 | 3.0190E−03 | 8.4902E−03 |
| A14 = | 8.1026E−04 | 9.4032E−04 | 6.6544E−05 | −5.4748E−04 | −1.4905E−03 |
| A16 = | −4.3734E−05 | −5.2724E−05 | −1.7874E−06 | 4.4307E−05 | 1.1353E−04 |
| Surface # | 12 | 13 | 14 | 15 | |
| k = | −7.0669E−01 | 5.1271E+00 | −2.0174E+01 | 1.5261E+01 | |
| A4 = | 1.6290E−02 | −3.0307E−03 | 9.5599E−04 | 1.3246E−03 | |
| A6 = | −3.2968E−02 | −1.0195E−03 | −1.6883E−04 | −1.9377E−04 | |
| A8 = | 2.7244E−02 | 3.1105E−04 | 1.2018E−04 | 1.6138E−04 | |
| A10 = | −1.3528E−02 | −2.7433E−04 | −6.0170E−05 | −5.6082E−05 | |
| A12 = | 4.0737E−03 | 1.5595E−04 | 1.7996E−05 | 1.1918E−05 | |
| A14 = | −6.8206E−04 | −4.7014E−05 | −2.7605E−06 | −1.2977E−06 | |
| A16 = | 4.8673E−05 | 5.2827E−06 | 1.6505E−07 | 5.7875E−08 | |

TABLE 4.3

| Zoom Position Data | | | | | | | |
|---|---|---|---|---|---|---|---|
| Zoom # | f | Fno | HFOV | D1 | D2 | D3 | D4 |
| 1 | 10.01 | 3.35 | 11.6 | Infinity | 4.822 | 1.087 | 1.994 |
| 2 | 14.00 | 4.03 | 8.3 | Infinity | 2.924 | 1.884 | 3.095 |
| 3 | 15.45 | 4.24 | 7.5 | Infinity | 2.394 | 2.305 | 3.204 |
| 4 | 16.45 | 4.38 | 7.1 | Infinity | 2.060 | 2.636 | 3.207 |
| 5 | 20.69 | 4.90 | 5.6 | Infinity | 0.865 | 4.459 | 2.579 |
| 6 | 9.95 | 3.35 | 11.6 | 800.000 | 4.822 | 1.182 | 1.899 |

TABLE 4.3-continued

| Zoom Position Data | | | | | | | |
|---|---|---|---|---|---|---|---|
| Zoom # | f | Fno | HFOV | D1 | D2 | D3 | D4 |
| 7 | 15.29 | 4.25 | 7.5 | 800.000 | 2.394 | 2.495 | 3.014 |
| 8 | 20.22 | 4.90 | 5.6 | 800.000 | 0.865 | 4.840 | 2.198 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 4.1, Table 4.2 and Table 4.3 as the following values and satisfy the following conditions:

| 4th Embodiment | | | |
|---|---|---|---|
| f [mm] | 9.95~20.69 | V1 + V2 | 60.84 |
| Fno | 3.35~4.90 | Vp30 | 3 |
| HFOV [degrees] | 5.6~11.6 | V40 | 5 |
| FOVmax [degrees] | 23.2 | ΔT23 | 3.96 |
| FOVmin [degrees] | 11.2 | Dr1r4/ΔT23 | 0.81 |
| FOVmax/FOVmin | 2.07 | \|Δd\| | 0.00 |
| f1/\|f2\| | 2.77 | \|ΔTd\|/ΣCT | 0.00 |
| V1/N1 | 12.3 | \|ΔBL\| | 0.00 |
| V2/N2 | 25.9 | \|ΔBL\|/ΣCT | 0.00 |
| V3/N3 | 36.5 | ΣCT/ΣAT | 1.48 |
| V4/N4 | 14.3 | Y1R1/ImgH | 1.23 |
| V5/N5 | 12.3 | BL/ImgH | 1.28 |
| V6/N6 | 8.2 | (R6 − R7)/(R6 + R7) | 0.01 |
| V7/N7 | 13.7 | | |

Furthermore, according to the 4th embodiment in FIG. 7A to FIG. 7H, the first lens element 410 and the second lens element 420 belong to a first lens group, the third lens element 430 and the fourth lens element 440 belong to a second lens group, the fifth lens element 450 and the sixth lens element 460 belong to a third lens group, and the seventh lens element 470 belongs to a fourth lens group. When the image lens assembly is focusing or zooming, a relative position between the first lens group and the image surface 490 is fixed, a relative position between the fourth lens group and the image surface 490 is fixed, and the second lens group and the third lens group move along the optical axis.

5th Embodiment

FIG. 9A to FIG. 9H are schematic views of a zoom imaging apparatus on different zoom positions according to the 5th embodiment of the present disclosure. FIG. 10A to FIG. 10H show spherical aberration curves, astigmatic field curves and a distortion curve of the zoom imaging apparatus on different zoom positions according to the 5th embodiment of FIG. 9A to FIG. 9H, respectively. In FIG. 9A to FIG. 9H, the zoom imaging apparatus includes an image lens assembly (its reference numeral is omitted) and an image sensor 595. The image lens assembly includes, in order from an object side to an image side along an optical path, a first lens element 510, a second lens element 520, an aperture stop 500, a third lens element 530, a fourth lens element 540, a fifth lens element 550, a sixth lens element 560, a seventh lens element 570, an IR-cut filter 580 and an image surface 590, wherein the image sensor 595 is disposed on the image surface 590 of the image lens assembly. The image lens assembly includes seventh lens elements (510, 520, 530, 540, 550, 560, 570) without additional one or more lens elements inserted between the first lens element 510 and the seventh lens element 570, and there is an air gap between each of adjacent lens elements of the seven lens elements.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric. Furthermore, the object-side surface 521 of the second lens element 520 includes at least one inflection point and at least one concave critical point in an off-axis region thereof.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of a plastic material, and has the object-side surface 551 and the image-side surface 552 being both aspheric. Furthermore, the object-side surface 551 of the fifth lens element 550 includes at least one inflection point in an off-axis region thereof.

The sixth lens element 560 with positive refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric.

The seventh lens element 570 with positive refractive power has an object-side surface 571 being convex in a paraxial region thereof and an image-side surface 572 being convex in a paraxial region thereof. The seventh lens element 570 is made of a plastic material, and has the object-side surface 571 and the image-side surface 572 being both aspheric.

The IR-cut filter 580 is made of a glass material, which is located between the seventh lens element 570 and the image surface 590 in order, and will not affect the focal length of the image lens assembly.

The detailed optical data of the 5th embodiment are shown in Table 5.1, Table 5.2 and Table 5.3 below.

TABLE 5.1

| 5th Embodiment | | | | | | | | |
|---|---|---|---|---|---|---|---|---|
| Surface # | | Curvature Radius | | Thickness | Material | Index | Abbe # | Focal Length |
| 0 | Object | Plano | | D1 | | | | |
| 1 | Lens 1 | 7.744 | ASP | 2.514 | Plastic | 1.641 | 18.3 | 19.64 |
| 2 | | 17.564 | ASP | 0.410 | | | | |
| 3 | Lens 2 | 3.574 | ASP | 0.522 | Plastic | 1.559 | 40.4 | −5.17 |
| 4 | | 1.514 | ASP | D2 | | | | |
| 5 | Ape. Stop | Plano | | 0.750 | | | | |
| 6 | Lens 3 | 4.410 | ASP | 2.430 | Glass | 1.543 | 62.9 | 3.41 |
| 7 | | −2.573 | ASP | 0.071 | | | | |
| 8 | Lens 4 | −2.375 | ASP | 0.487 | Plastic | 1.639 | 23.5 | −8.03 |
| 9 | | −4.778 | ASP | D3 | | | | |
| 10 | Lens 5 | −6.572 | ASP | 0.882 | Plastic | 1.639 | 23.5 | −4.48 |
| 11 | | 5.326 | ASP | 0.143 | | | | |
| 12 | Lens 6 | 3.709 | ASP | 0.738 | Plastic | 1.705 | 14.0 | 8.02 |
| 13 | | 9.891 | ASP | D4 | | | | |
| 14 | Lens 7 | 47.799 | ASP | 7.902 | Plastic | 1.534 | 55.9 | 14.02 |
| 15 | | −8.364 | ASP | 1.000 | | | | |
| 16 | IR-cut filter | Plano | | 0.210 | Glass | 1.517 | 64.2 | — |
| 17 | | Plano | | 3.509 | | | | |
| 18 | Image | Plano | | — | | | | |

Reference wavelength is 587.6 nm (d-line).
Effective radius of Surface 1 is 2.600 mm.
Effective radius of Surface 13 is 1.650 mm.
Effective radius of Surface 15 is 2.300 mm.

TABLE 5.2

| Aspheric Coefficients | | | | | |
|---|---|---|---|---|---|
| Surface # | 1 | 2 | 3 | 4 | 6 |
| k = | 0.0000E+00 | 0.0000E+00 | −3.1513E−02 | −2.4324E+00 | 1.3132E−01 |
| A4 = | 3.4446E−03 | −1.2755E−02 | −1.6327E−01 | −1.2887E−01 | 3.3472E−03 |
| A6 = | −6.3900E−04 | 1.5953E−02 | 9.0820E−02 | 1.0582E−01 | −1.1263E−02 |
| A8 = | 5.3469E−04 | 6.2578E−04 | −2.1434E−02 | −6.2172E−02 | 1.4874E−02 |
| A10 = | −2.7477E−04 | −1.0067E−02 | −1.9217E−02 | 2.2464E−02 | −1.1961E−02 |
| A12 = | 7.3534E−05 | 8.4903E−03 | 2.2809E−02 | −2.6468E−03 | 5.9449E−03 |
| A14 = | −1.1261E−05 | −3.6613E−03 | −1.1273E−02 | −1.4781E−03 | −1.8418E−03 |
| A16 = | 9.2161E−07 | 9.0490E−04 | 3.0721E−03 | 7.5044E−04 | 3.4535E−04 |
| A18 = | −3.1011E−08 | −1.2191E−04 | −4.4812E−04 | −1.3888E−04 | −3.5820E−05 |
| A20 = | −1.9296E−11 | 7.0235E−06 | 2.7382E−05 | 9.6363E−06 | 1.5761E−06 |
| Surface # | 7 | 8 | 9 | 10 | 11 |
| k = | −3.5451E−01 | −2.8362E−01 | 3.2779E+00 | −1.0554E+01 | −3.5085E+00 |
| A4 = | 4.0971E−02 | 4.6959E−02 | 1.5295E−02 | 2.7452E−02 | 9.6029E−02 |
| A6 = | −2.2008E−02 | −2.5904E−02 | −5.1319E−03 | −4.5258E−02 | −3.1082E−01 |
| A8 = | −5.4603E−03 | −3.5817E−03 | 4.7688E−04 | 7.7587E−02 | 6.5323E−01 |
| A10 = | 2.0535E−02 | 2.3636E−02 | 4.6546E−03 | −8.5918E−02 | −8.2545E−01 |
| A12 = | −1.4299E−02 | −1.7908E−02 | −4.0354E−03 | 5.8951E−02 | 6.4640E−01 |
| A14 = | 4.9243E−03 | 6.5614E−03 | 1.5922E−03 | −2.5158E−02 | −3.1655E−01 |
| A16 = | −9.3055E−04 | −1.3120E−03 | −3.3600E−04 | 6.5096E−03 | 9.4363E−02 |
| A18 = | 9.2402E−05 | 1.3767E−04 | 3.6762E−05 | −9.3506E−04 | −1.5657E−02 |
| A20 = | −3.7766E−06 | −5.9471E−06 | −1.6336E−06 | 5.7214E−05 | 1.1086E−03 |
| Surface # | 12 | 13 | 14 | 15 | |
| k = | −5.8541E−01 | 1.2130E+01 | 1.4413E+01 | 9.0267E+00 | |
| A4 = | 5.9775E−02 | 1.3464E−02 | −4.0252E−03 | 3.8580E−03 | |
| A6 = | −2.5181E−01 | −7.2718E−02 | 1.3014E−02 | −2.3023E−03 | |
| A8 = | 5.2104E−01 | 1.6231E−01 | −2.2725E−02 | 2.2931E−03 | |
| A10 = | −6.3867E−01 | −2.1385E−01 | 2.3197E−02 | −1.3093E−03 | |
| A12 = | 4.8379E−01 | 1.7299E−01 | −1.4734E−02 | 4.6716E−04 | |
| A14 = | −2.2849E−01 | −8.6604E−02 | 5.8826E−03 | −1.0379E−04 | |
| A16 = | 6.5468E−02 | 2.6128E−02 | −1.4340E−03 | 1.3995E−05 | |
| A18 = | −1.0407E−02 | −4.3487E−03 | 1.9480E−04 | −1.0453E−06 | |
| A20 = | 7.0389E−04 | 3.0647E04 | −1.1289E−05 | 3.3317E−08 | |

TABLE 5.3

| Zoom Position Data | | | | | | | |
|---|---|---|---|---|---|---|---|
| Zoom # | f | Fno | HFOV | D1 | D2 | D3 | D4 |
| 1 | 8.10 | 3.34 | 14.4 | Infinity | 6.140 | 0.745 | 1.546 |
| 2 | 12.77 | 4.06 | 9.0 | Infinity | 3.057 | 1.917 | 3.458 |
| 3 | 14.41 | 4.27 | 8.0 | Infinity | 2.345 | 2.445 | 3.642 |
| 4 | 15.68 | 4.42 | 7.3 | Infinity | 1.878 | 2.881 | 3.672 |
| 5 | 20.70 | 4.94 | 5.5 | Infinity | 0.486 | 4.891 | 3.055 |
| 6 | 8.10 | 3.35 | 14.4 | 800.000 | 6.140 | 0.786 | 1.506 |
| 7 | 14.45 | 4.28 | 8.0 | 800.000 | 2.345 | 2.554 | 3.533 |
| 8 | 20.75 | 4.96 | 5.5 | 800.000 | 0.486 | 5.129 | 2.817 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 5.1, Table 5.2 and Table 5.3 as the following values and satisfy the following conditions:

| 5th Embodiment | | | |
|---|---|---|---|
| f [mm] | 8.10~20.75 | V1 + V2 | 58.74 |
| Fno | 3.34~4.96 | Vp30 | 2 |
| HFOV [degrees] | 5.5~14.4 | V40 | 4 |
| FOVmax [degrees] | 28.8 | ΔT23 | 5.65 |
| FOVmin [degrees] | 11.0 | Dr1r4/ΔT23 | 0.61 |
| FOVmax/FOVmin | 2.61 | \|ΔTd\| | 0.00 |
| f1/\|f2\| | 3.80 | \|ΔTd\|/ΣCT | 0.00 |
| V1/N1 | 11.2 | \|ΔBL\| | 0.00 |
| V2/N2 | 25.9 | \|ΔBL\|/ΣCT | 0.00 |
| V3/N3 | 40.8 | ΣCT/ΣAT | 1.58 |
| V4/N4 | 14.3 | Y1R1/ImgH | 1.27 |
| V5/N5 | 14.3 | BL/ImgH | 2.31 |
| V6/N6 | 8.2 | (R6 − R7)/(R6 + R7) | 0.04 |
| V7/N7 | 36.5 | | |

Furthermore, according to the 5th embodiment in FIG. 9A to FIG. 9H, the first lens element 510 and the second lens element 520 belong to a first lens group, the third lens element 530 and the fourth lens element 540 belong to a second lens group, the fifth lens element 550 and the sixth lens element 560 belong to a third lens group, and the seventh lens element 570 belongs to a fourth lens group. When the image lens assembly is focusing or zooming, a relative position between the first lens group and the image surface 590 is fixed, a relative position between the fourth lens group and the image surface 590 is fixed, and the second lens group and the third lens group move along the optical axis.

6th Embodiment

FIG. 11A to FIG. 11H are schematic views of a zoom imaging apparatus on different zoom positions according to the 6th embodiment of the present disclosure. FIG. 12A to FIG. 12H show spherical aberration curves, astigmatic field curves and a distortion curve of the zoom imaging apparatus on different zoom positions according to the 6th embodiment of FIG. 11A to FIG. 11H, respectively. In FIG. 11A to FIG. 11H, the zoom imaging apparatus includes an image lens assembly (its reference numeral is omitted) and an image sensor 695. The image lens assembly includes, in order from an object side to an image side along an optical path, a first lens element 610, a second lens element 620, an aperture stop 600, a third lens element 630, a fourth lens element 640, a fifth lens element 650, a sixth lens element 660, a seventh lens element 670, an IR-cut filter 680 and an image surface 690, wherein the image sensor 695 is disposed on the image surface 690 of the image lens assembly. The image lens assembly includes seventh lens elements (610, 620, 630, 640, 650, 660, 670) without additional one or more lens elements inserted between the first lens element 610 and the seventh lens element 670, and there is an air gap between each of adjacent lens elements of the seven lens elements.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes at least one inflection point and at least one concave critical point in an off-axis region thereof.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of a plastic material, and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric.

The seventh lens element 670 with positive refractive power has an object-side surface 671 being convex in a paraxial region thereof and an image-side surface 672 being convex in a paraxial region thereof. The seventh lens element 670 is made of a glass material, and has the object-side surface 671 and the image-side surface 672 being both aspheric.

The IR-cut filter 680 is made of a glass material, which is located between the seventh lens element 670 and the image surface 690 in order, and will not affect the focal length of the image lens assembly.

The detailed optical data of the 6th embodiment are shown in Table 6.1, Table 6.2 and Table 6.3 below.

TABLE 6.1

| 6th Embodiment | | | | | | | | | |
|---|---|---|---|---|---|---|---|---|---|
| Surface # | | Curvature Radius | | Thickness | Material | Index | Abbe # | Focal Length |
| 0 | Object | Plano | | D1 | | | | |
| 1 | Lens 1 | 7.658 | ASP | 2.549 | Plastic | 1.633 | 23.4 | 24.11 |
| 2 | | 13.392 | ASP | 0.433 | | | | |
| 3 | Lens 2 | 3.589 | ASP | 0.500 | Plastic | 1.544 | 55.9 | −5.54 |
| 4 | | 1.557 | ASP | D2 | | | | |
| 5 | Ape. Stop | Plano | | 1.282 | | | | |
| 6 | Lens 3 | 4.622 | ASP | 2.133 | Plastic | 1.534 | 55.9 | 3.31 |
| 7 | | −2.397 | ASP | 0.096 | | | | |
| 8 | Lens 4 | −2.273 | ASP | 0.842 | Plastic | 1.642 | 22.5 | −7.75 |
| 9 | | −4.793 | ASP | D3 | | | | |
| 10 | Lens 5 | −5.290 | ASP | 0.691 | Plastic | 1.639 | 23.5 | −4.31 |
| 11 | | 6.029 | ASP | 0.035 | | | | |
| 12 | Lens 6 | 3.745 | ASP | 2.380 | Plastic | 1.705 | 14.0 | 7.29 |
| 13 | | 10.182 | ASP | D4 | | | | |
| 14 | Lens 7 | 16.648 | ASP | 5.202 | Glass | 1.507 | 70.5 | 11.87 |
| 15 | | −8.427 | ASP | 1.000 | | | | |
| 16 | IR-cut filter | Plano | | 0.210 | Glass | 1.517 | 64.2 | — |
| 17 | | Plano | | 2.852 | | | | |
| 18 | Image | Plano | | — | | | | |

Reference wavelength is 587.6 nm (d-line).
Effective radius of Surface 1 is 2.750 mm.
Effective radius of Surface 9 is 2.050 mm.
Effective radius of Surface 11 is 1.750 mm.
Effective radius of Surface 15 is 2.400 mm.

TABLE 6.2

| Aspheric Coefficients | | | | | |
|---|---|---|---|---|---|
| Surface* | 1 | 2 | 3 | 4 | 6 |
| k = | 0.0000E+00 | 0.0000E+00 | 9.3063E−03 | −2.5632E+00 | 2.5577E−01 |
| A4 = | 3.1750E−03 | −1.0290E−02 | −1.5975E−01 | −1.2712E−01 | 3.9814E−04 |
| A6 = | −1.8940E−04 | 2.3769E−02 | 1.0994E−01 | 1.2043E−01 | −4.6987E−03 |
| A8 = | 1.7394E−04 | −2.1387E−02 | −8.3004E−02 | −1.1191E−01 | 7.7594E−03 |
| A10 = | −7.3274E−05 | 1.4851E−02 | 6.0673E−02 | 9.2877E−02 | −8.1084E−03 |
| A12 = | 2.0347E−05 | −6.8322E−03 | −3.4416E−02 | −5.8704E−02 | 5.2444E−03 |
| A14 = | −3.6563E−06 | 1.9366E−03 | 1.3263E−02 | 2.5443E−02 | −2.0903E−03 |
| A16 = | 4.1316E−07 | −3.0258E−04 | −3.2023E−03 | −7.0064E−03 | 4.9574E−04 |
| A18 = | −2.6658E−08 | 1.9656E−05 | 4.3351E−04 | 1.0969E−03 | −6.3950E−05 |
| A20 = | 7.4727E−10 | | −2.4999E−05 | −7.4009E−05 | 3.4495E−06 |
| Surface # | 7 | 8 | 9 | 10 | 11 |
| k = | −4.1067E−01 | −2.5593E−01 | 3.5648E+00 | −8.7084E+00 | −4.8654E+00 |
| A4 = | 4.7772E−02 | 5.1425E−02 | 1.2881E−02 | 1.9963E−02 | 2.5626E−02 |
| A6 = | −5.6423E−02 | −6.2134E−02 | −8.3011E−03 | −5.7471E−03 | 1.7601E−02 |
| A8 = | 4.6221E−02 | 5.4716E−02 | 8.1045E−03 | −5.6302E−03 | −7.5755E−02 |
| A10 = | −1.9160E−02 | −2.3226E−02 | −3.2332E−03 | 9.7611E−03 | 9.5640E−02 |
| A12 = | 3.6377E−03 | 3.7342E−03 | 3.5754E−04 | −7.1117E−03 | −6.2529E−02 |
| A14 = | −7.3006E−05 | 5.8448E−04 | 1.8551E−04 | 2.8717E−03 | 2.2391E−02 |
| A16 = | −7.7615E−05 | −3.3822E−04 | −7.6588E−05 | −6.4176E−04 | −4.1214E−03 |
| A18 = | 9.8760E−06 | 5.1723E−05 | 1.1166E−05 | 7.1921E−05 | 2.9759E−04 |
| A20 = | −2.7696E−07 | −2.7939E−06 | −5.8160E−07 | −3.0214E−06 | 1.3726E−06 |
| Surface # | 12 | 13 | 14 | 15 | |
| k = | −6.3488E−01 | 1.6358E+01 | 4.8223E+01 | 9.4907E+00 | |
| A4 = | −2.9332E−03 | −1.0784E−03 | −1.1052E−03 | 4.4379E−03 | |
| A6 = | 2.3136E−02 | −3.4846E−03 | 1.1388E−03 | −9.9886E−04 | |
| A8 = | −6.8199E−02 | 6.7438E−03 | −2.2645E−03 | 1.0340E−03 | |
| A10 = | 8.5796E−02 | −8.8587E−03 | 1.9434E−03 | −6.5973E−04 | |
| A12 = | −5.8634E−02 | 7.4967E−03 | −9.9355E−04 | 2.7657E−04 | |
| A14 = | 2.3175E−02 | −3.9538E−03 | 3.1115E−04 | −7.3200E−05 | |
| A16 = | −5.2576E−03 | 1.2440E−03 | −5.8771E−05 | 1.1884E−05 | |
| A18 = | 6.3418E−04 | −2.1255E−04 | 6.1481E−06 | −1.0787E−06 | |
| A20 = | −3.1768E−05 | 1.5115E−05 | −2.7455E−07 | 4.2220E−08 | |

TABLE 6.3

| Zoom Position Data | | | | | | | |
|---|---|---|---|---|---|---|---|
| Zoom # | f | Fno | HFOV | D1 | D2 | D3 | D4 |
| 1 | 7.00 | 3.55 | 16.5 | Infinity | 6.872 | 0.901 | 1.861 |
| 2 | 11.28 | 4.34 | 10.1 | Infinity | 3.435 | 1.945 | 4.254 |
| 3 | 12.79 | 4.57 | 8.9 | Infinity | 2.638 | 2.424 | 4.572 |
| 4 | 13.97 | 4.73 | 8.1 | Infinity | 2.106 | 2.829 | 4.699 |
| 5 | 18.88 | 5.28 | 6.0 | Infinity | 0.468 | 4.786 | 4.380 |
| 6 | 7.00 | 3.56 | 16.5 | 800.000 | 6.872 | 0.935 | 1.828 |
| 7 | 12.82 | 4.58 | 8.9 | 800.000 | 2.638 | 2.512 | 4.483 |
| 8 | 18.97 | 5.30 | 6.0 | 800.000 | 0.468 | 4.985 | 4.181 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 6.1, Table 6.2 and Table 6.3 as the following values and satisfy the following conditions:

| 6th Embodiment | | | |
|---|---|---|---|
| f [mm] | 7.00~18.97 | V1 + V2 | 79.30 |
| Fno | 3.55~5.30 | Vp30 | 2 |
| HFOV [degrees] | 6.0~16.5 | V40 | 4 |
| FOVmax [degrees] | 33.0 | ΔT23 | 6.40 |
| FOVmin [degrees] | 12.0 | Dr1r4/ΔT23 | 0.54 |
| FOVmax/FOVmin | 2.76 | \|ΔTd\| | 0.00 |
| f1/\|f2\| | 4.35 | \|ΔTd\|/ΣCT | 0.00 |
| V1/N1 | 14.3 | \|ΔBL\| | 0.00 |
| V2/N2 | 36.2 | \|ΔBL\|/ΣCT | 0.00 |
| V3/N3 | 36.5 | ΣCT/ΣAT | 1.25 |
| V4/N4 | 13.7 | Y1R1/ImgH | 1.35 |
| V5/N5 | 14.3 | BL/ImgH | 1.99 |
| V6/N6 | 8.2 | (R6 − R7)/(R6 + R7) | 0.03 |
| V7/N7 | 46.8 | | |

Furthermore, according to the 6th embodiment in FIG. 11A to FIG. 11H, the first lens element 610 and the second lens element 620 belong to a first lens group, the third lens element 630 and the fourth lens element 640 belong to a second lens group, the fifth lens element 650 and the sixth lens element 660 belong to a third lens group, and the seventh lens element 670 belongs to a fourth lens group. When the image lens assembly is focusing or zooming, a relative position between the first lens group and the image surface 690 is fixed, a relative position between the fourth lens group and the image surface 690 is fixed, and the second lens group and the third lens group move along the optical axis.

7th Embodiment

FIG. 13A to FIG. 13H are schematic views of a zoom imaging apparatus on different zoom positions according to the 7th embodiment of the present disclosure. FIG. 14A to FIG. 14H show spherical aberration curves, astigmatic field curves and a distortion curve of the zoom imaging apparatus on different zoom positions according to the 7th embodiment of FIG. 13A to FIG. 13H, respectively. In FIG. 13A to FIG. 13H, the zoom imaging apparatus includes an image lens assembly (its reference numeral is omitted) and an image sensor 795. The image lens assembly includes, in order from an object side to an image side along an optical path, a reflective element 796, a first lens element 710, a second lens element 720, an aperture stop 700, a third lens element 730, a fourth lens element 740, a fifth lens element 750, a sixth lens element 760, a seventh lens element 770, an IR-cut filter 780 and an image surface 790, wherein the image sensor 795 is disposed on the image surface 790 of the image lens assembly. The image lens assembly includes seventh lens elements (710, 720, 730, 740, 750, 760, 770) without additional one or more lens elements inserted between the first lens element 710 and the seventh lens element 770, and there is an air gap between each of adjacent lens elements of the seven lens elements.

The reflective element 796 with negative refractive power has an object-side surface 7961 being convex in a paraxial region thereof and an image-side surface 7962 being concave in a paraxial region thereof. The reflective element 796 is made of plastic material. According to the 7th embodiment, the reflective element 796 is a prism.

The first lens element 710 with positive refractive power has an object-side surface 711 being convex in a paraxial region thereof and an image-side surface 712 being planar in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric. Furthermore, the object-side surface 721 of the second lens element 720 includes at least one inflection point and at least one concave critical point in an off-axis region thereof.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of a plastic material, and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric.

The seventh lens element 770 with positive refractive power has an object-side surface 771 being convex in a paraxial region thereof and an image-side surface 772 being convex in a paraxial region thereof. The seventh lens element 770 is made of a glass material, and has the object-side surface 771 and the image-side surface 772 being both aspheric.

The IR-cut filter 780 is made of a glass material, which is located between the seventh lens element 770 and the image surface 790 in order, and will not affect the focal length of the image lens assembly.

The detailed optical data of the 7th embodiment are shown in Table 7.1, Table 7.2 and Table 7.3 below.

TABLE 7.1

| 7th Embodiment | | | | | | | | | |
|---|---|---|---|---|---|---|---|---|---|
| Surface # | | Curvature Radius | | Thickness | Material | Index | Abbe # | Focal Length |
| 0 | Object | Plano | | D1 | | | | |
| 1 | Prism | 39.885 | | 7.639 | Plastic | 1.534 | 55.9 | −365.05 |
| 2 | | 30.902 | | 1.334 | | | | |
| 3 | Lens 1 | 8.838 | ASP | 1.369 | Plastic | 1.669 | 19.5 | 13.21 |
| 4 | | ∞ | ASP | 0.308 | | | | |
| 5 | Lens 2 | 3.540 | ASP | 0.544 | Plastic | 1.570 | 40.0 | −4.76 |
| 6 | | 1.451 | ASP | D2 | | | | |
| 7 | Ape. Stop | Plano | | −0.305 | | | | |
| 8 | Lens 3 | 4.622 | ASP | 1.756 | Plastic | 1.534 | 55.9 | 3.54 |
| 9 | | −2.397 | ASP | 0.122 | | | | |
| 10 | Lens 4 | −2.273 | ASP | 0.964 | Plastic | 1.686 | 18.4 | −10.07 |
| 11 | | −4.793 | ASP | D3 | | | | |
| 12 | Lens 5 | −5.290 | ASP | 0.500 | Plastic | 1.639 | 23.5 | −6.35 |
| 13 | | 6.029 | ASP | 0.117 | | | | |
| 14 | Lens 6 | 3.745 | ASP | 0.800 | Plastic | 1.686 | 18.4 | 8.66 |
| 15 | | 10.182 | ASP | D4 | | | | |
| 16 | Lens 7 | 16.648 | ASP | 0.628 | Glass | 1.686 | 18.4 | 44.76 |
| 17 | | −8.427 | ASP | 1.000 | | | | |
| 18 | IR-cut filter | Plano | | 0.210 | Glass | 1.517 | 64.2 | — |
| 19 | | Plano | | 4.193 | | | | |
| 20 | Image | Plano | | — | | | | |

Reference wavelength is 587.6 nm (d-line).
Effective radius of Surface 3 is 2.750 mm

TABLE 7.2

| Aspheric Coefficients | | | | | | |
|---|---|---|---|---|---|---|
| Surface # | 1 | 2 | 3 | 4 | 5 | 6 |
| k = | 0.0000E+00 | 0.0000E+00 | 0.0000E+00 | 0.0000E+00 | 9.9631E−02 | −2.4114E+00 |
| A4 = | 3.6426E−04 | 3.1468E−03 | 1.3405E−02 | 1.6216E−02 | −1.2166E−01 | −1.0791E−01 |
| A6 = | −9.5186E−06 | −9.1098E−04 | −4.3033E−03 | −4.5197E−03 | 4.1823E−02 | 6.5521E−02 |
| A8 = | 4.8042E−07 | 1.3912E−04 | 9.5468E−04 | −6.4082E−04 | −7.5984E−03 | −2.4752E−02 |
| A10 = | −9.6370E−09 | −7.4142E−06 | −1.5439E−04 | 9.2760E−04 | −2.7159E−03 | 3.6074E−03 |
| A12 = | | | 2.4809E−05 | −4.0137E−04 | 2.1660E−03 | 1.1577E−03 |
| A14 = | | | −1.6623E−06 | 1.1201E−04 | −5.1112E−04 | −5.6118E−04 |
| A16 = | | | −3.1639E−08 | −1.2346E−05 | 4.2037E−05 | 6.6313E−05 |
| Surface # | 8 | 9 | 10 | 11 | 12 | 13 |
| k = | −3.9191E−02 | 8.7668E−02 | −5.7401E−02 | 1.7088E+00 | −4.6755E+00 | −1.3995E+00 |
| A4 = | 1.5886E−04 | 2.6627E−02 | 3.1431E−02 | 1.4088E−02 | 3.6206E−02 | 9.9926E−02 |
| A6 = | −2.2948E−03 | −1.6495E−02 | −1.2741E−02 | −1.0445E−03 | −4.7346E−02 | −1.8099E−01 |
| A8 = | 2.6892E−03 | 1.9769E−02 | 1.4851E−02 | 1.7738E−03 | 4.9496E−02 | 1.8967E−01 |
| A10 = | −1.8349E−03 | −1.5898E−02 | −1.1948E−02 | −1.2270E−03 | −3.2080E−02 | −1.1278E−01 |
| A12 = | 6.7530E−04 | 7.4344E−03 | 5.7914E−03 | 5.8757E−04 | 1.2022E−02 | 3.8005E−02 |
| A14 = | −1.2670E−04 | −1.7905E−03 | −1.4537E−03 | −1.4735E−04 | −2.3929E−03 | −6.7615E−03 |
| A16 = | 9.1514E−06 | 1.6902E−04 | 1.4263E−04 | 1.4393E−05 | 1.9563E−04 | 4.9325E−04 |
| Surface # | 14 | 15 | 16 | 17 | | |
| k = | 7.0555E−01 | 9.8001E+01 | 9.8869E+01 | 2.1804E+01 | | |
| A4 = | 5.9704E−02 | 4.6417E−03 | 6.2005E−03 | 6.0129E−03 | | |
| A6 = | −1.2870E−01 | −1.2328E−02 | −3.7649E−03 | −2.9691E−03 | | |
| A8 = | 1.2868E−01 | 9.3959E−03 | 2.1557E−03 | 1.4948E−03 | | |
| A10 = | −7.0640E−02 | −3.3294E−03 | −8.6560E−04 | −5.4151E−04 | | |
| A12 = | 2.1770E−02 | 4.5009E−04 | 2.1544E−04 | 1.2166E−04 | | |
| A14 = | −3.5203E−03 | 2.3180E−05 | −2.9887E−05 | −1.5190E−05 | | |
| A16 = | 2.3228E−04 | −7.9660E−06 | 1.7123E−06 | 7.6988E−07 | | |

TABLE 7.3

| Zoom Position Data | | | | | | | |
|---|---|---|---|---|---|---|---|
| Zoom # | 8 | Fno | HFOV | D1 | D2 | D3 | D4 |
| 1 | 8.17 | 3.24 | 13.8 | Infinity | 5.215 | 0.828 | 2.254 |
| 2 | 11.84 | 3.90 | 9.6 | Infinity | 3.021 | 1.552 | 3.723 |
| 3 | 13.10 | 4.10 | 8.7 | Infinity | 2.481 | 2.125 | 3.691 |
| 4 | 14.10 | 4.25 | 8.1 | Infinity | 2.106 | 2.674 | 3.517 |
| 5 | 17.73 | 4.74 | 6.4 | Infinity | 0.986 | 5.563 | 1.748 |
| 6 | 8.14 | 3.25 | 13.8 | 800.000 | 5.215 | 0.946 | 2.136 |
| 7 | 13.00 | 4.12 | 8.7 | 800.000 | 2.481 | 2.390 | 3.425 |
| 8 | 17.37 | 4.75 | 6.4 | 800.000 | 0.986 | 6.177 | 1.134 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 7.1, Table 7.2 and Table 7.3 as the following values and satisfy the following conditions:

| 7th Embodiment | | | |
|---|---|---|---|
| f [mm] | 8.14~17.73 | Vp30 | 3 |
| Fno | 3.24~4.75 | V40 | 6 |
| HFOV [degrees] | 6.4~13.8 | ΔT23 | 4.23 |
| FOVmax [degrees] | 27.7 | Dr1r4/ΔT23 | 0.53 |
| FOVmin [degrees] | 12.8 | \|ΔTd\| | 0.00 |
| FOVmax/FOVmin | 2.16 | \|ΔTd\|/ΣCT | 0.00 |
| f1/\|f2\| | 2.77 | \|ΔBL\| | 0.00 |
| V1/N1 | 11.7 | \|ΔBL\|/ΣCT | 0.00 |
| V2/N2 | 25.5 | ΣCT/ΣAT | 0.77 |
| V3/N3 | 36.5 | Y1R1/ImgH | 1.13 |
| V4/N4 | 10.9 | BL/ImgH | 2.65 |
| V5/N5 | 14.3 | (R6 − R7)/(R6 + R7) | 0.08 |
| V6/N6 | 10.9 | Tgp | 143.00 |
| V7/N7 | 10.9 | Tgp/Np | 93.23 |
| V1 + V2 | 59.46 | | |

In Table 7.3, a glass transition temperature of a material of the reflective element 796 is Tgp, a refractive index of the reflective element 796 is Np.

According to the 7th embodiment in FIG. 13A to FIG. 13H, the first lens element 710 and the second lens element 720 belong to a first lens group, the third lens element 730 and the fourth lens element 740 belong to a second lens group, the fifth lens element 750 and the sixth lens element 760 belong to a third lens group, and the seventh lens element 770 belongs to a fourth lens group. When the image lens assembly is focusing or zooming, a relative position between the first lens group and the image surface 790 is fixed, a relative position between the fourth lens group and the image surface 790 is fixed, and the second lens group and the third lens group move along the optical axis.

Furthermore, FIG. 16 shows a schematic view of the zoom imaging apparatus with another reflective element 796 according to the 7th embodiment of the present disclosure. In FIG. 16, the reflective element 796 is a prism for folding the incident light.

8th Embodiment

FIG. 17 is a three-dimensional schematic view of a zoom imaging apparatus 10 according to the 8th embodiment of the present disclosure. In FIG. 17, the zoom imaging apparatus 10 of the 8th embodiment is a camera module, the zoom imaging apparatus 10 includes an imaging lens assembly 11, a driving apparatus 12 and an image sensor 13, wherein the imaging lens assembly 11 includes the image lens assembly of the present disclosure and a lens barrel (not shown in drawings) for carrying the image lens assembly. The zoom imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The image lens assembly can obtain a favorable imaging position by the driving apparatus 12 so as to capture clear images when the imaged object is disposed at different object distances.

The zoom imaging apparatus 10 can include the image sensor 13 located on the image surface of the image lens assembly, such as CMOS and CCD, with superior photosensitivity and low noise. Thus, it is favorable for providing realistic images with high definition image quality thereof.

Moreover, the zoom imaging apparatus 10 can further include an image stabilization module 14, which can be a kinetic energy sensor, such as an accelerometer, a gyro sensor, and a Hall Effect sensor. In the 8th embodiment, the image stabilization module 14 is a gyro sensor, but is not limited thereto. Therefore, the variation of different axial directions of the image lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (01S) and electronic image stabilizations (EIS) etc., can be provided.

9th Embodiment

FIG. 18A is a schematic view of one side of an electronic device 20 according to the 9th embodiment of the present disclosure. FIG. 18B is a schematic view of another side of the electronic device 20 of FIG. 18A. FIG. 18C is a system schematic view of the electronic device 20 of FIG. 18A. In FIGS. 18A, 18B and 18C, the electronic device 20 according to the 9th embodiment is a smartphone, which include zoom imaging apparatus 10, prime imaging apparatuses 10*a*, 10*b*, 10*c*, 10*d*, a flash module 21, a focusing assisting module 22, an image signal processor (ISP) 23, a user interface 24 and an image software processor 25, wherein each of the imaging apparatuses 10*b*, 10*c*, 10*d* is a front camera. When the user captures images of an imaged object 26 via the user interface 24, the electronic device 20 focuses and generates an image via at least one of the zoom imaging apparatus 10 while compensating for low illumination via the flash module 21 when necessary. Then, the electronic device 20 quickly focuses on the imaged object 26 according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

The zoom imaging apparatus 10 according to the 9th embodiment can include the image lens assembly of the present disclosure, and can be the same or similar to the zoom imaging apparatus 10 according to the aforementioned 8th embodiment, and will not describe again herein. In detail, according to the 9th embodiment, the zoom imaging apparatus 10 and the prime imaging apparatus 10*a* face towards the same side, and the optical axis of the zoom imaging apparatus 10 is perpendicular to an optical axis of the prime imaging apparatus 10*a*. When a maximum field of view of the prime imaging apparatus 10*a* of the electronic device 20 is DFOV (which is 75 degrees), and the maximum field of view in the zoom range of the image lens assembly is FOVmax (which is 13.2 degrees), the following condition is satisfied: DFOV−FOVmax=61.8 degrees.

Furthermore, according to the 9th embodiment, the prime imaging apparatus 10*a* can be wide angle imaging apparatus, the prime imaging apparatuses 10*b*, 10*c*, 10*d* can be wide angle imaging apparatus, ultra-wide angle imaging apparatus and TOF (Time-Of-Flight) module, respectively, but the present disclosure will not be limited thereto. The connecting relationships between each of the prime imaging apparatuses 10*a*, 10*b*, 10*c*, 10*d* and other elements can be the same as the zoom imaging apparatus 10 in FIG. 18C, or can be adaptively adjusted according to the type of the imaging apparatuses, which will not be shown and detailed descripted again.

10th Embodiment

FIG. 19 is a schematic view of one side of an electronic device 30 according to the 10th embodiment of the present disclosure. The electronic device 30 according to the 10th embodiment is a smartphone, the electronic device 30 includes a zoom imaging apparatus 30*a*, two prime imaging apparatuses 30*b*, 30*c*, a flash module 31. In the zoom imaging apparatus 30*a*, the maximum field of view in the zoom range of the image lens assembly is FOVmax (which is 13.2 degrees); the prime imaging apparatus 30*b* is wide-angle arrangement, which has field of view being 75 degrees; the prime imaging apparatus 30*c* is ultra-wide-angle arrangement, which has field of view being 125 degrees. When a maximum field of view of the prime imaging apparatus 30*b* or 30*c* of the electronic device 30 is DFOV, and the maximum field of view in the zoom range of the image lens assembly is FOVmax, the following condition is satisfied: DFOV−FOVmax=96 degrees.

According to the 10th embodiment, the electronic device 30 can include the same elements or the similar elements in the aforementioned 8th embodiment, and the connecting relationships between each of the zoom imaging apparatus 30*a*, the prime imaging apparatuses 30*b*, 30*c*, the flash module 31 and other elements can be the same or similar as the disclosure in the 9th embodiment, which will not be shown and detailed descripted again. In the 10th embodiment, the zoom imaging apparatus 30*a* can include the image lens assembly of the present disclosure, and can be the same or similar to the zoom imaging apparatus 10 according to the aforementioned 8th embodiment, and will not describe again herein. In detail, the zoom imaging apparatus 30*a* and the prime imaging apparatuses 30*b*, 30*c* face towards the same side, and an optical axis of the zoom imaging apparatus 30*a* is perpendicular to an optical axis of each of the prime imaging apparatuses 30*b*, 30*c*.

11th Embodiment

FIG. 20 is a schematic view of one side of an electronic device 40 according to the 11th embodiment of the present disclosure. The electronic device 40 according to the 11th embodiment is a smartphone, the electronic device 40 includes zoom imaging apparatuses 40*g*, 40*h*, prime imaging apparatuses 40*a*, 40*b*, 40*c*, 40*d*, 40*e*, 40*f*, 40*i*, a flash module 41. In each of the zoom imaging apparatuses 40*g*, 40*h*, the maximum field of view in the zoom range of the image lens assembly is FOVmax (which is 29 degrees); each of the prime imaging apparatuses 40*c*, 40*d* is wide-angle arrangement, which has field of view being 75 degrees; each of the prime imaging apparatuses 40*a*, 40*b* is ultra-wide-angle arrangement, which has field of view being 125 degrees. When a maximum field of view of the prime imaging apparatus 40*a*, 40*b*, 40*c* or 40*d* of the electronic device 40 is DFOV, and the maximum field of view in the zoom range of the image lens assembly is FOVmax, the following condition is satisfied: DFOV−FOVmax=96 degrees.

According to the 11th embodiment, the electronic device 40 can include the same elements or the similar elements in the aforementioned 8th embodiment, and the connecting relationships between each of the zoom imaging apparatuses 40*g*, 40*h*, the prime imaging apparatuses 40*a*, 40*b*, 40*c*, 40*d*, 40*e*, 40*f*, 40*i*, the flash module 41 and other elements can be the same or similar as the disclosure in the 9th embodiment, which will not be shown and detailed descripted again. In the 11th embodiment, the zoom imaging apparatuses 40*g*, 40*h* can include the image lens assembly of the present disclosure, and can be the same or similar to the zoom imaging apparatus 10 according to the aforementioned 8th embodiment, and will not describe again herein. In detail, the zoom imaging apparatuses 40*g*, 40*h* and the prime imaging apparatuses 40*a*, 40*b*, 40*c*, 40*d*, 40*e*, 40*f*, 40*i* face towards the same side, and an optical axis of each of the zoom imaging apparatuses 40*g*, 40*h* is perpendicular to an optical axis of each of the prime imaging apparatuses 40*a*, 40*b*, 40*c*, 40*d*, 40*e*, 40*f*, 40*i*.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising, in order from an object side to an image side along an optical path:

- a first lens group comprising a first lens element with positive refractive power having an object-side surface being convex in a paraxial region thereof; and a second lens element having negative refractive power;
- a second lens group comprising a third lens element and a fourth lens element;
- a third lens group comprising a fifth lens element with negative refractive power, and a sixth lens element; and
- a fourth lens group comprising a seventh lens element;
- wherein, a total number of lens elements in the image lens assembly is seven, at least one lens element of the image lens assembly comprises at least one inflection point in an off-axis region thereof; when the image lens assembly is focusing or zooming, a relative position between the first lens group and an image surface is fixed, a relative position between the fourth lens group and the image surface is fixed, and the second lens group and the third lens group move along an optical axis; at least four lens elements of the image lens assembly are made of plastic material;

wherein, a maximum field of view in a zoom range of the image lens assembly is FOVmax, a minimum field of view in the zoom range of the image lens assembly is FOVmin, and the following conditions are satisfied:

$$FOVmax<50 \text{ degrees; and}$$

$$1.25<FOVmax/FOVmin<6.0.$$

2. The image lens assembly of claim 1, wherein a focal length of the first lens element is f1, a focal length of the second lens element is f2, and the following condition is satisfied:

$$1.5<f1/|f2|.$$

3. The image lens assembly of claim 1, wherein the maximum field of view in the zoom range of the image lens assembly is FOVmax, the minimum field of view in the zoom range of the image lens assembly is FOVmin, and the following condition is satisfied:

$$1.5<FOVmax/FOVmin<5.0.$$

4. The image lens assembly of claim 1, wherein an Abbe number of one of the lens elements is Vi, a refractive index of the lens element is Ni, and at least two of the lens elements of the image lens assembly satisfy the following condition:

$$6.0<Vi/Ni<12.5, \text{ wherein } i=1, 2, 3, 4, 5, 6, 7.$$

5. The image lens assembly of claim 1, wherein at least one of the lens elements of the image lens assembly comprises at least one critical point in an off-axis region thereof.

6. The image lens assembly of claim 1, wherein a total number of the lens elements having Abbe numbers less than 40 is V40, and the following condition is satisfied:

$$4\leq V40.$$

7. The image lens assembly of claim 1, wherein a sum of central thicknesses of all lens elements of the image lens assembly is ΣCT, a sum of all axial distances between adjacent lens elements of the image lens assembly is EAT, and the following condition is satisfied:

$$0.65<\Sigma CT/\Sigma AT<2.0.$$

8. The image lens assembly of claim 1, wherein the seventh lens element with positive refractive power has an image-side surface being convex in a paraxial region thereof.

9. The image lens assembly of claim 1, wherein an axial distance from the object-side surface of the first lens element to an image-side surface of the second lens element is Dr1r4, a difference value of an axial distance between the second lens element and the third lens element in long shot mode with a maximum field of view to an axial distance between the second lens element and the third lens element in long shot mode with a minimum field of view is ΔT23, and the following condition is satisfied:

$$Dr1r4/\Delta T23<1.5.$$

10. The image lens assembly of claim 1, wherein a maximum effective diameter of the object-side surface of the first lens element in the zoom range is Y1R1, a maximum image height of the image lens assembly is ImgH, and the following condition is satisfied:

$$Y1R1/ImgH<1.5.$$

11. The image lens assembly of claim 1, wherein at least one of the lens elements of the image lens assembly is made of glass material.

12. The image lens assembly of claim 1, wherein an Abbe number of the first lens element is V1, an Abbe number of the second lens element is V2, a total number of the lens elements with positive refractive power having Abbe numbers less than 30 is Vp30, and the following conditions are satisfied:

$$V1+V2<60; \text{ and}$$

$$2\leq Vp30.$$

13. The image lens assembly of claim 1, wherein the second lens group comprises one lens element with positive refractive power and one lens element with negative refractive power, the third lens group comprises one lens element with positive refractive power and one lens element with negative refractive power.

14. The image lens assembly of claim 1, wherein a sum of central thicknesses of all lens elements of the image lens assembly is ΣCT, a difference value of an axial distance between the image-side surface of the seventh lens element and the image surface in long shot mode with a maximum field of view to an axial distance between the image-side surface of the seventh lens element and the image surface in long shot mode with a minimum field of view is ΔBL, a difference value of an axial distance between the object-side surface of the first lens element and the image-side surface of the seventh lens element in long shot mode with the maximum field of view to an axial distance between the object-side surface of the first lens element and the image-side surface of the seventh lens element in long shot mode with the minimum field of view is ΔTd, and the following conditions are satisfied:

$$|\Delta BL|/\Sigma CT<0.01; \text{ and}$$

$$|\Delta TP|/\Sigma CT<0.01.$$

15. The image lens assembly of claim 1, wherein there is an air gap between each of adjacent lens elements of the seven lens elements, a curvature radius of the image-side surface of the third lens element is R6, a curvature radius of the object-side surface of the fourth lens element is R7, and the following condition is satisfied:

$$-0.75<(R6-R7)/(R6+R7)<0.75.$$

16. The image lens assembly of claim 1, wherein an axial distance between an image-side surface of the seventh lens element and the image surface is BL, a maximum image height of the image lens assembly is ImgH, and the following condition is satisfied:

$$BL/ImgH<2.0.$$

17. The image lens assembly of claim 1, further comprises at least one reflective element.

18. The image lens assembly of claim 17, wherein the reflective element is made of plastic material, a glass transition temperature of a material of the reflective element is Tgp, a refractive index of the reflective element is Np, and the following condition is satisfied:

$$92.5<Tgp/Np<100.$$

19. The image lens assembly of claim 18, wherein the reflective element is disposed on an object side of the first lens element along the optical path, the reflective element with refractive power has a surface facing towards an imaged object being convex in a paraxial region thereof.

20. A zoom imaging apparatus, comprising:
the image lens assembly of claim 1; and
an image sensor disposed on the image surface of the image lens assembly.

21. An electronic device, comprising:
the zoom imaging apparatus of claim 20; and
at least one prime imaging apparatus;
wherein the zoom imaging apparatus and the prime imaging apparatus face towards the same side, and the optical axis of the zoom imaging apparatus is perpendicular to an optical axis of the prime imaging apparatus;
wherein a maximum field of view of the prime imaging apparatus of the electronic device is DFOV, the maximum field of view in the zoom range of the image lens assembly is FOVmax, and the following condition is satisfied:

$$40 \text{ degrees} < DFOV - FOV\max.$$

22. The electronic device of claim 21, wherein the zoom imaging apparatus comprises at least one reflective element.

23. The electronic device of claim 21, wherein a maximum field of view of the prime imaging apparatus of the electronic device is DFOV, the maximum field of view in the zoom range of the image lens assembly is FOVmax, and the following condition is satisfied:

$$60 \text{ degrees} < DFOV - FOV\max.$$

24. An electronic device, comprising a zoom imaging apparatus and at least one prime imaging apparatus, the zoom imaging apparatus and the prime imaging apparatus facing towards the same side, the zoom imaging apparatus comprising an image lens assembly; an optical axis of the prime imaging apparatus is perpendicular to an optical axis of the image lens assembly, and the image lens assembly comprising, in order from an object side to an image side along an optical path:
a first lens group comprising a first lens element having positive refractive power; and a second lens element having negative refractive power;
a second lens group comprising at least one lens element;
a third lens group comprising at least one lens element; and
a fourth lens group comprising a seventh lens element;
wherein, a total number of lens elements in the image lens assembly is seven, at least one lens element of the image lens assembly comprises at least one inflection point in an off-axis region thereof; when the image lens assembly is focusing or zooming, a relative position between the first lens group and an image surface is fixed, a relative position between the fourth lens group and the image surface is fixed, and the second lens group and the third lens group move along the optical axis; at least four lens elements of the image lens assembly are made of plastic material; when the image lens assembly is zooming, a relative position between any lens elements of each of the lens groups is fixed;
wherein, a maximum field of view in a zoom range of the image lens assembly is FOVmax, a minimum field of view in the zoom range of the image lens assembly is FOVmin, a maximum field of view of the prime imaging apparatus of the electronic device is DFOV, and the following conditions are satisfied:

$$1.25 < FOV\max/FOV\min < 5.0; \text{ and}$$

$$40 \text{ degrees} < DFOV - FOV\max.$$

25. The electronic device of claim 24, wherein the second lens group comprises two lens elements, the third lens group comprises two lens elements.

26. The electronic device of claim 25, wherein the two lens elements of the second lens group comprises one lens element with positive refractive power and the other lens element with negative refractive power, the two lens elements of the third lens group comprises one lens element with positive refractive power and the other lens element with negative refractive power.

27. The electronic device of claim 24, wherein a maximum effective diameter of an object-side surface of the first lens element in the zoom range is Y1R1, a maximum image height of the image lens assembly is ImgH, and the following condition is satisfied:

$$Y1R1/ImgH < 1.5.$$

28. The electronic device of claim 24, wherein a total number of the lens elements having Abbe numbers less than 40 is V40, and the following condition is satisfied:

$$5 \leq V40.$$

29. The electronic device of claim 24, wherein the image lens assembly further comprises a third lens element on an image side of the second lens element along the optical path, an axial distance from an object-side surface of the first lens element to an image-side surface of the second lens element is Dr1r4, a difference value of an axial distance between the second lens element and the third lens element in long shot mode with a maximum field of view to an axial distance between the second lens element and the third lens element in long shot mode with a minimum field of view is ΔT23, and the following condition is satisfied:

$$Dr1r4/\Delta T23 < 1.5.$$

30. The electronic device of claim 24, wherein a sum of central thicknesses of all lens elements of the image lens assembly is ΣCT, a sum of all axial distances between adjacent lens elements of the image lens assembly is EAT, and the following condition is satisfied:

$$0.65 < \Sigma CT/\Sigma AT < 2.0.$$

31. The electronic device of claim 24, wherein an Abbe number of one of the lens elements is Vi, a refractive index of the lens element is Ni, and at least two of the lens elements of the image lens assembly satisfy the following condition:

$$6.0 < Vi/Ni < 12.5, \text{ wherein } i=1, 2, 3, 4, 5, 6, 7.$$

32. The electronic device of claim 24, wherein an average of lens refractive indices of the image lens assembly is Navg, and the following condition is satisfied:

$$Navg < 1.70.$$

33. The electronic device of claim 24, wherein the maximum field of view of the prime imaging apparatus of the electronic device is DFOV, the maximum field of view in the zoom range of the image lens assembly is FOVmax, and the following condition is satisfied:

$$60 \text{ degrees} < DFOV - FOV\max.$$

34. The electronic device of claim 24, further comprising at least one reflective element.

35. The electronic device of claim 34, wherein a glass transition temperature of a material of the reflective element is Tgp, a refractive index of the reflective element is Np, and the following condition is satisfied:

$$92.5<Tgp/Np<100.$$

36. The electronic device of claim 35, wherein the reflective element is disposed on an object side of the first lens element along the optical path, the reflective element with refractive power has a surface facing towards an imaged object being convex in a paraxial region thereof.

* * * * *